United States Patent
Dixon et al.

(10) Patent No.: US 10,300,871 B2
(45) Date of Patent: *May 28, 2019

(54) AUXILIARY POWER SYSTEM FOR A VEHICLE

(71) Applicant: Oshkosh Corporation, Oshkosh, WI (US)

(72) Inventors: Matthew Dixon, St. Petersburg, FL (US); Martin Skurka, Parrish, FL (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,491

(22) Filed: Aug. 20, 2018

(65) Prior Publication Data
US 2018/0354437 A1    Dec. 13, 2018

Related U.S. Application Data

(63) Continuation of application No. 14/678,706, filed on Apr. 3, 2015, now Pat. No. 10,053,035.

(60) Provisional application No. 61/975,663, filed on Apr. 4, 2014.

(51) Int. Cl.
| | | |
|---|---|---|
| *B60L 1/00* | (2006.01) | |
| *B60L 3/00* | (2019.01) | |
| *H02G 3/00* | (2006.01) | |
| *B60R 16/033* | (2006.01) | |
| *B60L 11/18* | (2006.01) | |

(52) U.S. Cl.
CPC .............. *B60R 16/033* (2013.01); *B60L 1/00* (2013.01); *B60L 11/18* (2013.01); *B60L 11/1809* (2013.01); *B60L 11/1861* (2013.01); *B60L 11/1868* (2013.01); *B60L 2200/40* (2013.01)

(58) Field of Classification Search
CPC ........................... B60R 16/033; B60L 11/1809
USPC ........................................................ 307/10.1
See application file for complete search history.

(56) References Cited

U.S. PATENT DOCUMENTS

| | | | |
|---|---|---|---|
| 8,295,950 B1 | 10/2012 | Wordsworth et al. | |
| 10,053,035 B1 * | 8/2018 | Dixon | B60R 16/033 |

OTHER PUBLICATIONS

Frontline Communications, DSNG/ENG Nissan NV, trade show promotional flyer, featuring Frontline VIP Power System, product disclosed as of Apr. 6, 2013 at National Association of Broadcasters Show, Las Vegas, Nevada, 1 page.

(Continued)

*Primary Examiner* — Metasebia T Retebo
(74) *Attorney, Agent, or Firm* — Foley & Lardner LLP

(57) ABSTRACT

A vehicle includes a chassis, an engine coupled to the chassis, a primary electrical system, and an auxiliary electrical system. The primary electrical system is configured to power one or more electrical loads associated with operation of the vehicle when the engine is running. The primary electrical system includes a primary alternator and a primary battery. The auxiliary electrical system includes an auxiliary alternator configured to generate electrical power, a battery system electrically coupled to the auxiliary alternator and configured to store at least a portion of the electrical power generated by the auxiliary alternator, and an inverter coupled to the battery system. The inverter is configured to at least one of (a) charge the battery system, (b) power a direct current load, and (c) power an alternating current load.

17 Claims, 110 Drawing Sheets

(56) References Cited

OTHER PUBLICATIONS

Frontline Communications, Frontline NV-ENG Product Description, 2013, product disclosed as of Apr. 6, 2013 at National Association of Broadcasters Show, Las Vegas, Nevada, 2 pages.
Frontline Communications, Frontline VIP (TM) Exclusive Power System, product description page, 2015, retrieved from the internet at: http://www.frontlinecomm.com/vehicle.cfm?ProductID=%23%210G1%0A on Oct. 21, 2015, 2 pages.
Frontline Communications, NV-ENG SR Product Description, product disclosed as of Apr. 5, 2014 at National Association of Broadcasters Show, Las Vegas, Nevada, 2 pages.
Frontline Communications, NV-ENG SR Product Description, product disclosed as of Apr. 6, 2013, at National Association of Broadcasters Show, Las Vegas, Nevada, 2 pages.
Frontline Communications, NV-IPVS ENG TVU MLink Product Description, product disclosed as of Apr. 5, 2014 at National Association of Broadcasters Show, Las Vegas, Nevada, 2 pages.
Frontline Communications, Press Release titled, "Frontline Communications' Frontline VIP TM Premium Power System Wins NewBay Media's Product Innovation Award 2014", dated Dec. 29, 2014, Clearwater, FL., 3 pages.
Frontline Communications, Press Release titled, "Frontline Communications Introduces Industry's First Full-Size ENG Vehicle with Inverter-Based UPS Battery System; Delivers Extended and Continuous Power Without a Generator", dated Mar. 27, 2013, Clearwater, FL., 3 pages.
Photograph of Display Booth at 2014 National Association of Broadcasters Show held in Las Vegas, Nevada, Apr. 5-10, 2014; showing Frontline VIP (TM)Vehicle Integrated Power System, and product information board marked "Patent Pending". 2 pages.

\* cited by examiner

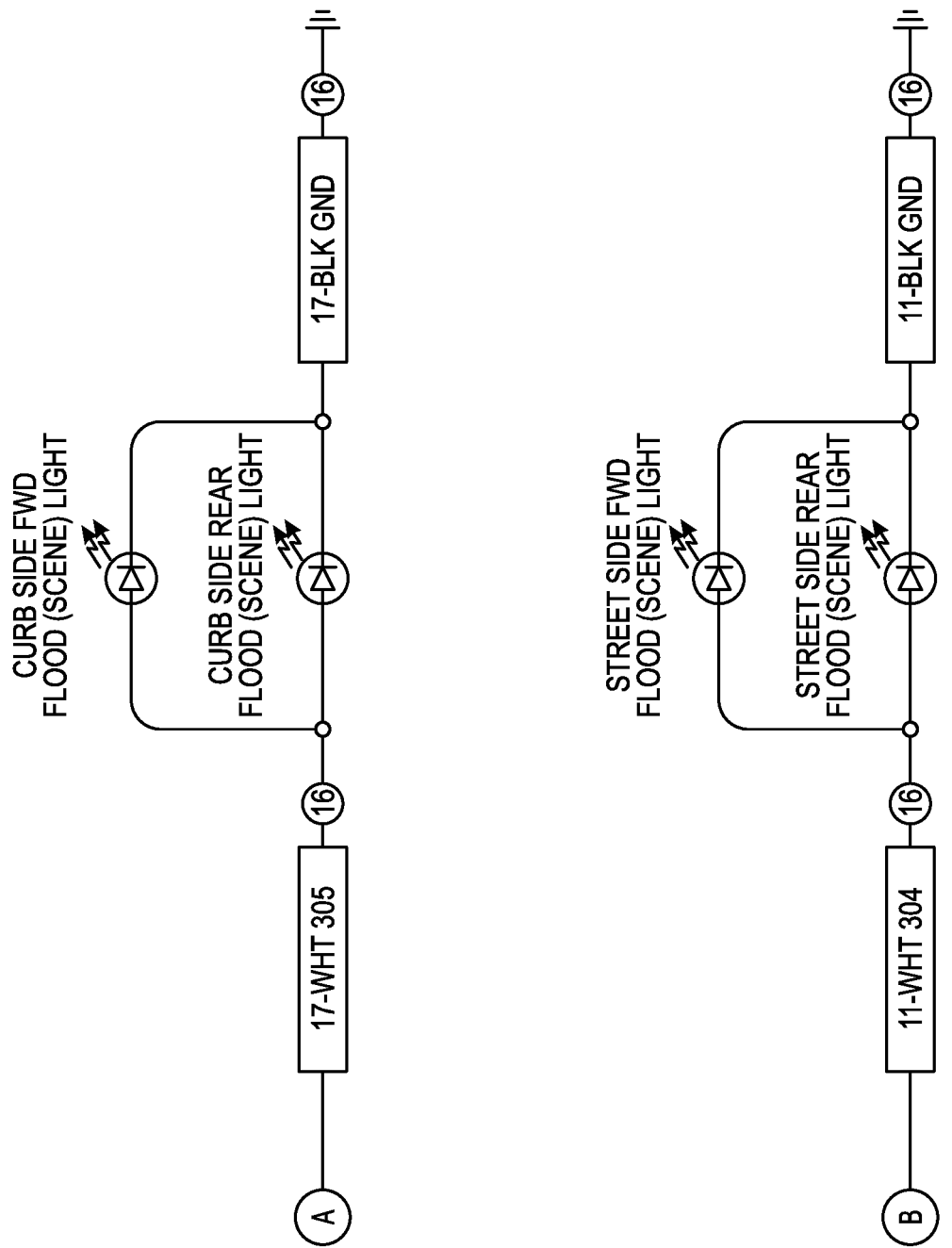

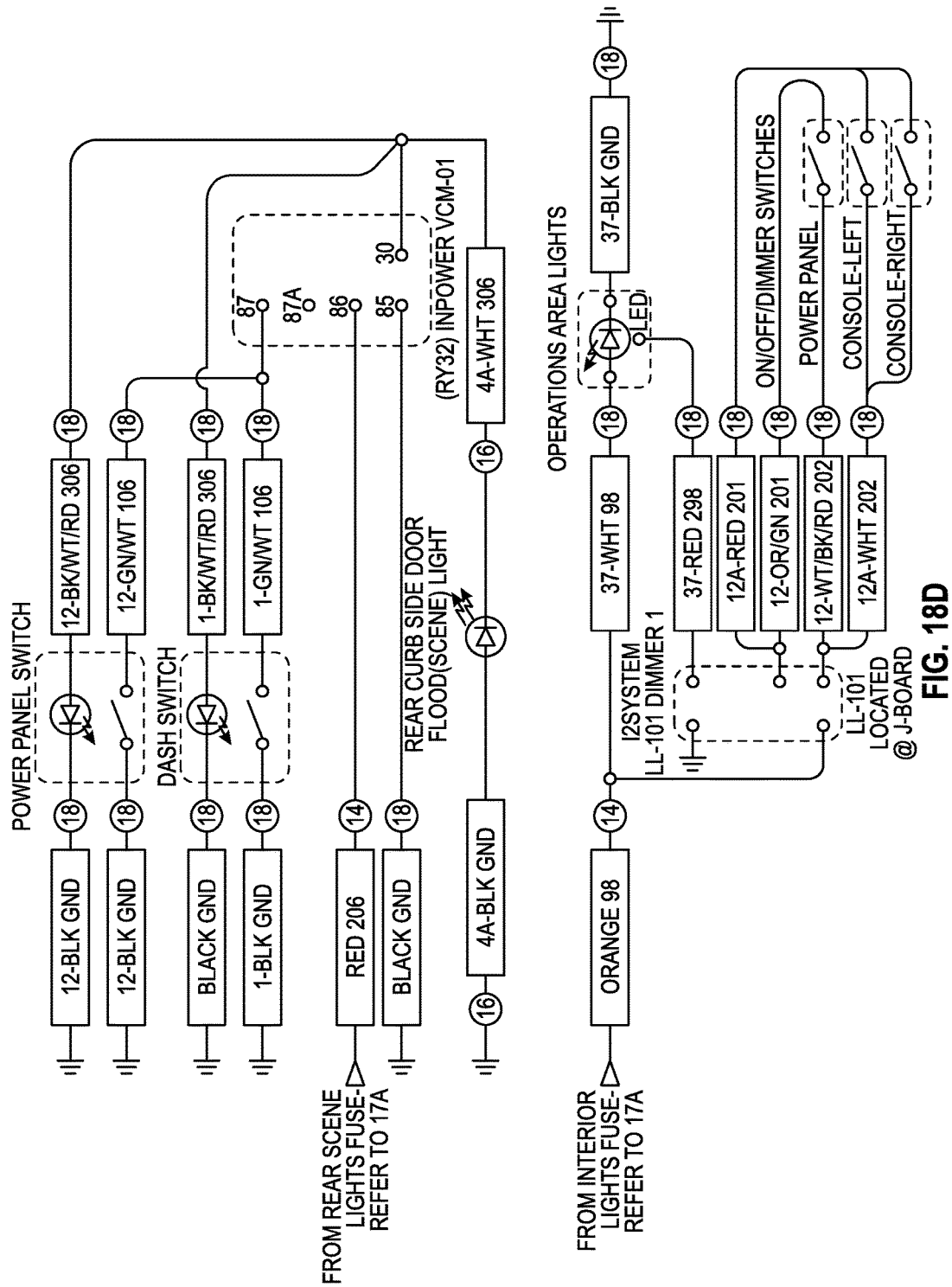

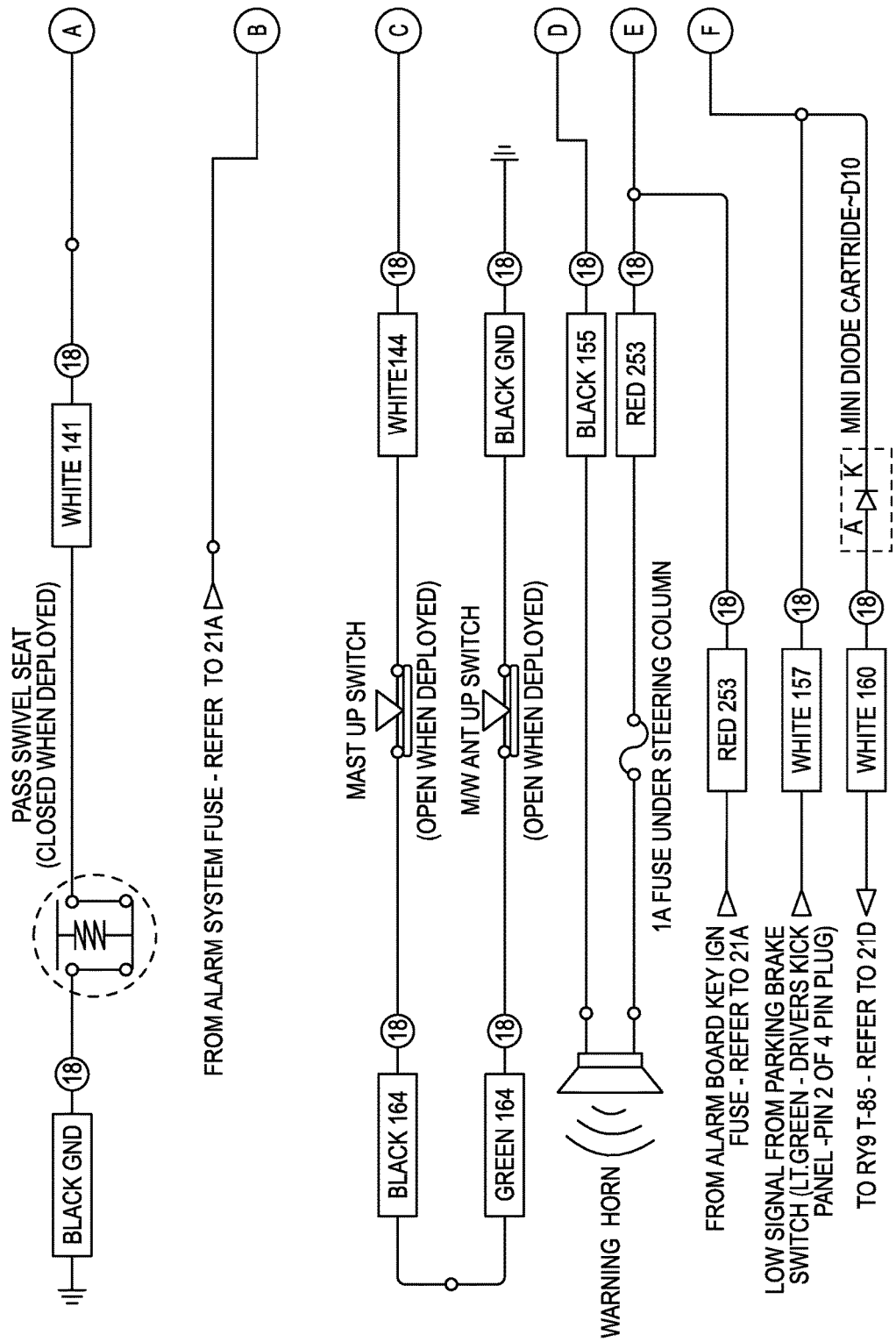

AUXILIARY POWER SYSTEM FOR A VEHICLE

CROSS-REFERENCE TO RELATED PATENT APPLICATIONS

This application is a continuation of U.S. patent application Ser. No. 14/678,706, filed Apr. 3, 2015, which claims the benefit of U.S. Provisional Patent Application No. 61/975,663, filed Apr. 4, 2014, both of which are incorporated herein by reference in their entireties.

BACKGROUND

Broadcast vehicles traditionally include alternating current (AC) generator systems. Such generator systems produce AC electrical power and require either the engine of the vehicle or a generator power source (e.g., an engine, a motor, etc.) to be running during use of the various electrical systems of the broadcast vehicle. Generator-powered systems are often loud and expensive to maintain. Such characteristics may degrade the quality of the filming for which the vehicle may be used (i.e., due to the noisy generator sound in the live film footage or recording, etc.).

SUMMARY

One embodiment relates to a vehicle. The vehicle includes a chassis, an engine coupled to the chassis, a primary electrical system, and an auxiliary electrical system. The primary electrical system is configured to power one or more electrical loads associated with operation of the vehicle when the engine is running. The primary electrical system includes a primary alternator and a primary battery. The auxiliary electrical system includes an auxiliary alternator configured to generate electrical power (e.g., used to power one or more electrical loads associated with operation of the vehicle when the engine is off, etc.), a battery system electrically coupled to the auxiliary alternator and configured to store at least a portion of the electrical power generated by the auxiliary alternator, and an inverter coupled to the battery system. The inverter is configured to at least one of (a) charge the battery system, (b) power a direct current load, and (c) power an alternating current load. In one embodiment, the battery system of the auxiliary electrical system is independent of (e.g., decoupled from, etc.) the primary battery. In another embodiment, the auxiliary electrical system is independent of the primary electrical system. The auxiliary electrical system may also include a solar panel system, an inverter, and/or a user interface.

Another embodiment relates to a power system for a vehicle. The power system includes a primary electrical system and an auxiliary electrical system. The primary electrical system is configured to power one or more electrical loads associated with operation of the vehicle when the vehicle is running The primary electrical system includes a primary alternator and a primary battery. The auxiliary electrical system is configured to power various systems of the vehicle. The auxiliary electrical system includes an auxiliary alternator configured to generate electrical power, a battery system electrically coupled to the auxiliary alternator and configured to store at least a portion of the electrical power generated by the auxiliary alternator, and an inverter coupled to the battery system. The inverter is configured to at least one of (a) charge the battery system, (b) power a direct current load, and (c) power an alternating current load.

Still another embodiment relates to a method for powering a vehicle. The method includes converting mechanical energy from an engine of the vehicle into primary direct current electrical energy with a primary alternator of a primary electrical system, supplying at least a portion of the primary direct current electrical energy to a primary battery of the primary electrical system, generating auxiliary direct current electrical energy with an auxiliary alternator of an auxiliary electrical system, storing the generated auxiliary direct current electrical energy in a battery system of the auxiliary electrical system, converting the stored auxiliary direct current electrical energy to converted alternating current electrical energy with an inverter of the auxiliary electrical system, and powering one or more systems of the vehicle with the auxiliary electrical system while the engine of the vehicle is turned off.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, in which:

FIGS. 18A-18I are schematic diagrams of other portions of a DC portion of an auxiliary power system, according to an exemplary embodiment;

FIGS. 30A-30E are schematic diagrams of other portions of a DC portion of an auxiliary power system, according to yet another exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes a primary electrical system and an auxiliary electrical system. In one embodiment, the vehicle is a mobile news vehicle (e.g., used to broadcast from a particular location, etc.). In other embodiments, the vehicle is a public safety vehicle (e.g., a homeland security vehicle, an emergency response mobile command vehicle, etc.) or still another type of vehicle. The primary electrical system may include a first DC alternator and a first battery. It should be understood that the primary electrical system is used to power the ordinary operational functions of the vehicle. By way of example, the primary electrical system may power headlights of the vehicle, instrument panel lighting and displays within a cab of the vehicle, and the various electrical devices used during vehicle operation (e.g., sensors, spark plugs, engine management systems, etc.). In one embodiment, the auxiliary electrical system replaces the AC generator systems traditionally implemented on broadcast vehicles (e.g., 7 kW Onan generators, engine-mounted generators, etc.). Such generators produce AC electrical power and require either the engine of the vehicle or the generator power source (e.g., engine, motor, etc.) to be running during use. The auxiliary electrical system may operate various systems of the vehicle for an extended period of time (e.g., several hours) without operating the engine of the vehicle. The auxiliary electrical system may be quieter and less expensive to maintain than generator-powered systems. Such characteristics may improve the quality of the filming for which the vehicle may be used (i.e., by removing the noisy generator sound from the live film footage or recording, etc.). The auxiliary electrical system may include various components that are arranged to facilitate use of the vehicle by a broadcaster.

According to an exemplary embodiment, the auxiliary electrical system includes a second DC alternator and a second battery. By way of example, the second DC alternator may be coupled to an engine of the vehicle and used to generate electrical power that may be stored within the second battery. An onboard inverter may be used to convert electrical power stored within the second battery from DC to AC current. In one embodiment, the auxiliary electrical system is used to power various AC and DC loads. By way of example, such AC and DC loads may include lighting, displays, and communications equipment disposed within a cargo area of the vehicle.

Figure 1:
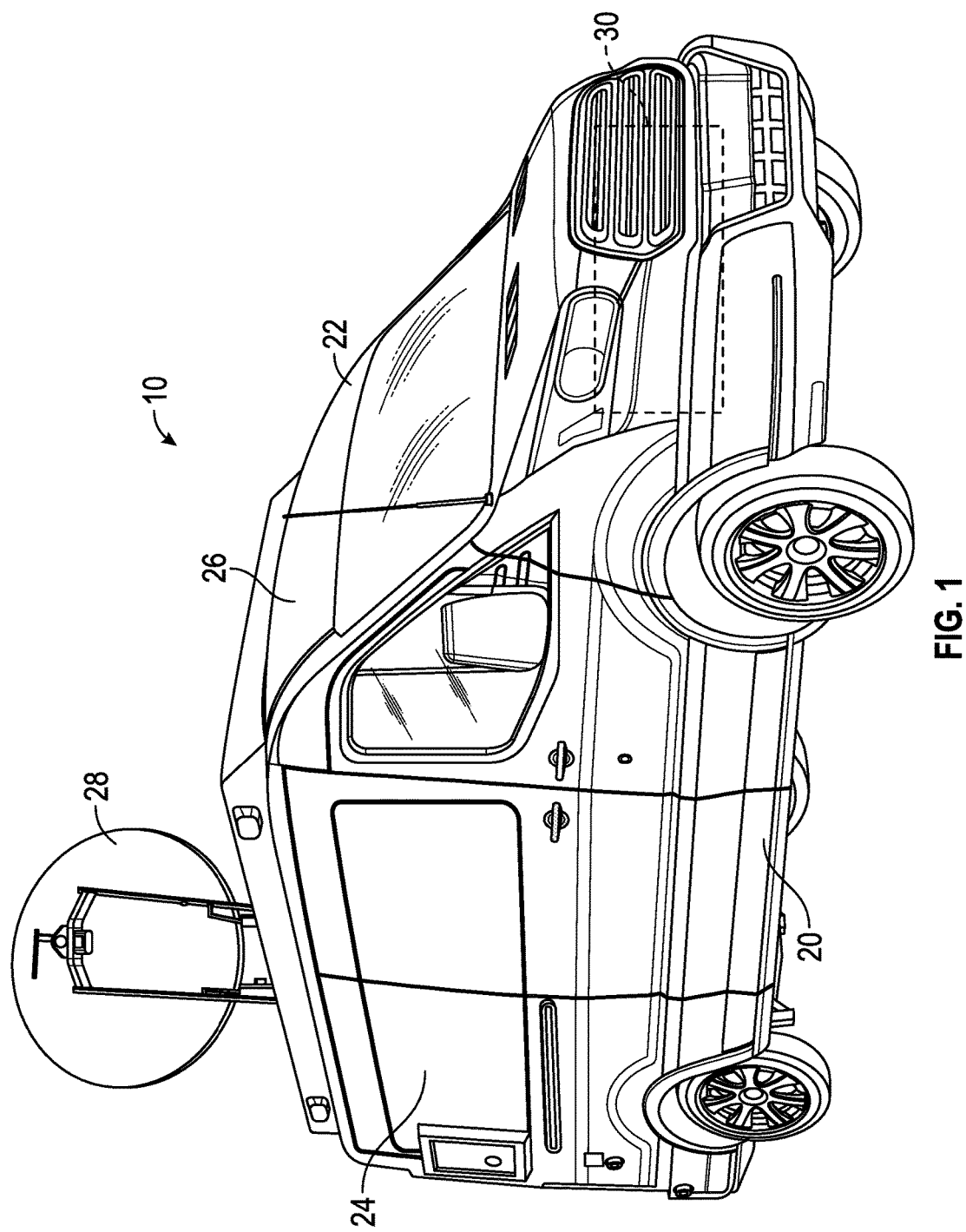
FIG. 1 is a perspective view of a mobile communications vehicle, according to an exemplary embodiment.

Referring to the exemplary embodiment shown in FIG. 1, a vehicle, shown as mobile communications vehicle 10, includes a body, shown as body 20, and an engine 30. In one embodiment, mobile communications vehicle 10 has as 9,000; 9,500; 9,900; or 10,360 pound GVWR and is manufactured using a full-frame V-8 chassis to provide over 1,000 pounds of payload. Mobile communications vehicle 10 may have a wheel base of 148 inches. Engine 30 may be configured to combust gasoline, diesel, or still another fuel. In other embodiments, an electric motor is used in place of or in addition to engine 30. Mobile communications vehicle 10 may be an ENG vehicle, a DSNG vehicle, or a combination thereof, among other alternatives. As shown in FIG. 1, body 20 includes a cab portion 22 and a rear body portion, shown as cargo portion 24. In one embodiment, an operator may sit within cab portion 22 and drive mobile communication vehicle 10 (e.g., to a location from which a broadcast will occur, etc.). Cargo portion 24 may include equipment utilized for the recordation or transmission of a broadcast (e.g., a television broadcast, etc.). In one embodiment, cargo portion 24 has a 72 inch interior height and may house three full-height equipment racks. In other embodiments, cargo portion 24 has a 54 inch interior height. As shown in FIG. 1, body 20 includes a roof portion, shown as roof panel 26. Roof panel 26 may be configured to provide a low roof model, a standard roof model, or a high roof model, among other alternatives. A communications device, shown as dish 28, is coupled to roof panel 26, according to an exemplary embodiment. Dish 28 may be directly coupled to roof panel 26 or coupled to roof panel 26 with an intermediate superstructure (e.g., a pole, etc.). In one embodiment, the intermediate superstructure includes a driver configured to reposition dish 28 between a storage orientation and an operational orientation. By way of example, the intermediate superstructure may include a pole (e.g., a telescoping pole, etc.) that may be actuated between a lowered storage orientation and a raised operational orientation.

Figure 2A:
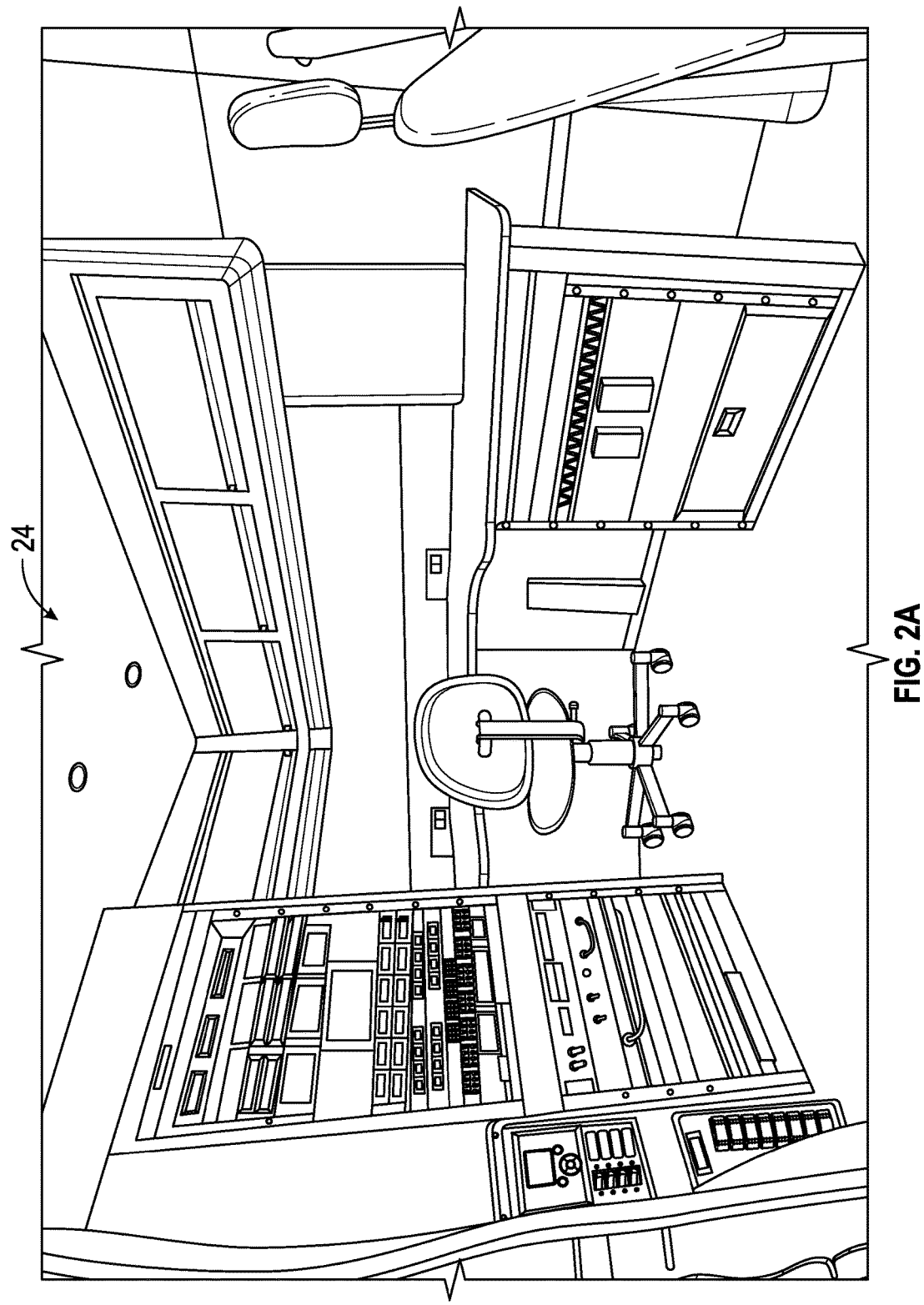
FIGS. 2A-2G are various perspective views of components of a mobile communications vehicle, according to an exemplary embodiment.
Figure 2B:
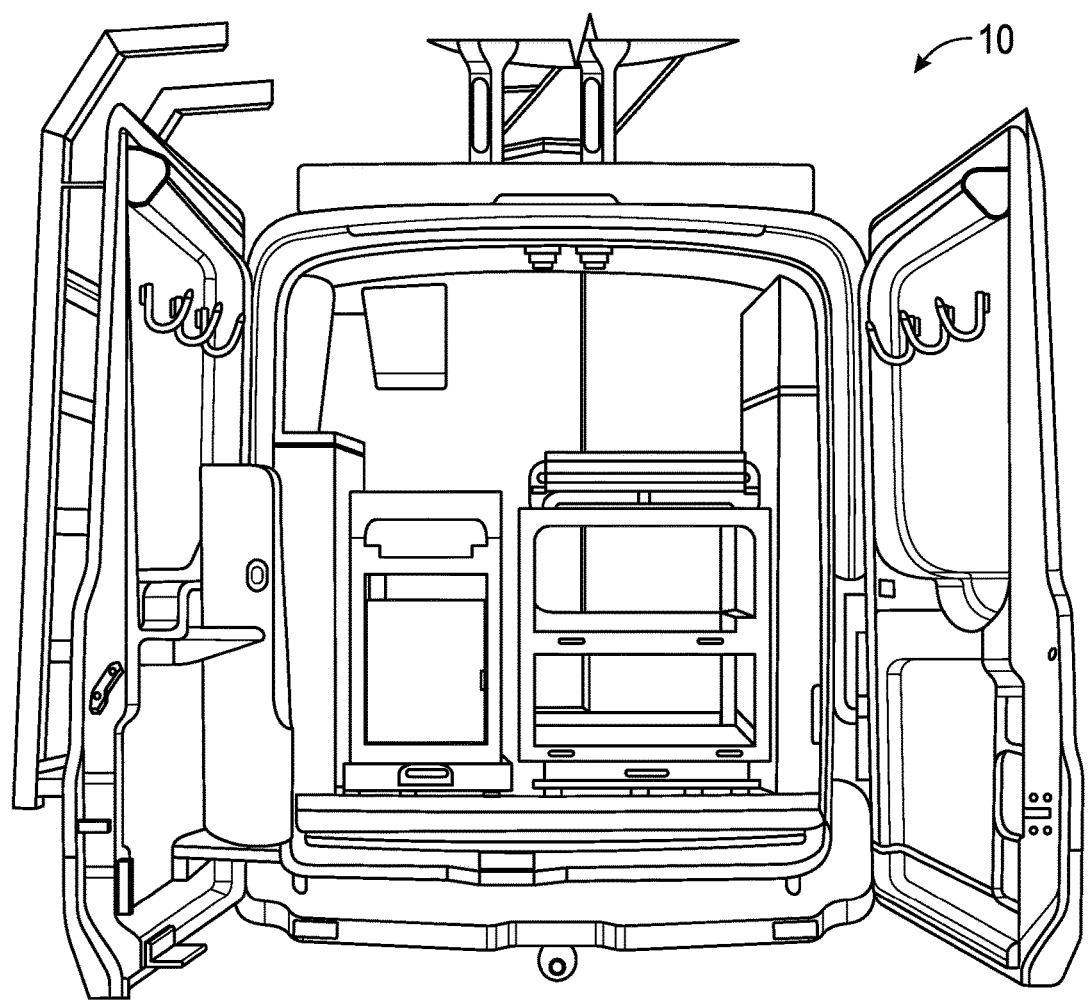
Figure 2D:
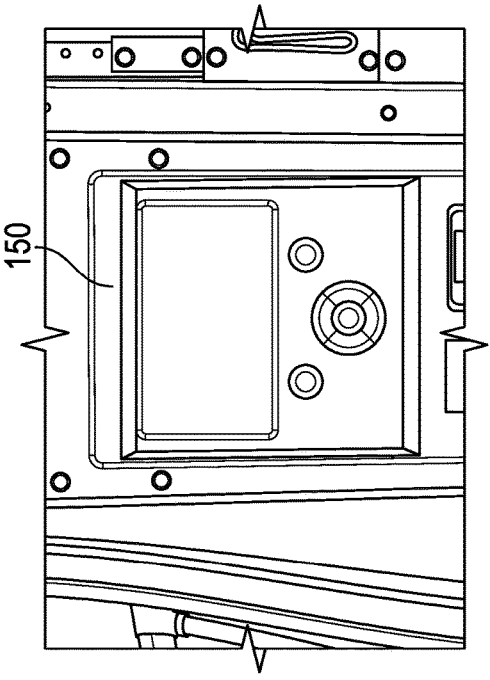
Figure 2F:
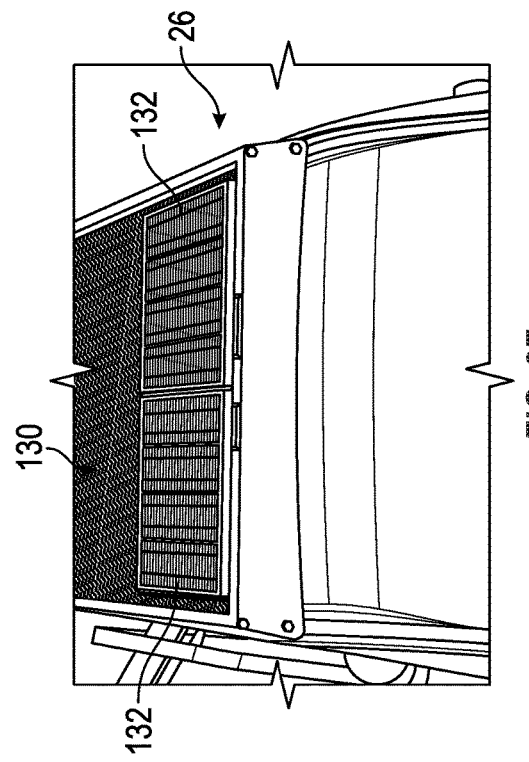
Figure 2C:
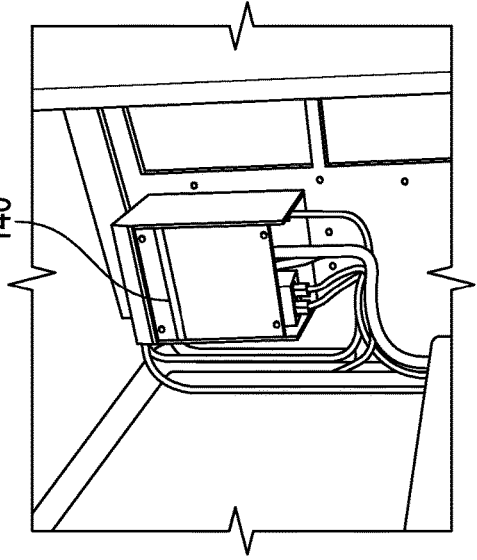
Figure 2E:
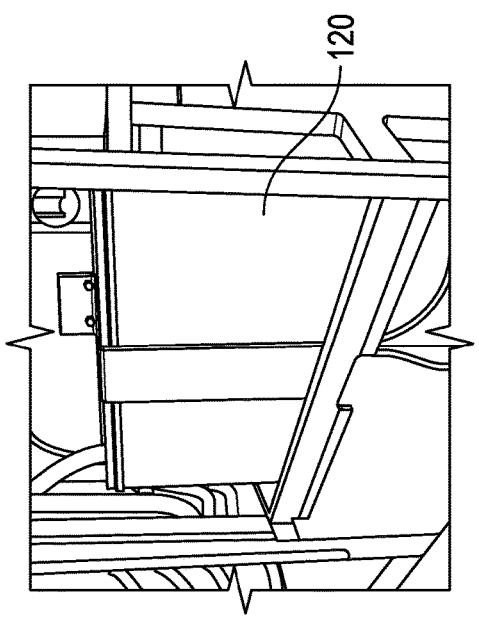
Figure 2G:
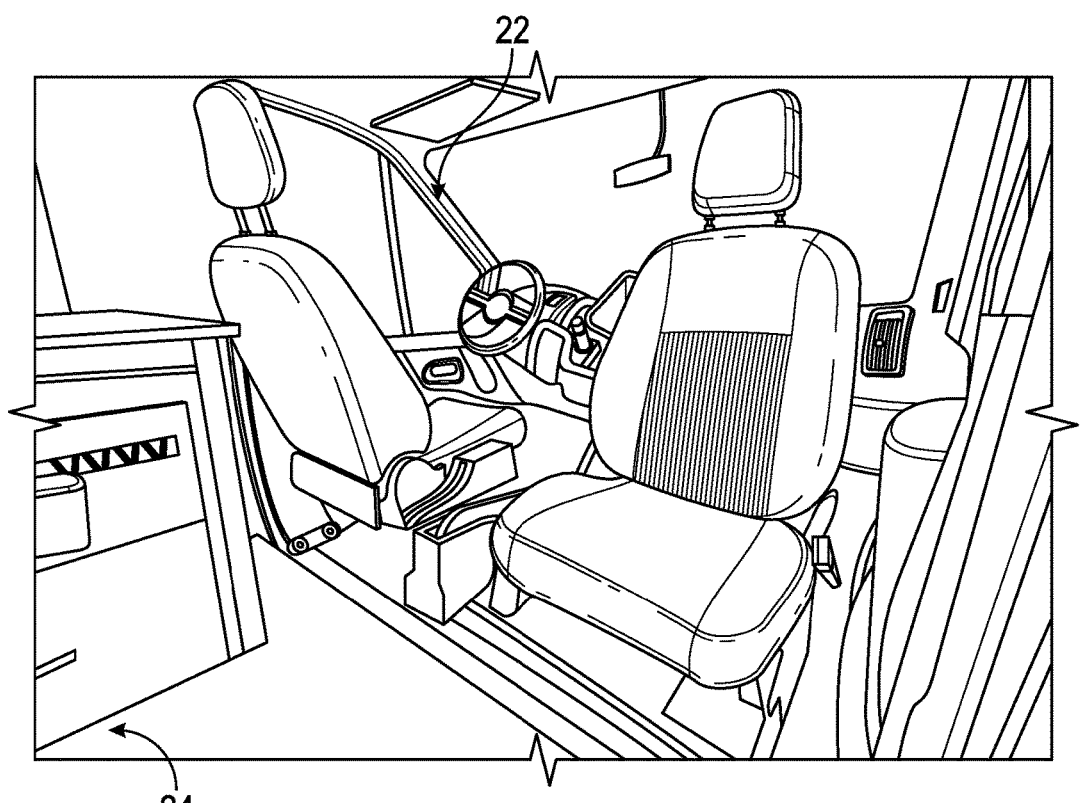

Referring to FIGS. 2A-2G, various views of mobile communications vehicle 10 are shown, according to an exemplary embodiment. As shown in FIG. 2A, cargo portion 24 of mobile communications vehicle 10 may include an interior layout configured to facilitate a non-linear editing environment. As shown in FIG. 2B, various equipment or racks may be positioned in a rear portion of body 20. In one embodiment, mobile communications vehicle 10 includes a modular equipment storage system. The modular equipment storage system may include a light weight adjustable storage system. The various equipment and racks may be slidably coupled to the rear portion of body 20 to facilitate easy access to the area behind the racks. The racks may further include a tilting feature when extended from the rear portion of the body 20. As shown in FIGS. 2C-2F, mobile communications vehicle 10 includes an auxiliary electrical system that includes an inverter 140, a control system with a user interface 150, and a battery system 120 that may include one or more batteries. A solar panel system 130 may be electrically coupled to the batteries and positioned on roof panel 26 of mobile communications vehicle 10. In other embodiments, the solar panel system 130 may be removable (e.g., an operator may position the solar panel along a ground surface nearby mobile communications vehicle 10, etc.). The solar panel system 130 may include one or more solar panels 132 (e.g., one, two, three, etc.) and provide power to the battery system 120. In one embodiment, mobile communications vehicle 10 includes two 55 watt solar panels 132 that may provide four amps of electrical power. As shown in FIG. 2G, a passenger seat positioned within cab portion 22 may swivel and may have an alarm that sounds if a drive gear of mobile communications vehicle 10 is selected with the passenger seat facing cargo portion 24.

Figure 3A:
FIG. 3A is a perspective view of a high-roof model of a mobile communications vehicle, according to an exemplary embodiment.
Figure 3B:
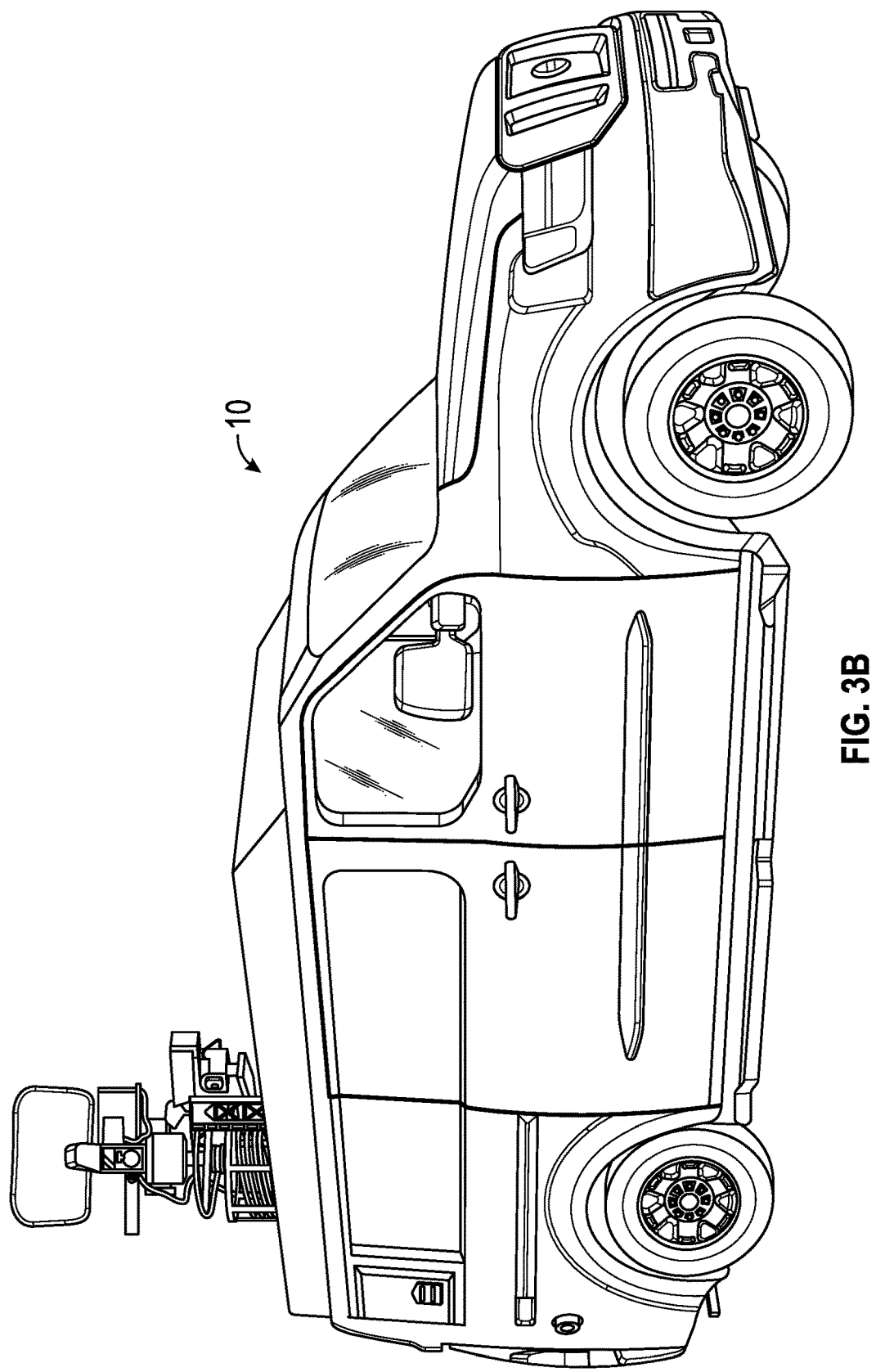
FIG. 3B is a perspective view of a standard roof model of a mobile communications vehicle, according to an exemplary embodiment.
Figure 4A:
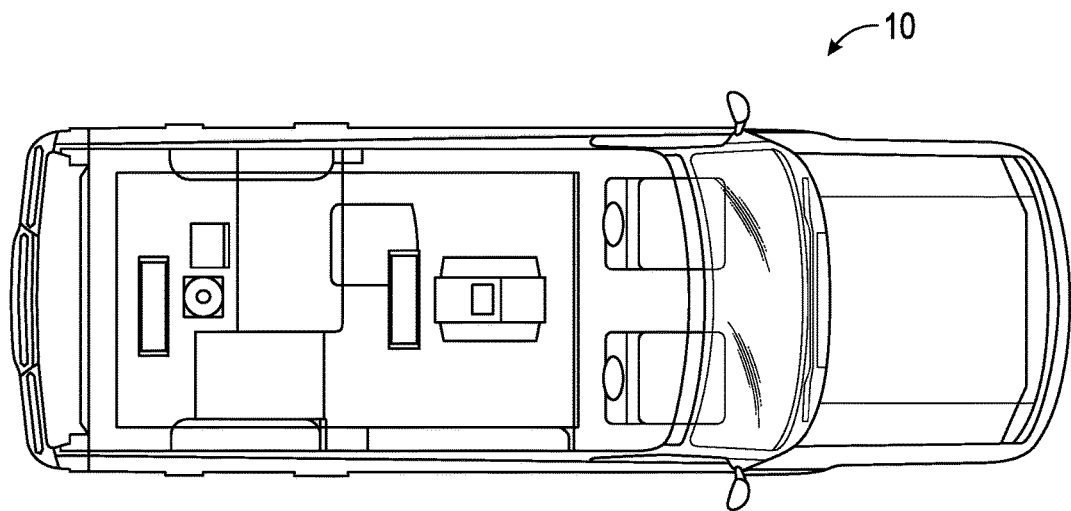
FIGS. 4A-4F are various plan views of a mobile communications vehicle, according to an exemplary embodiment.
Figure 4B:
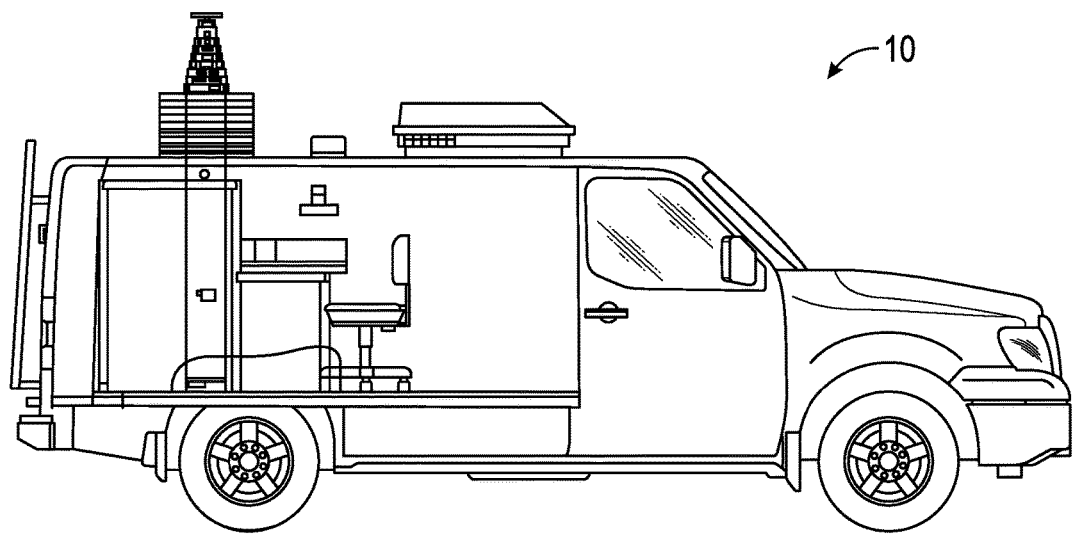
Figure 4C:
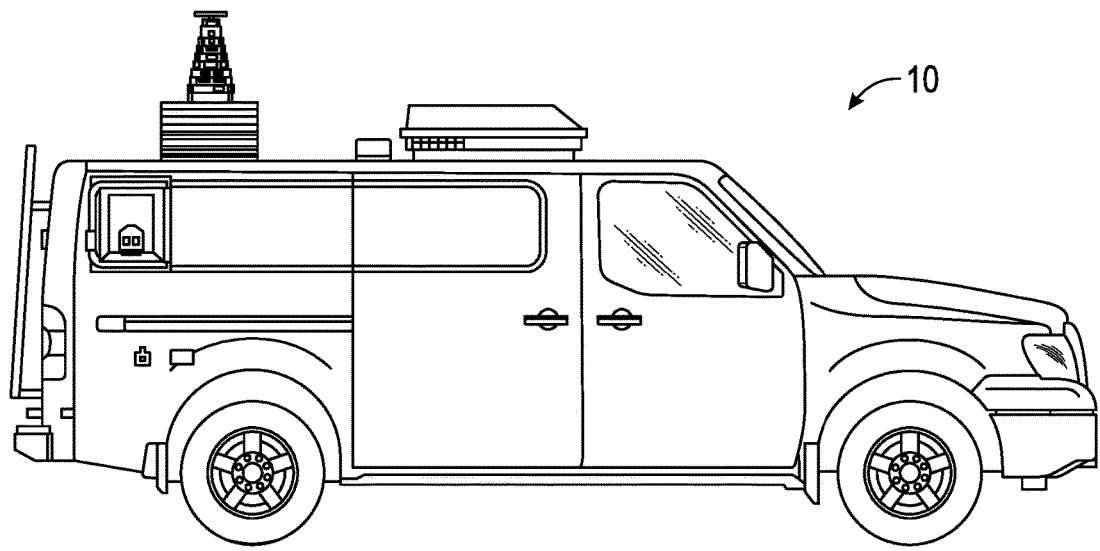
Figure 4D:
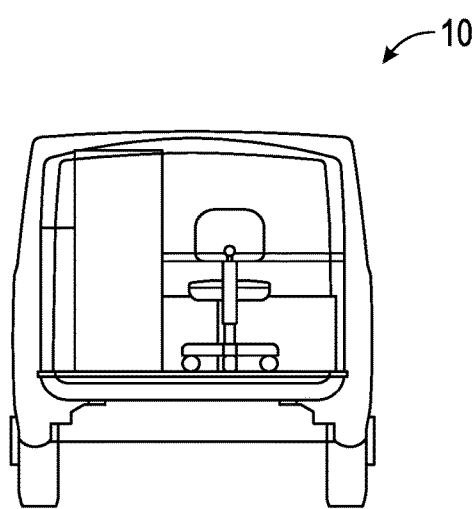
Figure 4E:
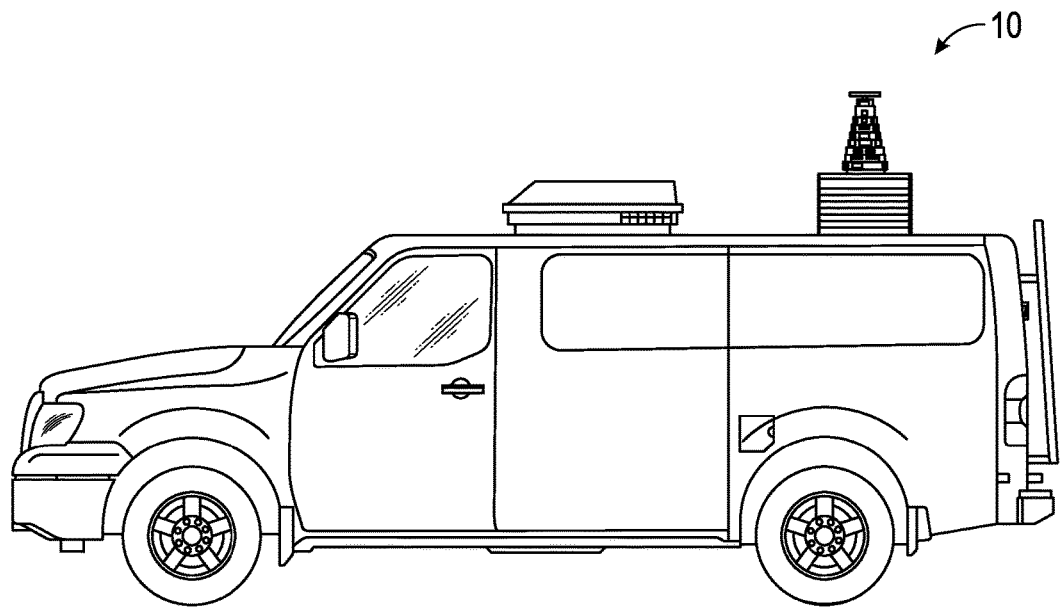
Figure 4F:
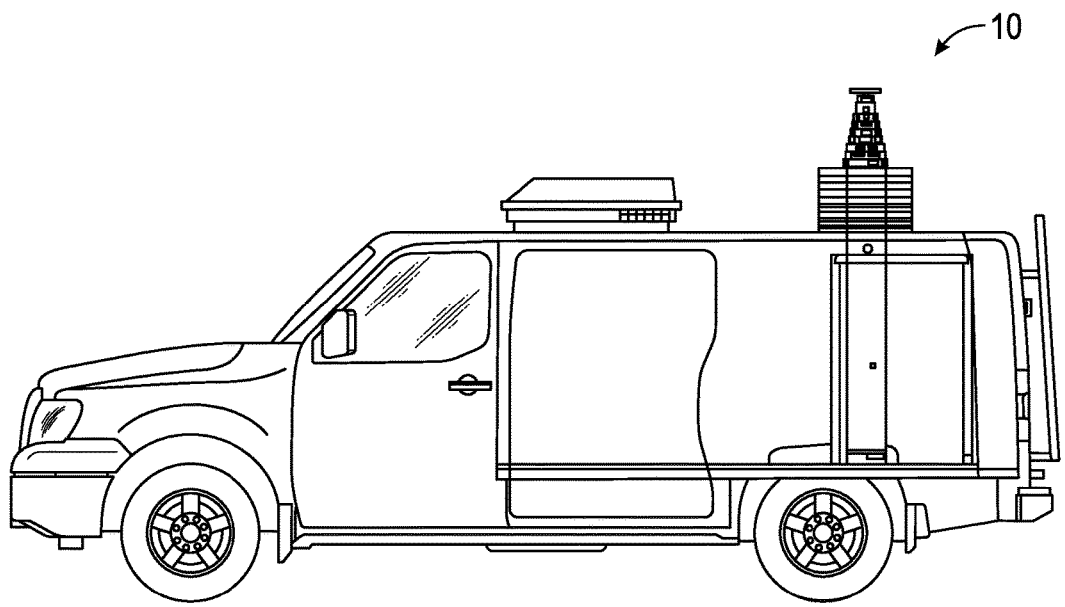
Figure 5A:
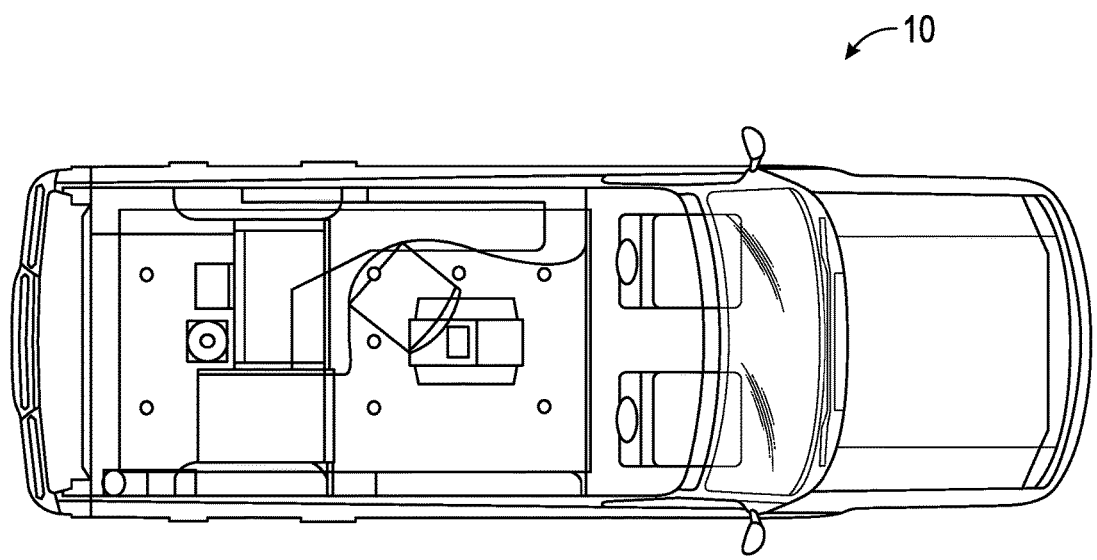
FIGS. 5A-5F are various plan views of a mobile communications vehicle, according to another exemplary embodiment.
Figure 5B:
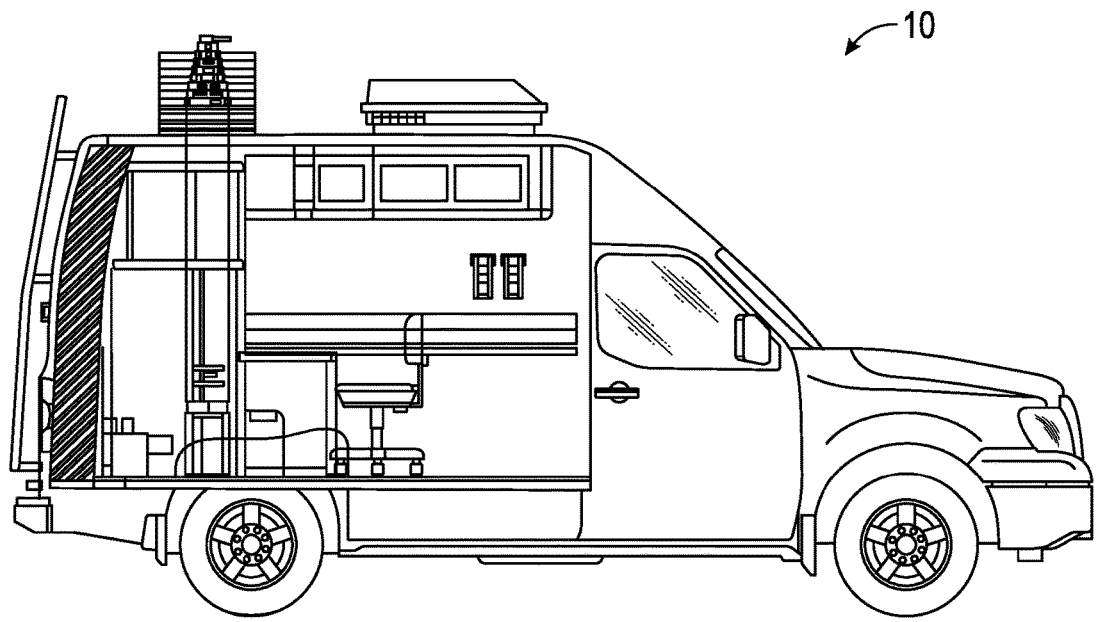
Figure 5C:
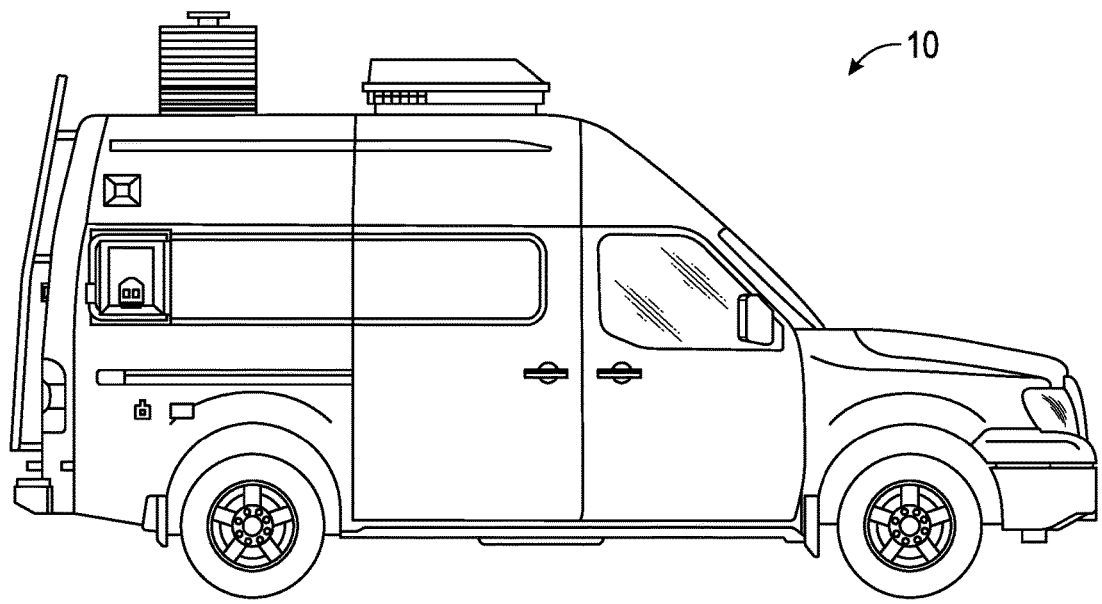
Figure 5D:
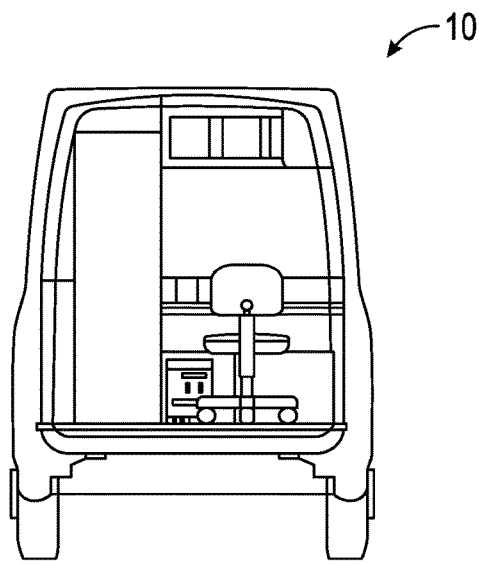
Figure 5E:
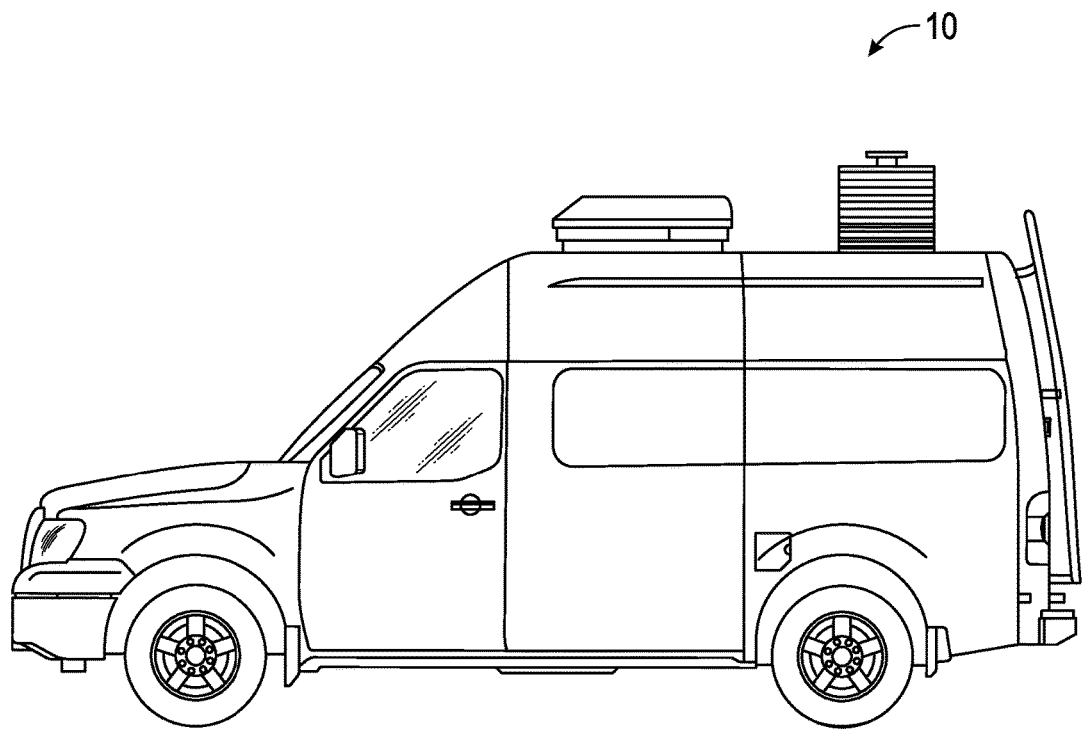
Figure 5F:
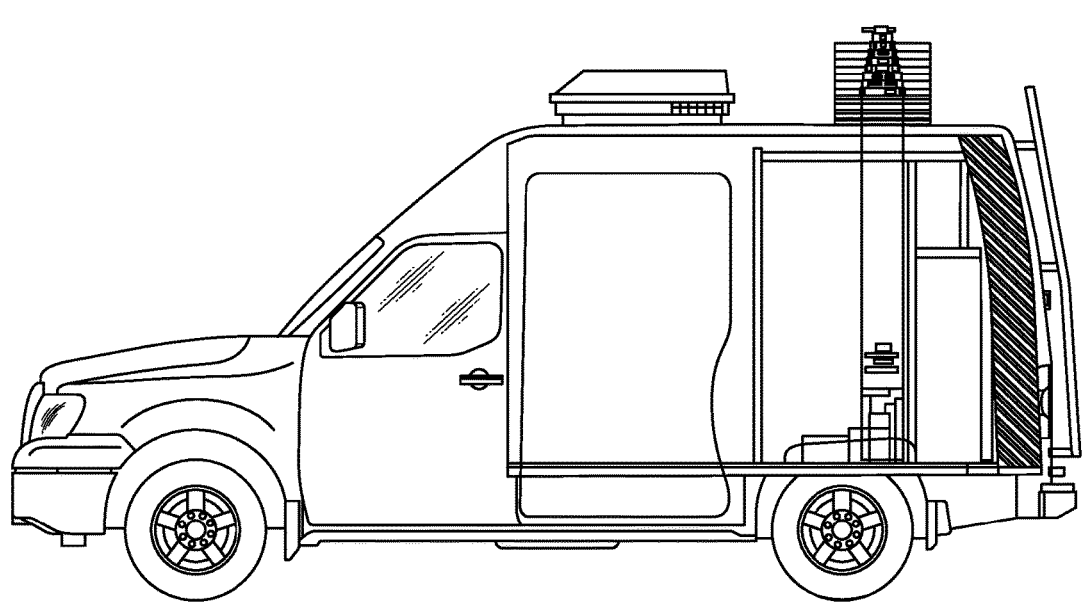
Figure 6A:
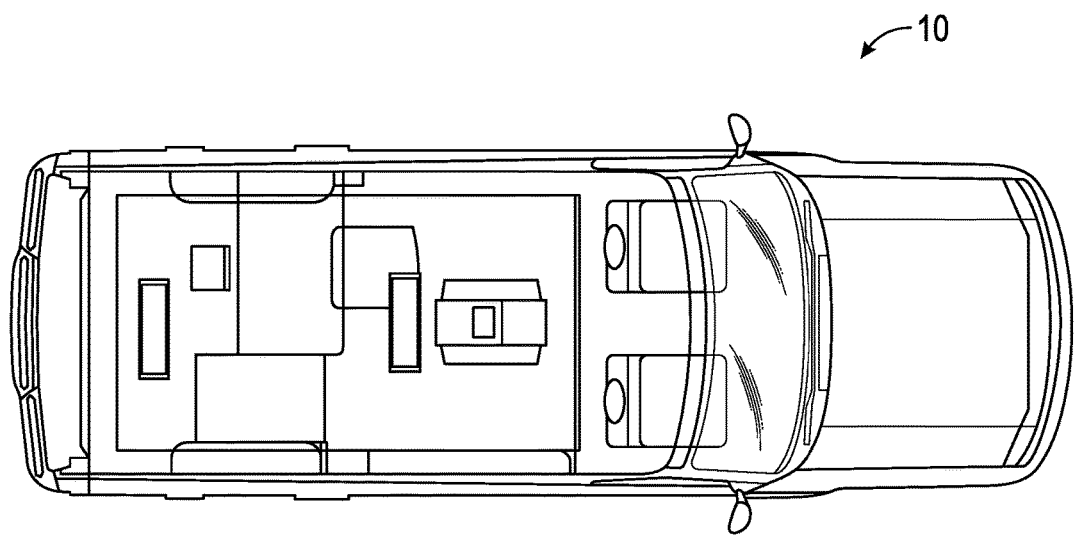
FIGS. 6A-6F are various plan views of a mobile communications vehicle, according to still another exemplary embodiment.
Figure 6B:
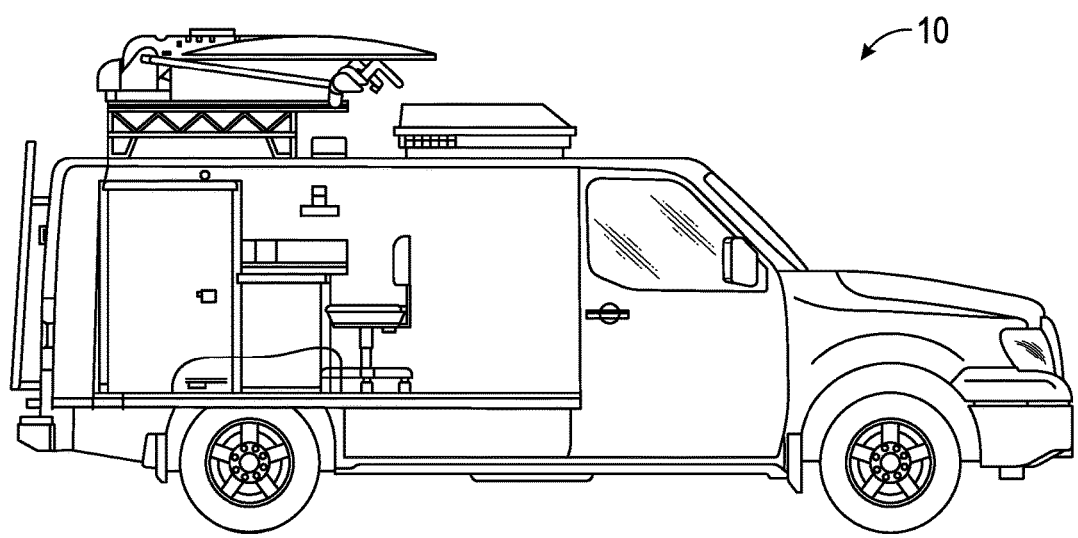
Figure 6C:
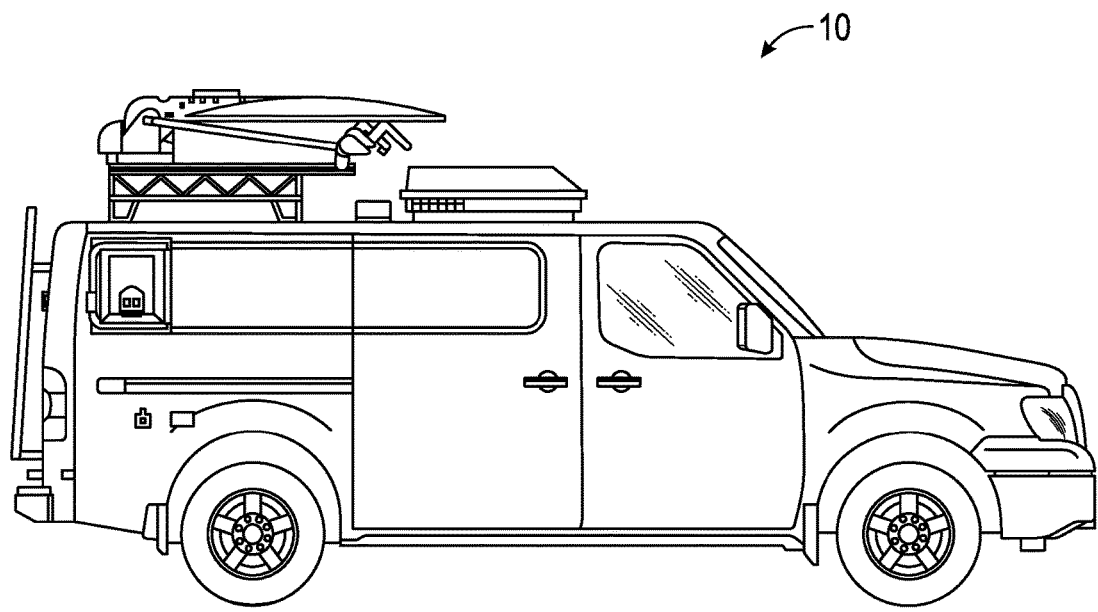
Figure 6D:
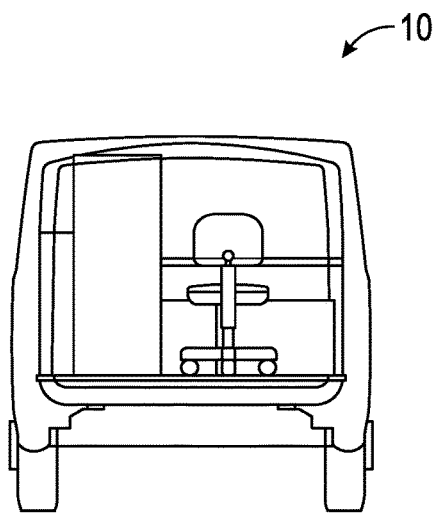
Figure 6E:
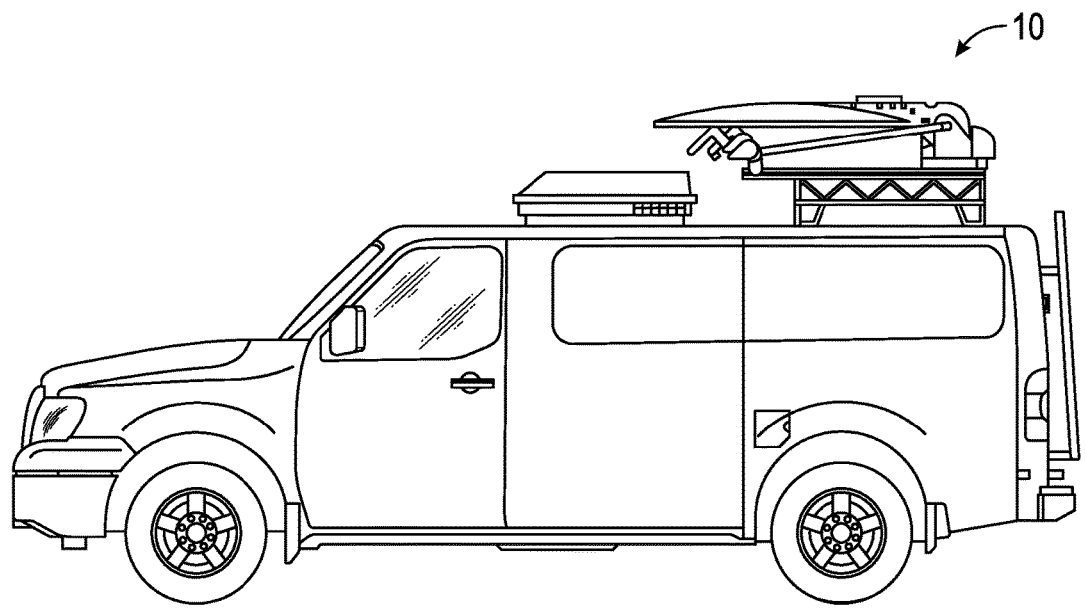
Figure 6F:
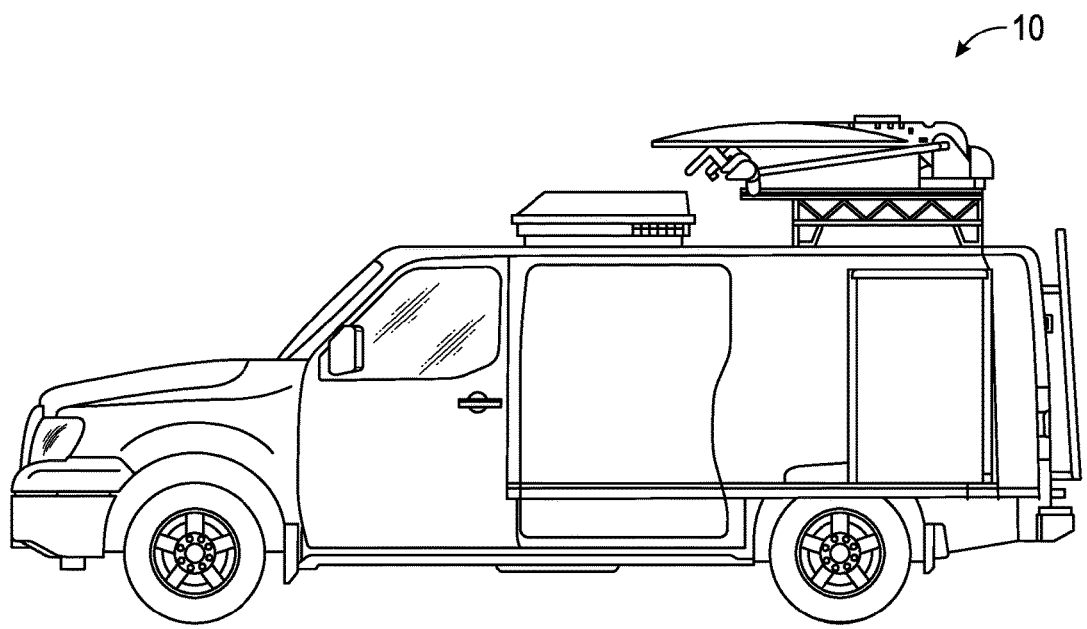
Figure 7A:
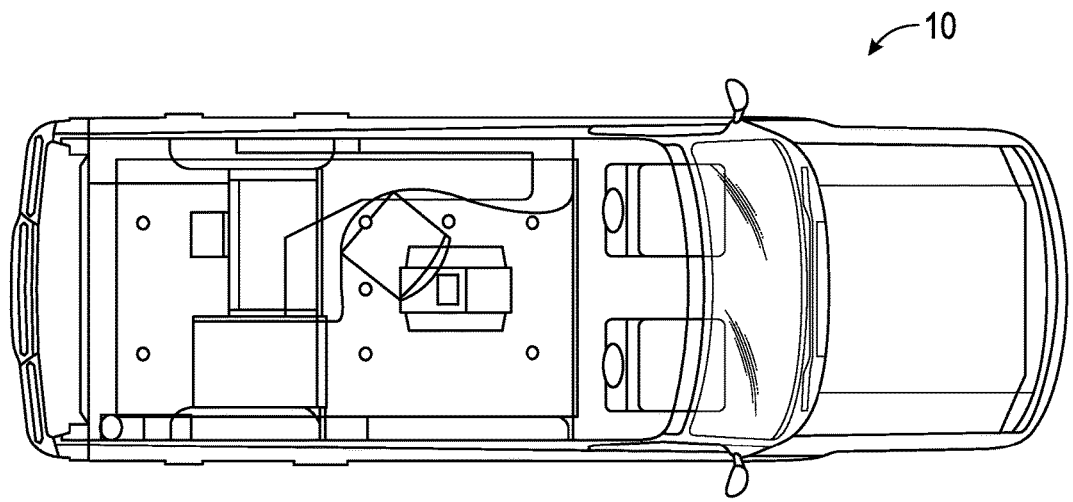
FIGS. 7A-7F are various plan views of a mobile communications vehicle, according to yet another exemplary embodiment.
Figure 7B:
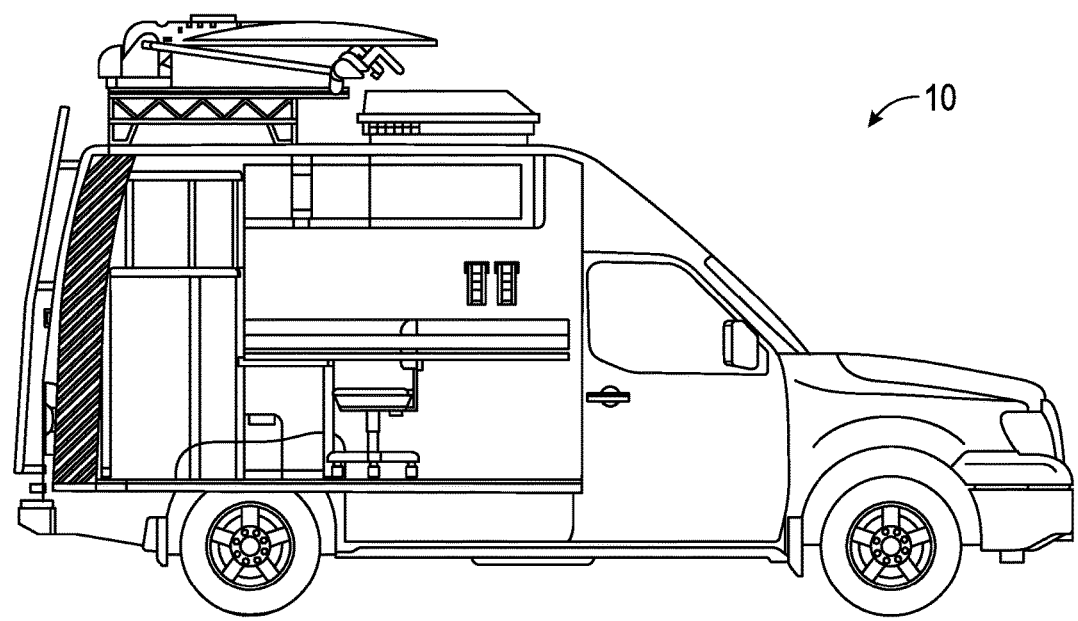
Figure 7C:
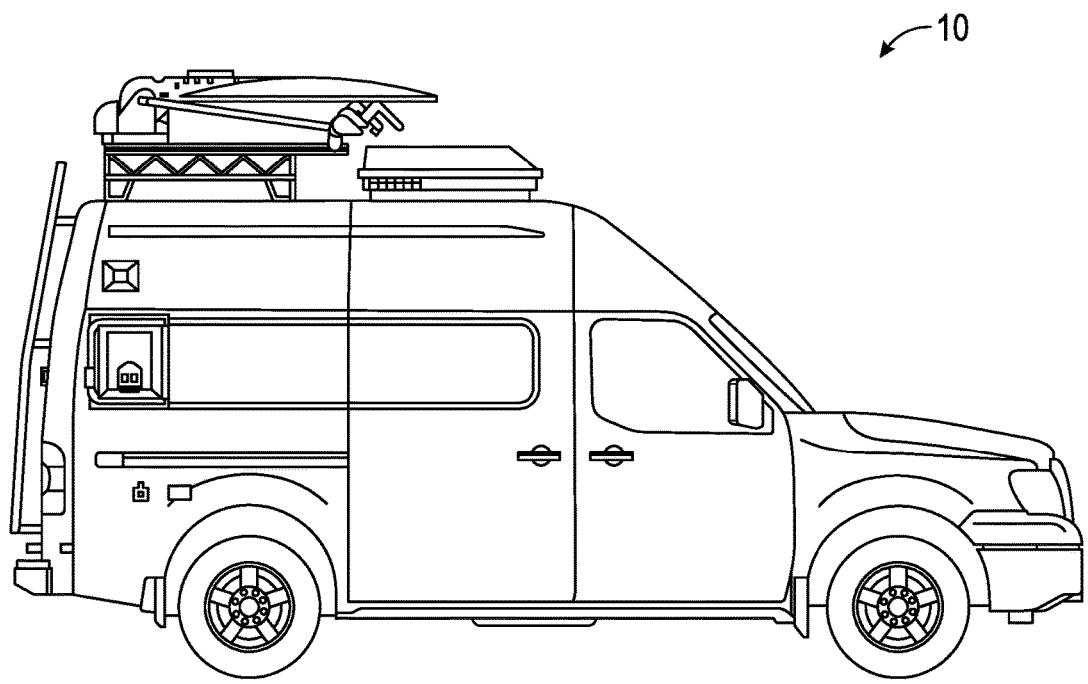
Figure 7D:
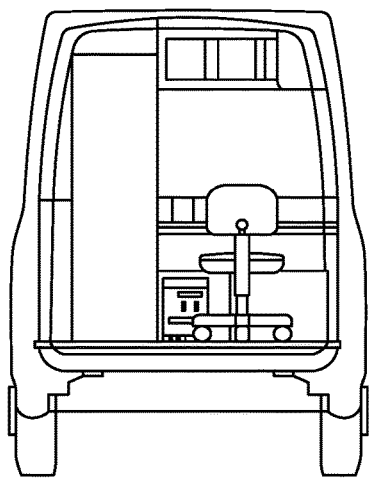
Figure 7E:
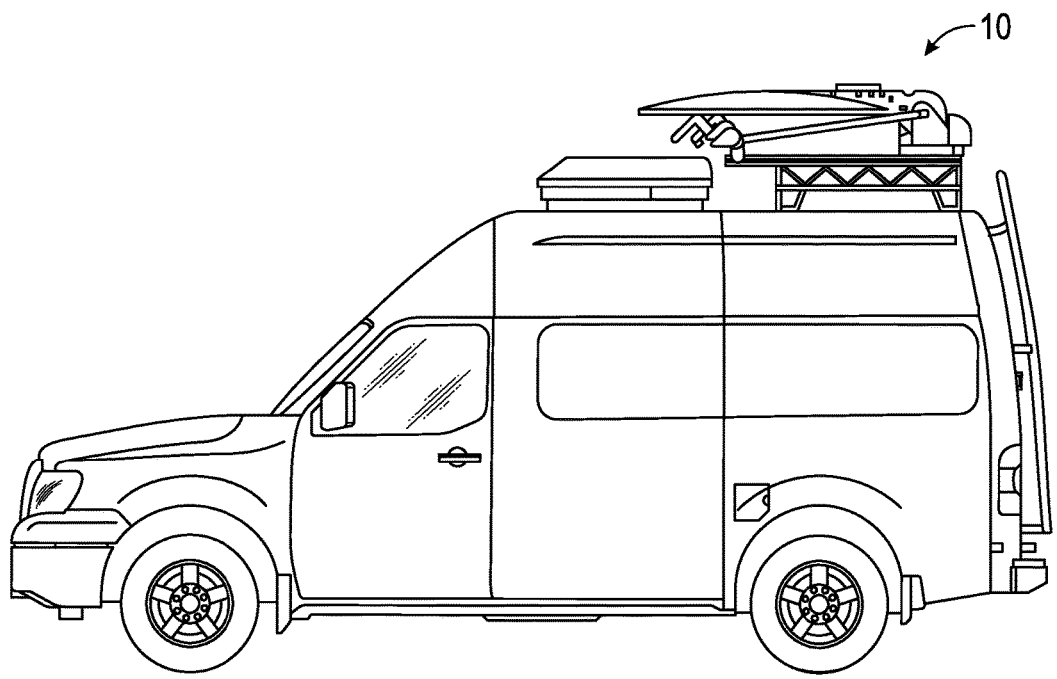
Figure 7F:
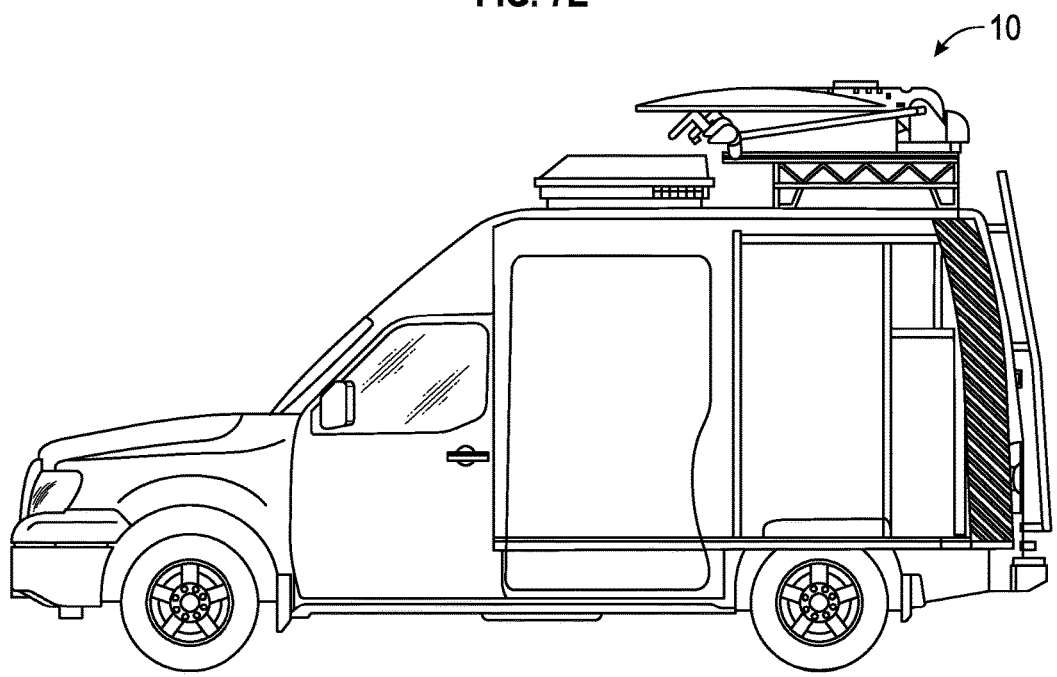

According to an exemplary embodiment, mobile communications vehicle 10 is manufactured based upon a Ford Transit chassis. According to the various embodiments shown in FIGS. 3A-8C, mobile communications vehicle 10 may be manufactured using various other chassis, including the Nissan NV HD chassis. As shown in FIG. 3A, in one embodiment, mobile communications vehicle 10 is a high roof model (e.g., ENG-NV HR model, etc.). The high roof model of mobile communications vehicle 10 may provide an interior height of around 72 inches. As shown in FIG. 3B, in other embodiments, mobile communications vehicle 10 is a standard roof model (e.g., ENG-NV HR model, etc.). The standard roof model of mobile communications vehicle 10 may provide an interior height of around 54 inches.

Figure 8A:
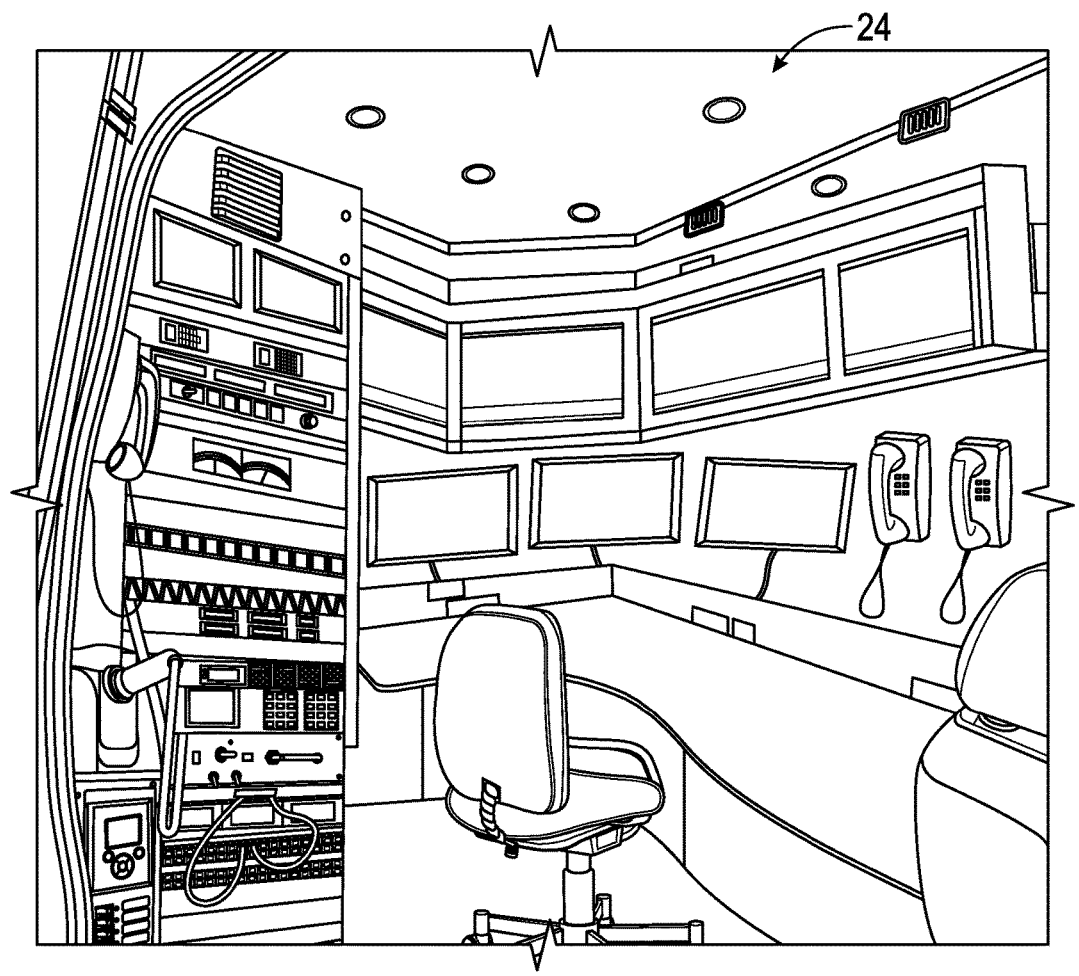
FIGS. 8A-8C are various interior views of a mobile communications vehicle, according to an exemplary embodiment.
Figure 8B:
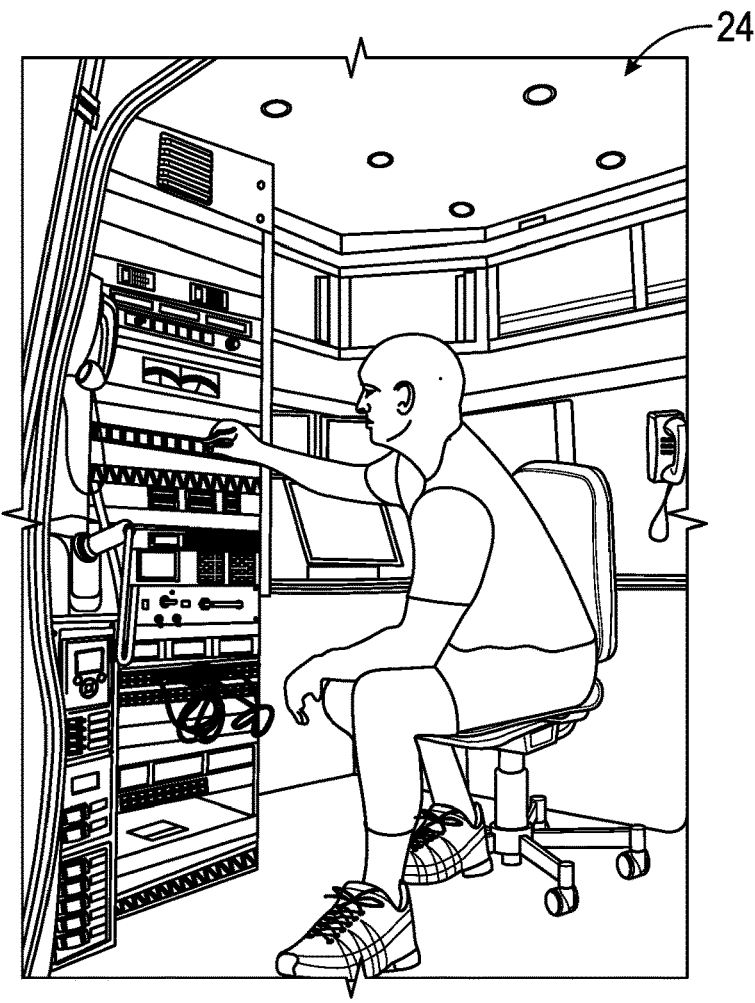
Figure 8C:
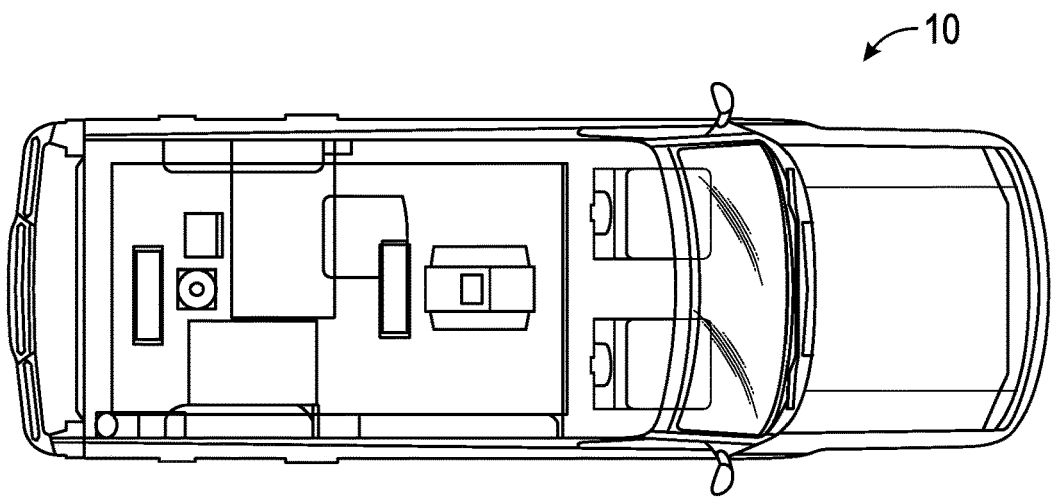

FIGS. 4A-7F show various features and dimensions of mobile communications vehicle 10, according to various alternative embodiments. Referring to FIGS. 4A-4F, in one embodiment, mobile communications vehicle 10 has a wheel base of approximately 148 inches, an exterior height of approximately 84 inches, and a longitudinal length of approximately 240 inches. Mobile communications vehicle 10 may include various features including, but not limited to, an interior battery/component compartment, a mast coupled to the roof, a mast actuator, a scene light, a roof mounted air conditioning unit, and a roof access ladder. Referring to FIGS. 5A-5F, in an alternative embodiment, mobile communications vehicle 10 has an exterior height of approximately 108 inches. Referring now to FIGS. 6A-7F, in some embodiments, mobile communications vehicle 10 includes an antenna platform configured to couples an antenna (e.g., dish 28, etc.) to the roof panel (e.g., roof panel 26, etc.) of mobile communications vehicle 10. Referring now to FIGS. 8A-8C, mobile communications vehicle 10 may include an interior layout configured to facilitate a non-linear editing environment. As shown in FIGS. 8A-8C, cargo portion 24 of mobile communications vehicle 10 may include storage compartments (e.g., cabinets, etc.), display monitors, telephones (or other communication equipment), and various controls and electronics to operate various systems of mobile communications vehicle 10 that facilitate non-linear editing.

According to an exemplary embodiment, mobile communications vehicle 10 includes a primary electrical system and an auxiliary electrical system. In one embodiment, the auxiliary electrical system may have a power rating of 3 kW, 8 kW, or still another level (e.g., a power level for AC power, etc.) and may power one or more systems of mobile communications vehicle 10 for four hours without miming engine 30. The auxiliary electrical system may be an inverter based un-interruptible power supply system that operates at a standard idle of mobile communications vehicle 10. Engine 30 provides a motive power to move mobile communications vehicle 10, powers the primary electrical system, and powers the auxiliary electrical system, according to an exemplary embodiment. According to an exemplary embodiment, the auxiliary power system includes a high voltage warning and detection system.

Figure 9:
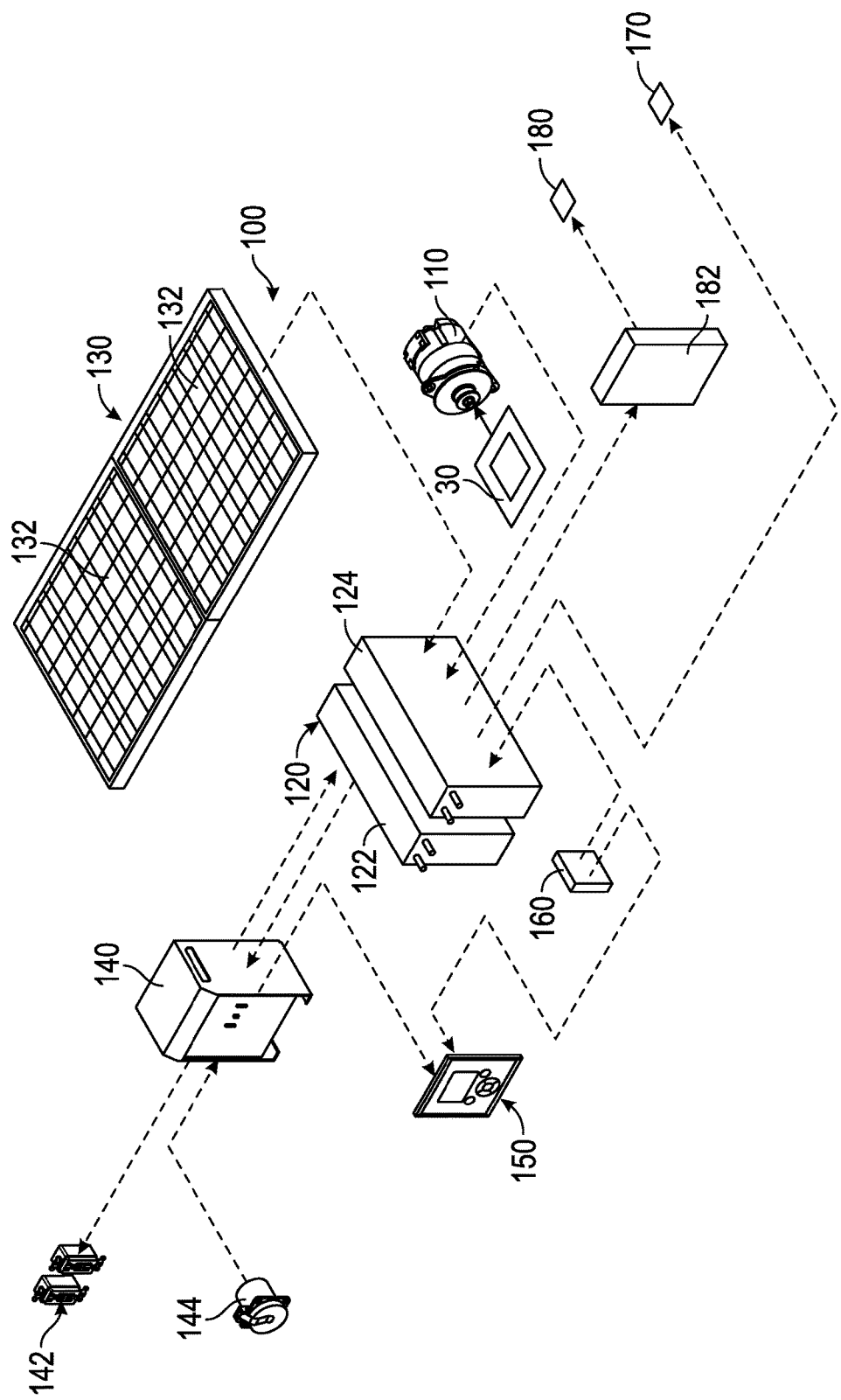
FIG. 9 is a schematic view of an auxiliary electrical system, according to an exemplary embodiment.

Referring next to FIGS. 9-15, an auxiliary electrical system, shown as auxiliary electrical system 100, is configured to operate independent of the primary electrical system of mobile communications vehicle 10. As shown in FIG. 9, auxiliary electrical system 100 includes an auxiliary alternator, shown as auxiliary alternator 110. Auxiliary alternator 110 generates DC electrical power (e.g., a direct current flow of electrical energy, etc.). In one embodiment, auxiliary alternator 110 provides up to 300 amps of 28 volt DC current. Auxiliary alternator 110 may be an 8400 watt alternator that is provided in addition to the OEM alternator that defines at least a portion of a primary electrical system of mobile communications vehicle 10. By way of example, auxiliary alternator 110 may be a Mil-Spec alternator. In one embodiment, mobile communications vehicle 10 does not include a generator (e.g., a device coupled to engine 30 that produces AC electrical power, etc.) or an onboard generator set (e.g., a portable or fixed unit having a motor or engine and used to produce AC electrical power, etc.).

As shown in FIG. 9, auxiliary electrical system 100 includes a battery system, shown as battery system 120. In one embodiment, battery system 120 is electrically coupled to auxiliary alternator 110. Auxiliary alternator 110 may power 95-100 percent of loads of mobile communications vehicle 10 either directly or by way of battery system 120. Auxiliary electrical system 100 may operate automatically (e.g., without operator input). In one embodiment, auxiliary electrical system 100 may turn on and turn off engine 30 based on a charge level of battery system 120 (e.g., auxiliary electrical system 100 may include a controller configured to turn on engine 30 based on a determination that the charge level of battery system 120 has fallen below a threshold level, etc.).

Figure 10:
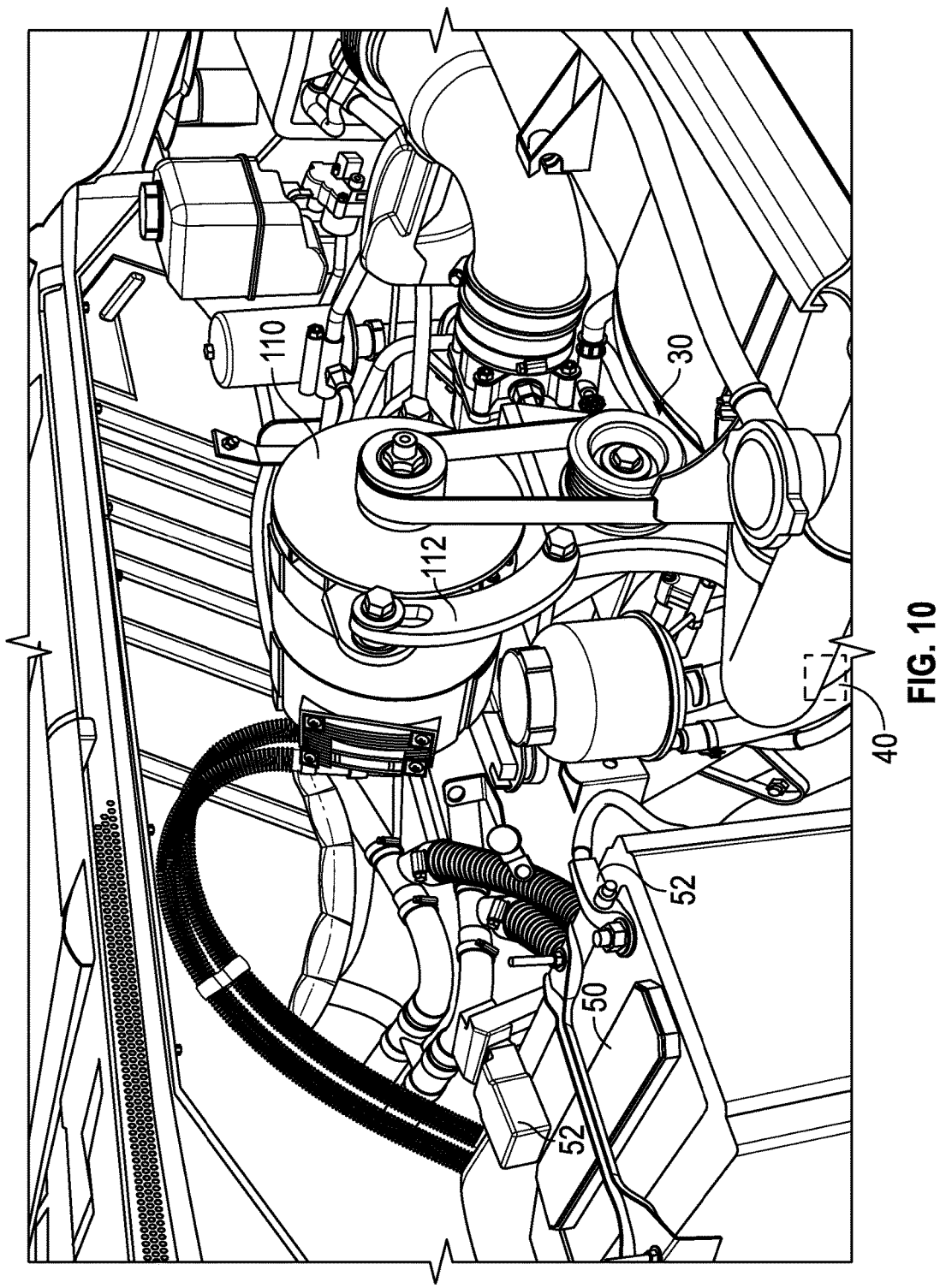
FIG. 10 is a perspective view of a primary alternator and an auxiliary alternator of an auxiliary electrical system, according to an exemplary embodiment.
Figure 11:
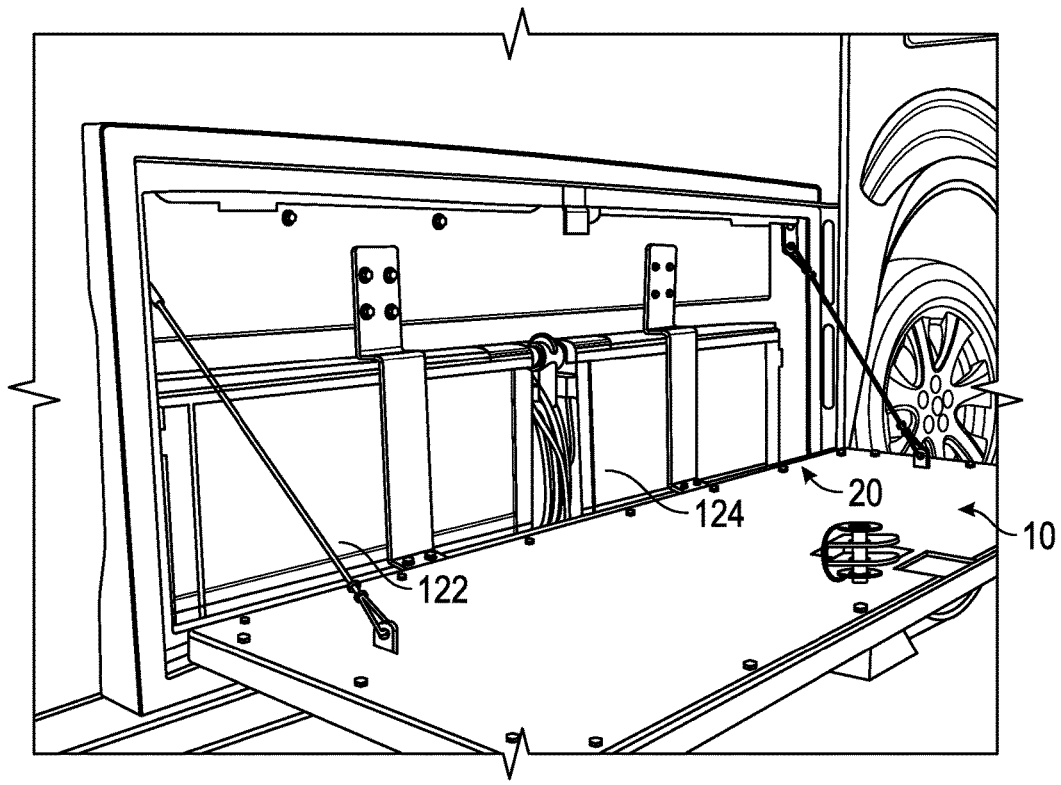
FIG. 11 is a perspective view of a battery system of an auxiliary electrical system, according to an exemplary embodiment.

As shown in FIG. 10, auxiliary alternator 110 is coupled to engine 30 of mobile communications vehicle 10 with a bracket 112. Auxiliary alternator 110 may operate in parallel to a primary alternator 40 of mobile communications vehicle 10. In one embodiment, both primary alternator 40 and auxiliary alternator 110 are coupled to (e.g., rotationally coupled to with a belt, etc.) engine 30. Primary alternator 40 and auxiliary alternator 110 may convert rotational energy produced by engine 30 into DC electrical power for use in the primary electrical system and auxiliary electrical system 100 of mobile communications vehicle 10. In one embodiment, primary alternator 40 is electrically coupled to a battery 50 (e.g., a primary battery, etc.) of the primary electrical system of mobile communications vehicle 10 with leads 52. In one embodiment, primary alternator 40 is not coupled to battery system 120 of auxiliary electrical system 100.

In one embodiment, battery system 120 is configured to store electrical power (e.g., DC electrical power, etc.) generated by auxiliary alternator 110. A controller may be configured to provide an alarm based on a determination that a charge level of battery system 120 has fallen below a threshold level (e.g., a percentage of a maximum charge level, an amp-hour reading, etc.). As shown in FIG. 9, battery system 120 includes a first battery pack (e.g., a first battery cell, a first set of battery cells, etc.), shown as battery pack 122, and a second battery pack (e.g., a second battery cell, a second set of battery cells, etc.), shown as battery pack 124. In one embodiment, battery system 120 is configured to store electrical power that corresponds with the characteristics of the electrical power produced by auxiliary alternator 110. By way of example, battery system 120 may be configured to store DC current at a voltage of 28 volts DC. In other embodiments, battery system 120 may be configured to store DC current at another voltage (e.g., 12 volts, 24 volts, etc.). According to an exemplary embodiment, battery pack 122 and battery pack 124 each include 12 volt batteries arranged in parallel to form a 24 volt battery system 120. Battery pack 122 and battery pack 124 may include 12 volt Odyssey Extreme Series model PC 1800-FT batteries, or batteries manufactured by another supplier. In one embodiment, battery pack 122 and battery pack 124 are gel cell batteries. According to an alternative embodiment, at least one of battery pack 122 and battery pack 124 may include lithium ion batteries or still another type of energy storage device. According to an exemplary embodiment, battery pack 122 and battery pack 124 are coupled to a frame rail (e.g., of a chassis, etc.) of mobile communications vehicle 10. As shown FIG. 11, battery pack 122 and battery pack 124 are disposed within body 20 of mobile communications vehicle 10.

Figure 12:
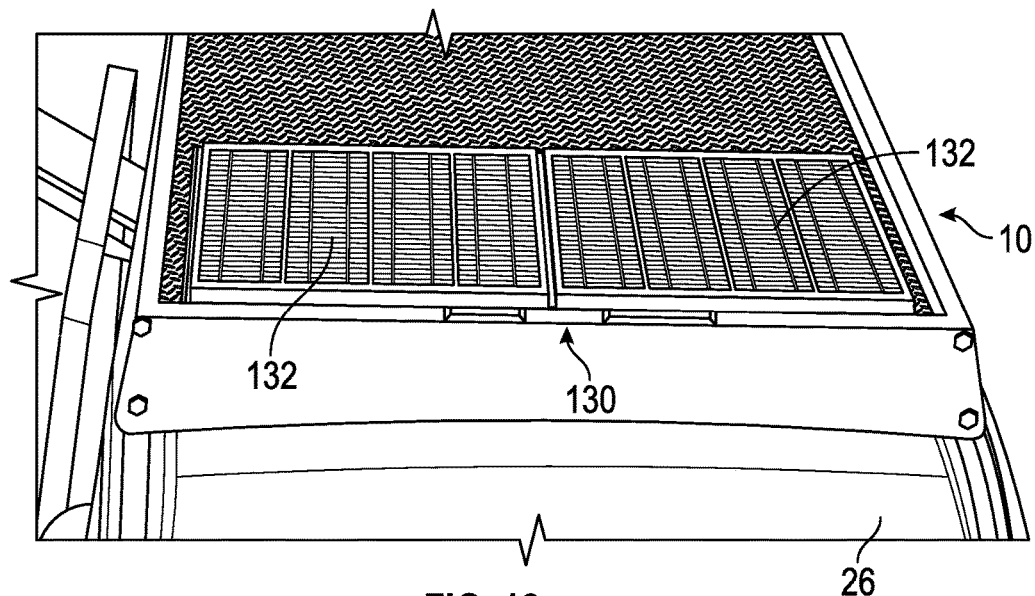
FIG. 12 is a perspective view of a solar panel system of an auxiliary electrical system, according to an exemplary embodiment.

Referring next to FIGS. 9 and 12, auxiliary electrical system 100 includes an electrical power producer that is electrically coupled with battery system 120. According to the exemplary embodiment shown in FIGS. 9 and 12, auxiliary electrical system 100 includes a solar panel system, shown as solar panel system 130. In one embodiment, solar panel system 130 is coupled to battery system 120 and is configured to produce electrical power from incident solar energy. Solar panel system 130 may keep battery system 120 topped off and hot, according to an exemplary embodiment. As shown in FIGS. 9 and 12, solar panel system 130 includes a pair of solar panels 132. In other embodiments, solar panel system 130 includes more or fewer solar panels 132. According to an exemplary embodiment, solar panel system 130 is configured to provide electrical power having characteristics that correspond to features of battery system 120. By way of example, battery system 120 may be configured to store DC electrical power at 24 volts, and solar panel system 130 may be configured to provide 24 volt DC electrical power to battery system 120. In one embodiment, solar panels 132 are connected in parallel and are each configured to provide electrical power at 12 volts DC. According to an alternative embodiment, solar panels 132 are connected in series and are each configured to provide electrical power at 24 volts DC. The amperage of the electrical power produced by solar panel system 130 may vary based on the ambient sun exposure, among other conditions, but may reach or exceed four amps. As shown in FIG. 12, solar panel system 130 is coupled to roof panel 26 of mobile communications vehicle 10.

Figure 13:
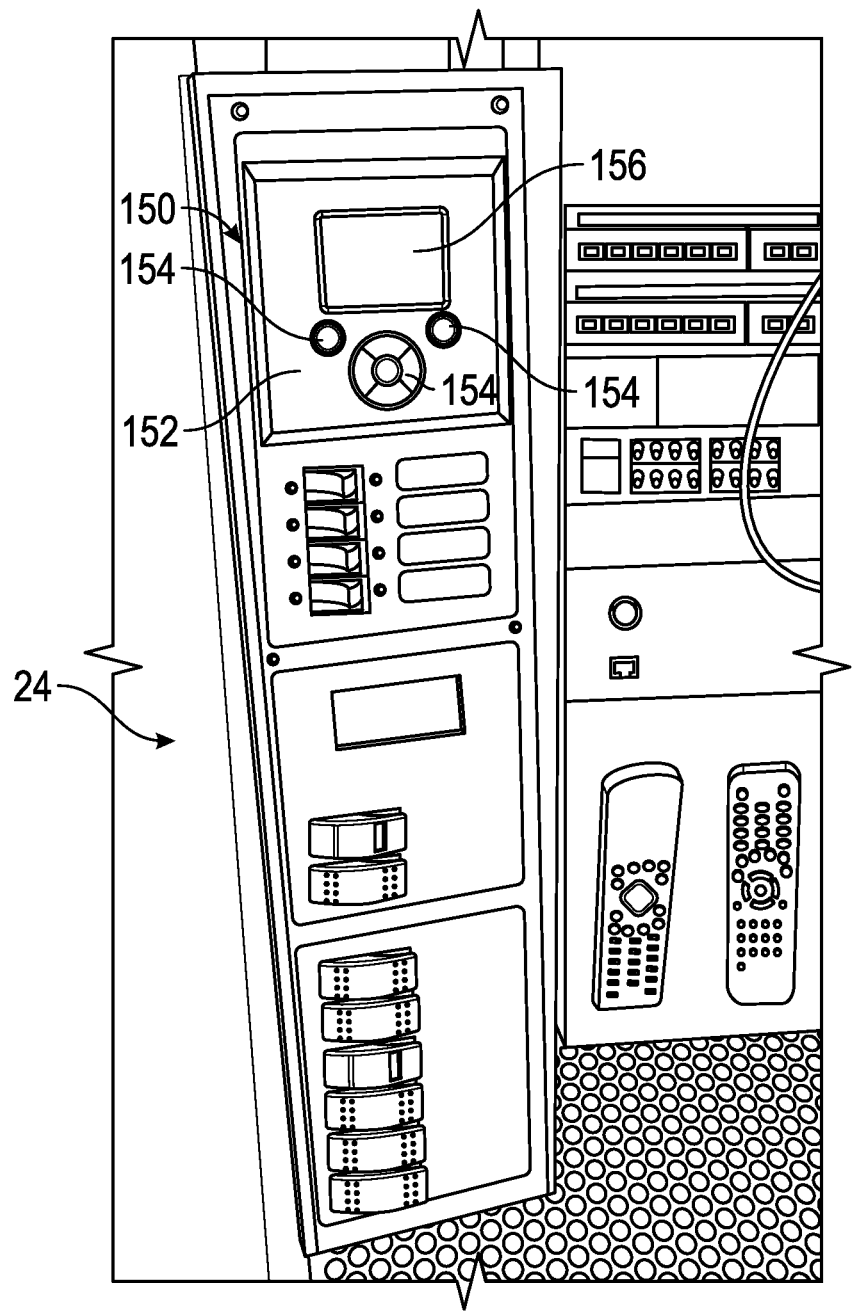
FIG. 13 is a perspective view of a power panel of an auxiliary electrical system, according to an exemplary embodiment.
Figure 14:
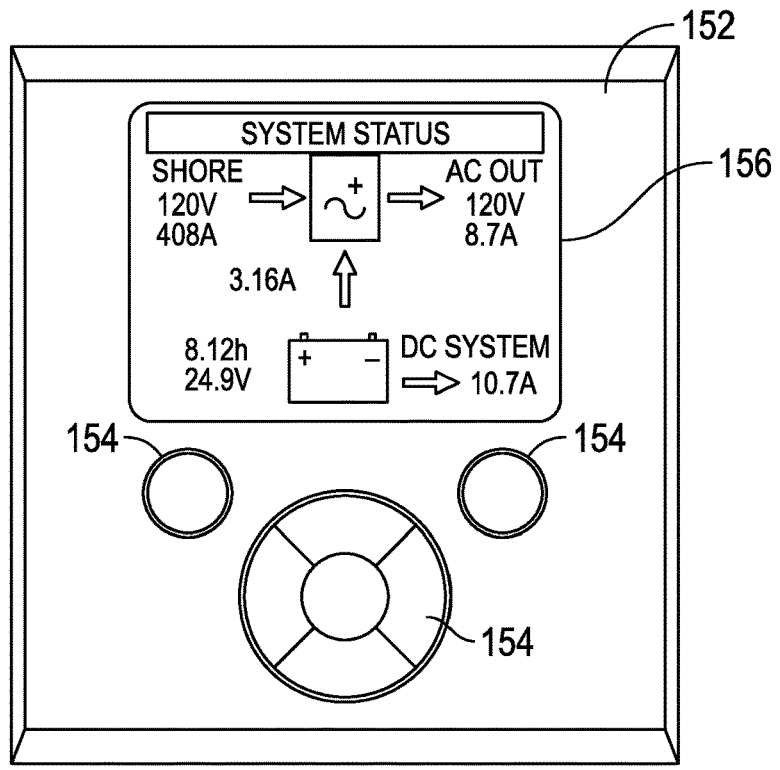
FIG. 14 is a schematic view of a user interface for an auxiliary electrical system, according to an exemplary embodiment.
Figure 15:
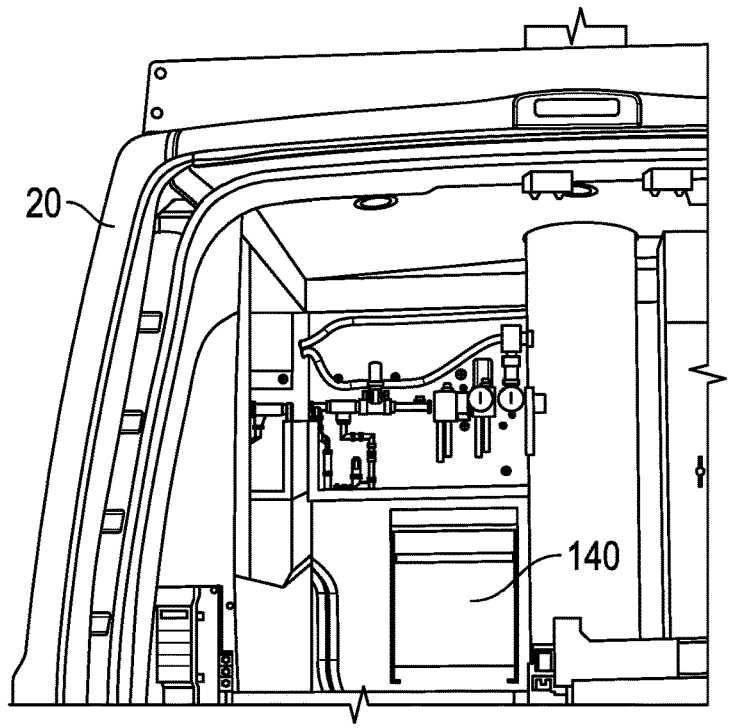
FIG. 15 is a perspective view of an inverter for an auxiliary electrical system, according to an exemplary embodiment.

Referring to FIGS. 9 and 13-15, auxiliary electrical system 100 includes an inverter 140 and a user interface, shown as power panel 150. Inverter 140 may monitor the various loads on battery system 120 and provide an estimated charge time remaining for battery system 120 based on a current or projected use profile. As shown in FIG. 13, power panel 150 is positioned within an operating environment disposed within cargo portion 24 of body 20. In other embodiments, power panel 150 is otherwise positioned (e.g., within cab portion 22, etc.) within body 20 of mobile communications vehicle 10. In still other embodiments, auxiliary electrical system 100 is remotely controlled (e.g., via a satellite, Wi-Fi, or other wireless connection, etc.). A mobile communications vehicle 10 having a remotely controlled auxiliary electrical system 100 may or may not include power panel 150, according to various alternative embodiments. As shown in FIG. 15, inverter 140 may be positioned within a rear portion (e.g., behind an operating environment within cargo portion 24, etc.) of body 20.

According to an exemplary embodiment, inverter 140 is configured to convert electrical power between direct current and alternating current. Inverter 140 may be manufactured by Victron Energy or another manufacturer, according to various alternative embodiments. As shown in FIG. 9, inverter 140 is coupled to battery system 120. During a first mode of operation, DC electrical energy (e.g., 24 volt DC electrical energy, etc.) flows from battery system 120 to inverter 140, where it is converted into AC electrical energy (e.g., 110 volt or 120 volt AC electrical energy). The AC electrical energy may be thereafter utilized to power one or more AC loads 142. By way of example, such AC loads may include various displays, camera equipment, rack equipment, editing equipment, satellite amplifiers, or communications equipment associated with mobile communications vehicle 10 (e.g., microwave or radio transmitters, etc.). During a second mode of operation, AC electrical energy may be provided to inverter 140 by way of an electrical power connector, shown as AC electrical power inlet 144. In one embodiment, an operator may couple AC electrical power inlet 144 with an electrical power source (e.g., a generator set, the power grid, etc.) using a cable (e.g., a power cord, etc.). AC electrical power may flow through AC electrical power inlet 144 and into inverter 140, where it is converted into DC electrical power (e.g., 24 volt DC electrical power, etc.) and stored within battery system 120 (i.e., battery system 120 may be charged using an external source of AC electrical power). During a third mode of operation, a first portion of the AC electrical power provided to inverter 140 (e.g., by way of AC electrical power input 144, etc.) is used to charge battery system 120 and a second portion of the AC electrical power provided to inverter 140 is used to directly power AC loads 142.

According to the exemplary embodiment shown in FIGS. 13-14, power panel 150 includes a user interface 152 having a plurality of user inputs, shown as buttons 154, and a display, shown as screen 156. Power panel 150 may be manufactured by Victron Energy or another manufacturer, according to various alternative embodiments. Power panel 150 is coupled to inverter 140 and battery system 120, according to an exemplary embodiment. As shown in FIG. 9, power panel 150 is coupled to battery system 120 by way of a battery monitor 160. Battery monitor 160 may be manufactured by Victron Energy or another manufacturer, according to various alternative embodiments. According to an exemplary embodiment, power panel 150 is configured to provide an operator with information relating to auxiliary electrical system 100. By way of example, power panel 150 may be configured to provide an operator with performance information relating to auxiliary electrical system 100. In one embodiment, power panel 150 is configured to provide information relating to a charge level of battery system 120. In another embodiment, power panel 150 is configured to provide information relating to a charge status of battery system 120 (e.g., the electrical power being provided to battery system 120 by auxiliary alternator 110 or inverter 140, etc.). In still another embodiment, power panel 150 is configured to provide information relating to a draw on battery system 120 (e.g., the electrical power being used by mobile communications vehicle 10, etc.). In yet another embodiment, power panel 150 is configured to provide at least one of these types of information and/or still other information.

Referring to the exemplary embodiment shown in FIG. 14, user interface 152 displays a system status of auxiliary electrical system 100. As shown in FIG. 14, screen 156 may provide a voltage and current of electrical energy provided by AC electrical power input 144 as a "Shore" power and a voltage and current of electrical energy provided to various AC loads 142 as an "AC Out." Screen 156 may also show a current provided to first DC electrical load 170 and second DC electrical load 180 as a "DC System" reading (shown as 10.7 amps) and readings associated with a charge level of battery system 120 (shown as 24.9 volts) along with an estimated time until the charge level of battery system 120 is depleted (shown as 8.12 hours) at a current electrical power usage level. Screen 156 may also provide a characteristic of the energy provided to inverter 140 from battery system 120 (shown as 3.16 amps). Buttons 154 may be used to turn on or off screen 156, toggle between various system and device list options (e.g., for inverter 140, for battery system 120, etc.), and to turn on or off inverter 140 after selecting inverter 140 with a button 154.

According to an exemplary embodiment, battery system 120 provides DC electrical energy to power various DC electrical loads. As shown in FIG. 9, battery system 120 is configured to power a first DC electrical load 170 and a second DC electrical load 180. According to an exemplary embodiment, first DC electrical load 170 has characteristics that correspond to the electrical power stored by battery system 120. By way of example, first DC electrical load 170 may be a 24 volt DC electrical load. First DC electrical load 170 may include news transmission systems or lighting loads, among others.

In one embodiment, second DC electrical load 180 has characteristics that are different than the electrical power stored by battery system 120. By way of example, second DC electrical load 180 may be a 12 volt DC electrical load.

In one embodiment, second DC electrical load 180 includes various lighting loads. By way of example, mobile communications vehicle 10 may include exterior lighting (e.g., Whelen micro pioneer super LEDs, etc.) that defines at least a portion of second DC electrical load 180. In one embodiment, the exterior lighting is scene lighting configured to be used on-site (e.g., at a particular location, etc.). LED lighting may be used to reduce power draw on auxiliary electrical system 100, and the LED lighting may be dimmable to further reduce power draw. Auxiliary power system 100 includes an electrical device 182 that is disposed along a flow path between battery system 120 and second DC electrical load 180 to convert the electrical power from battery system 120 into electrical power appropriate for second DC electrical load 180. By way of example, electrical device 182 may be a Vanner model 66-100 Voltmaster 100 amp unit, a Beltron Unit, or an Orion 24/12-70 amp unit, among other alternatives. In one embodiment, electrical device 182 is a DC to DC voltage converter configured to reduce the voltage from battery system 120 (e.g., 24 volts DC) into a voltage appropriate for second DC electrical load 180 (e.g., 12 volts DC). In other embodiments, electrical device 182 is a battery equalizer.

According to an exemplary embodiment, energy may flow from engine 30, through auxiliary alternator 110 and into battery system 120. By way of example, auxiliary alternator 110 may convert rotational energy provided by engine 30 into electrical energy for storage in battery system 120. In some embodiments, battery system 120 further receives electrical energy from solar panel system 130. Energy may thereafter flow from battery system 120 to one or more of the AC or DC outputs/loads of mobile communications vehicle 10 either directly (e.g., to DC electrical loads, etc.) or through inverter 140 (e.g., to AC electrical loads, etc.).

Figure 16A:
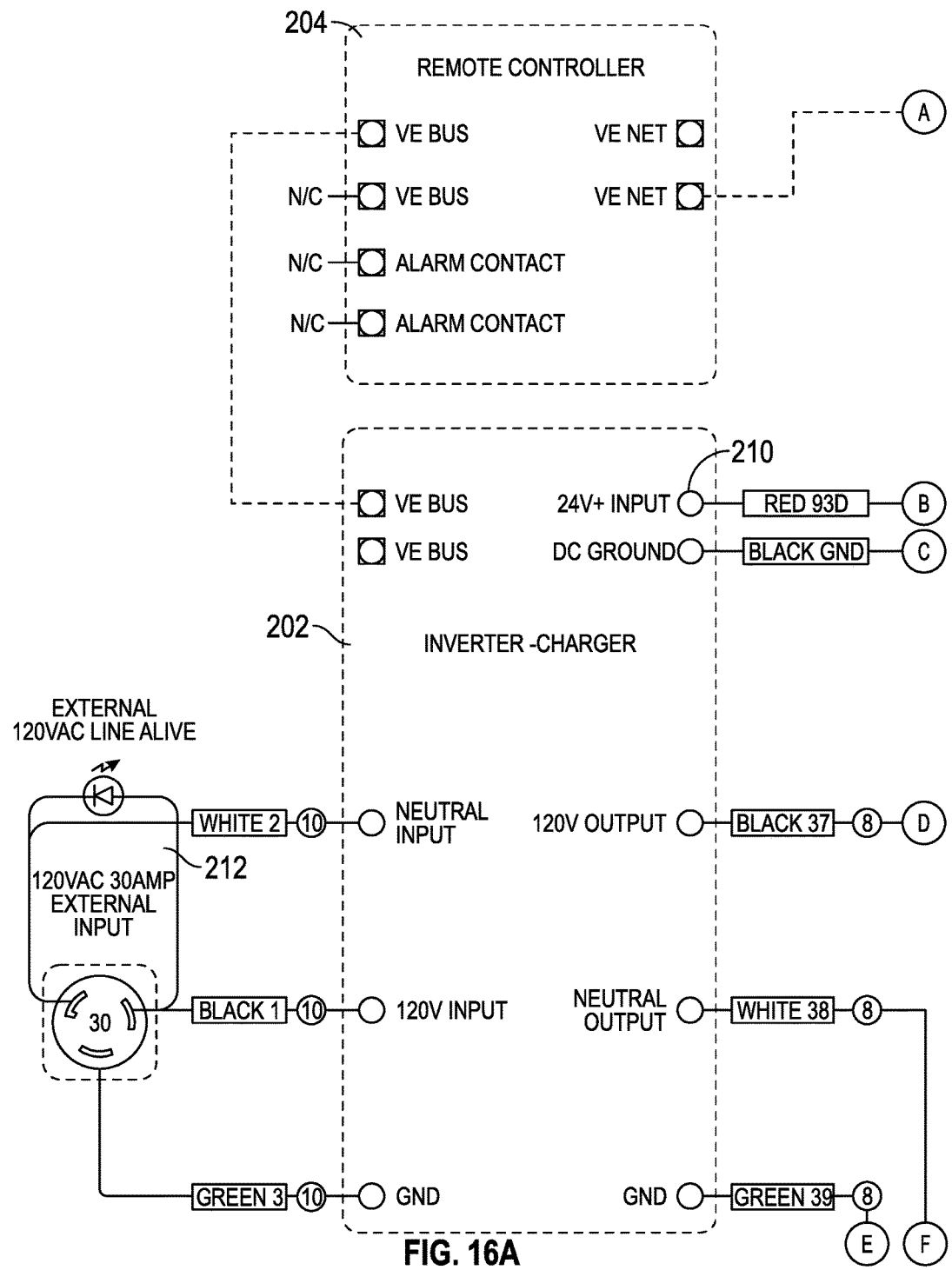
FIGS. 16A-16C are a schematic diagram of an AC portion of an auxiliary power system, according to an exemplary embodiment.

Referring generally to FIGS. 16A-20C, a first embodiment of an auxiliary power system for a vehicle is shown. FIGS. 16A-16C illustrate a schematic diagram of an AC portion of the auxiliary power system. The AC portion generally includes a charger/inverter 202, a remote controller 204, and a battery controller 206.

Charger/inverter 202 may be, for example, a Victron Multiplus PMP243021102, 3000 Watt 24 VDC/120 VAC inverter. Charger/inverter 202 is configured to convert DC power from the 24 V battery system (battery system 240 shown in FIG. 17E) to AC power via input 210. Charger/inverter 202 may further receive AC power from an external input 212. Charger/inverter 202 may supply the AC power to a plurality of outputs 214, to provide power to a plurality of vehicle systems.

Charger/inverter 202 may further provide a power supply to remote controller 204. Remote controller 204 may be, for example, a Victron Blue Power Panel GX. Remote controller 204 may receive an input from charger/inverter 202 and use the input to provide a display for a user relating to operation of the auxiliary power system. Remote controller 204 further receives a user input via the interface of the controller and uses the user input to control operation of the auxiliary power system. In other words, remote controller 204 may act as a monitoring tool for a user associated with the auxiliary power system, providing the user with the ability to configure various settings of any device of the auxiliary power system.

Battery controller 206 is shown coupled to remote controller 204 and may receive information relating to the operation of one or more batteries of the auxiliary power system. Battery controller 206 may generally be a device that monitors the status of one or more batteries of the auxiliary power system. For example, battery controller 206 may monitor battery voltage, battery current, battery temperature, a state of charge of the battery, etc. Battery controller 206 may include an interface that a user may interact with. Battery controller 206 may be, for example, a Victron Vnet battery controller.

FIGS. 17A-20C are schematic diagrams of the DC portion of the auxiliary power system. The DC portion generally includes a battery equalizer 230, solar panels 232 (shown as rooftop photovoltaic cells in FIG. 17E), solar controller 234, alternator 236, and battery system 240.

Referring now to FIGS. 17A-17H, a schematic diagram of a portion of the DC portion is shown in greater detail. The DC portion includes a battery equalizer 230. Battery equalizer 230 may be, for example, a Vanner 66-100 battery equalizer. Battery equalizer 230 may be configured to ensure a battery voltage produced by battery system 240 is relatively stable, so that the power supply may be provided to various vehicle systems.

The DC portion further includes solar panels 232 and a solar controller 234 configured to control solar panels 232 and the power source provided to battery system 240 by solar panels 232. Solar panels 232 may be, for example, a pair of rooftop photovoltaic cells. Solar controller 234 may be, for example, a Sunsaver SS-10-24 V controller.

The DC portion further includes alternator 236. Alternator 236 may generally be configured to produce DC power.

Figure 17A:
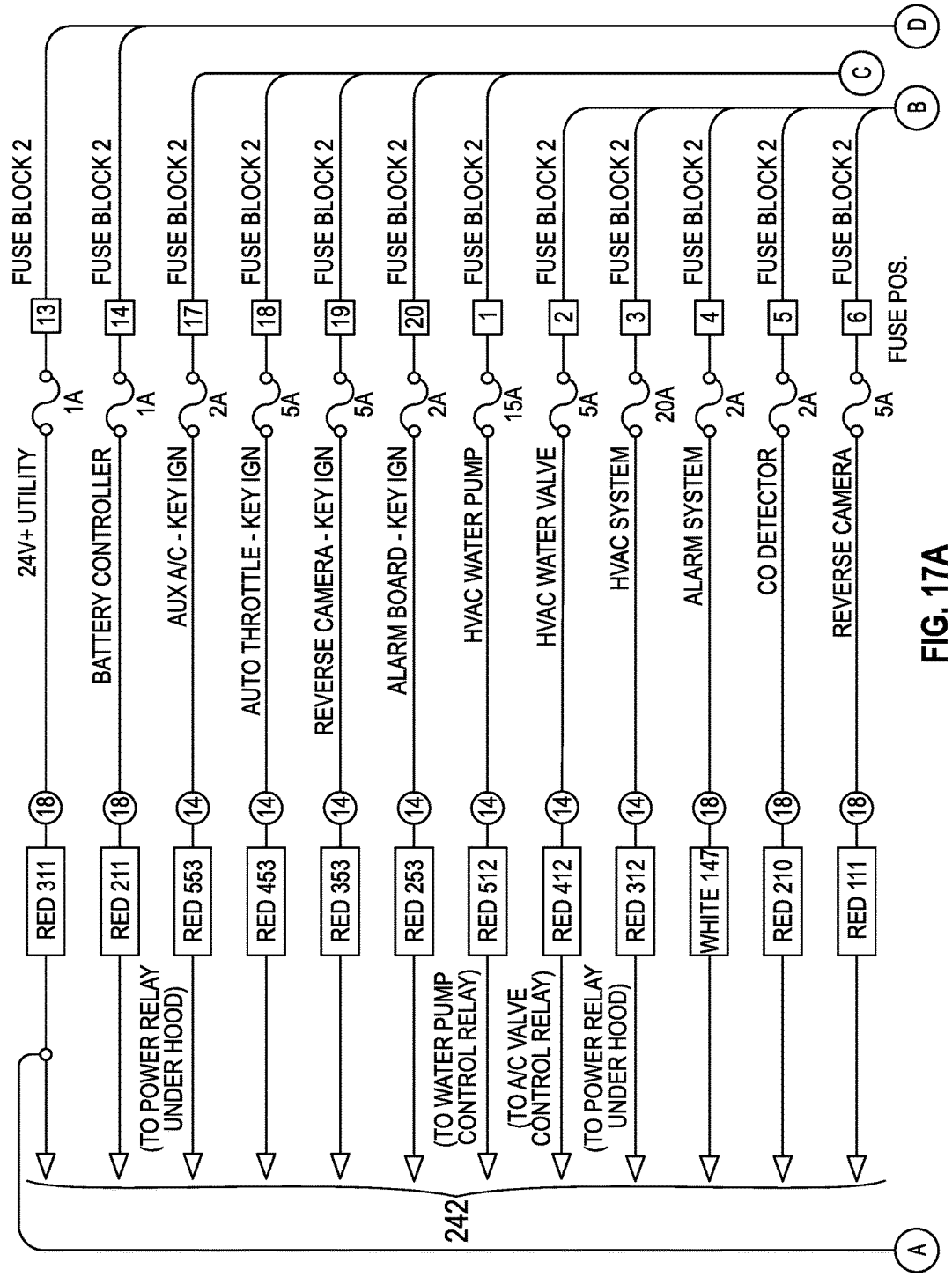
FIGS. 17A-17H are a schematic diagram of a portion of a DC portion of an auxiliary power system, according to an exemplary embodiment.
Figure 17B:
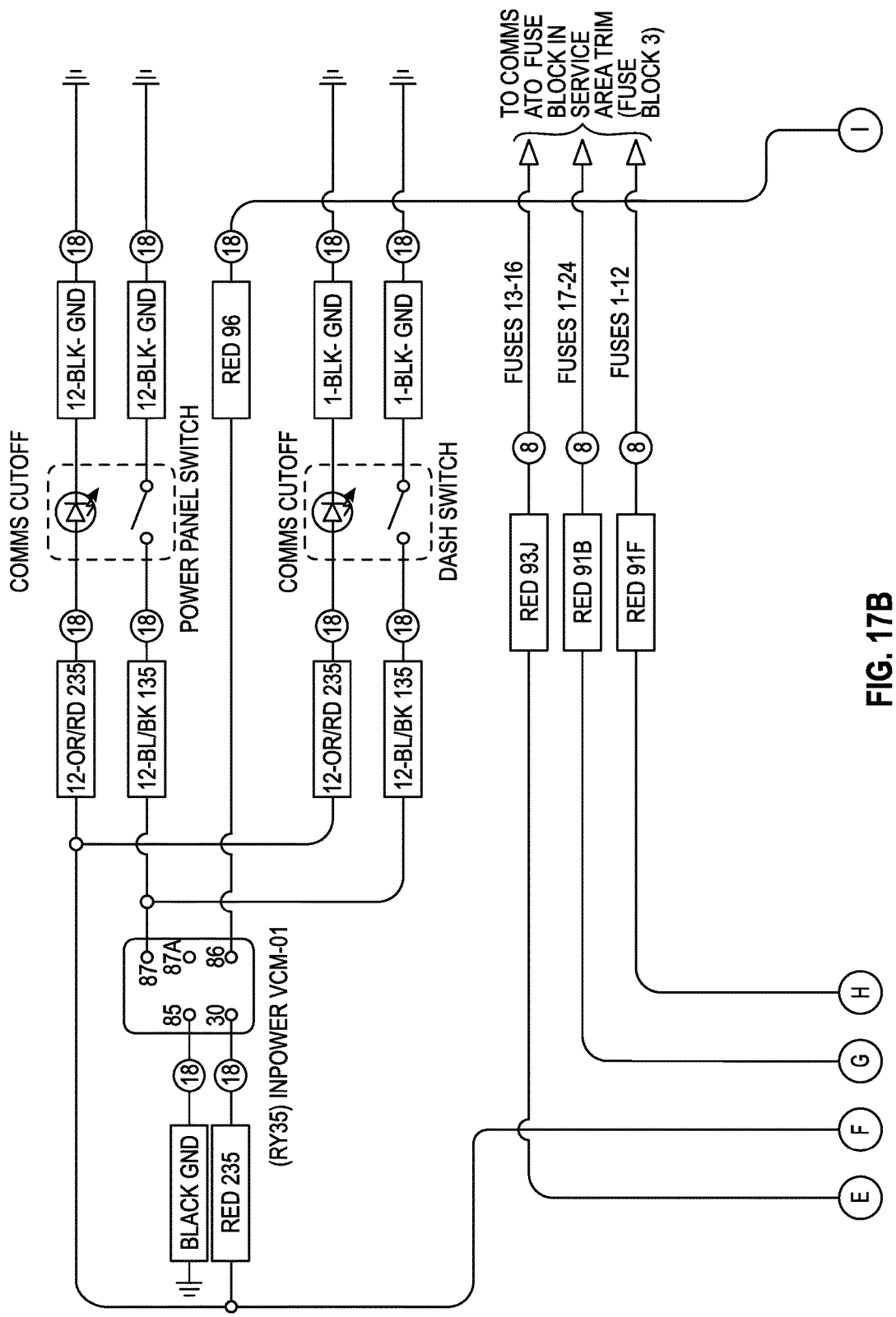
Figure 17C:
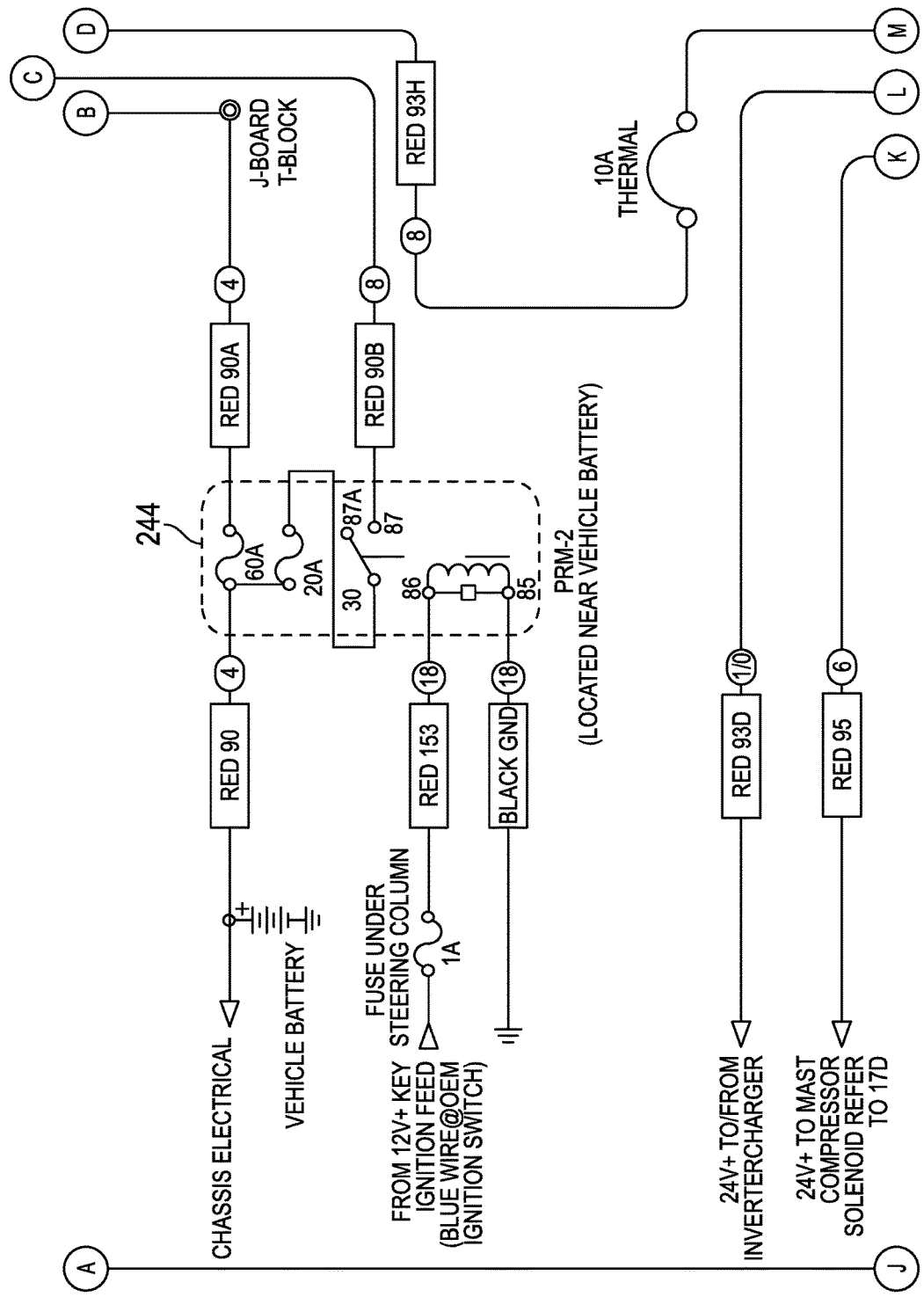
Figure 17D:
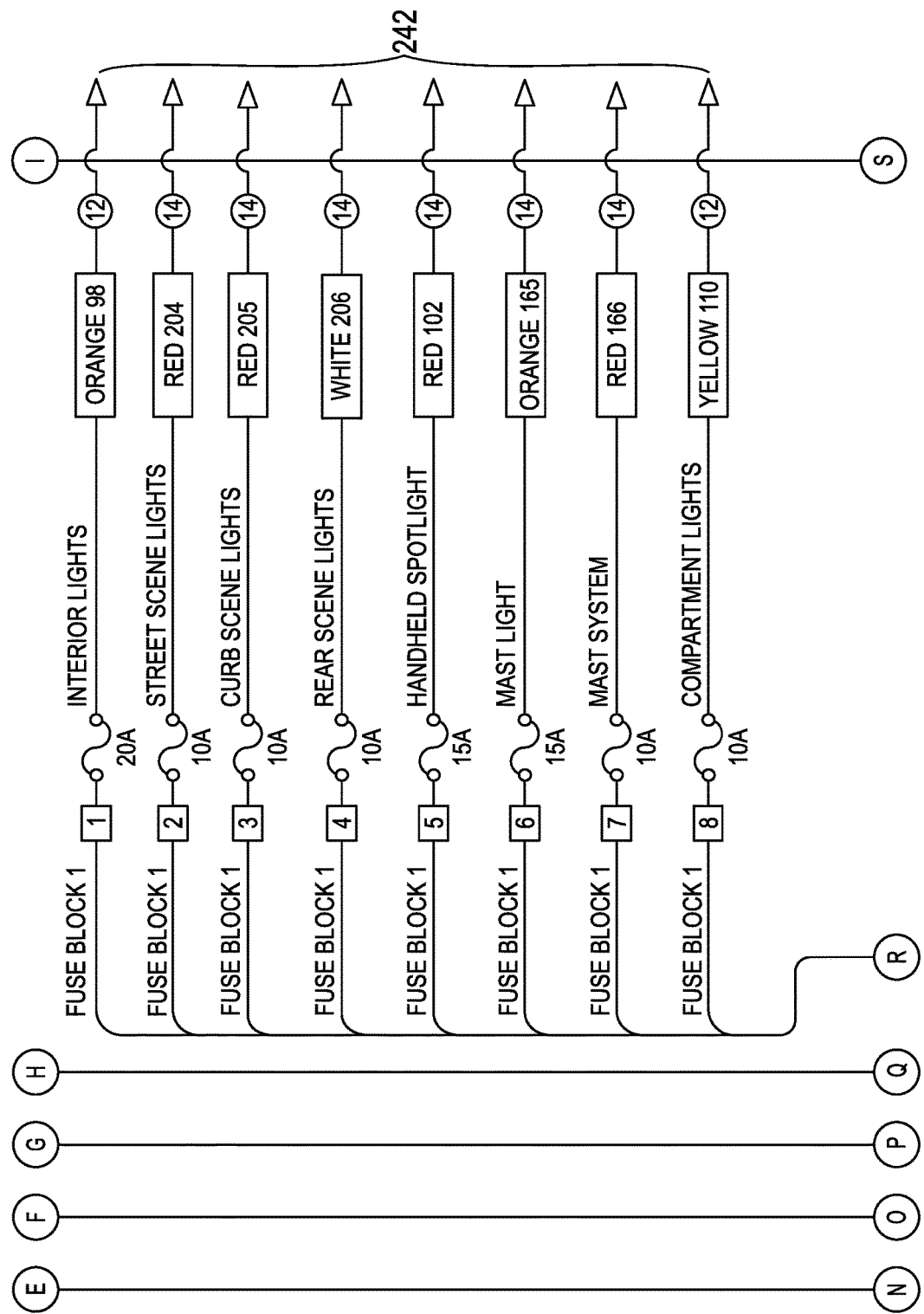
Figure 17E:
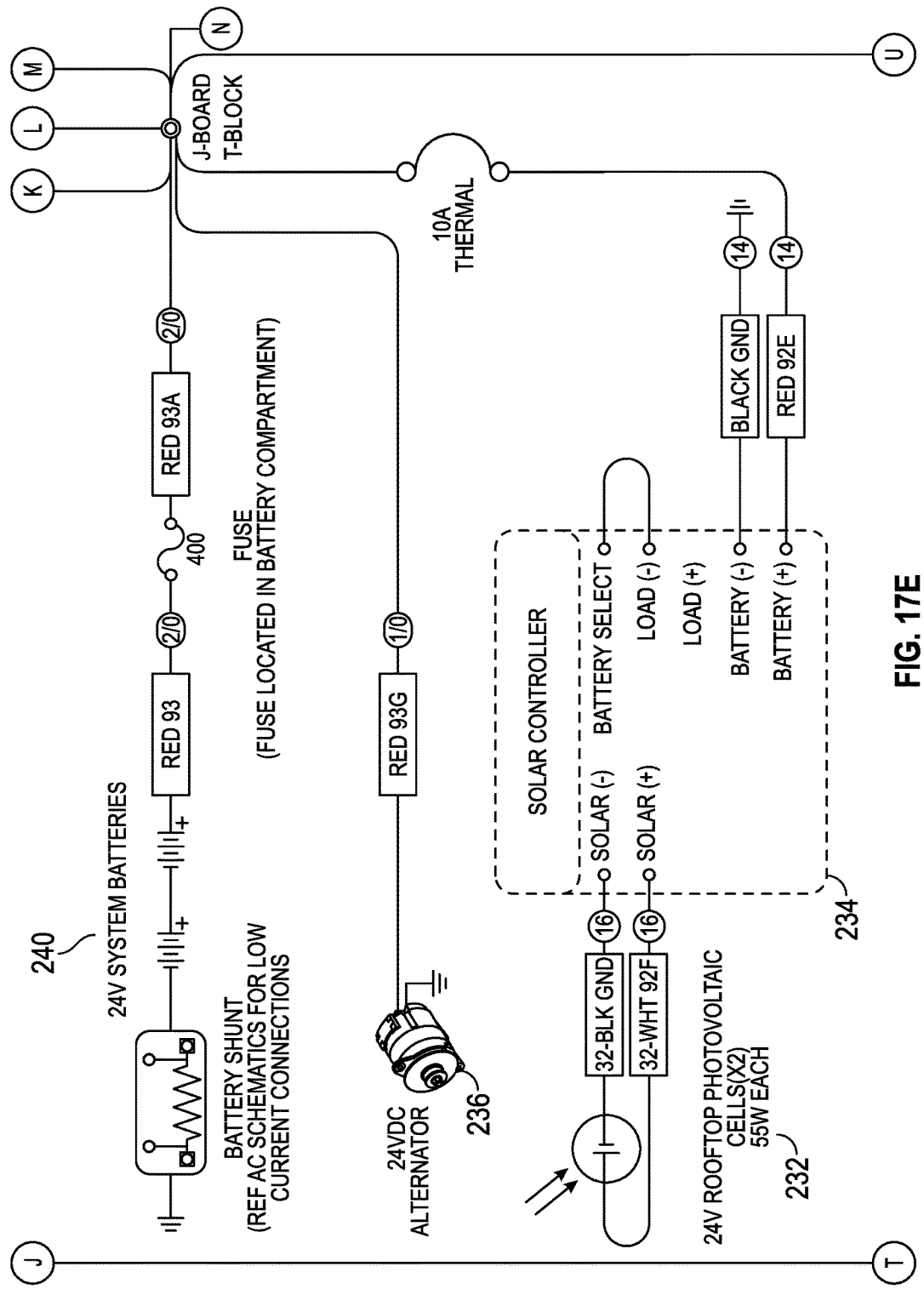
Figure 17F:
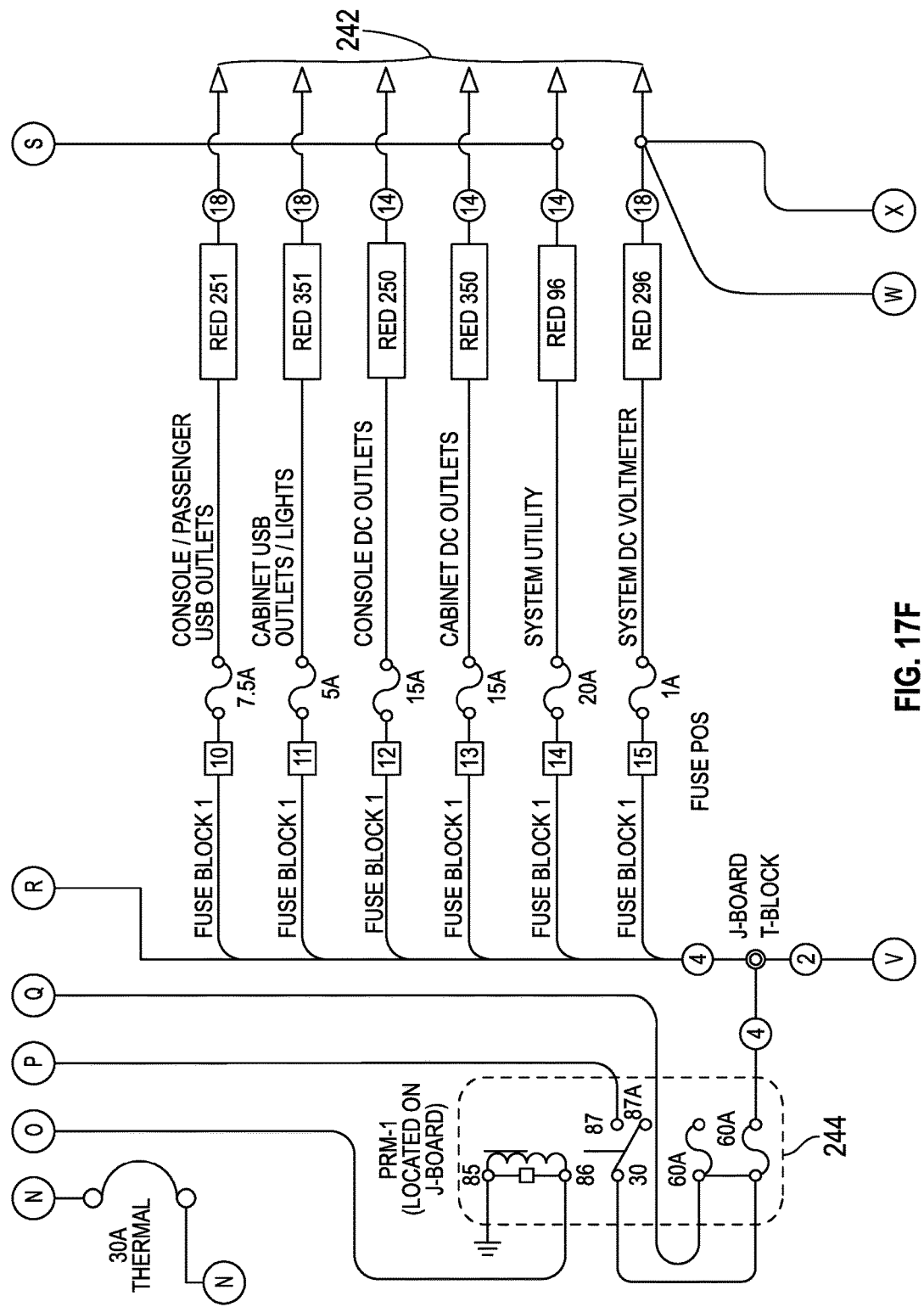
Figure 17G:
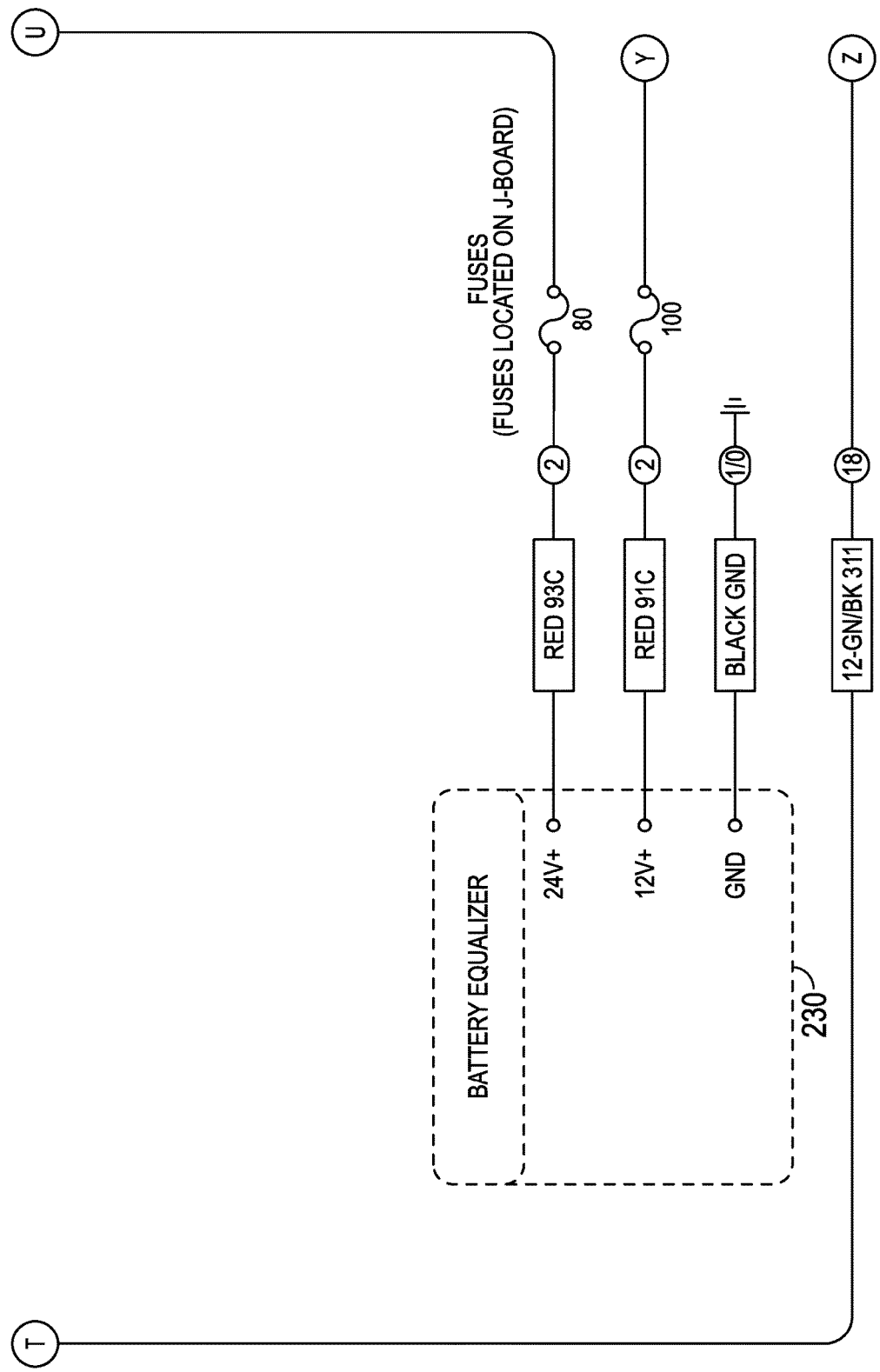
Figure 17H:
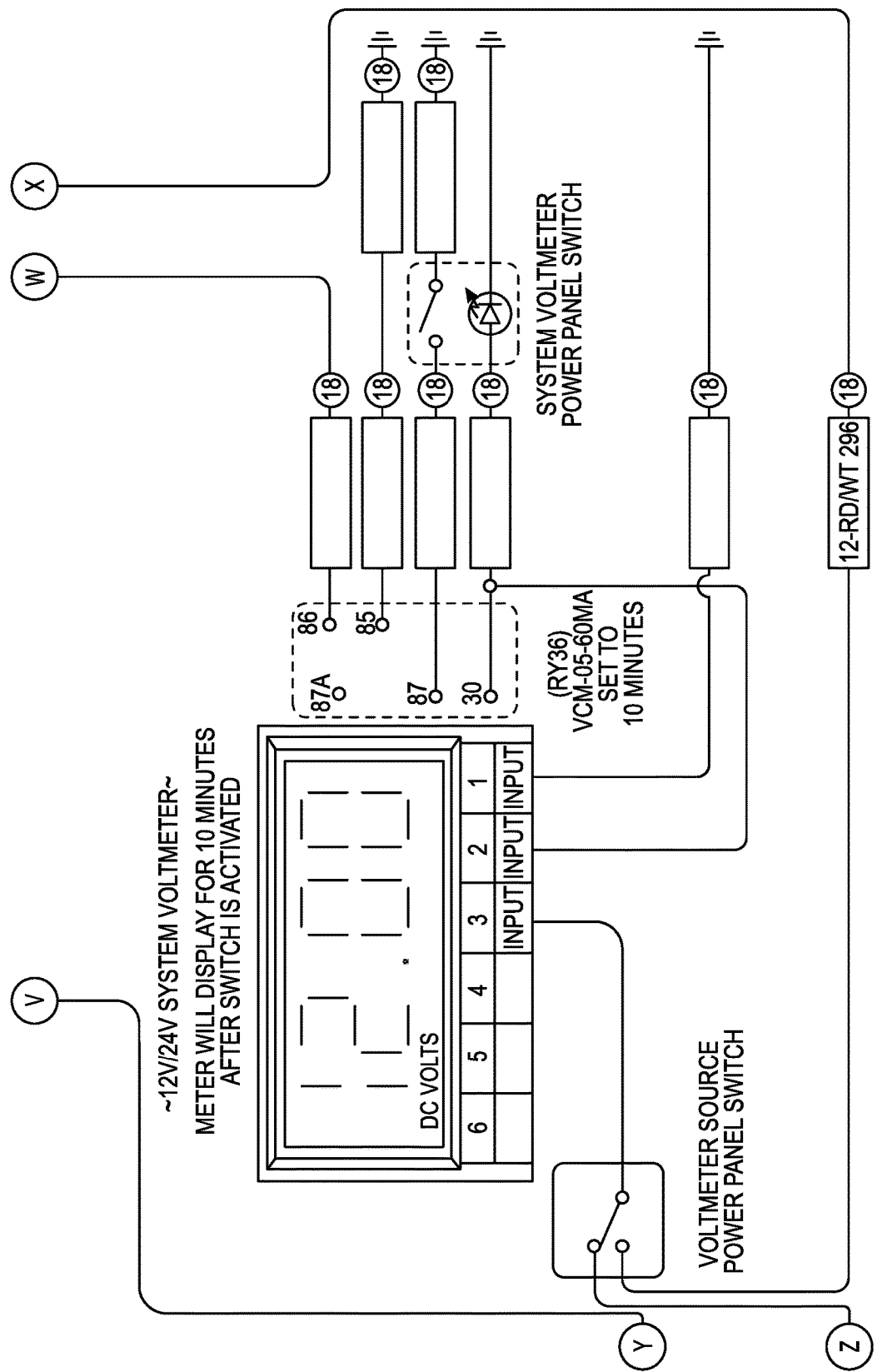
Figure 18A:
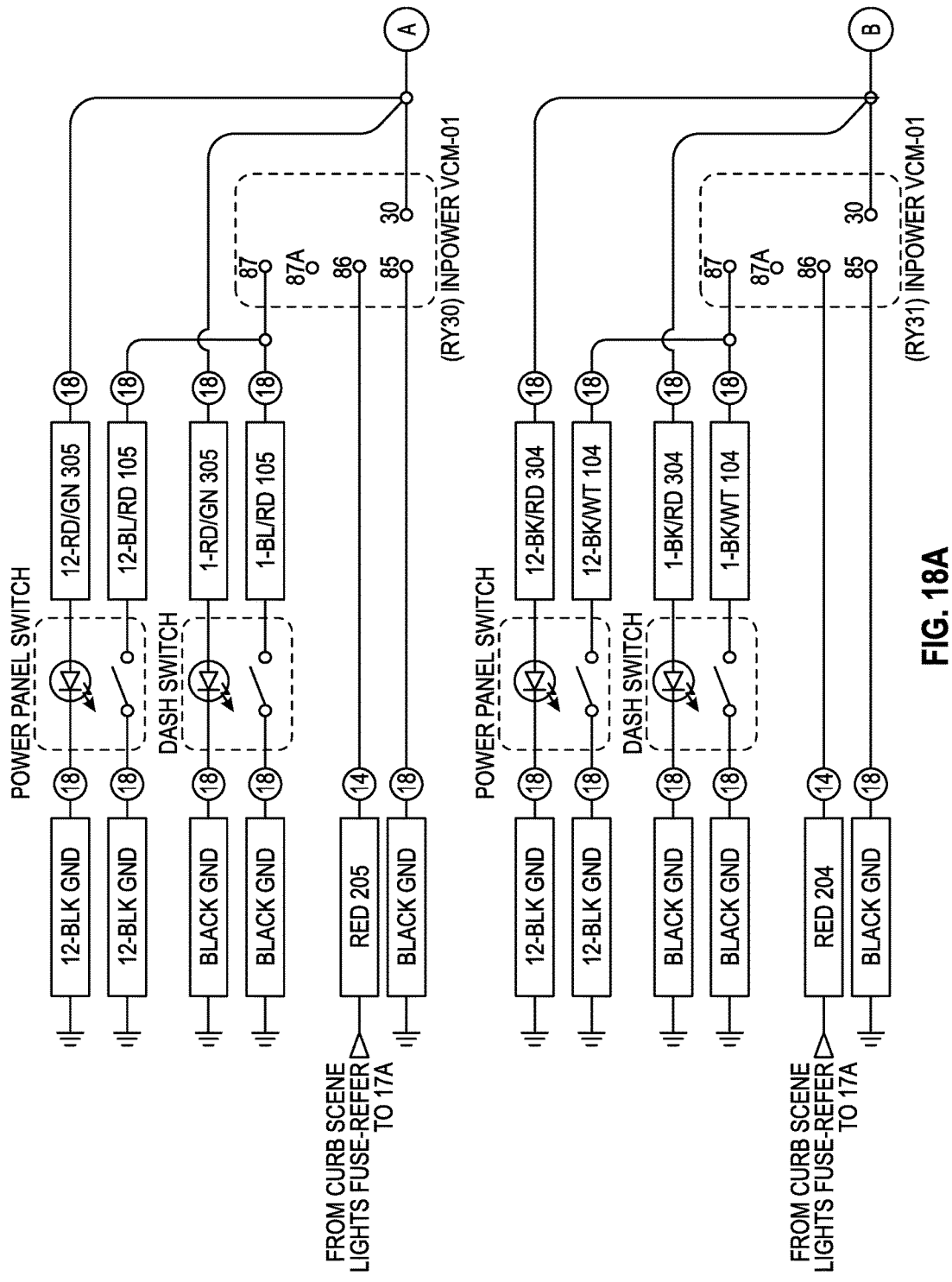
Figure 18C:
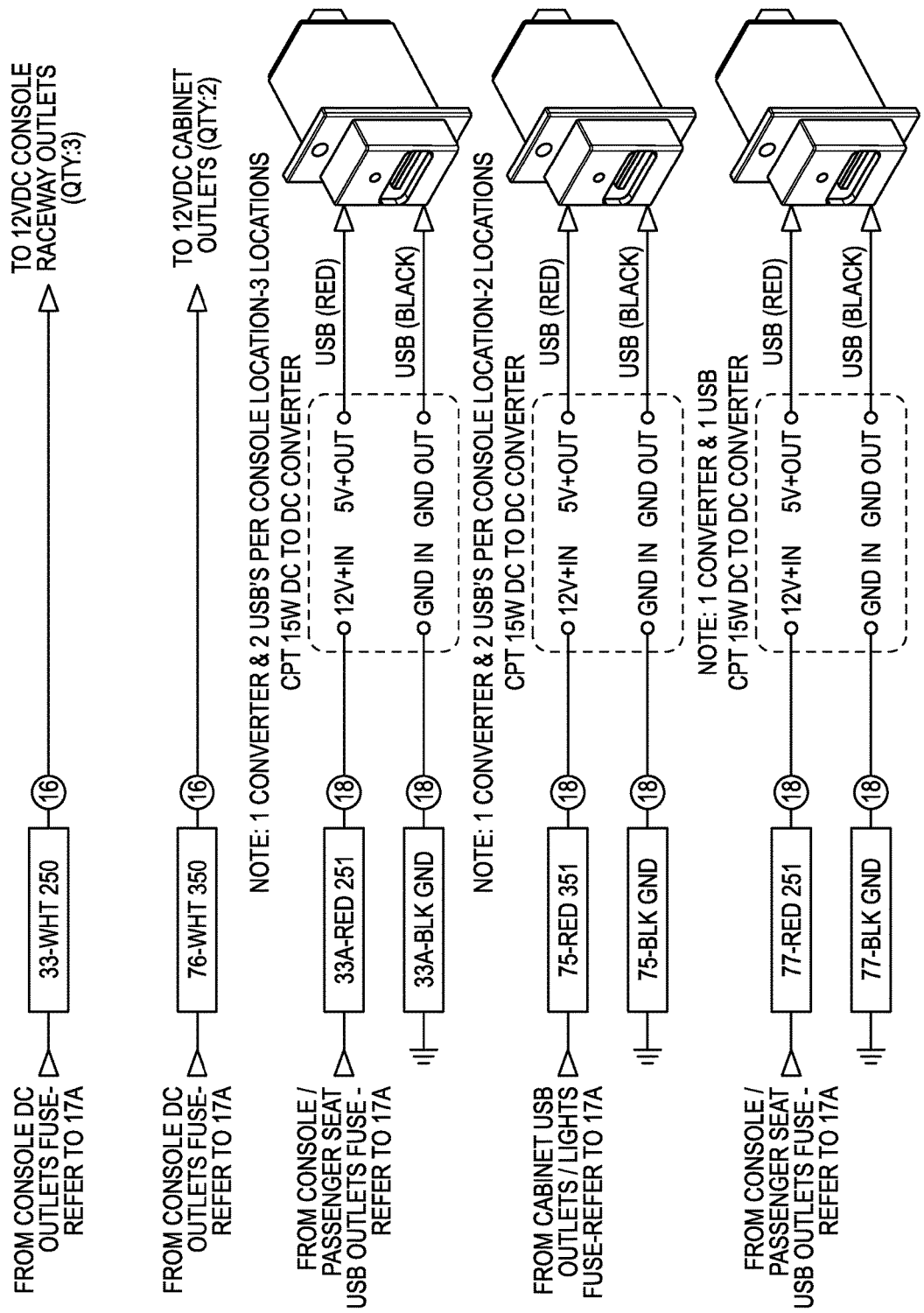
Figure 18E:
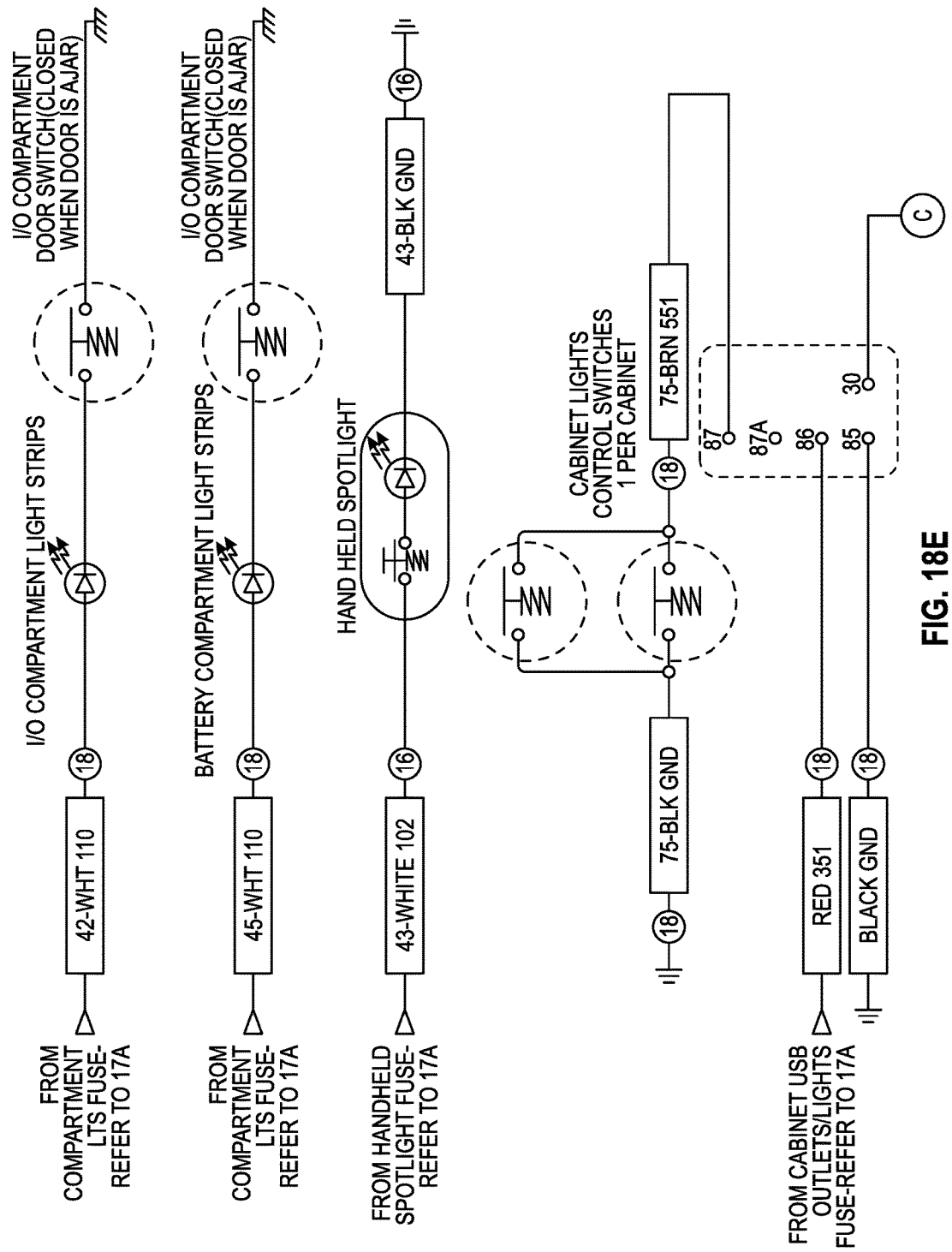
Figure 18F:
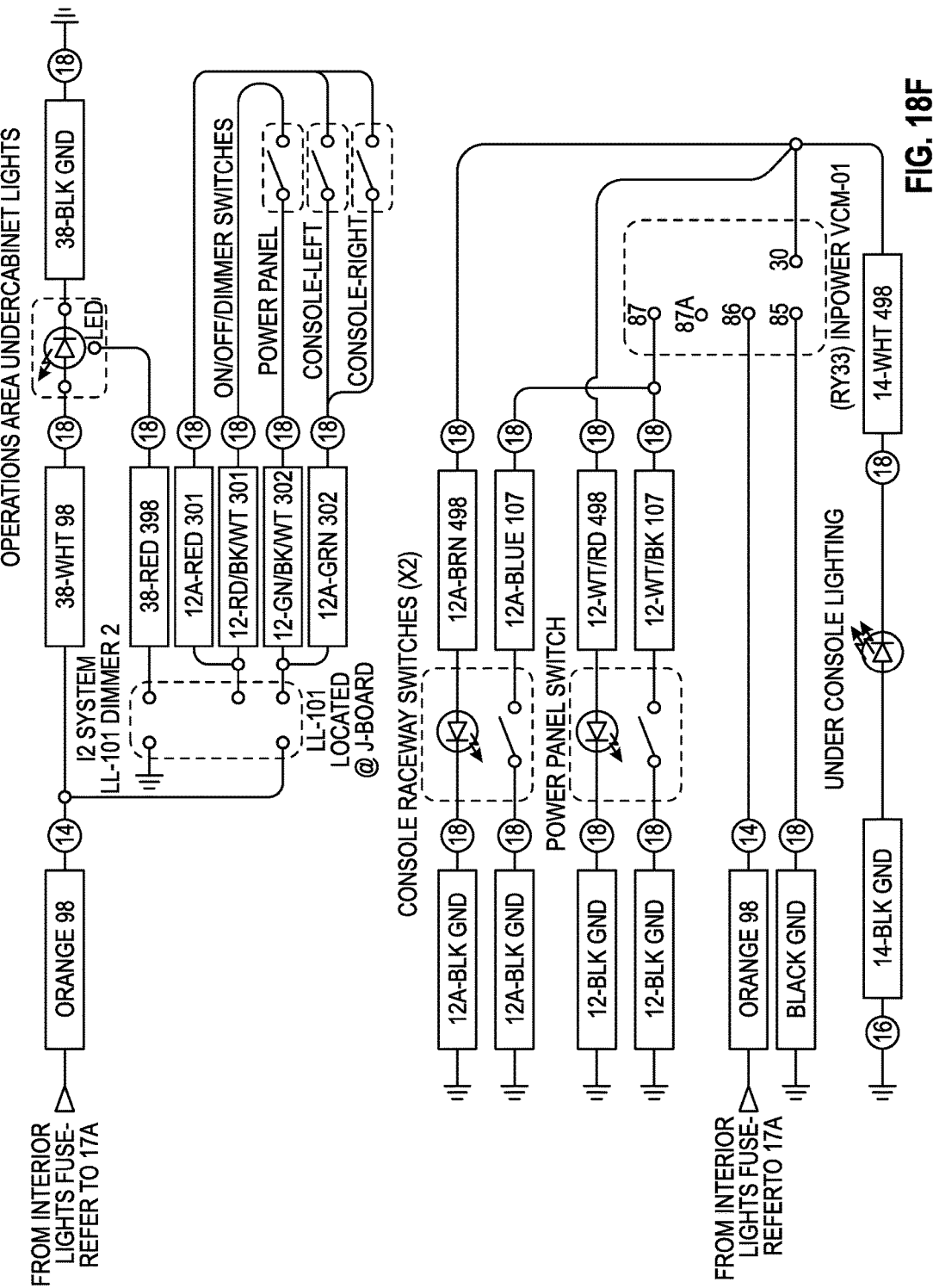
Figure 18G:
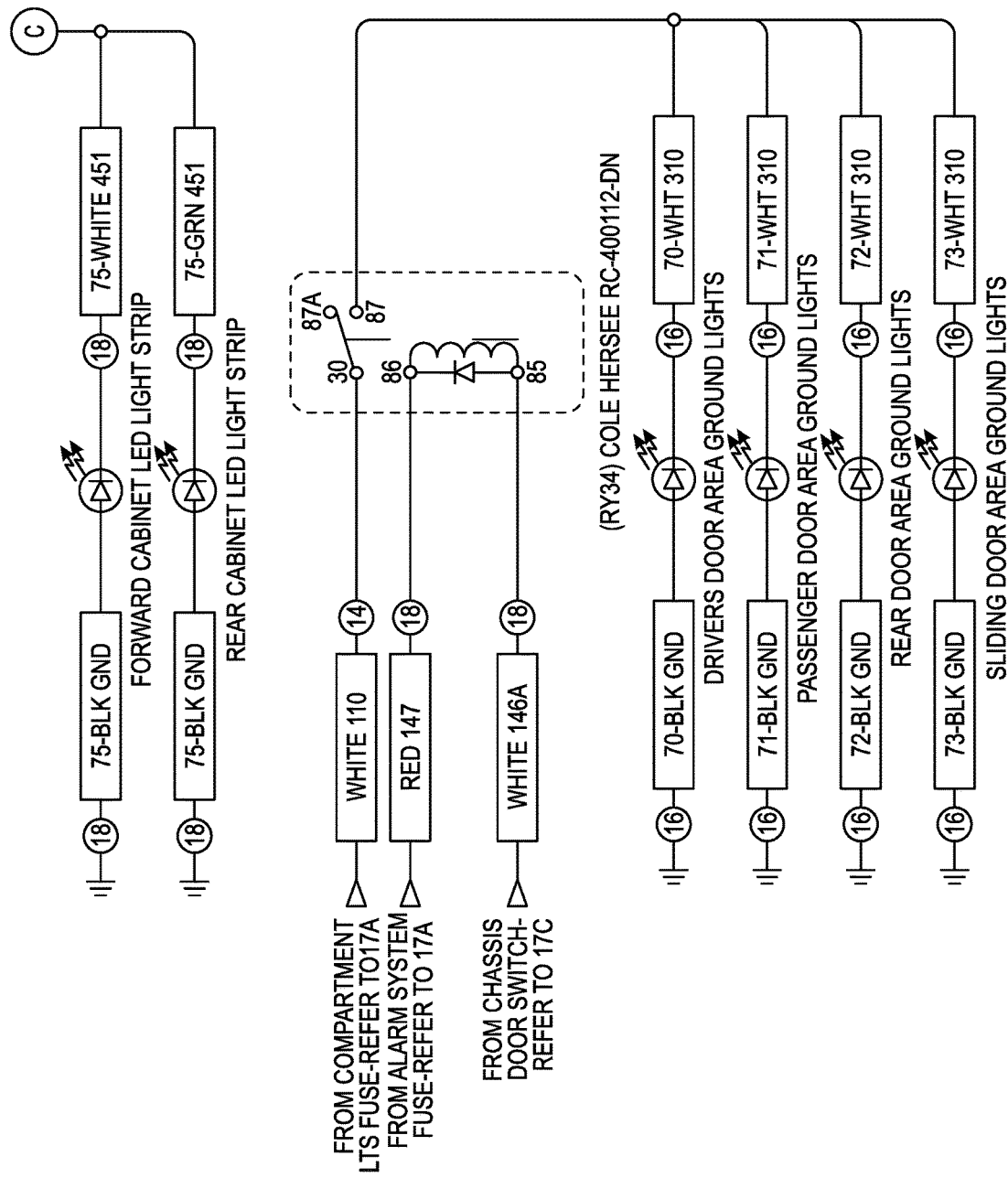
Figure 18H:
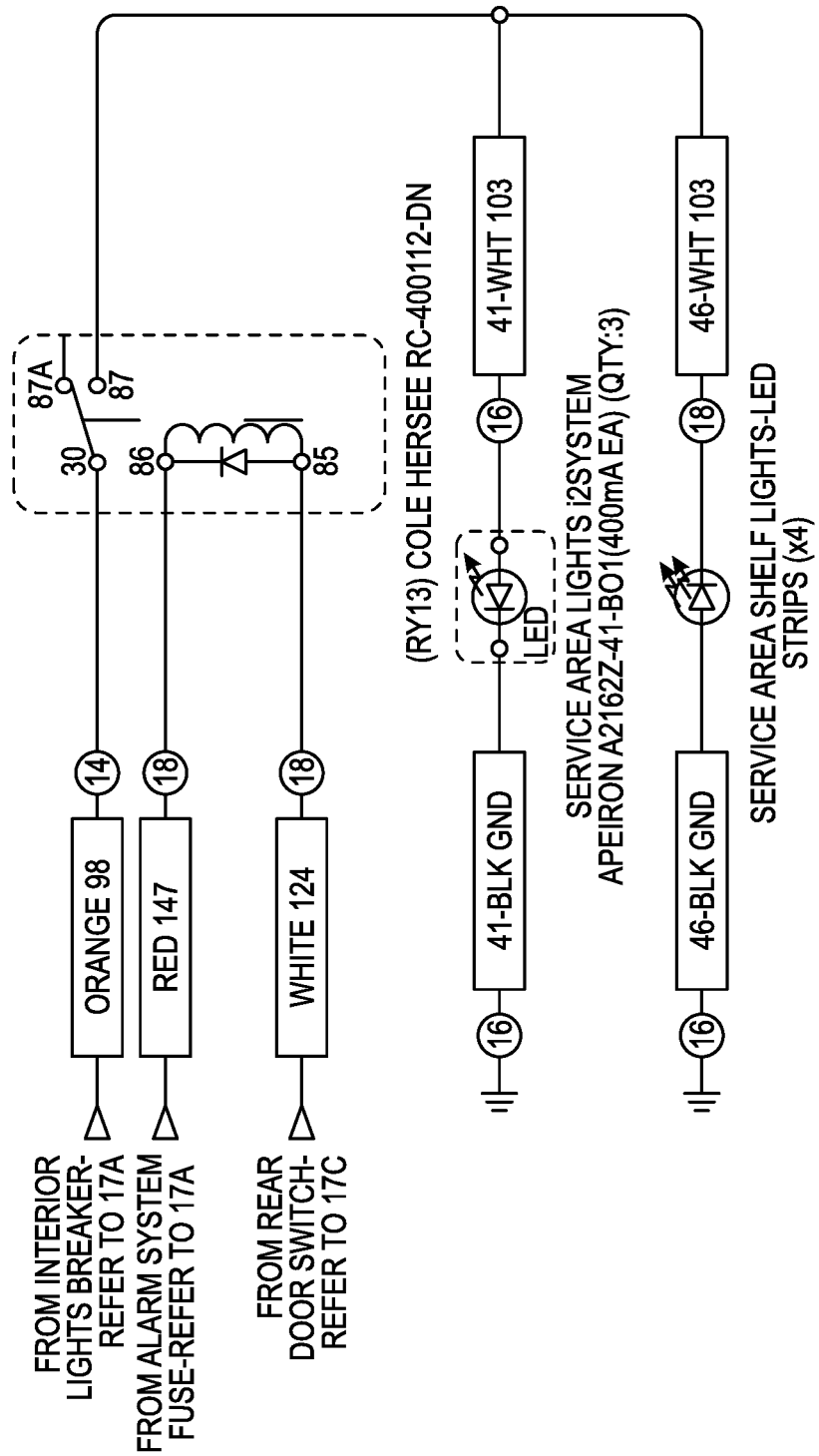
Figure 18I:
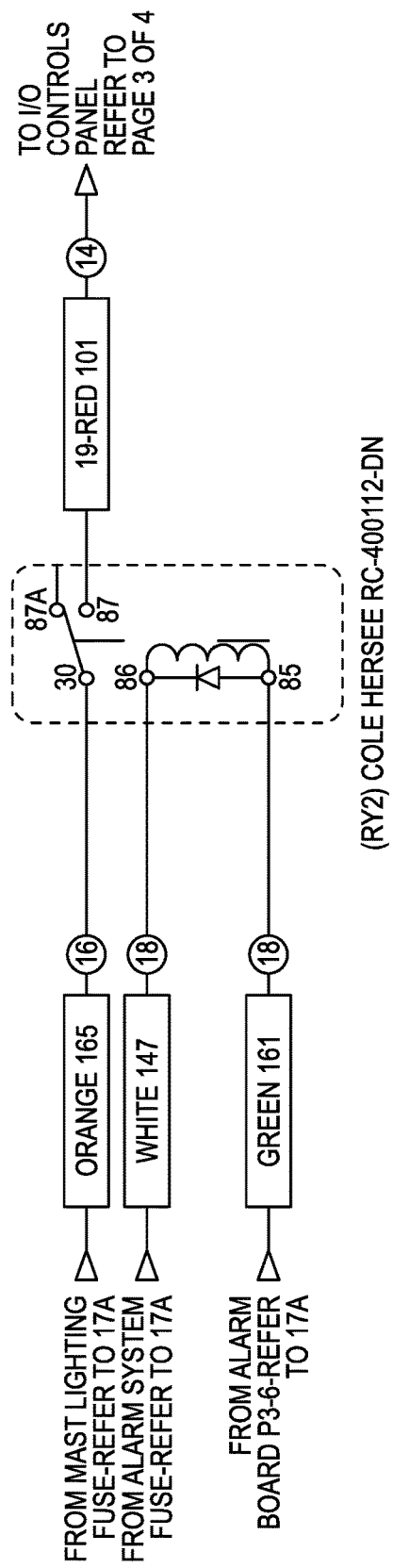
Figure 19A:
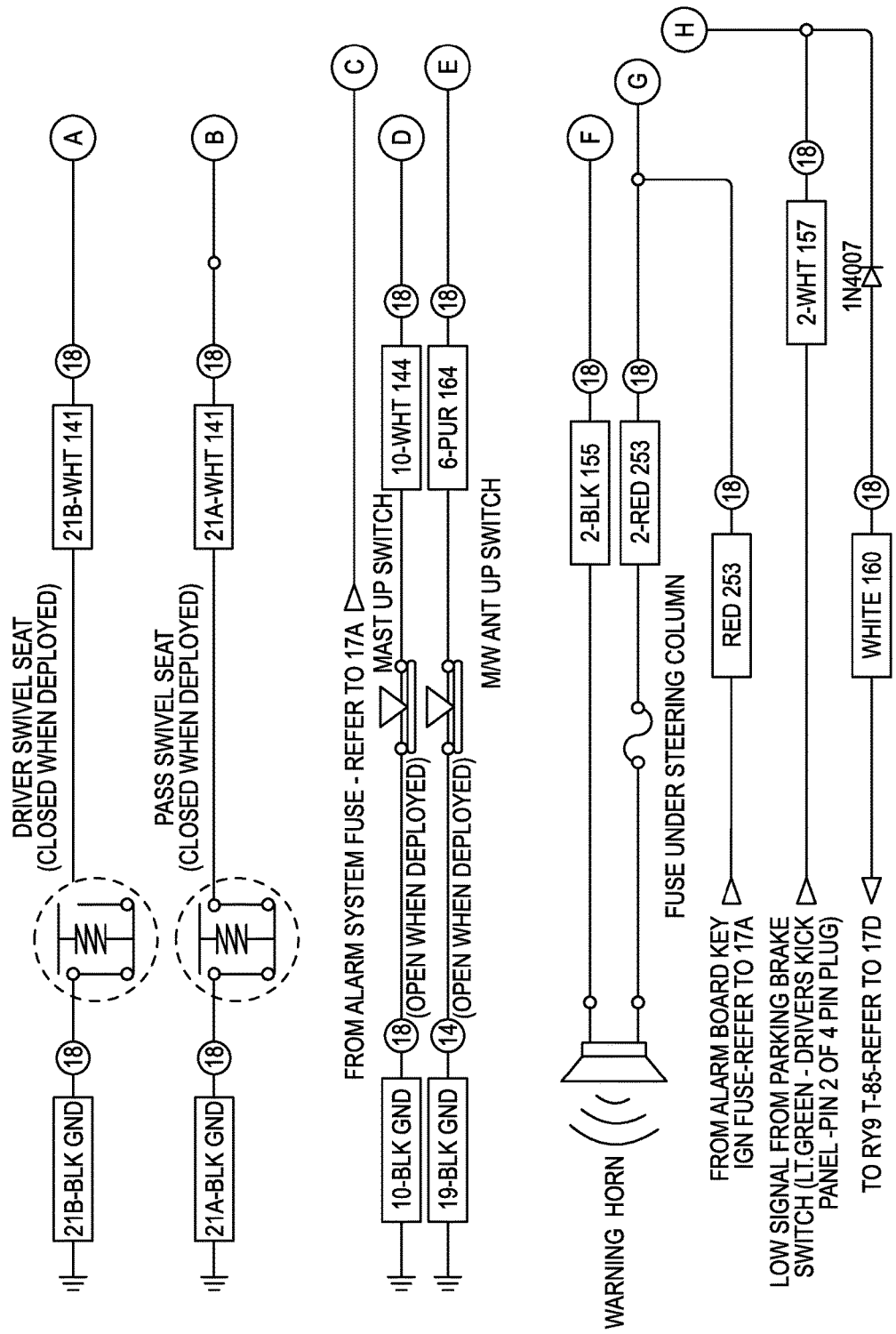
FIGS. 19A-19E are a schematic diagram of another portion of a DC portion of an auxiliary power system, according to an exemplary embodiment.
Figure 19B:
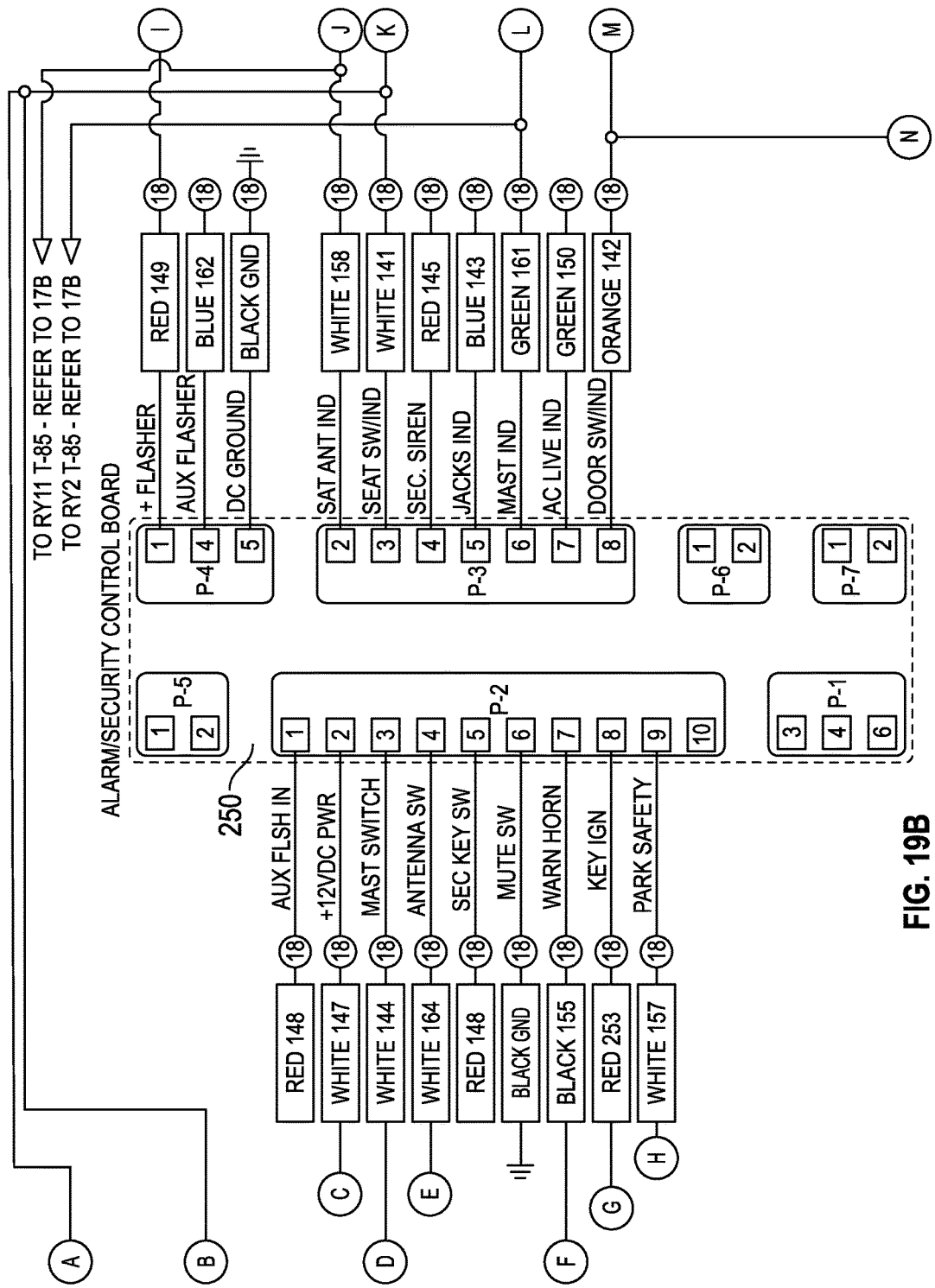
Figure 19C:
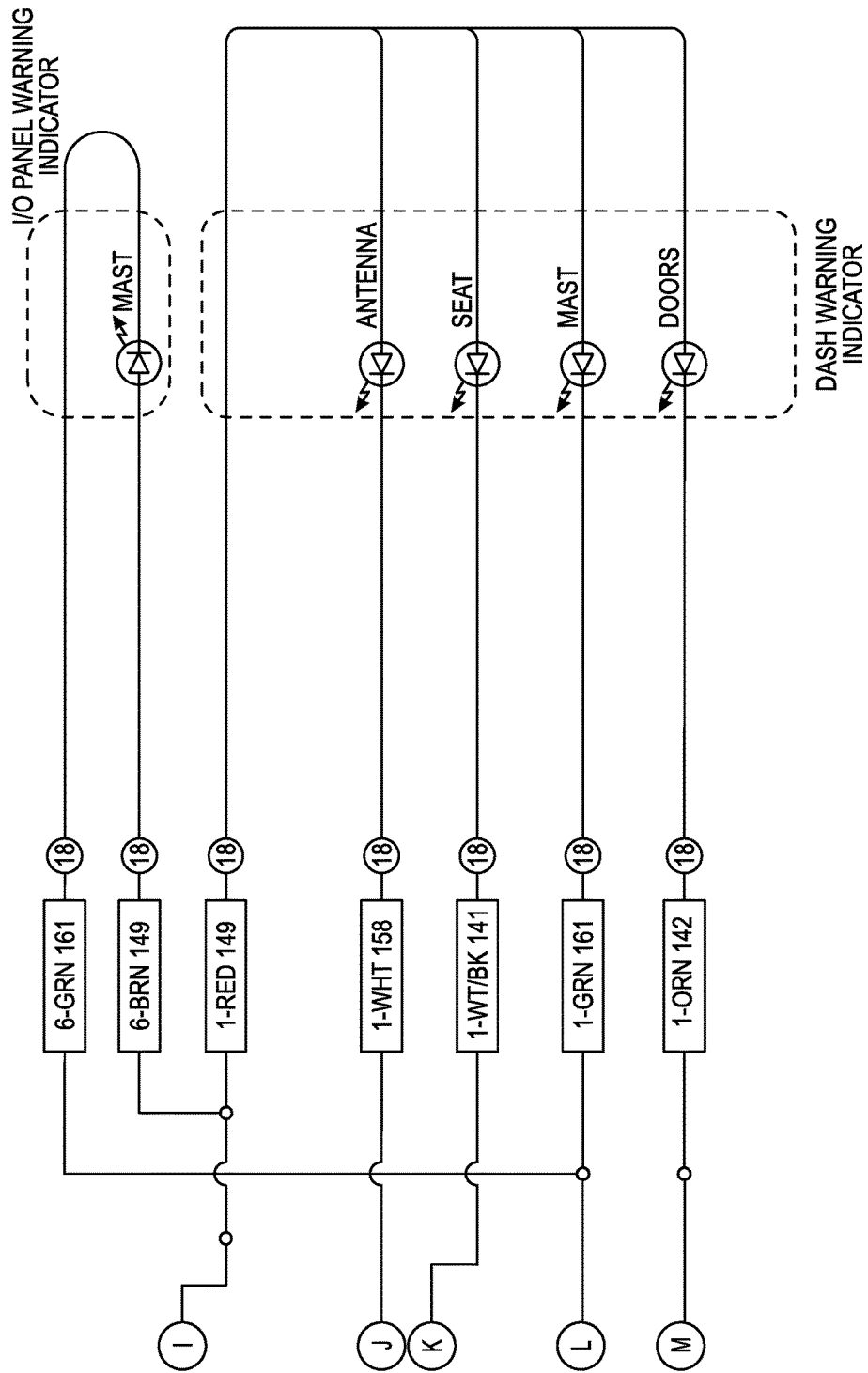
Figure 19D:
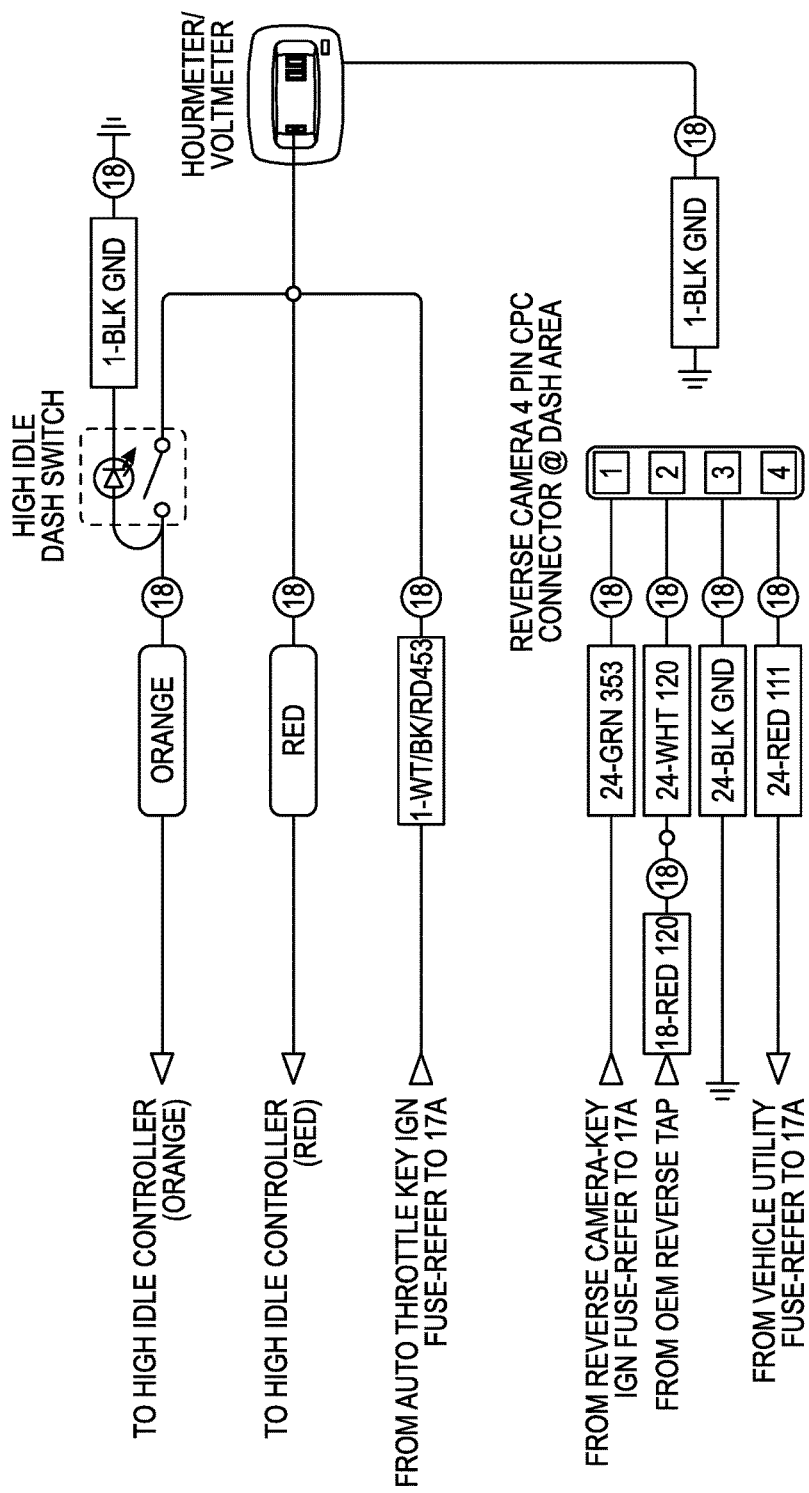
Figure 19E:
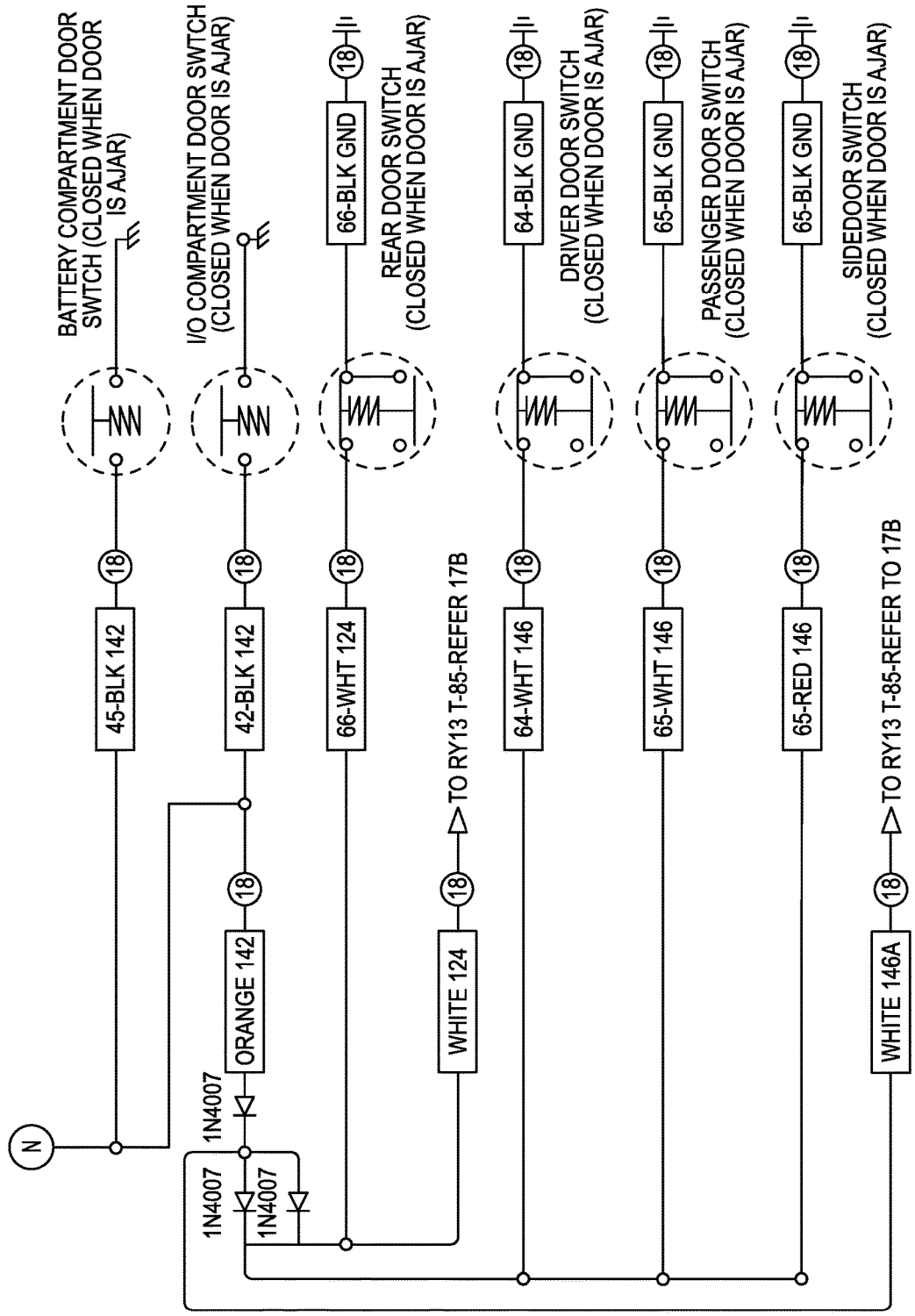

The DC portion further includes a battery system 240. Battery system 240 is shown in FIG. 17E to include a pair of 24 V system batteries, in one embodiment. Battery system 240 provides a power source to various vehicle systems, either directly or indirectly via a battery equalizer or through charger/inverter 202. Referring further to FIGS. 17A-17H, battery system 240 is shown to provide a power source to various vehicle systems 242 such as the auxiliary A/C, reverse camera, alarm system, HVAC system, etc. Power relay modules (PRM) 244 (e.g., a Bussman PRM-1) may be configured to relay power from battery system 240 to other vehicle systems 242 (e.g., various vehicle lights and outlets). In some embodiments, battery system 240 includes a battery monitor configured to monitor performance characteristics of battery system 240 (e.g., voltage/current draw, charge level, etc.).

Referring now to FIGS. 18A-18I, a schematic diagram of another portion of the DC portion of the auxiliary power system is shown. More particularly, the schematic diagram of FIGS. 18A-18I illustrates in greater detail the various vehicle systems 242 that receive power from battery system 240.

Referring now to FIGS. 19A-19E, a schematic diagram of another portion of the DC portion of the auxiliary power system is shown. More particularly, the schematic diagram of FIGS. 19A-19E illustrates in greater detail an alarm/security control board 250 of the auxiliary power system. Alarm/security control board 250 may be configured to control various vehicle subsystems related to providing alarms or warnings to occupants of the vehicle. For example, alarm/security control board 250 may control one or more warning indicators on a panel or dash of the vehicle, one or more door switches, and one or more vehicle subsystems related to generating visual or audio alarms for occupants of the vehicle.

Figure 20A:
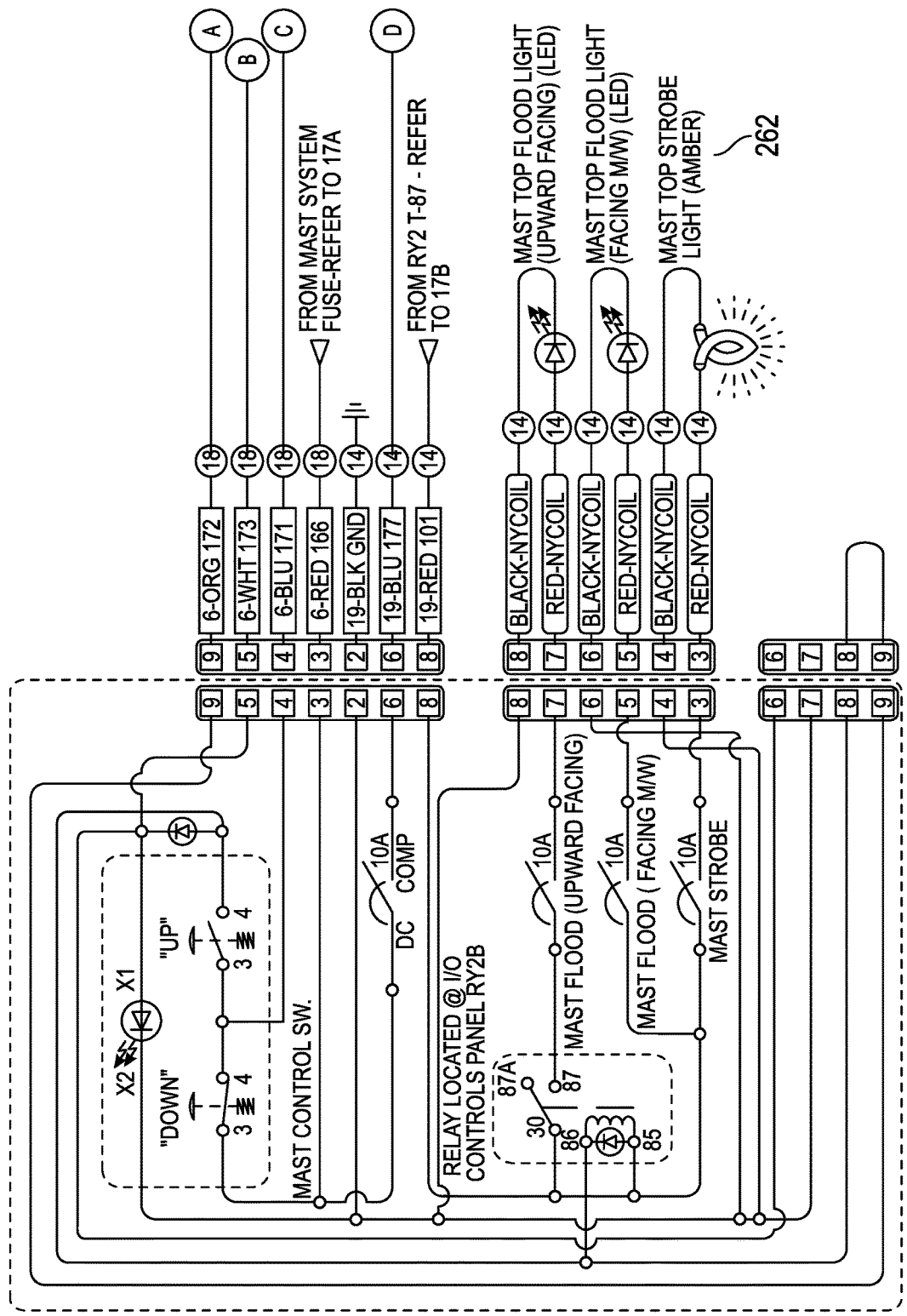
FIGS. 20A-20C are a schematic diagram of another portion of a DC portion of an auxiliary power system, according to an exemplary embodiment.
Figure 20B:
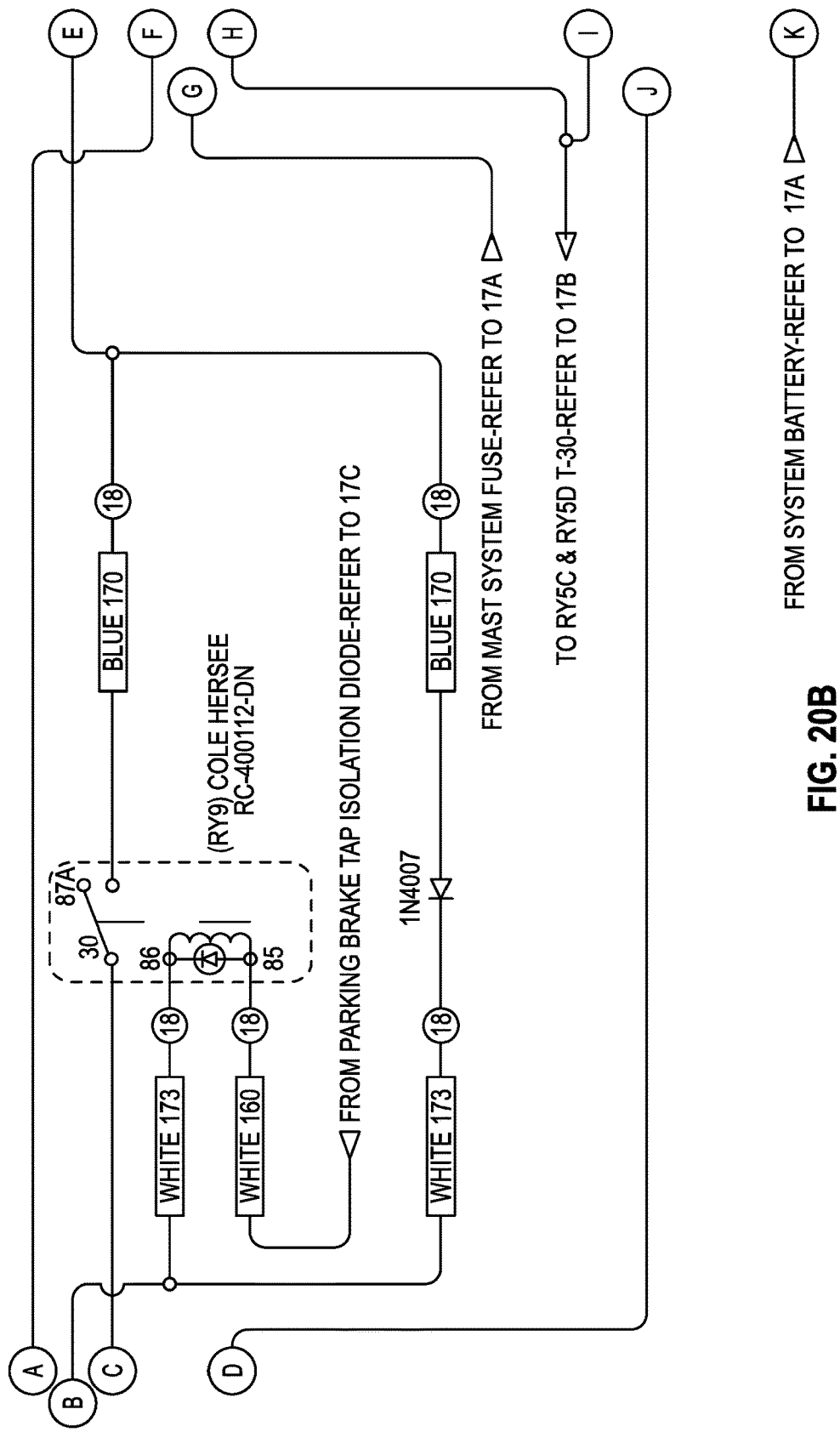
Figure 20C:
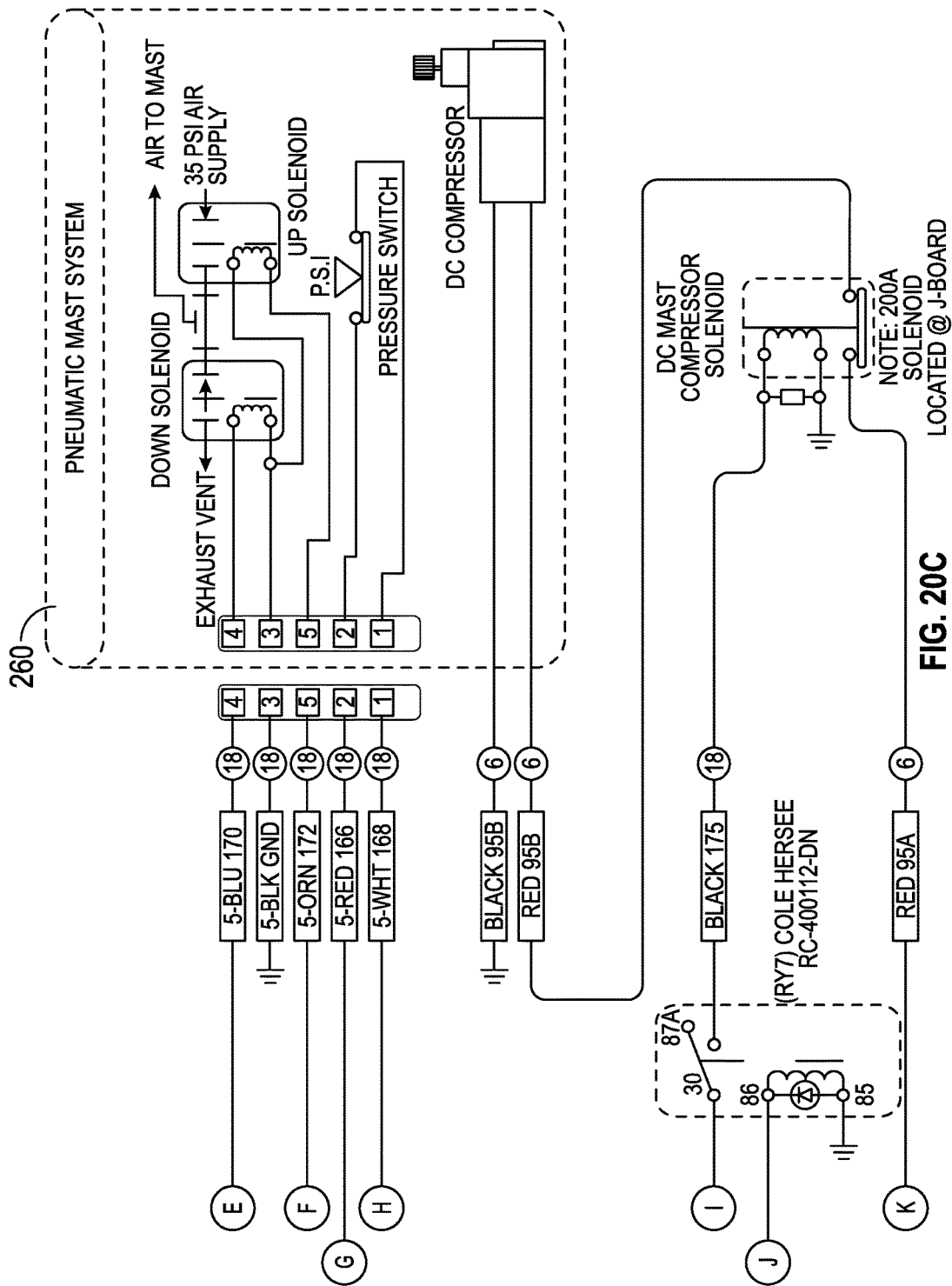

Referring now to FIGS. 20A-20C, a schematic diagram of another portion of the DC portion of the auxiliary power system is shown. More particularly, the schematic diagram of FIGS. 20A-20C illustrates in greater detail pneumatic mast system 260. Pneumatic mast system 260 may be a vehicle system configured to deploy communications equipment (e.g., dishes, microwave transmitters, etc.), lighting, and other vehicle systems at a location above the vehicle. Pneumatic mast system 260 may be powered by DC power provided by battery system 240 as described above. Pneumatic mast system 260 may include a plurality of lights 262 powered by battery system 240.

Figure 21A:
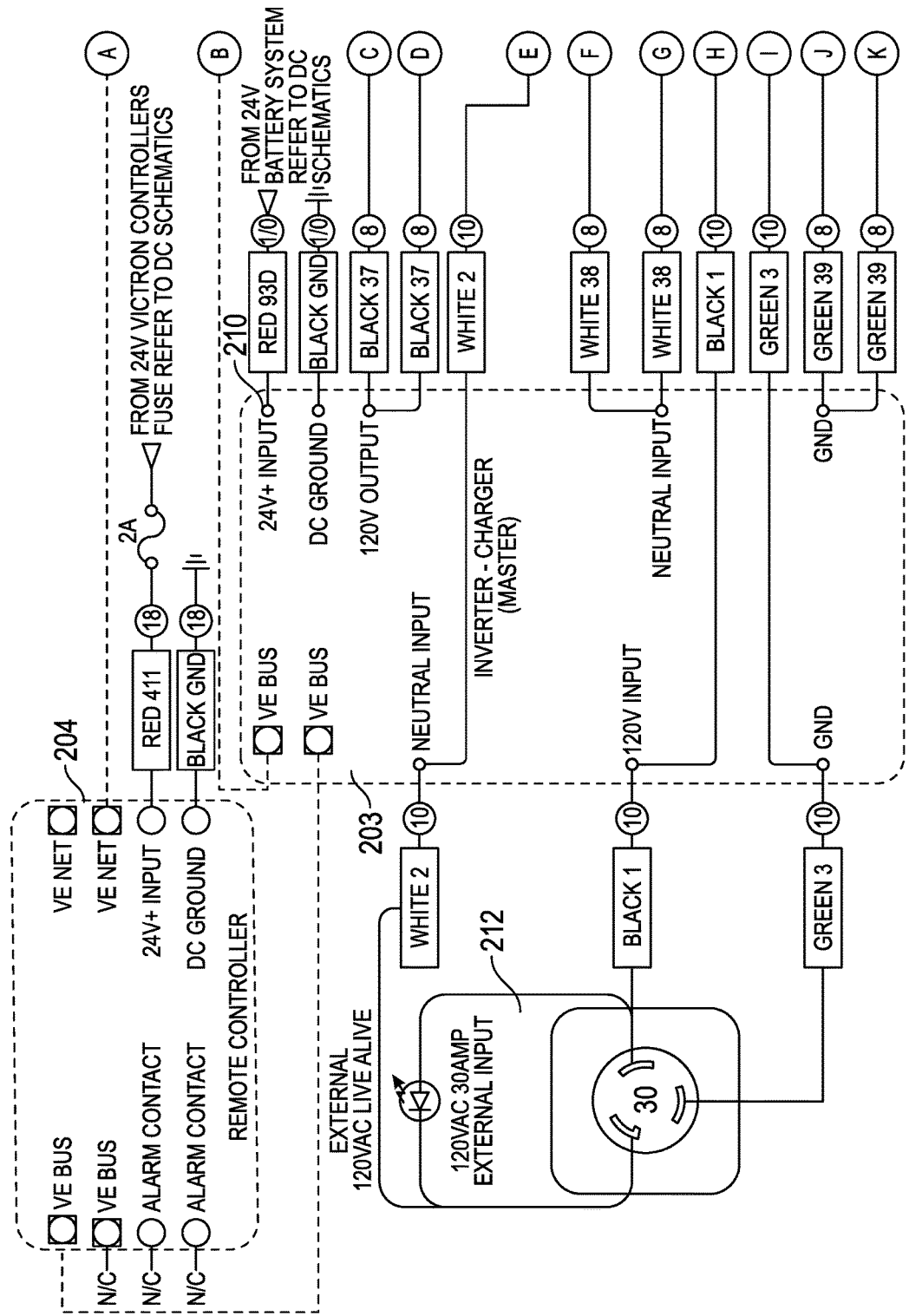
FIGS. 21A-21C are a schematic diagram of an AC portion of an auxiliary power system, according to another exemplary embodiment.
Figure 21B:
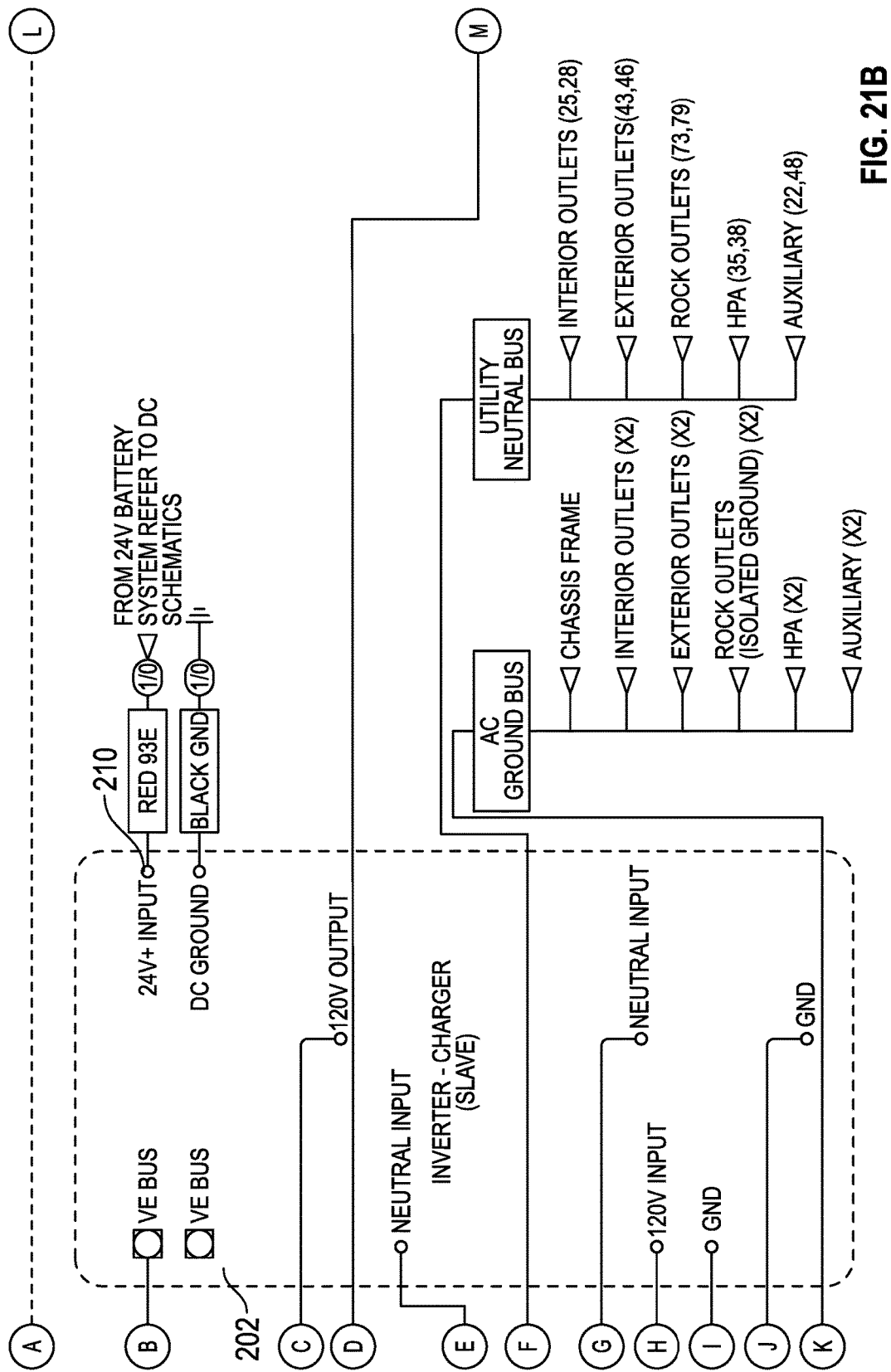
Figure 21C:
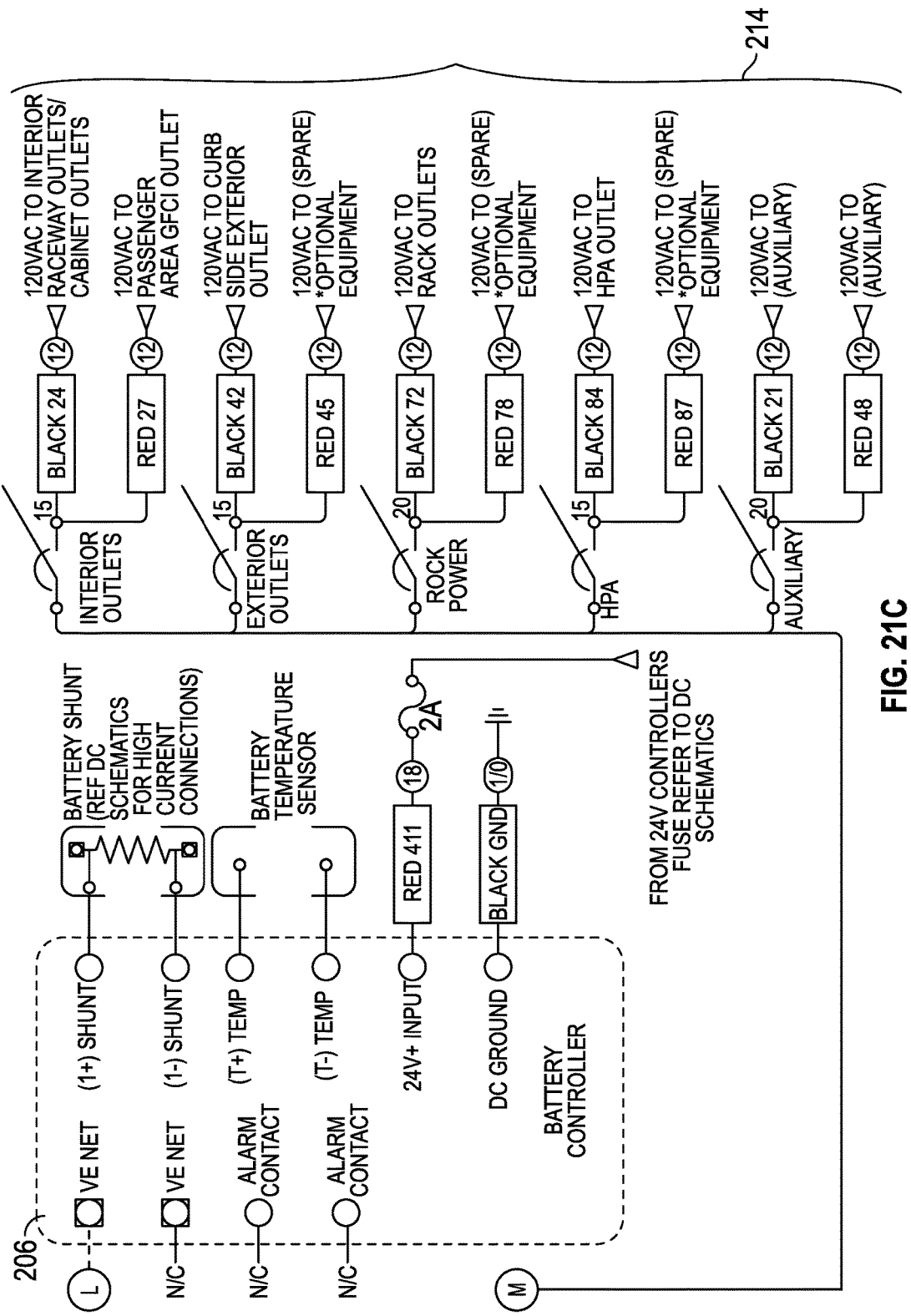
Figure 22A:
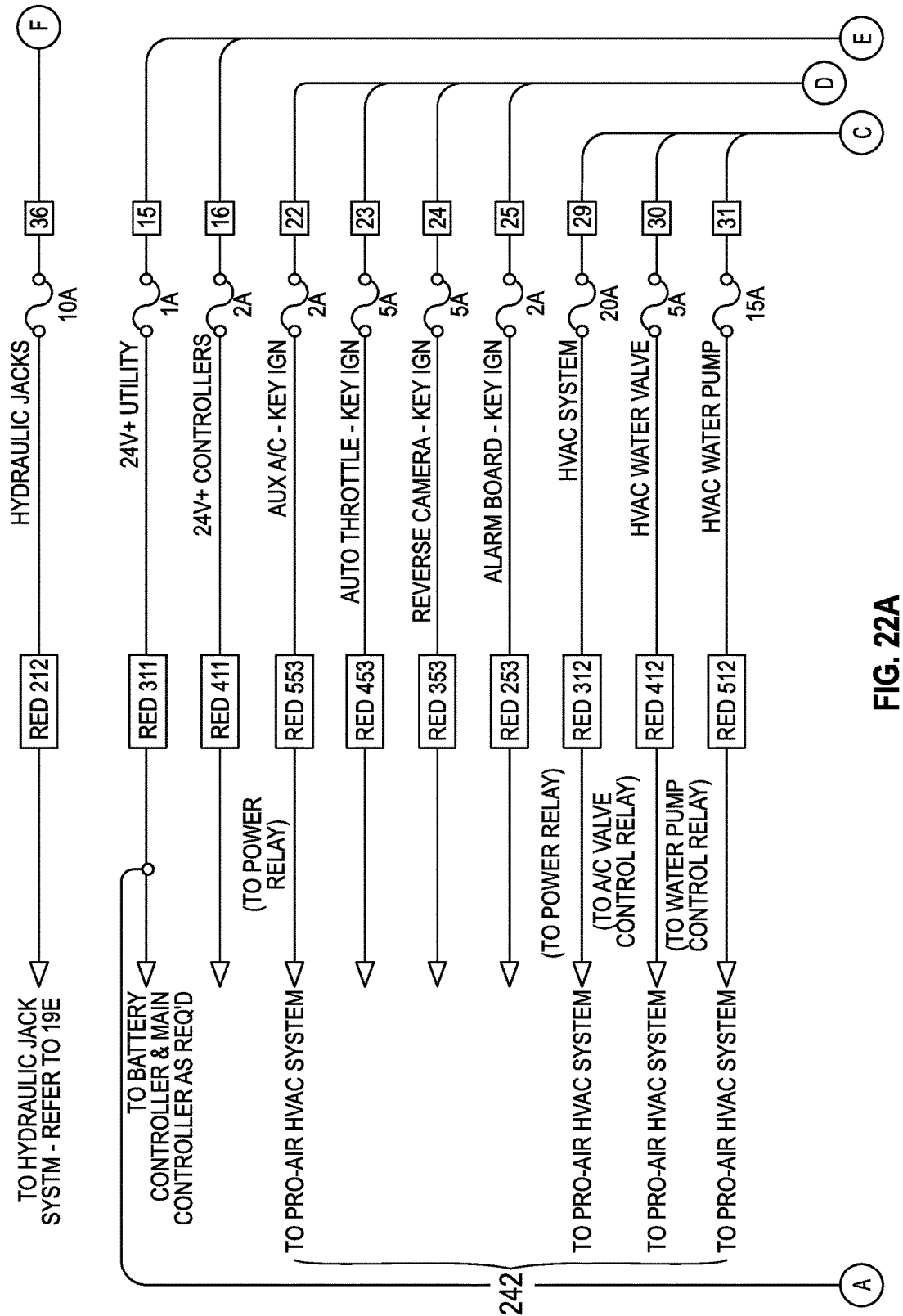
FIGS. 22A-22G are a schematic diagram of a portion of a DC portion of an auxiliary power system, according to another exemplary embodiment.
Figure 22B:
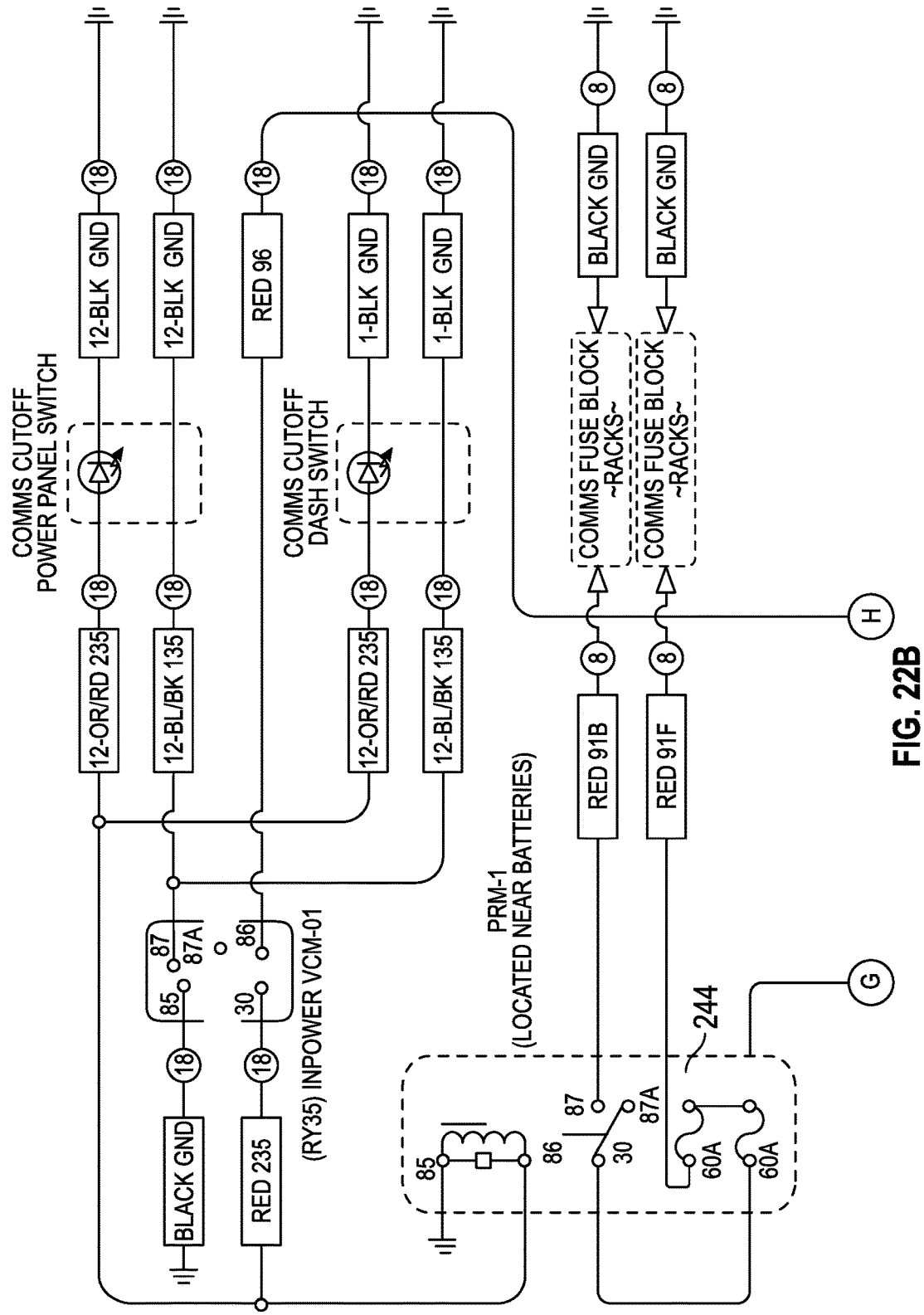
Figure 22C:
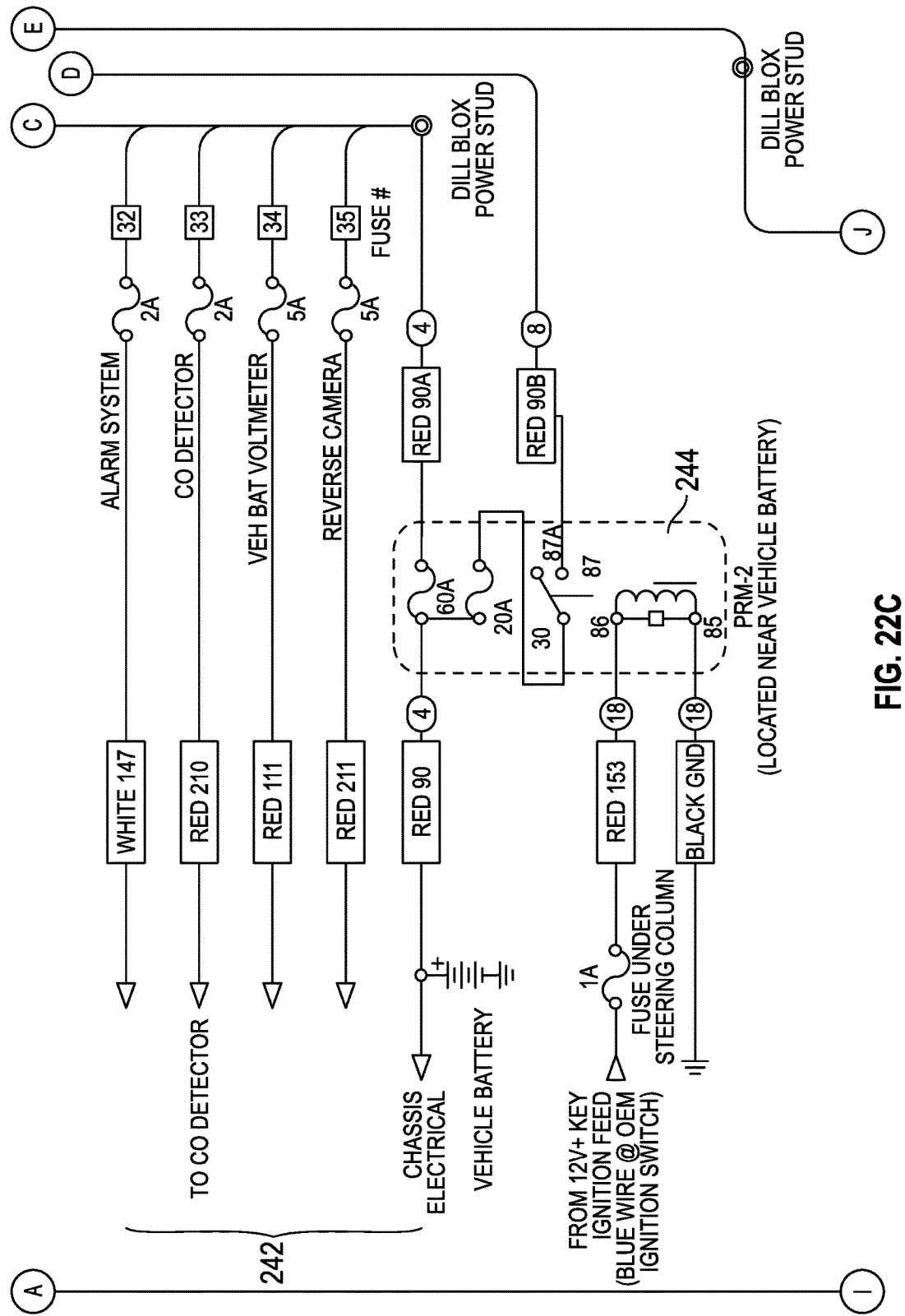
Figure 22D:
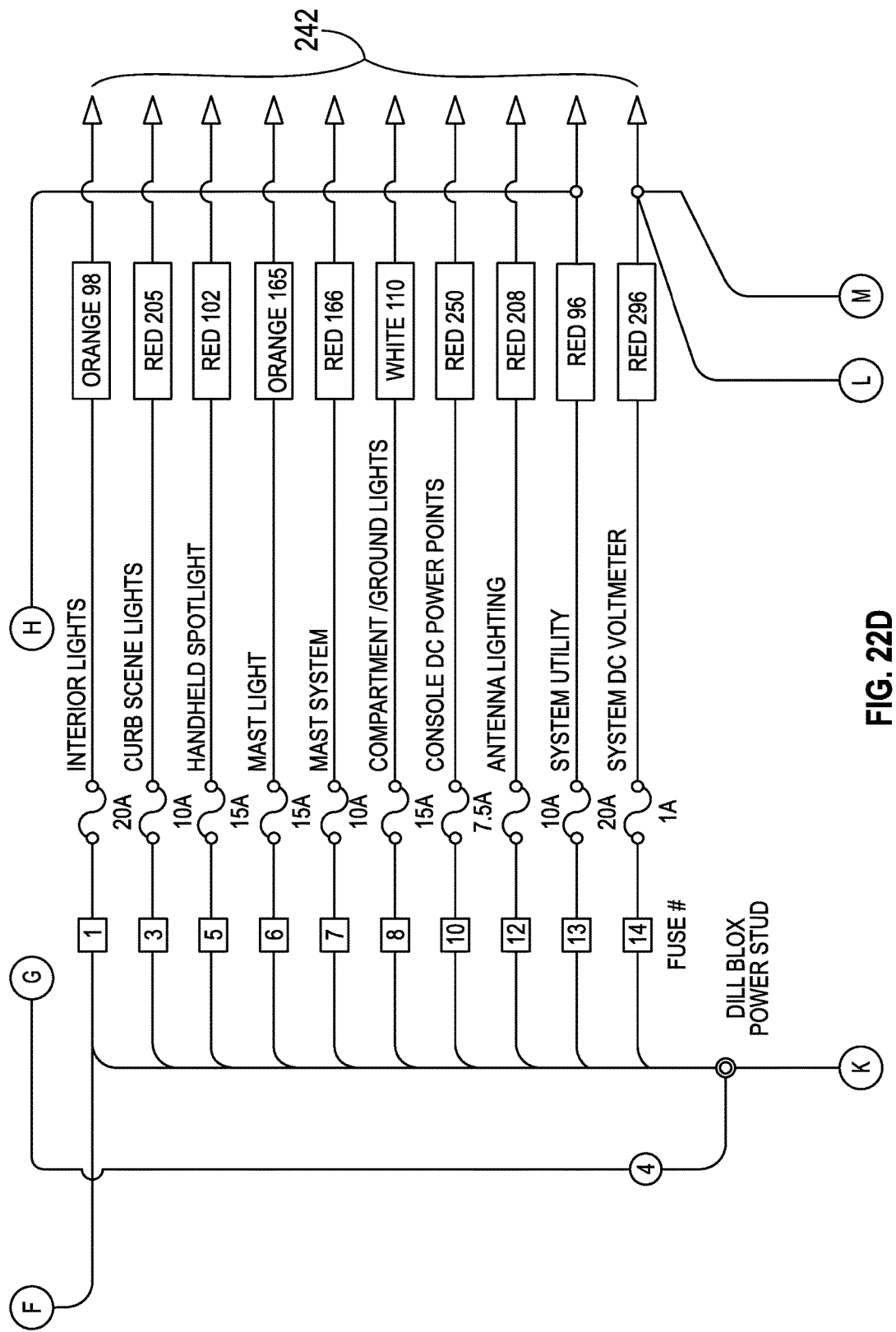
Figure 22E:
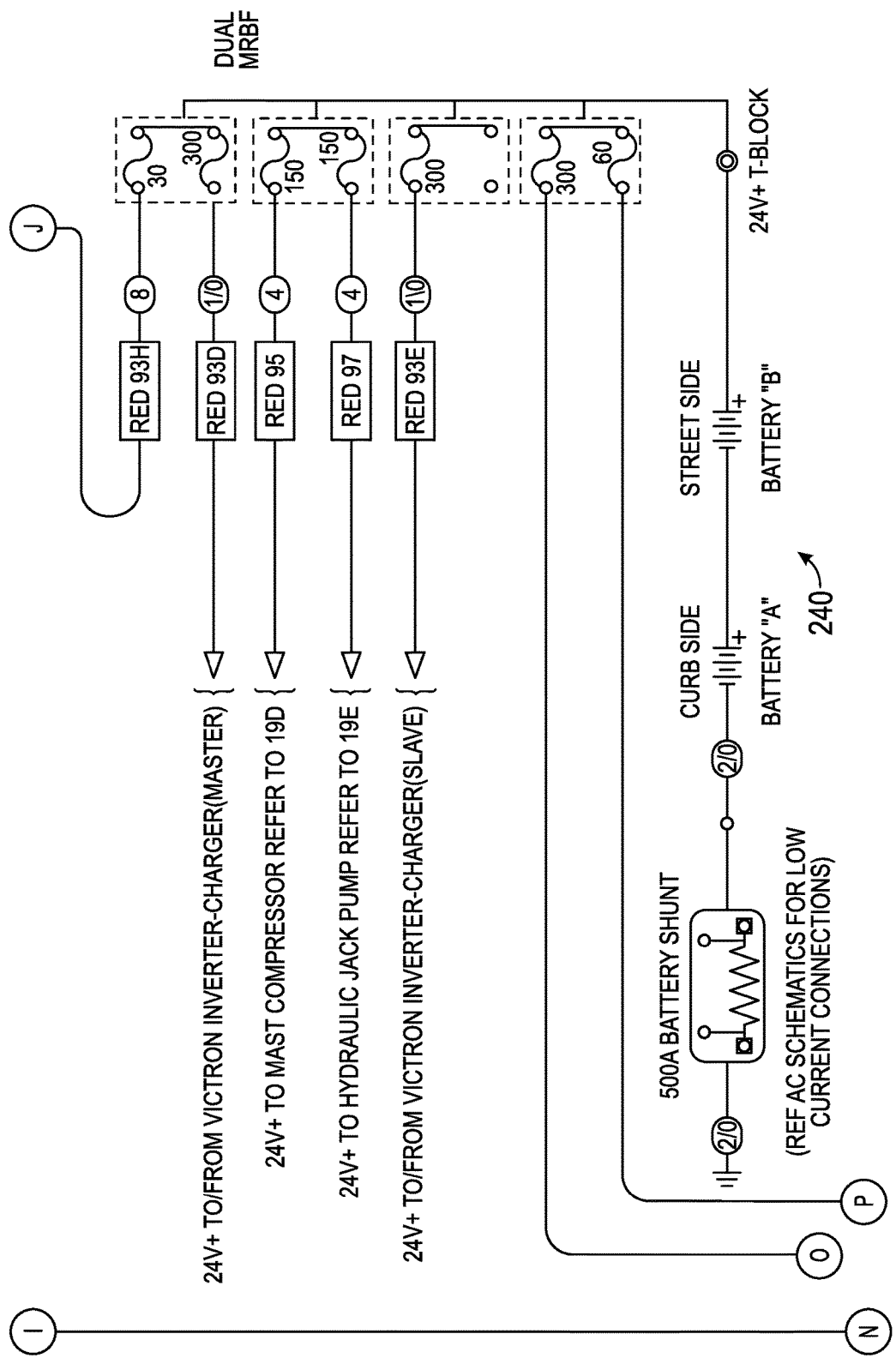
Figure 22F:
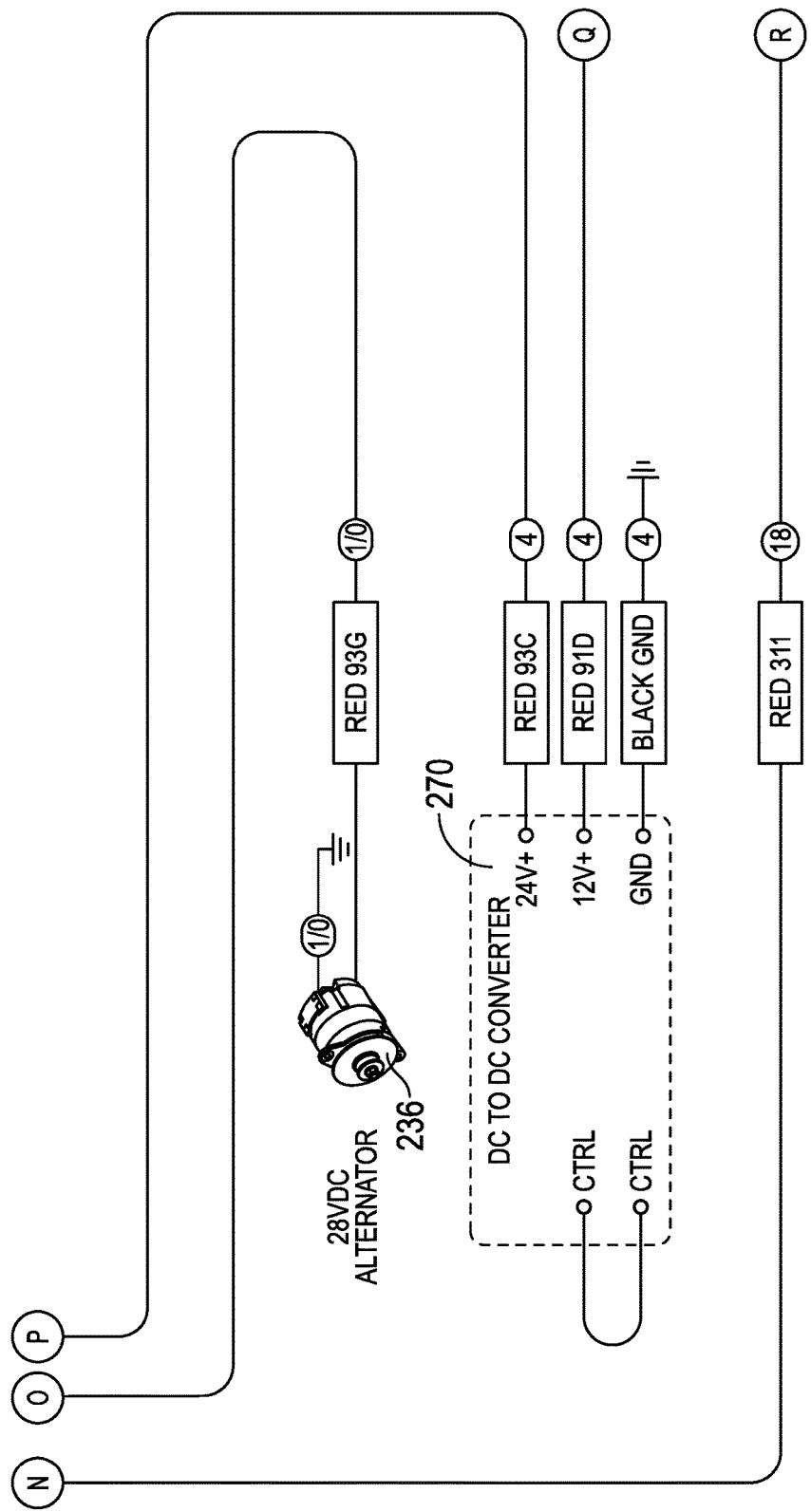
Figure 22G:
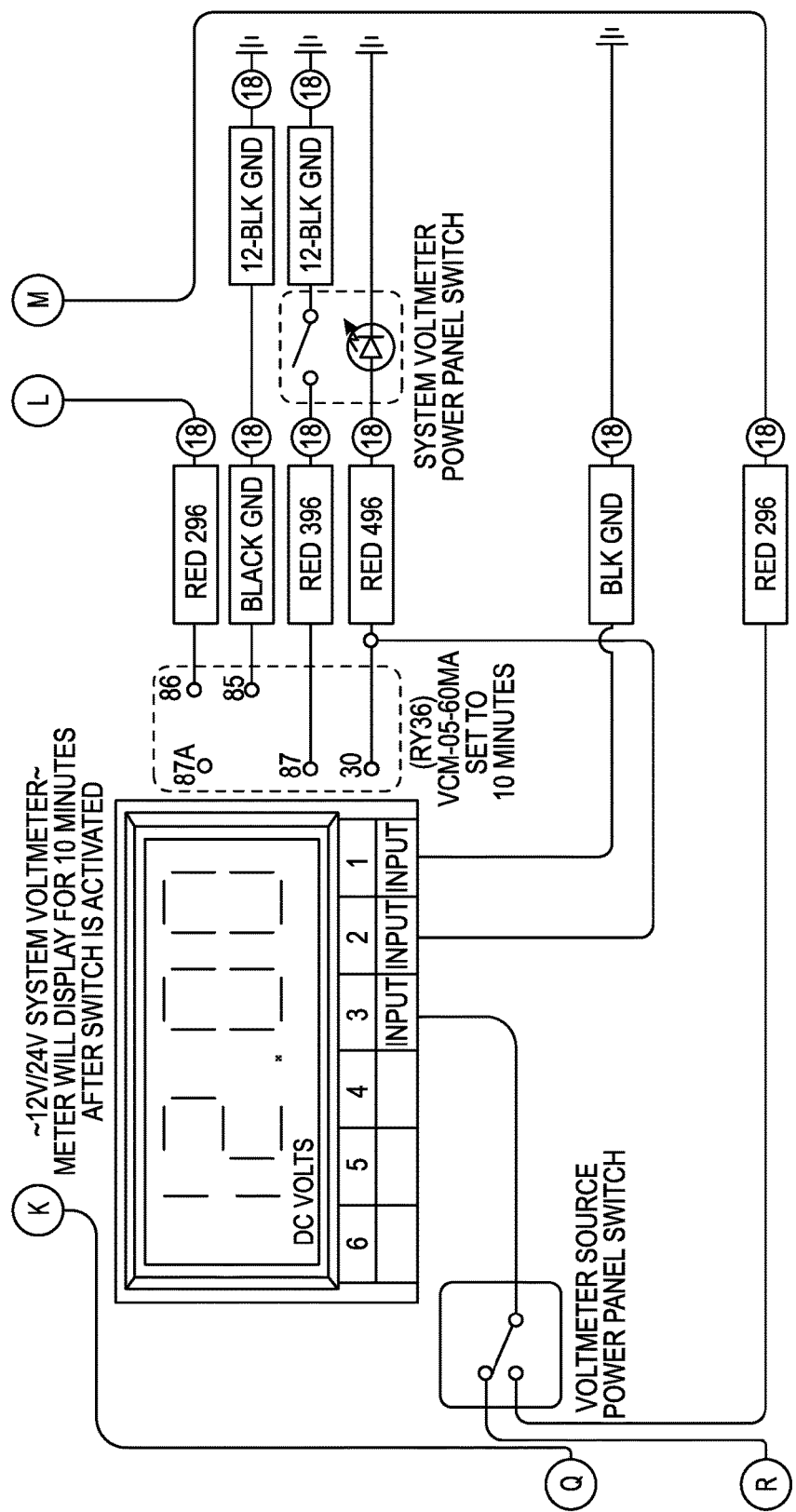
Figure 23A:
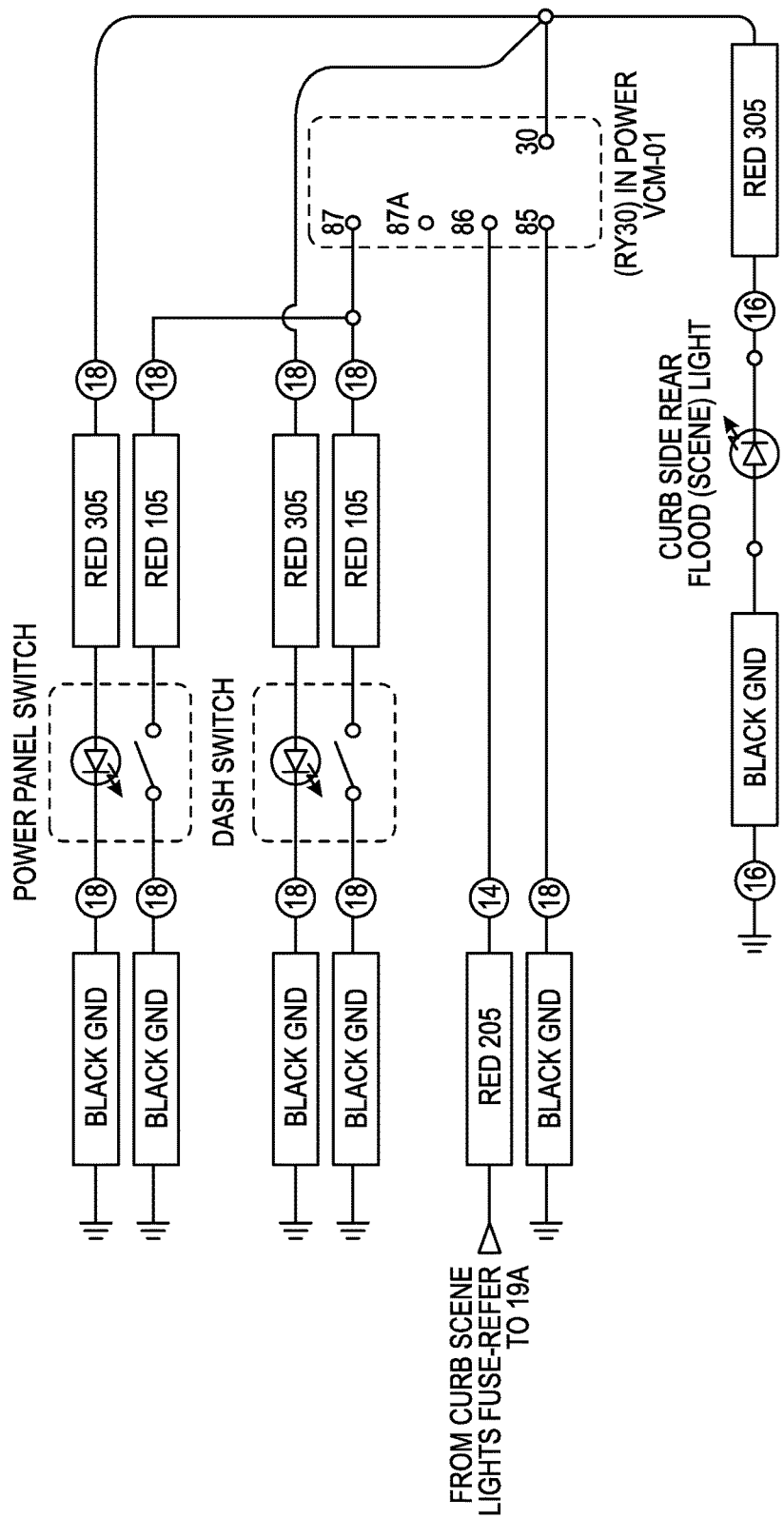
FIGS. 23A-23D are schematic diagrams of other portions of a DC portion of an auxiliary power system, according to another exemplary embodiment.
Figure 23B:
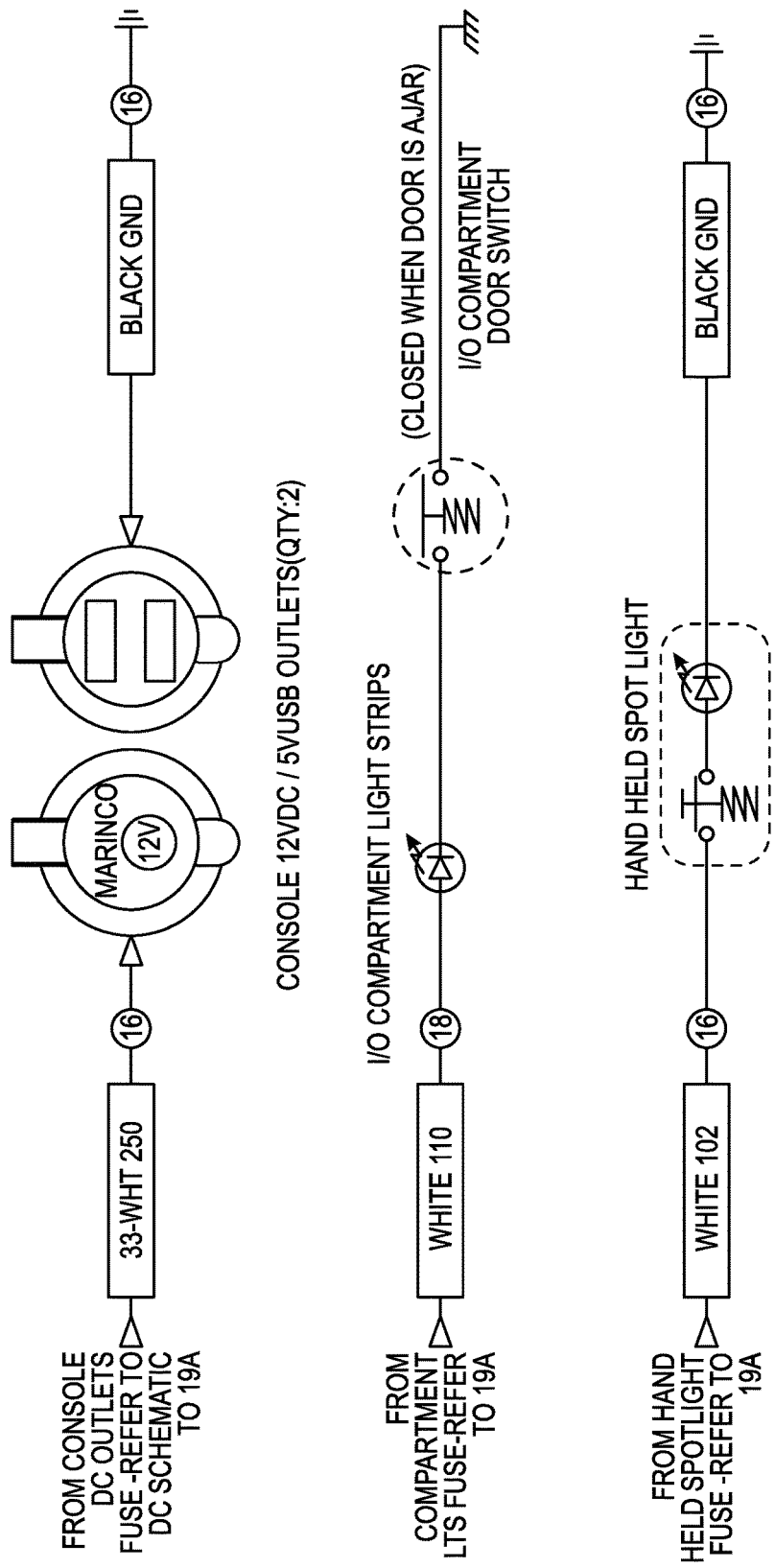
Figure 23C:
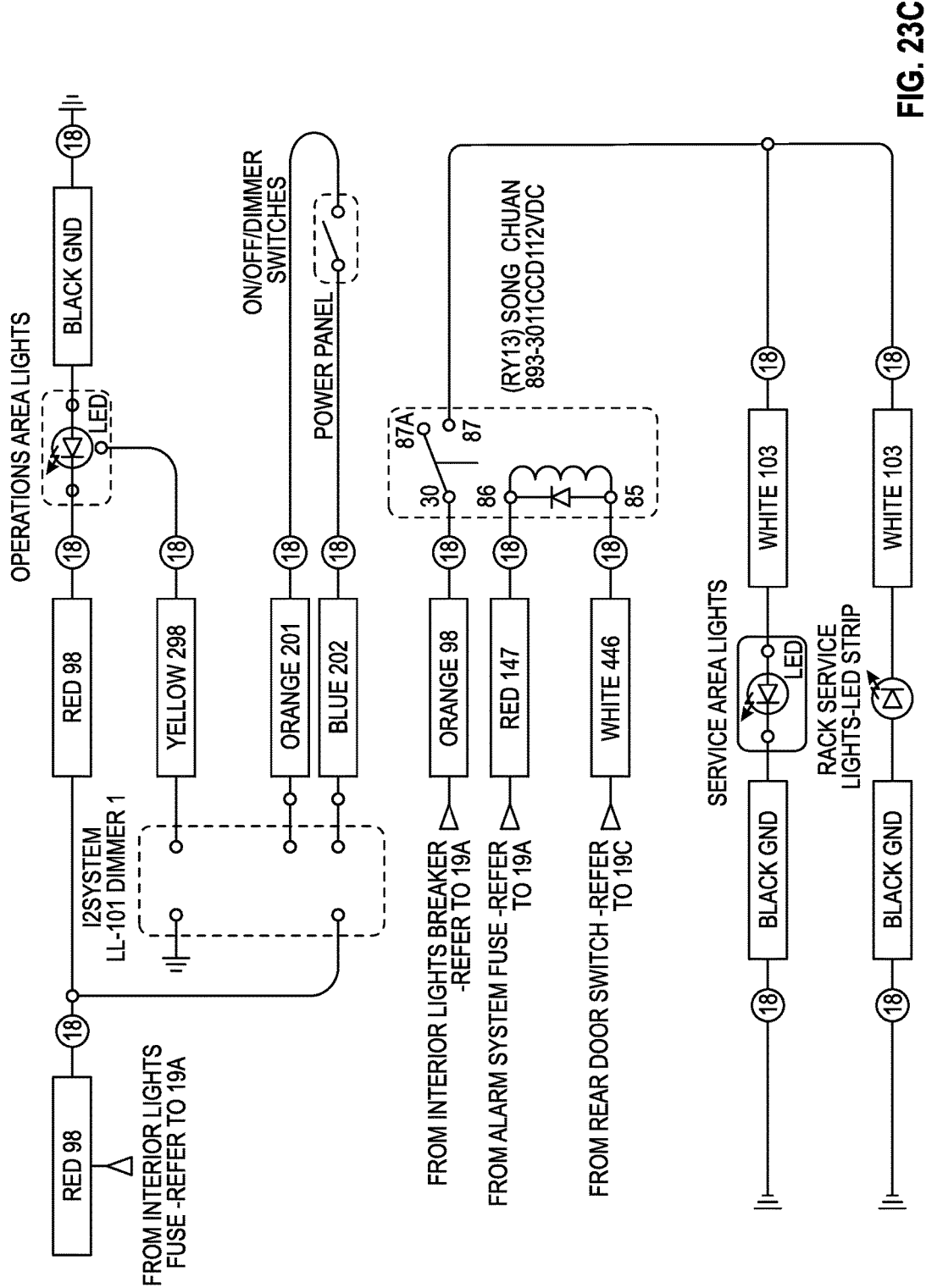
Figure 23D:
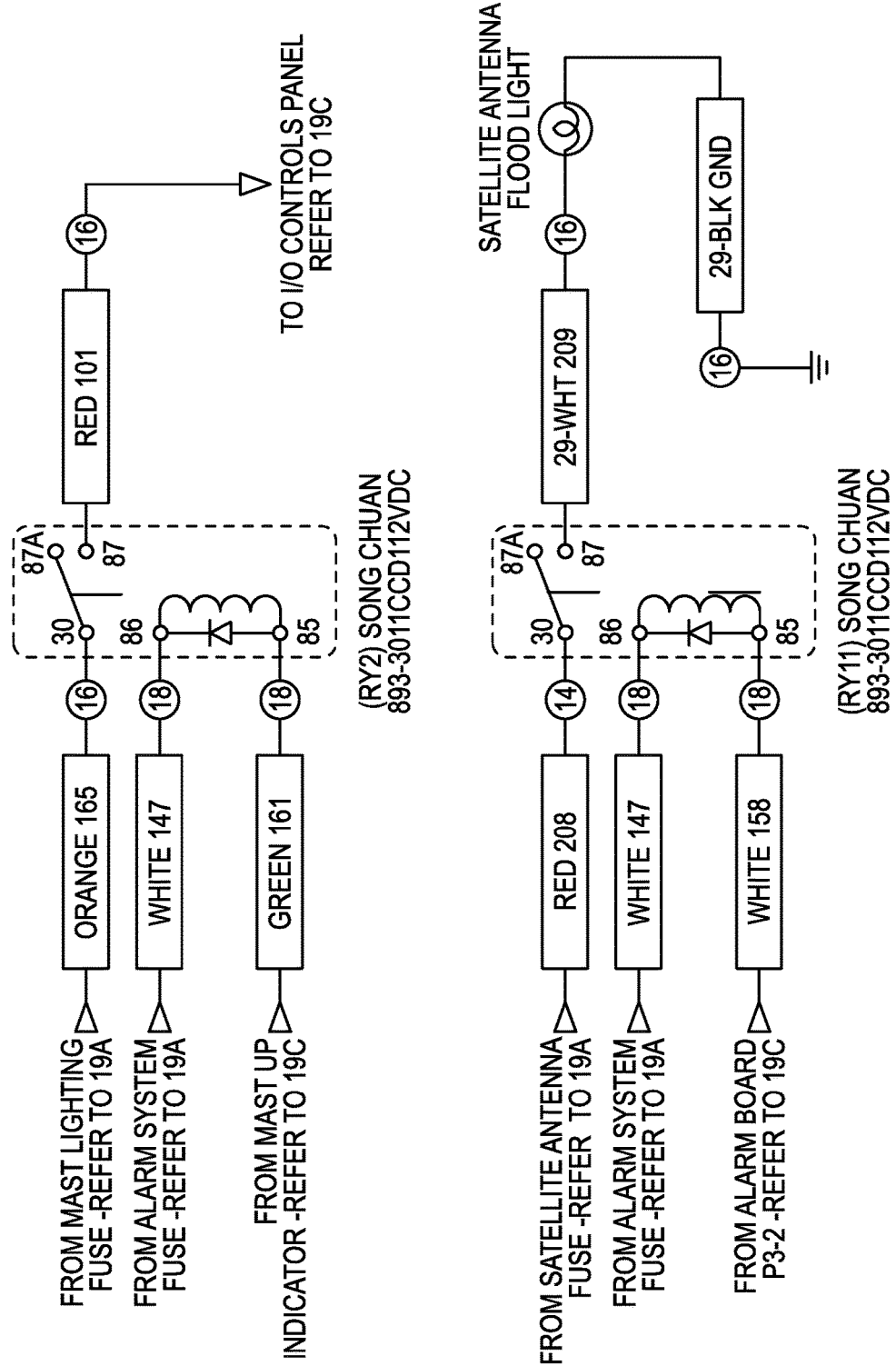
Figure 24A:
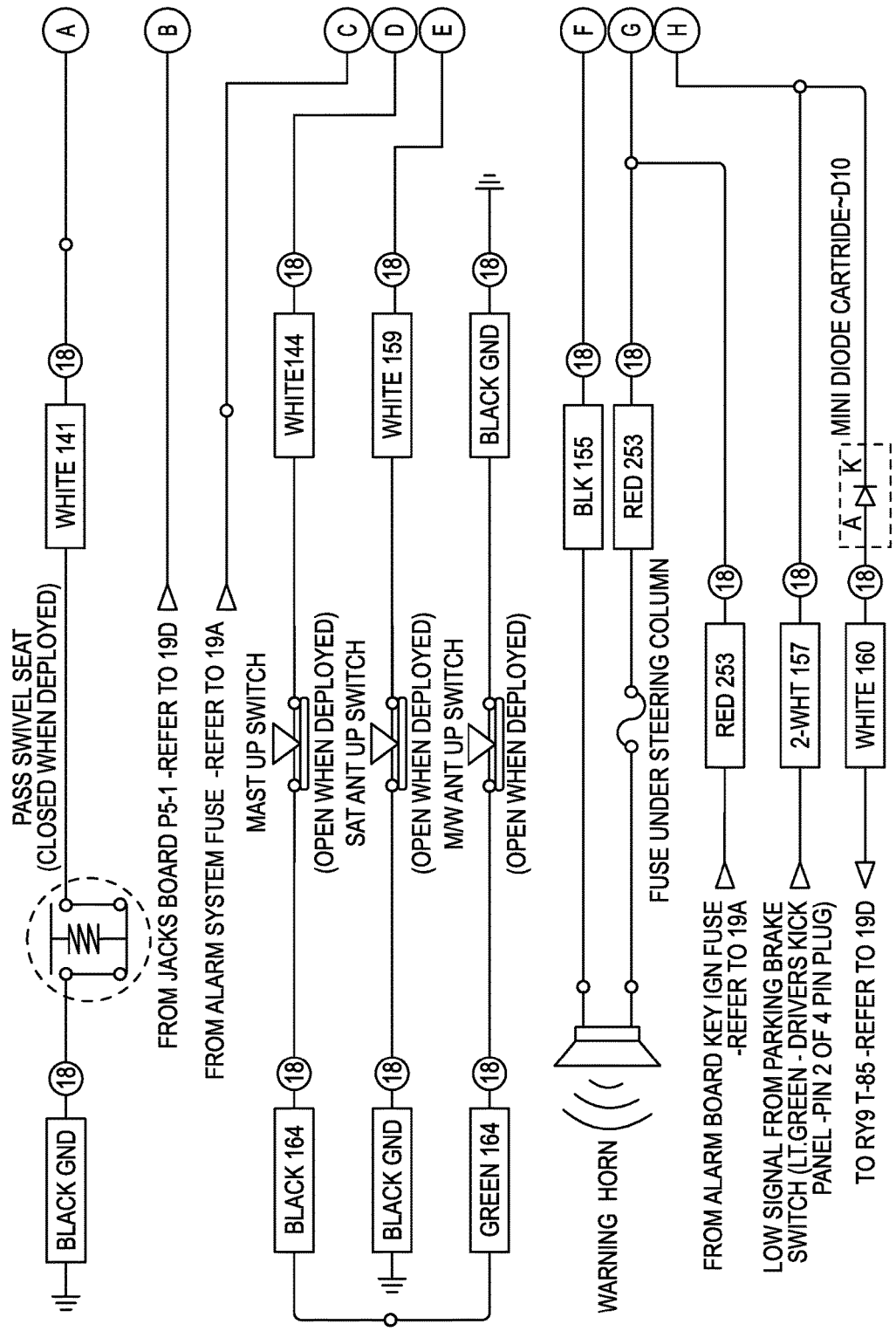
FIGS. 24A-24E are schematic diagrams of other portions of a DC portion of an auxiliary power system, according to another exemplary embodiment.
Figure 24B:
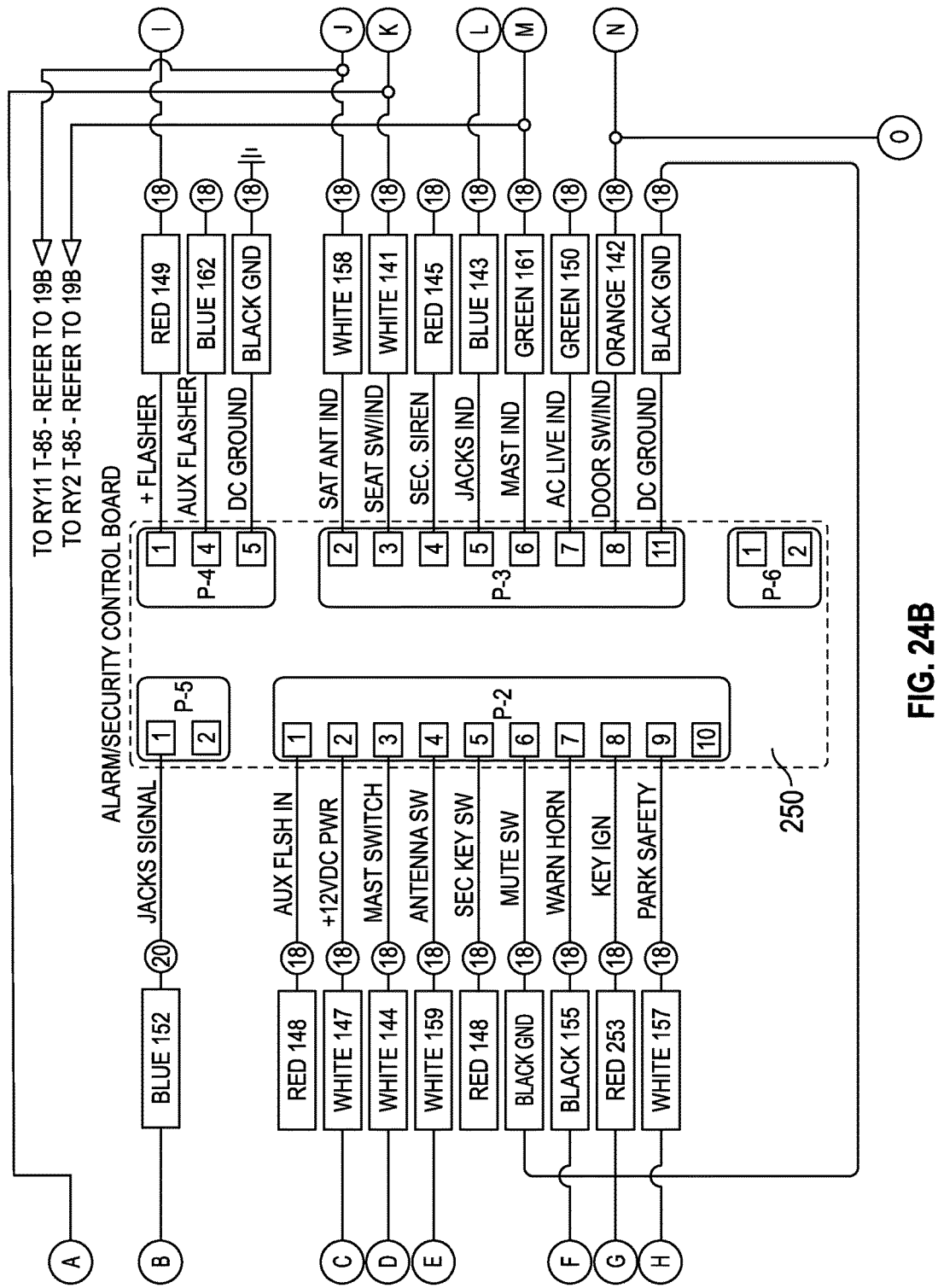
Figure 24C:
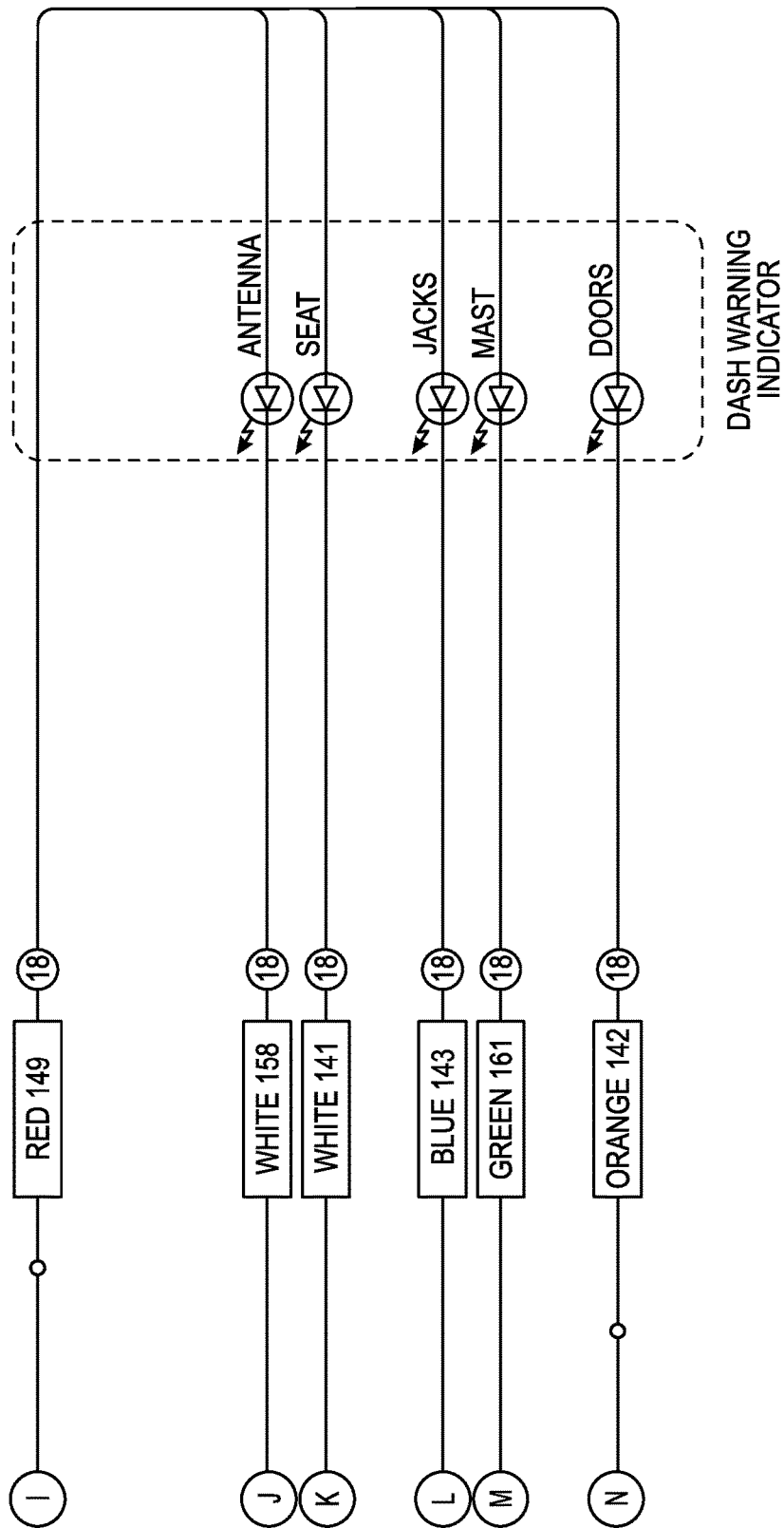
Figure 24D:
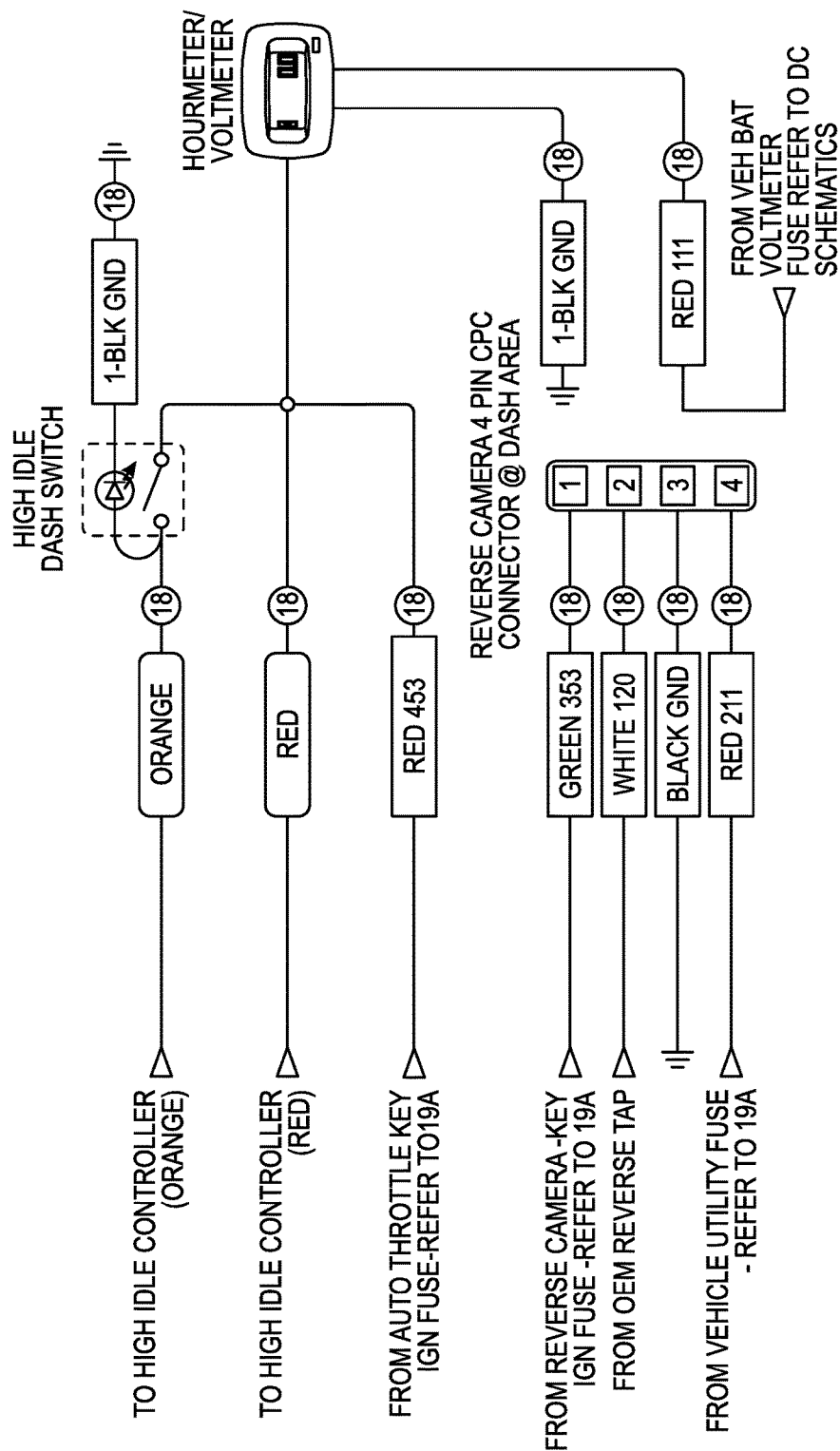
Figure 24E:
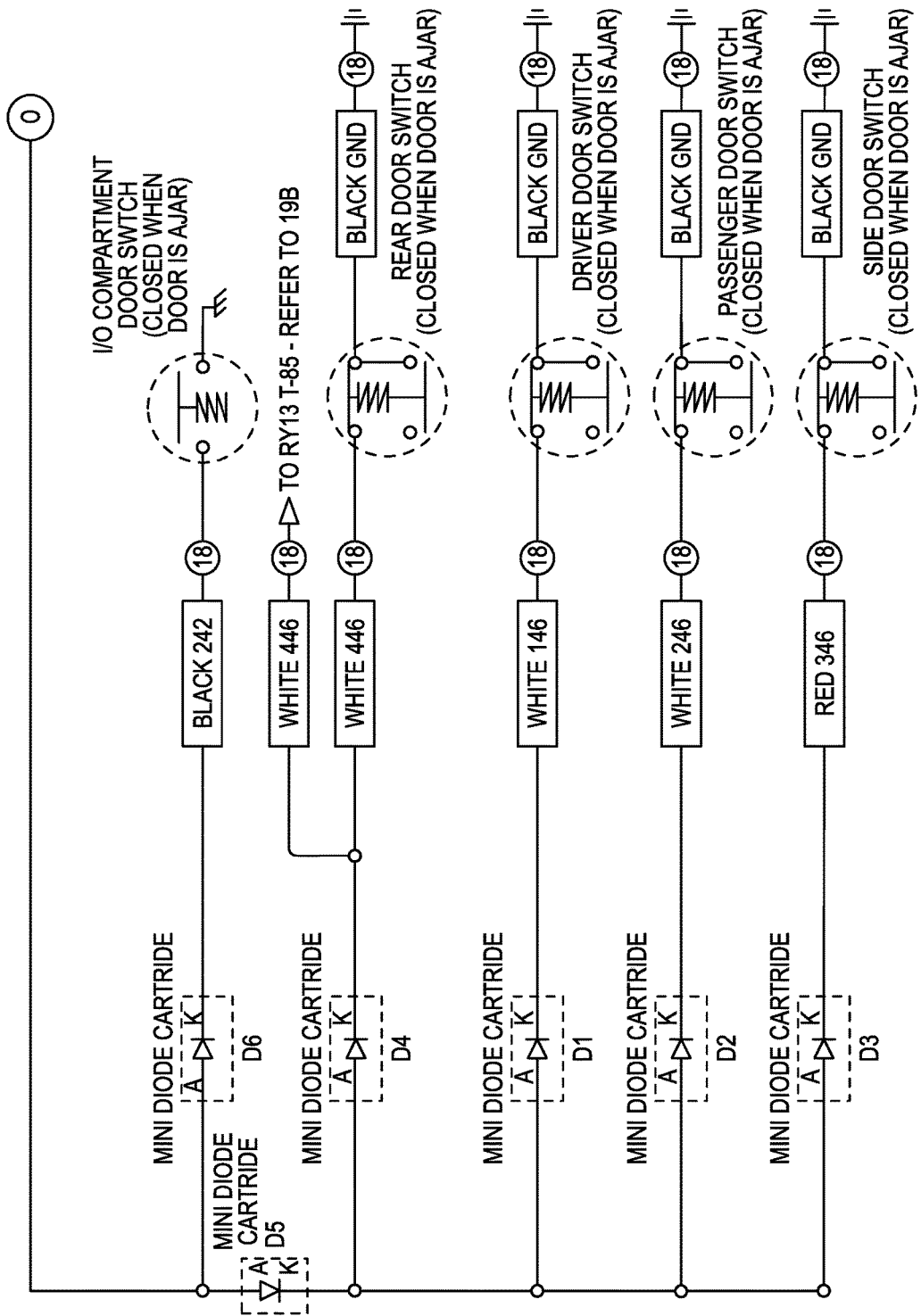
Figure 25A:
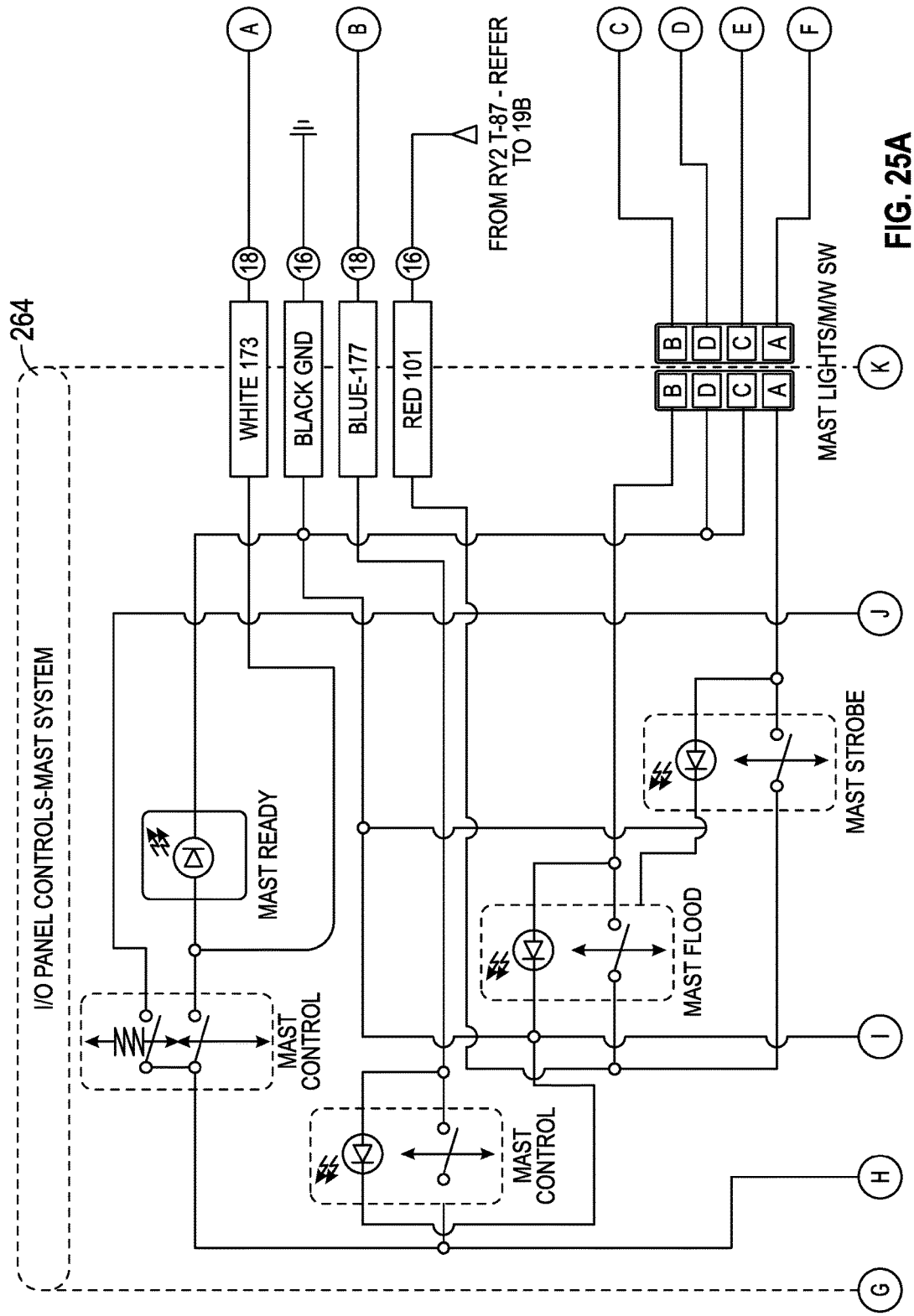
FIGS. 25A-25E are a schematic diagram of another portion of a DC portion of an auxiliary power system, according to another exemplary embodiment.
Figure 25B:
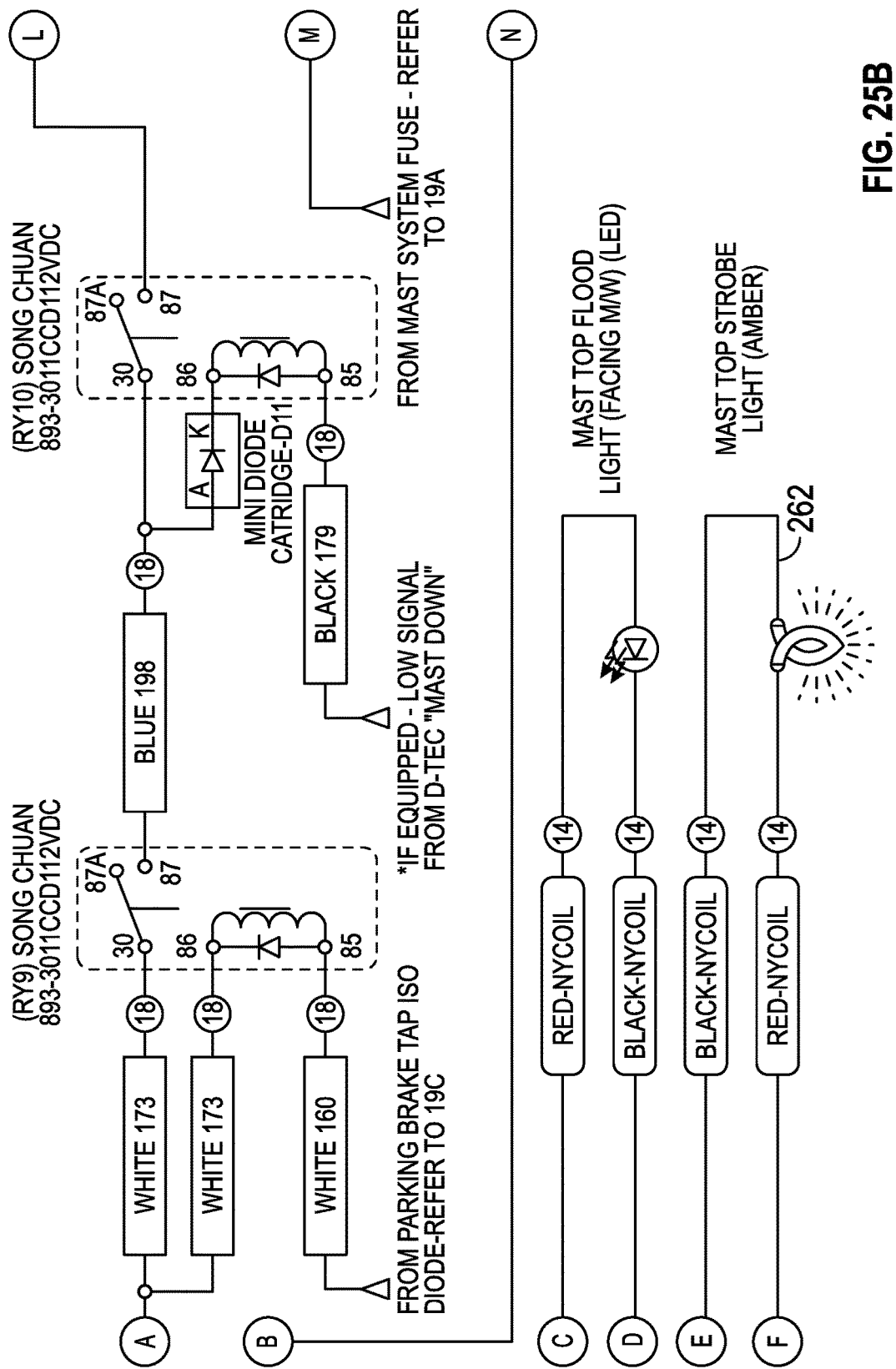
Figure 25C:
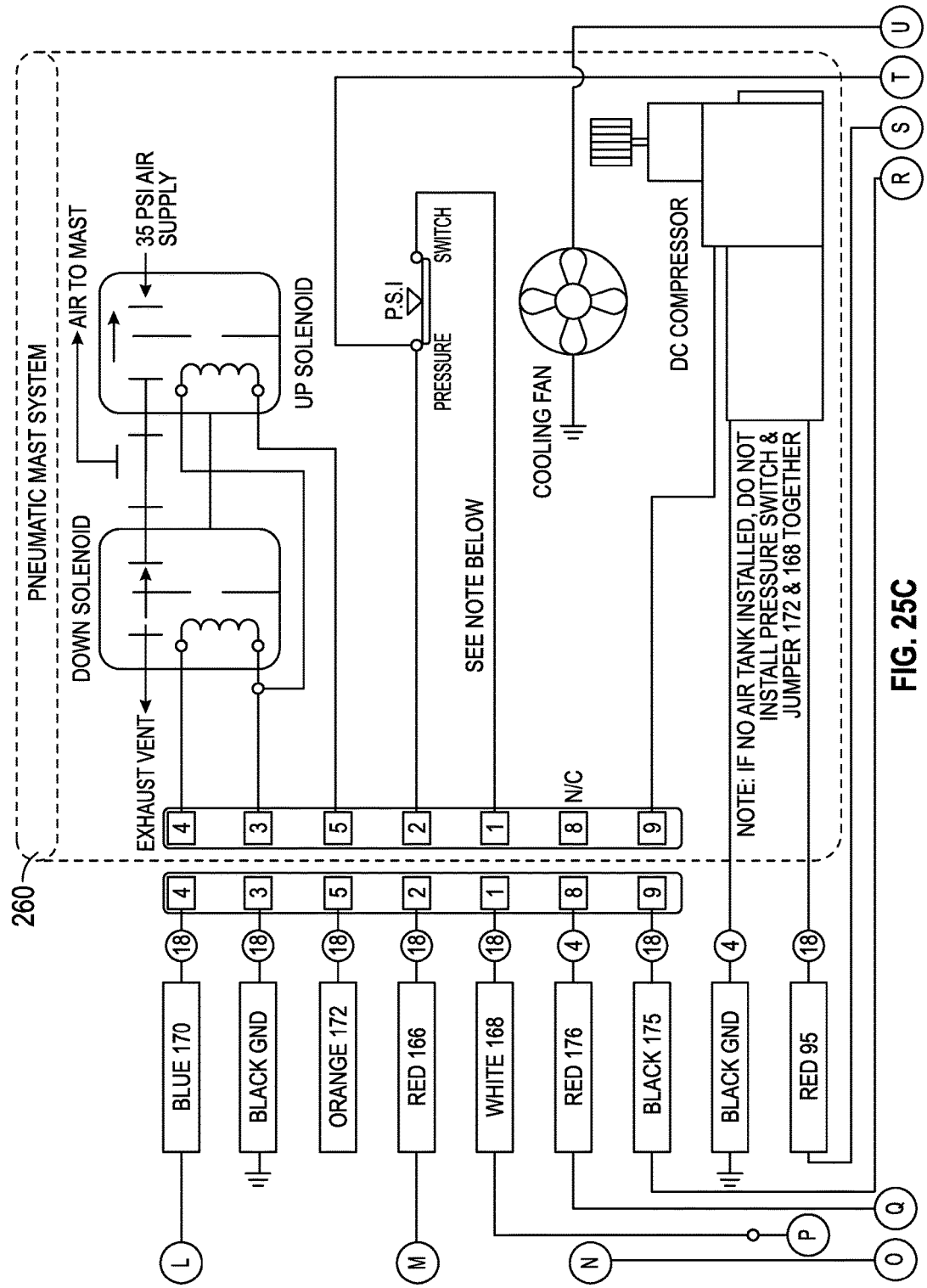
Figure 25D:
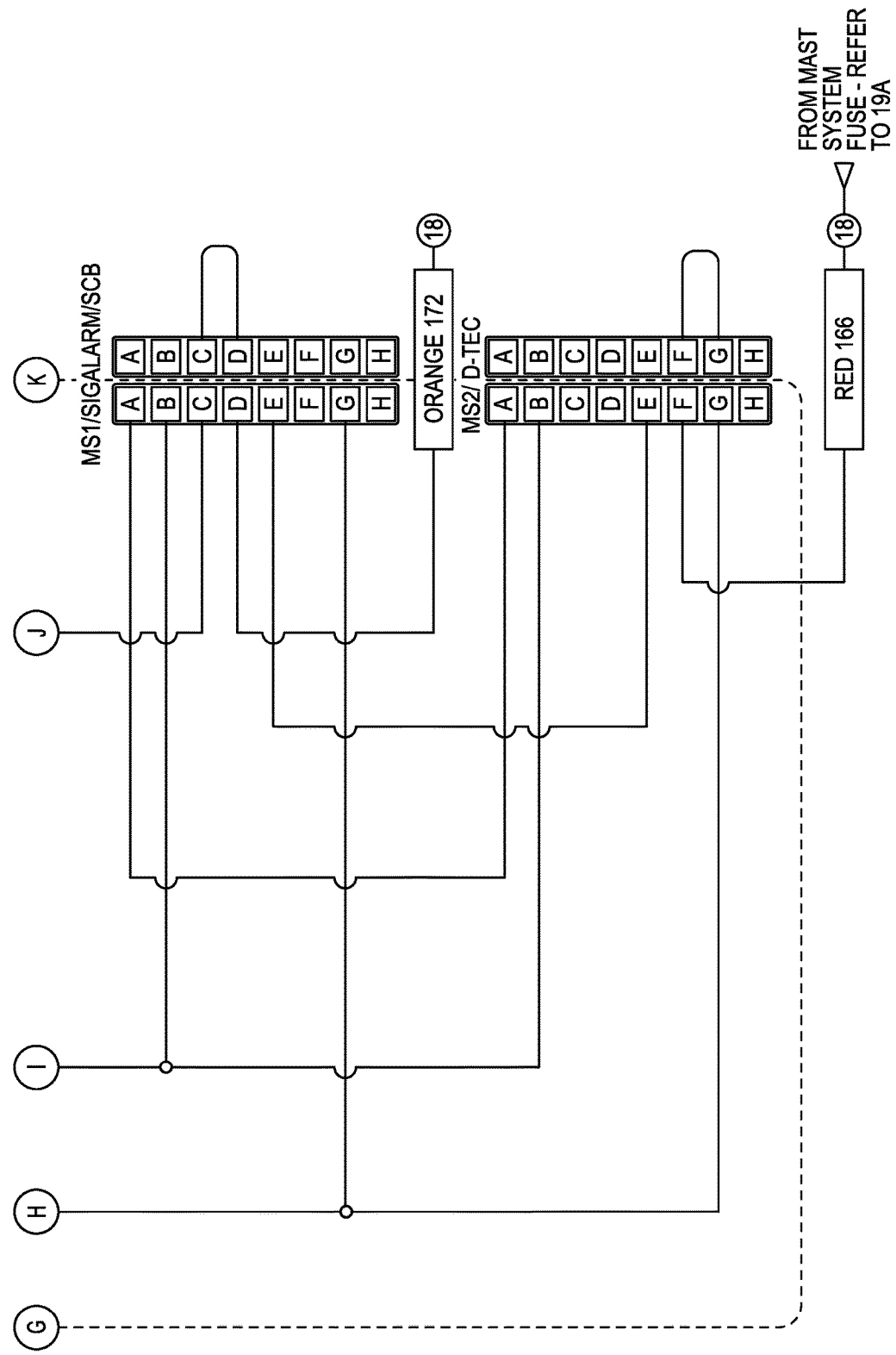
Figure 25E:
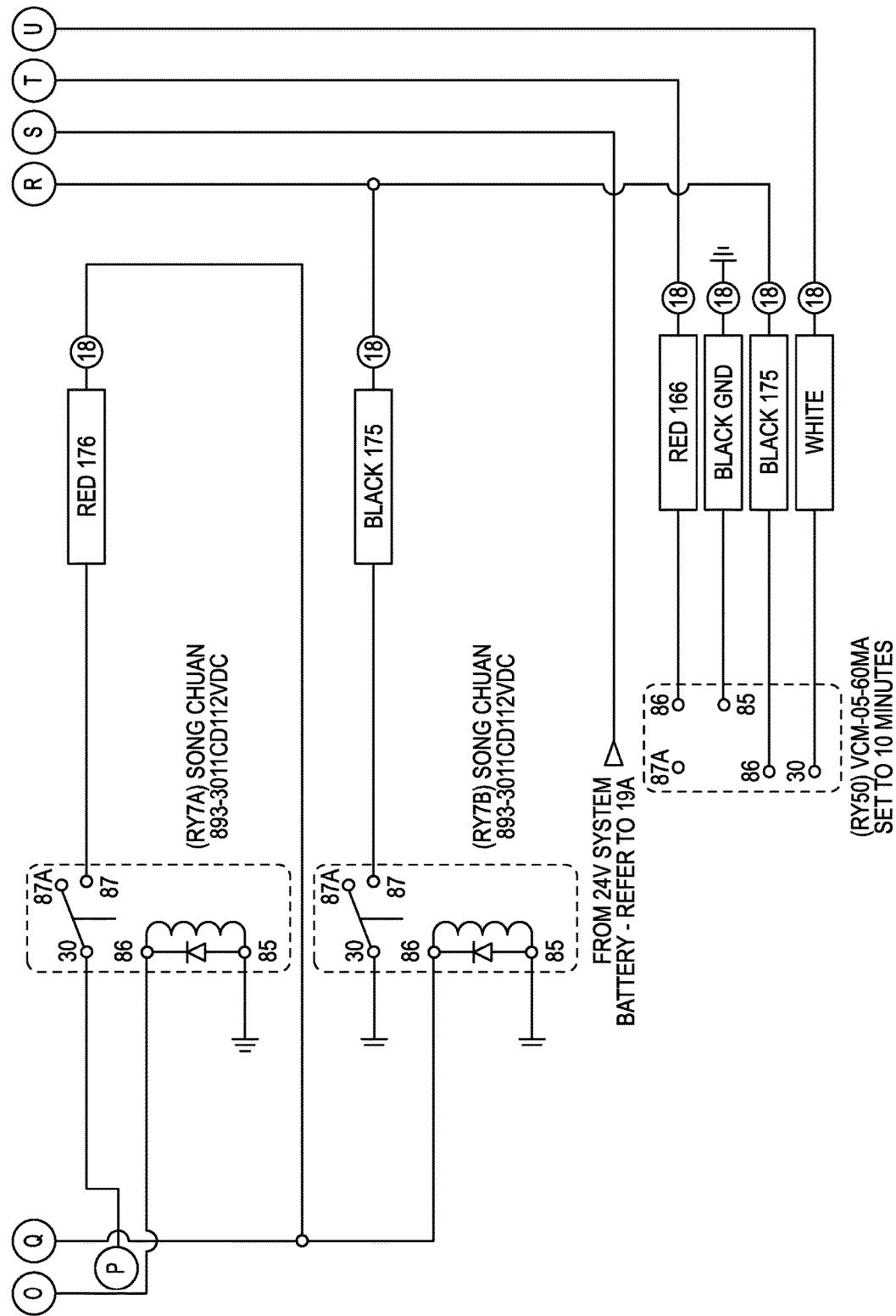
Figure 26A:
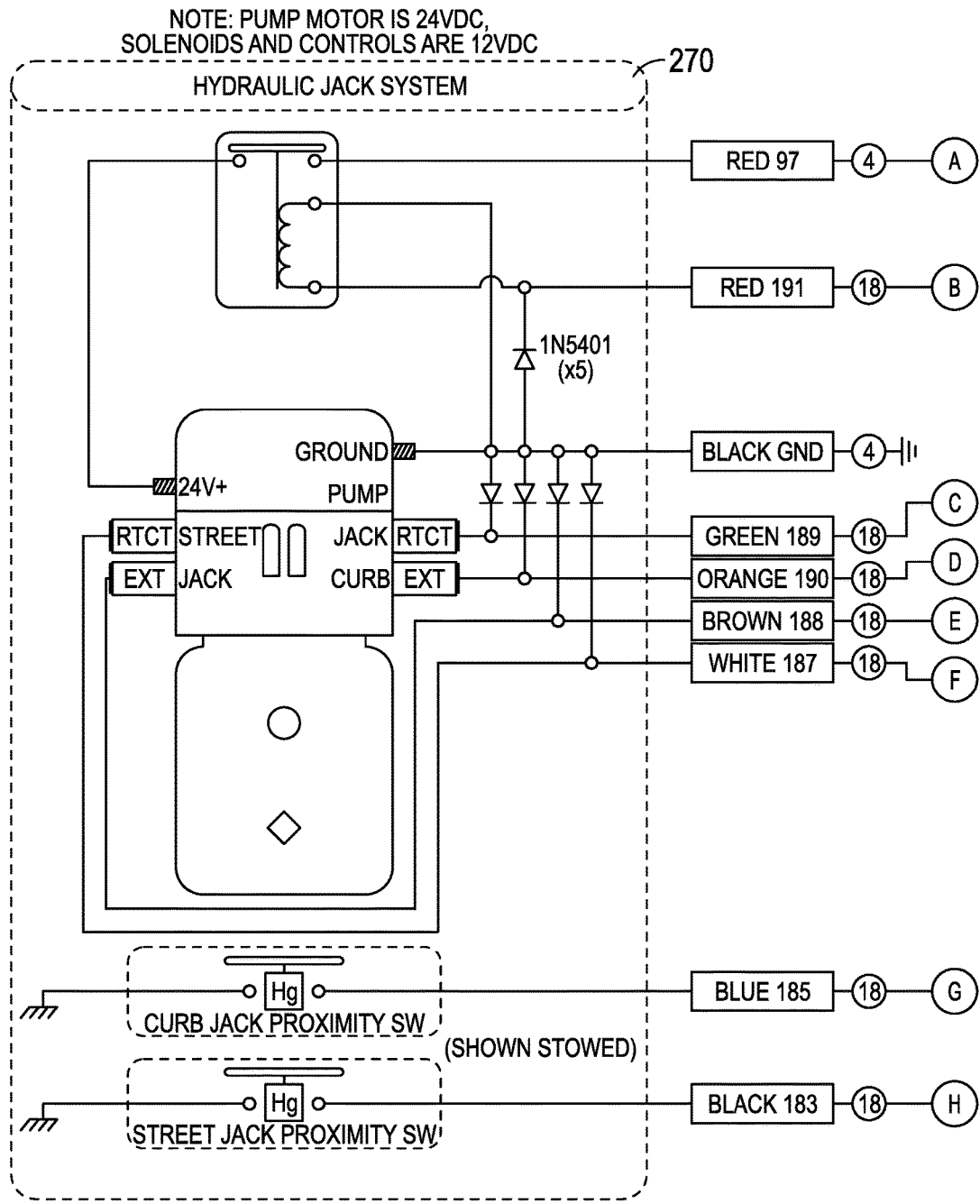
FIGS. 26A-26D are a schematic diagram of another portion of a DC portion of an auxiliary power system, according to another exemplary embodiment.
Figure 26B:
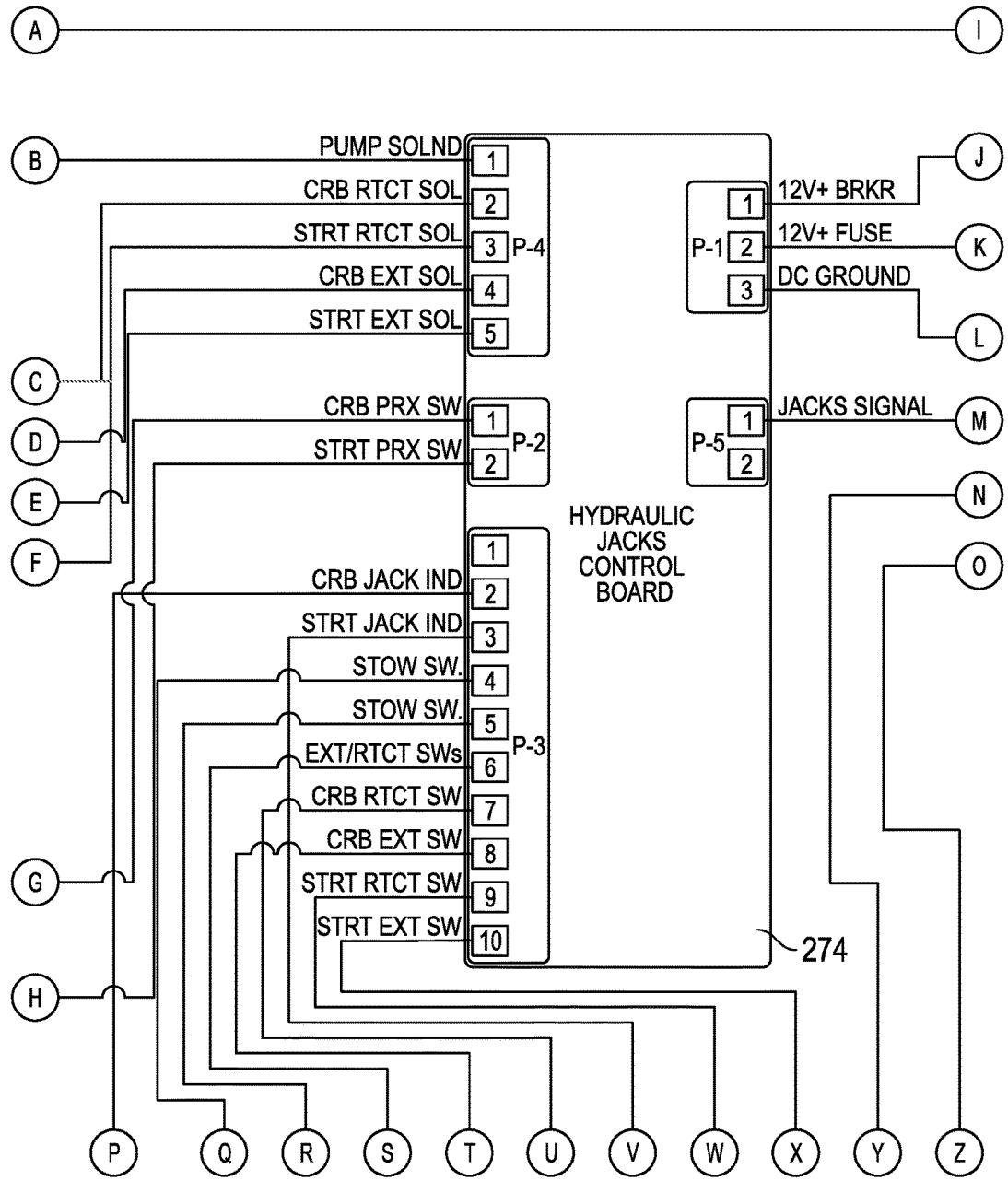
Figure 26C:
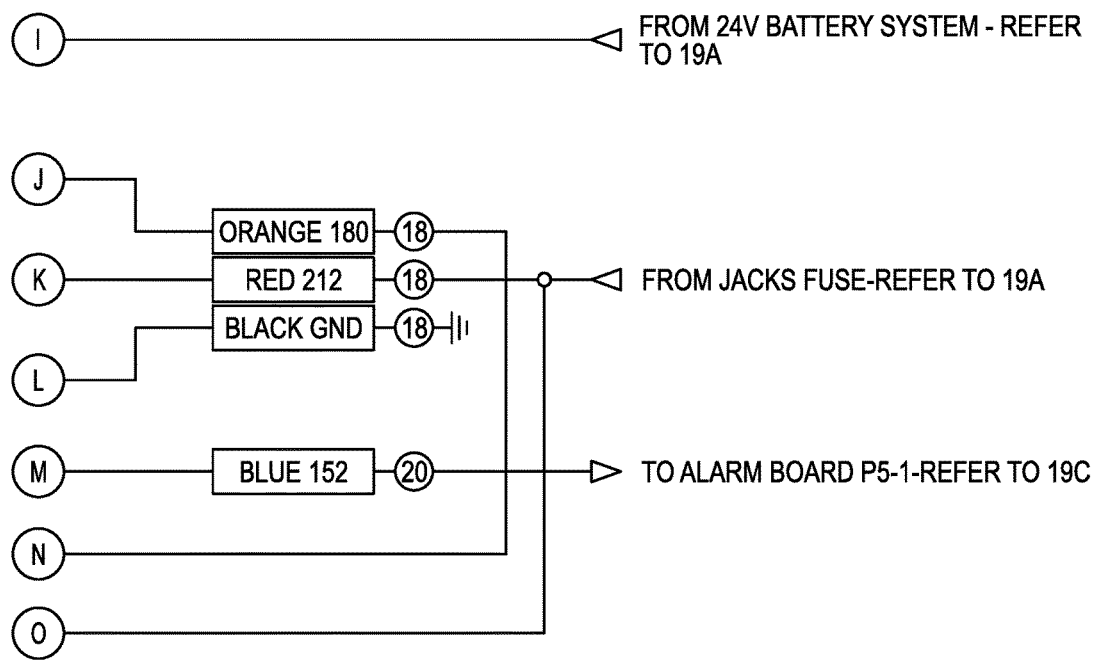
Figure 26D:
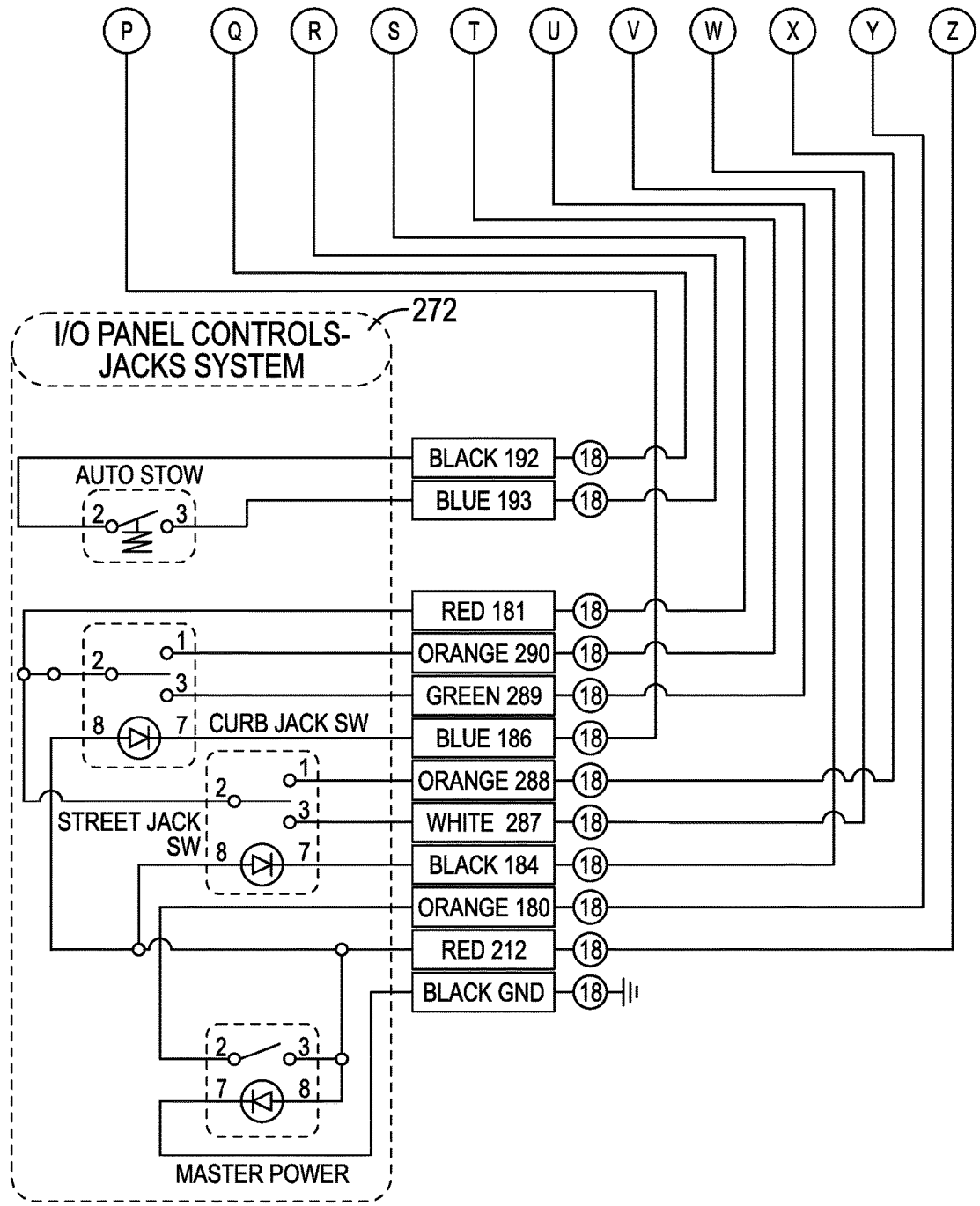

Referring generally to FIGS. 21A-26D, a second embodiment of an auxiliary power system for a vehicle is shown. FIGS. 21A-21C illustrate a schematic diagram of an AC portion of the auxiliary power system. As compared to the first embodiment, the auxiliary power system includes a second charger/inverter 203 in addition to the first charger/inverter 202. The first charger/inverter 202 is shown as a slave device and the second charge/inverter 203 as a master device. First charger/inverter 202 receives input from battery system 240 and generates AC power from the DC power input. The AC power is provided as an input to the second charger/inverter 203, which is then configured to provide the power supply to the various vehicle systems as described above. Second charger/inverter 203 may further receive a DC power supply from battery system 240.

Referring now to FIGS. 22A-22G, in the second embodiment, the DC portion of the auxiliary power system includes a DC to DC converter 270 and excludes a battery equalizer. DC to DC converter 270 may convert the DC power supply generated by battery system 240 from one voltage level to another. DC to DC converter 270 may be used to control the power supply generated by battery system 240 in place of battery equalizer 230. Unlike the first embodiment, the embodiment of FIGS. 22A-22G does not include a solar power source or other external power source beyond the power source provided by battery system 240. The DC portion of the auxiliary power system may further include the other various components as described with reference to FIGS. 17A-17H. However, it should be understood that the individual vehicle components powered by the auxiliary power system may vary based on vehicle configuration.

Referring to FIGS. 23A-25E, schematic diagrams of other portions of the DC portion of the auxiliary power system are shown in greater detail. The DC portion of the auxiliary power system as shown in detail in FIGS. 23A-25E may have the same general functionality as described with reference to FIGS. 18A-20C. Referring more particularly to FIGS. 25A-25E, I/O panel controls 264 for mast system 260 is illustrated that may be used to control pneumatic mast system 260 and lights 262.

Referring now to FIGS. 26A-26D, a schematic diagram of another portion of the DC portion of the auxiliary power system is shown in greater detail. The schematic diagram of FIGS. 26A-26D illustrates a hydraulic jack system 270, I/O panel controls 272 for controlling hydraulic jack system 270 via user input, and a hydraulic jacks control board 274 for controlling hydraulic jack system 270. Hydraulic jack system 270 may be powered by battery system 240 as shown in FIGS. 26A-26D and described above.

Figure 16B:
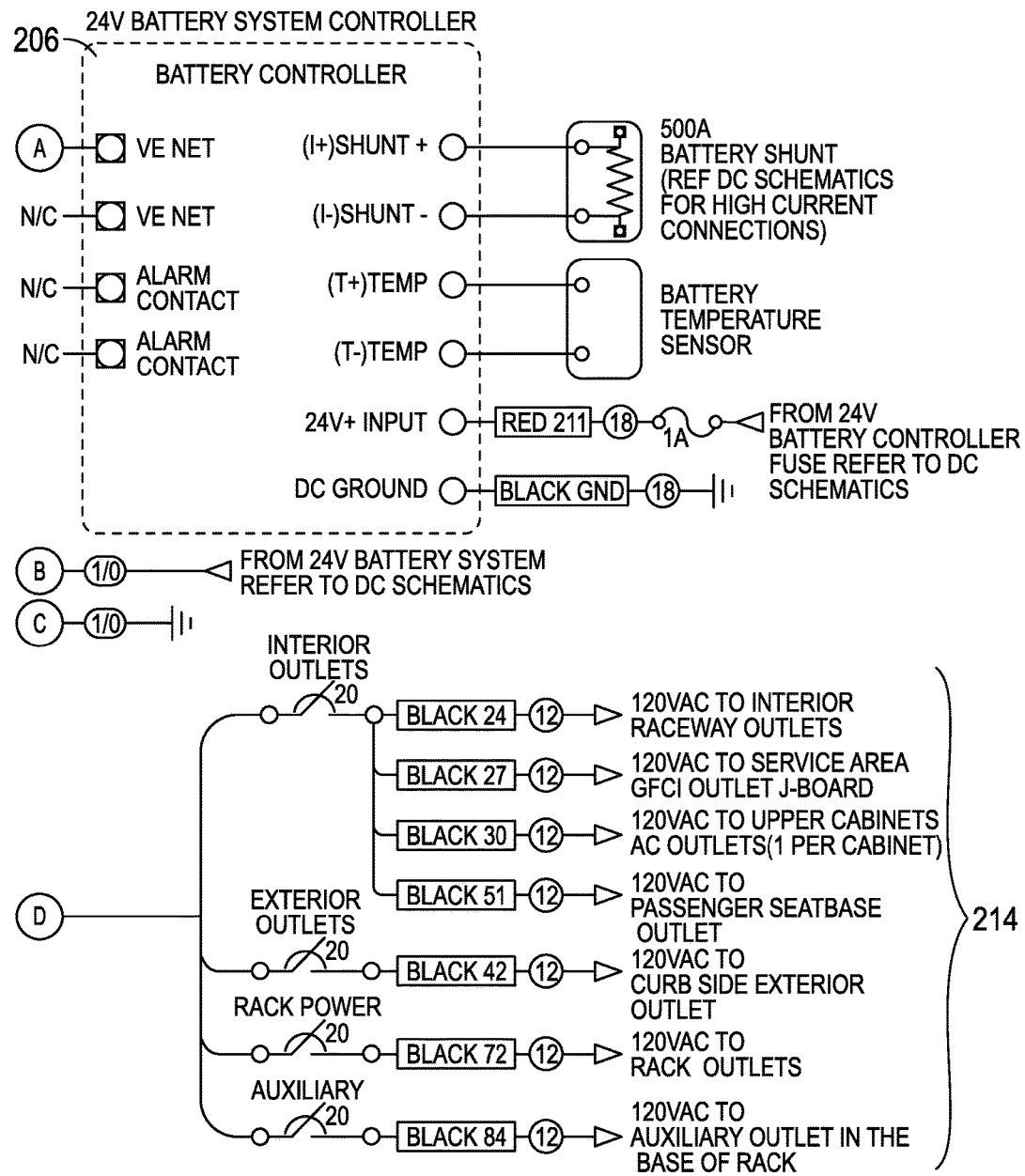
Figure 16C:
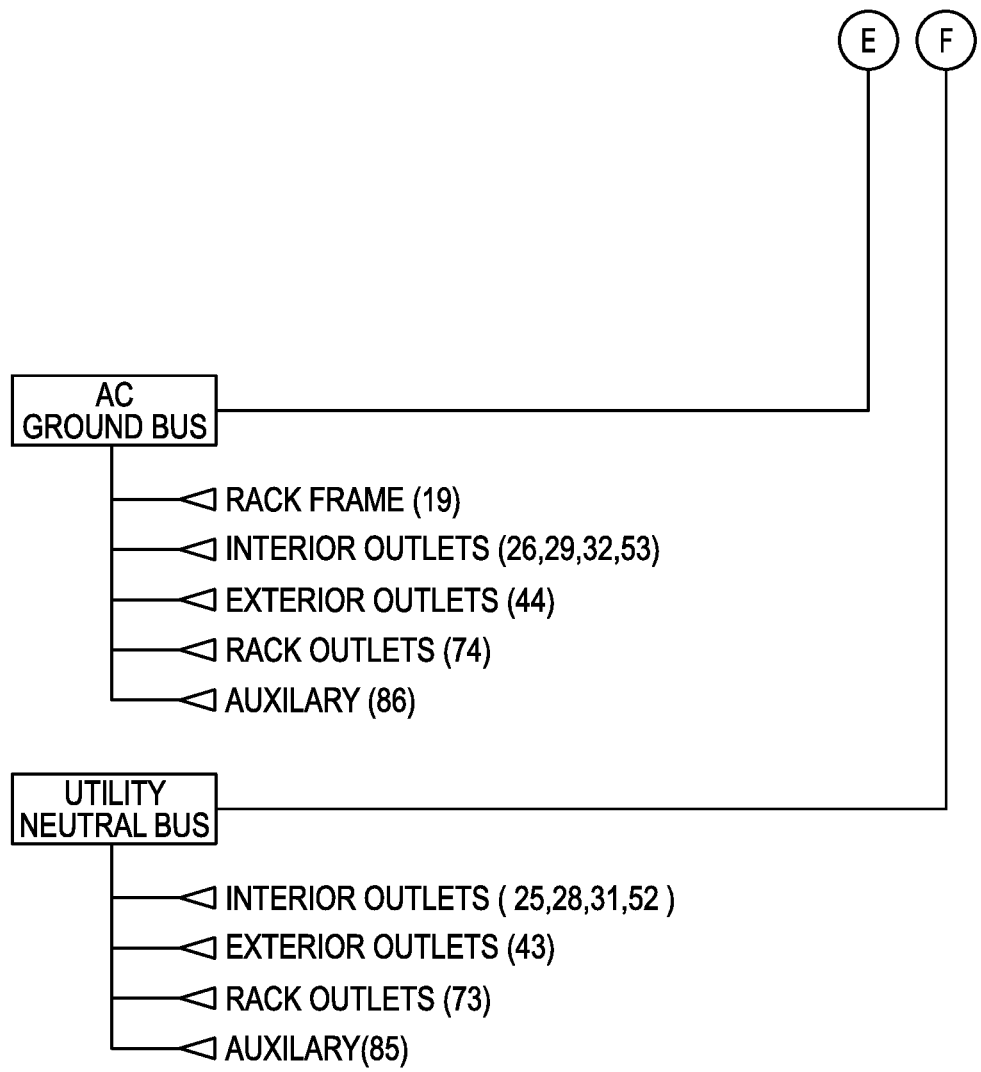
Figure 27A:
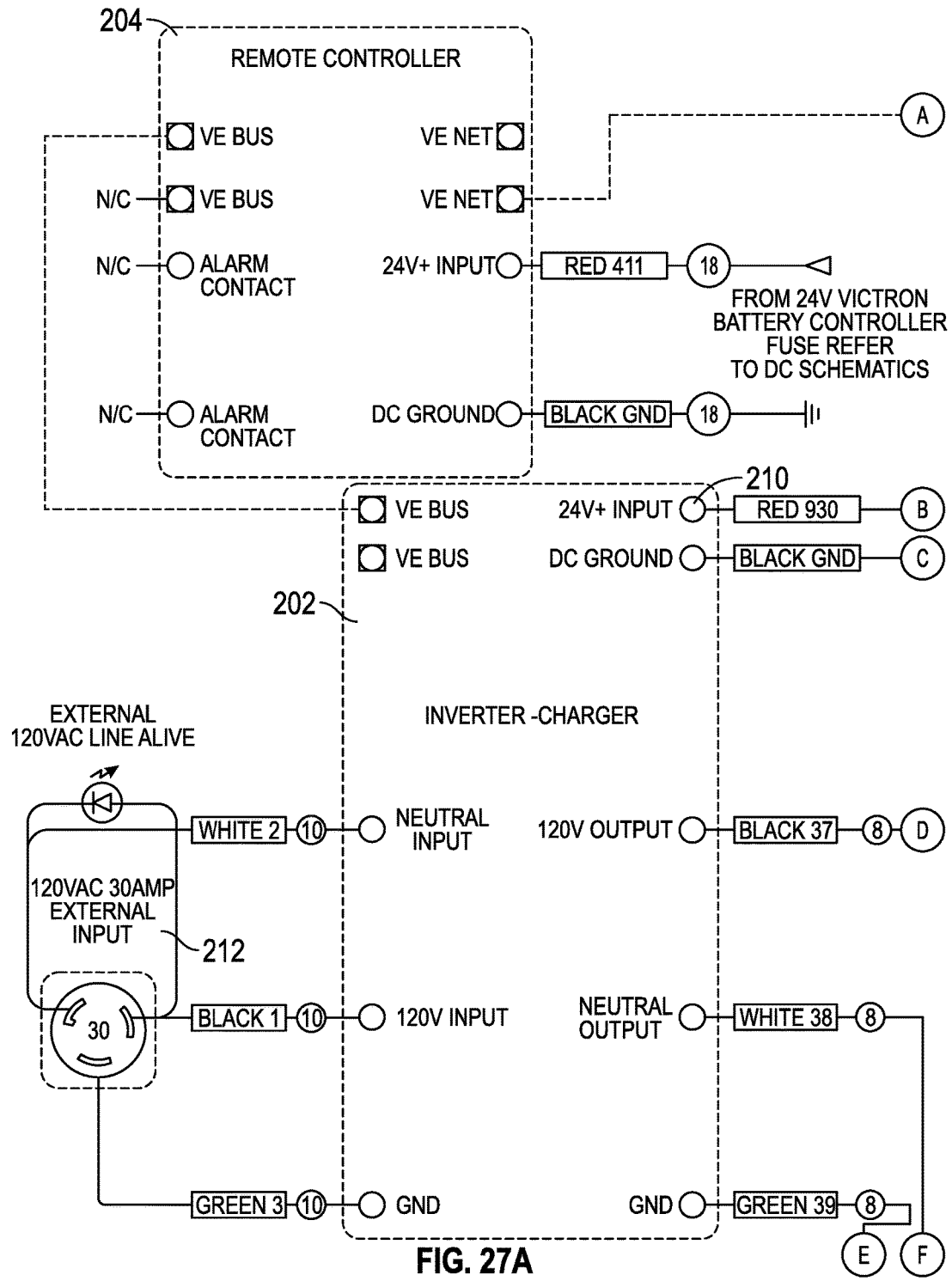
FIGS. 27A-27C are a schematic diagram of an AC portion of an auxiliary power system, according to yet another exemplary embodiment.
Figure 27B:
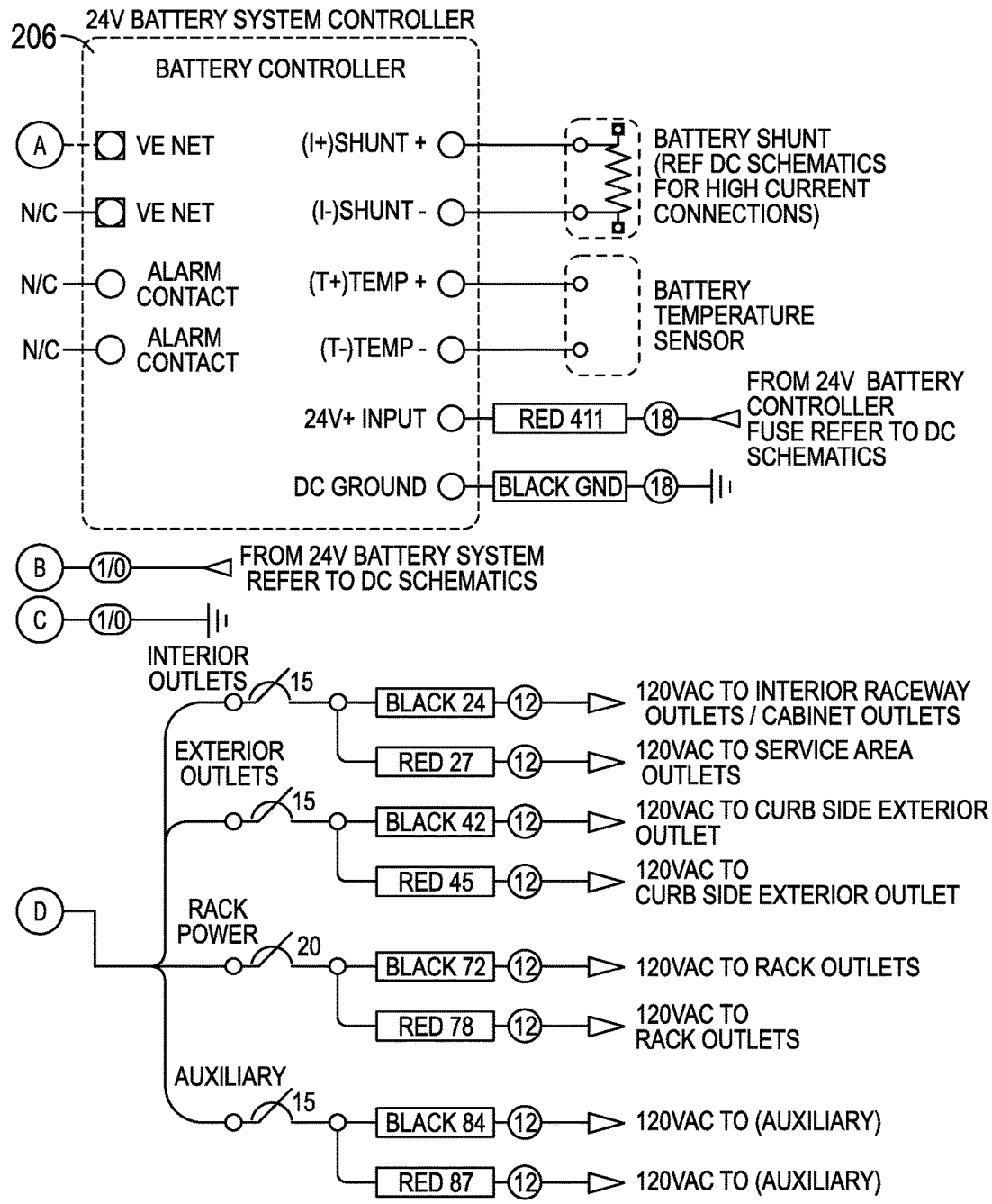
Figure 27C:
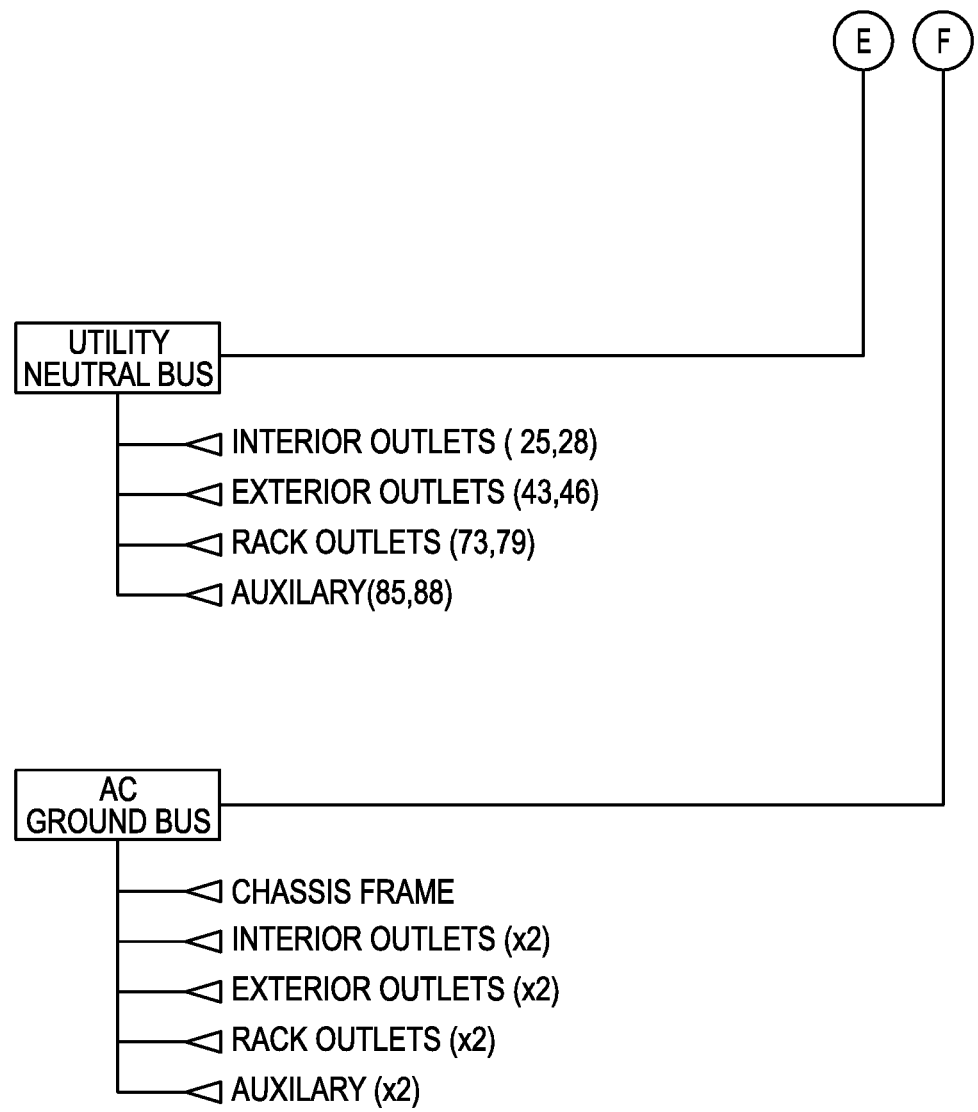
Figure 28A:
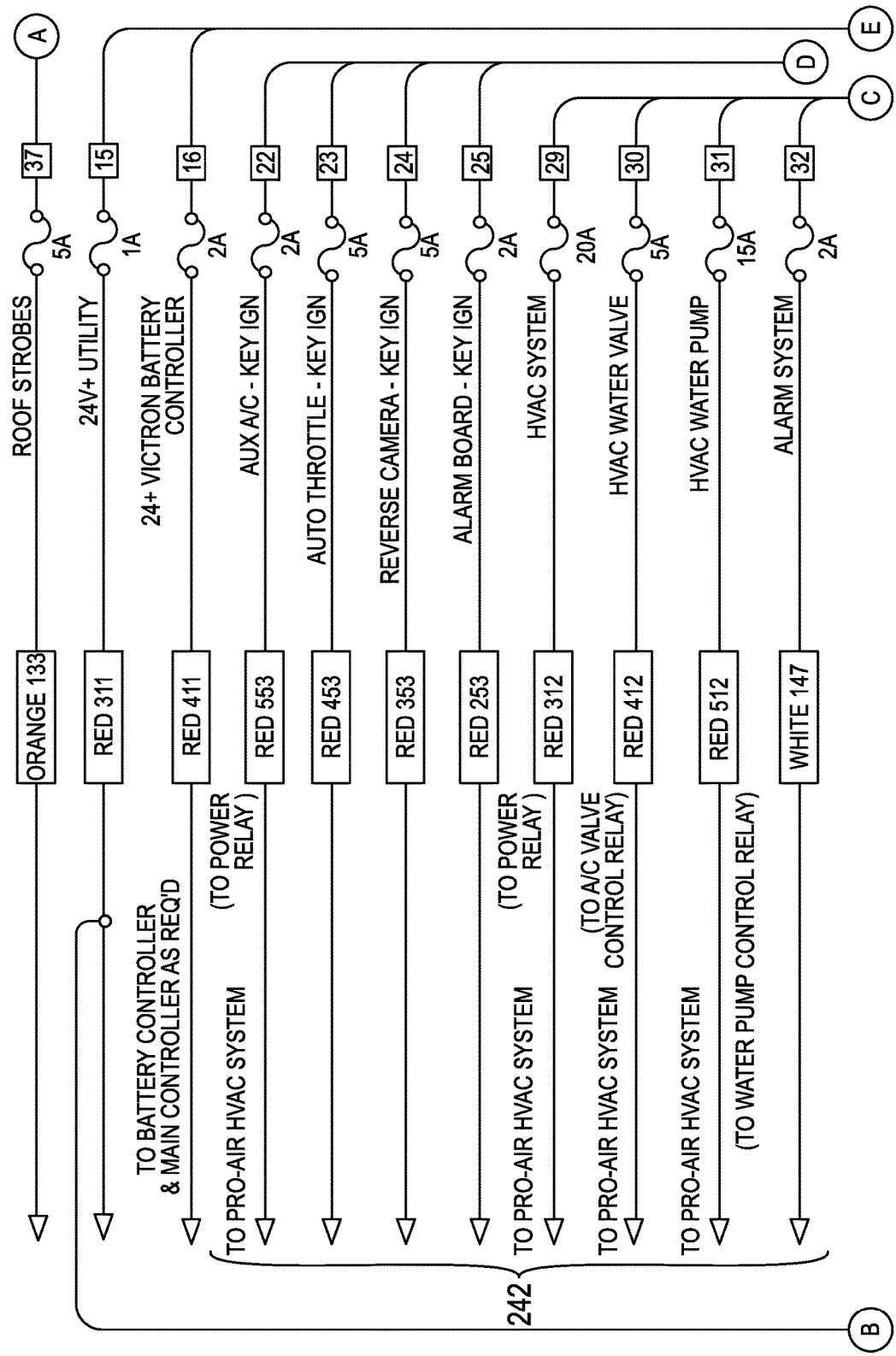
FIGS. 28A-28G are a schematic diagram of a portion of a DC portion of an auxiliary power system, according to yet another exemplary embodiment.
Figure 28B:
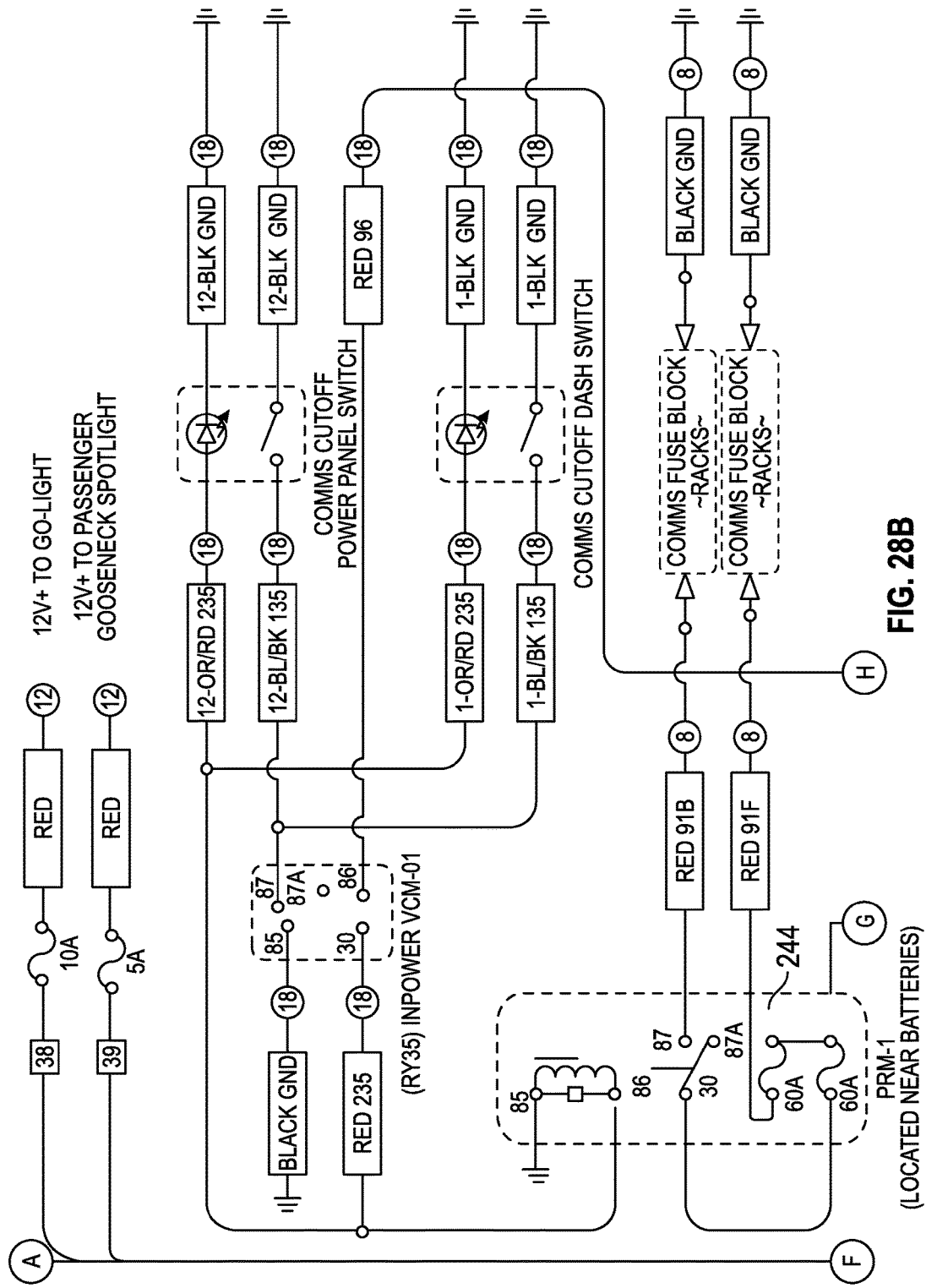
Figure 28C:
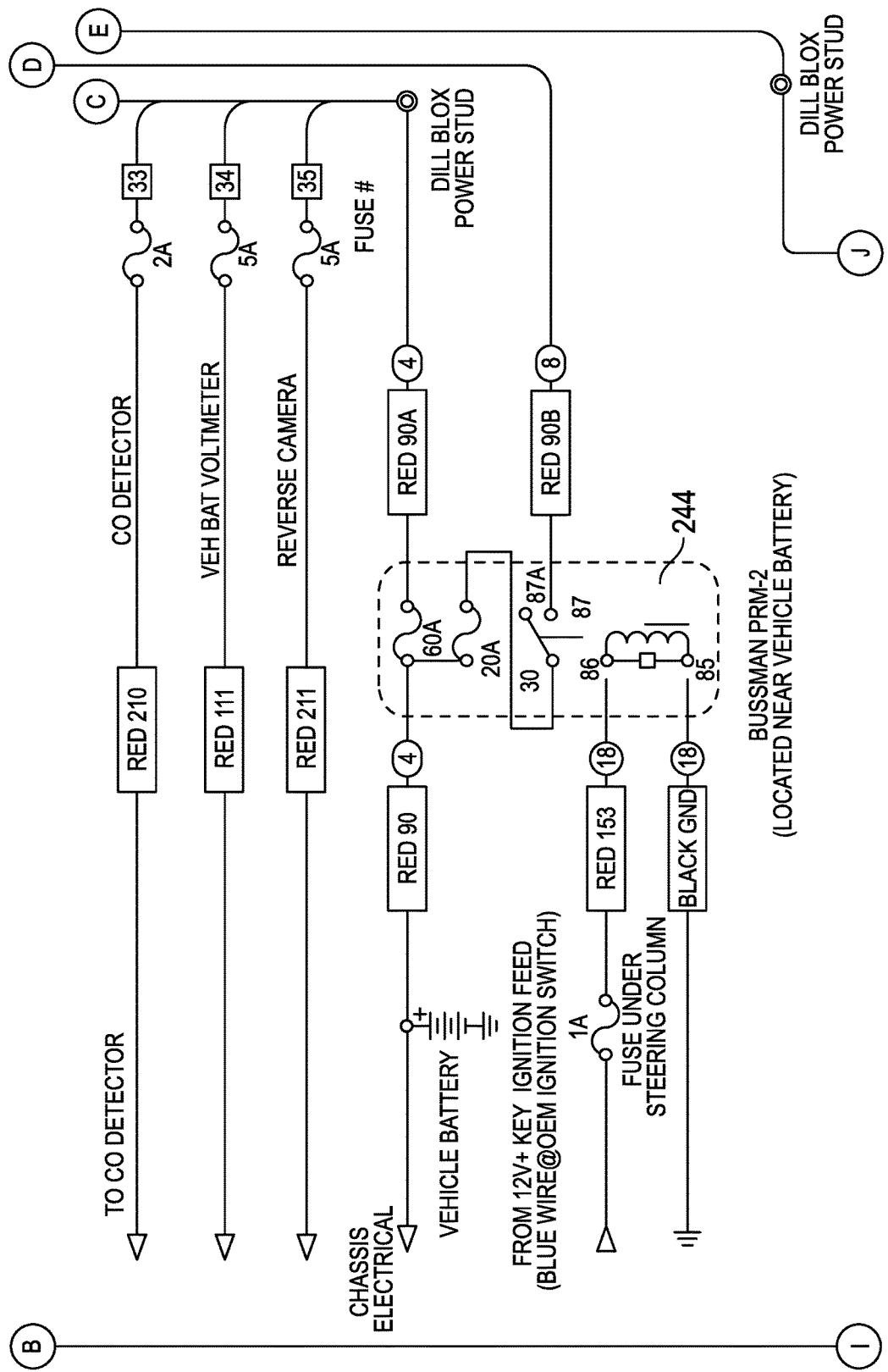
Figure 28D:
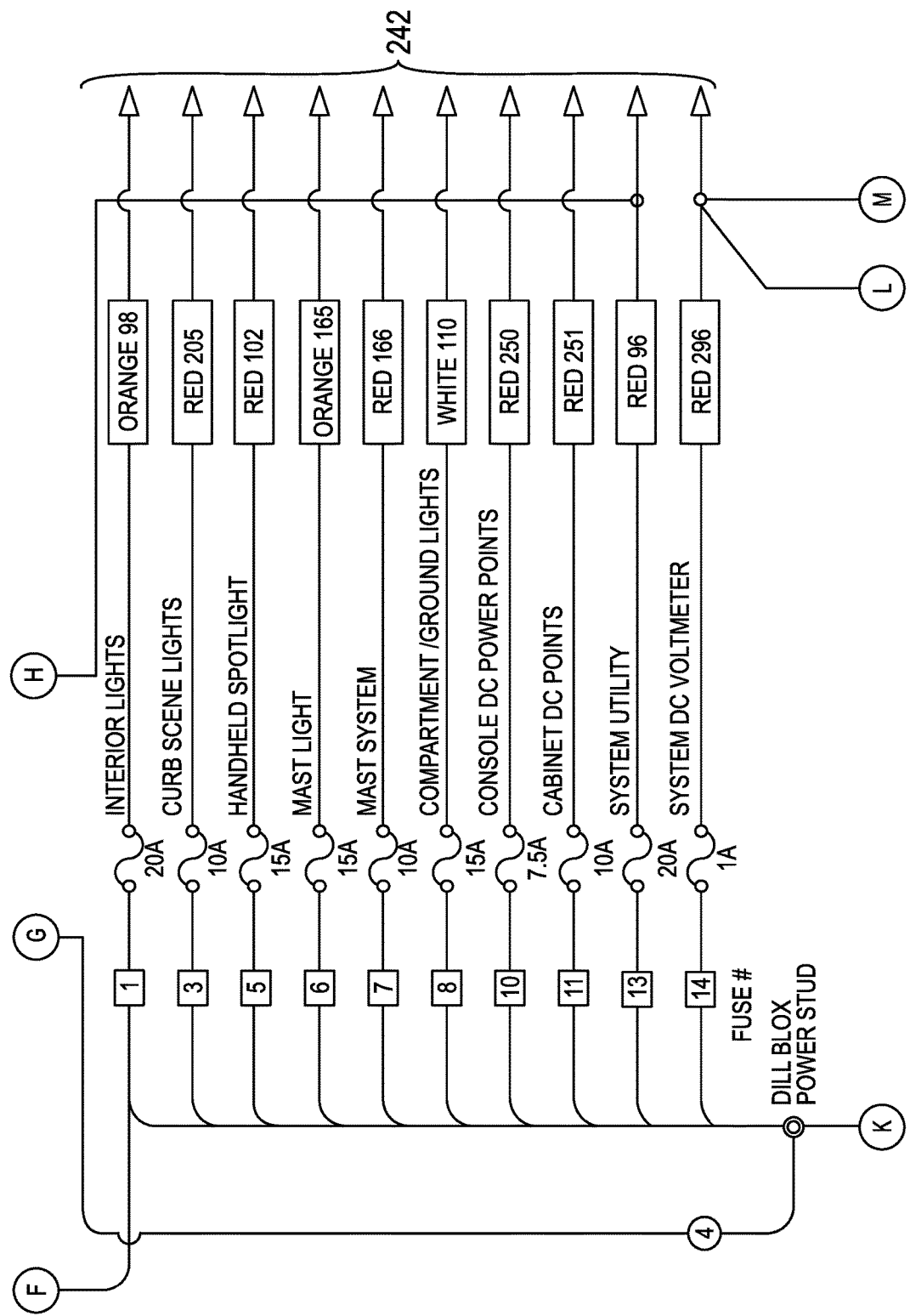
Figure 28E:
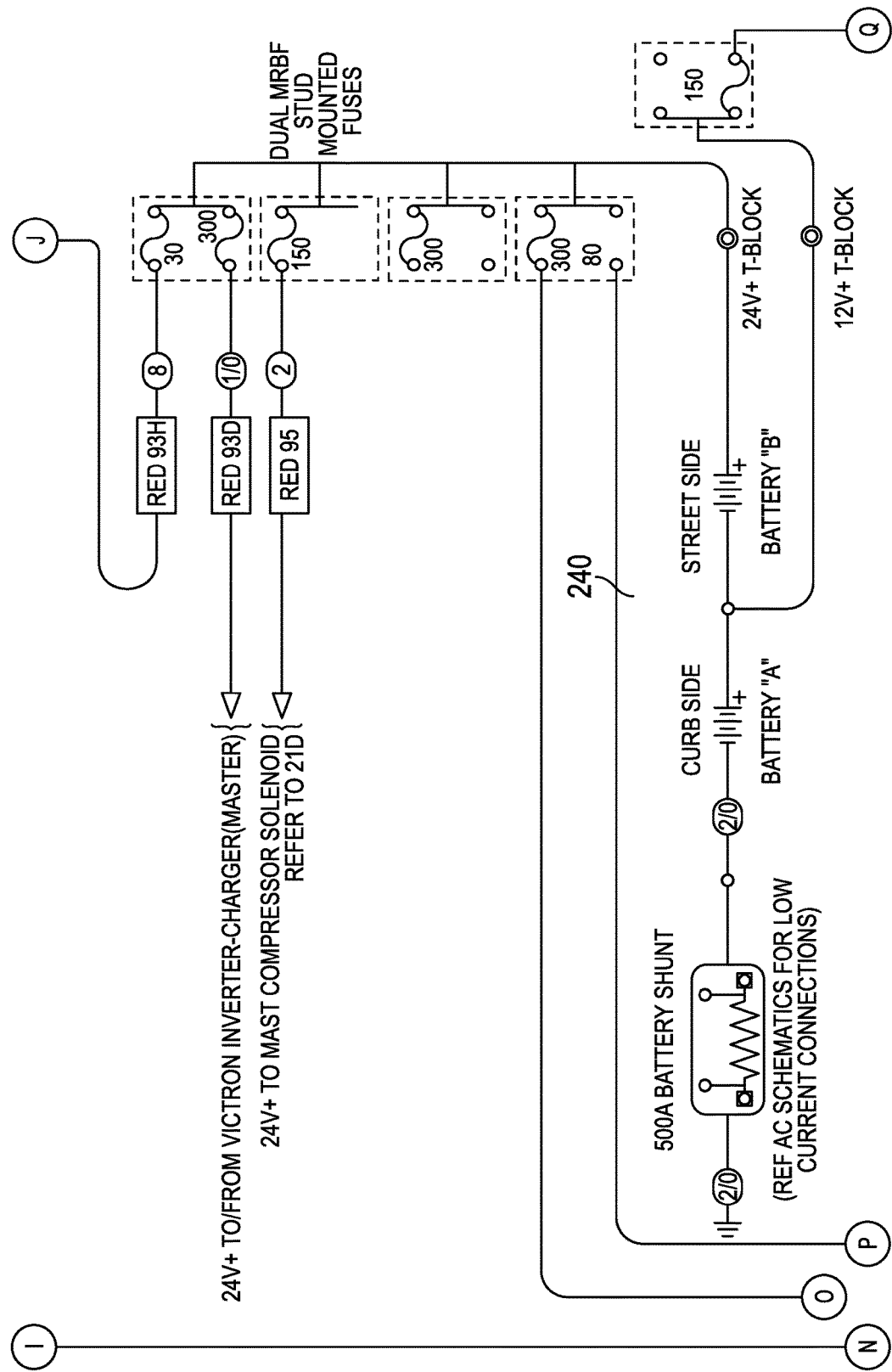
Figure 28F:
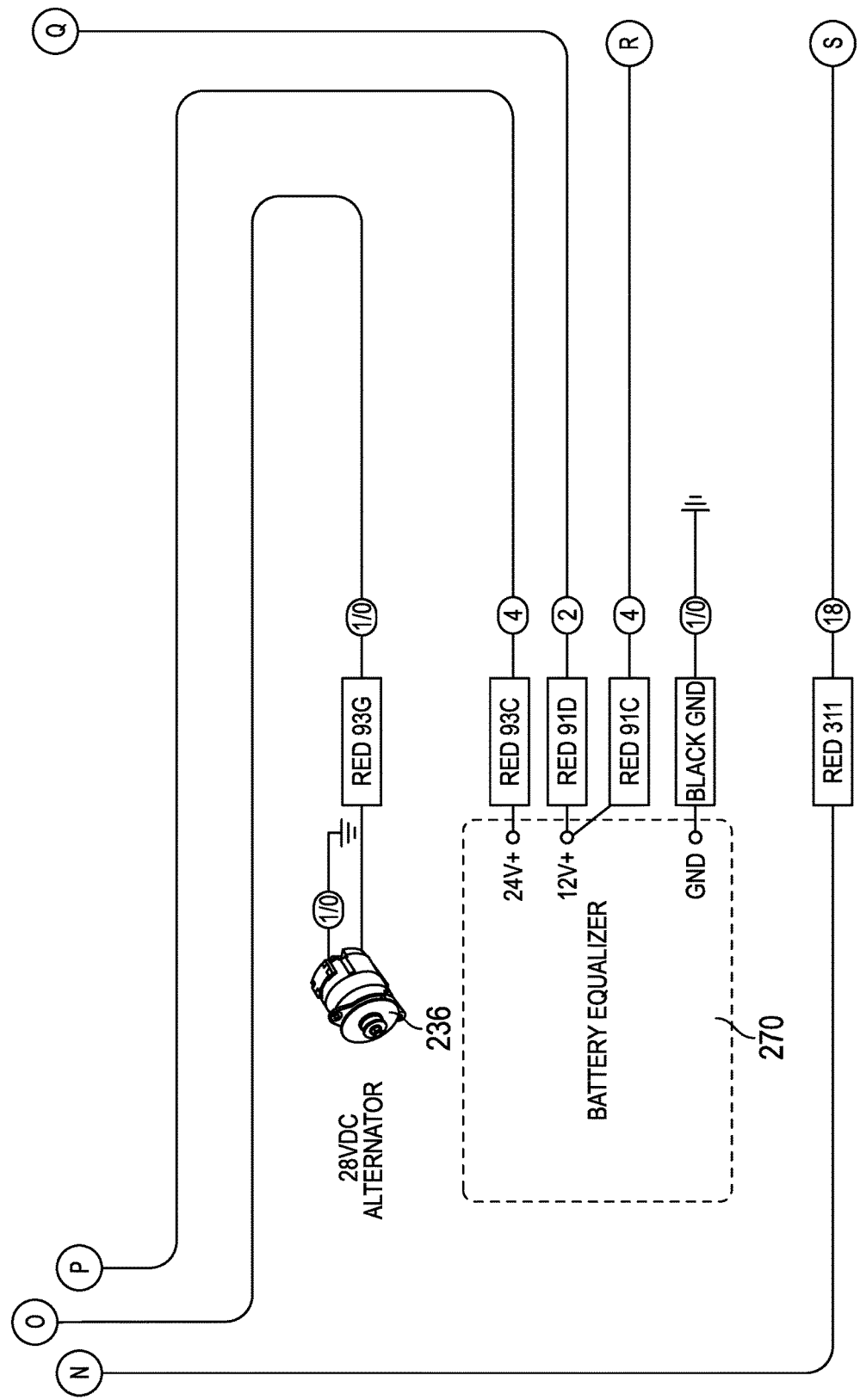
Figure 28G:
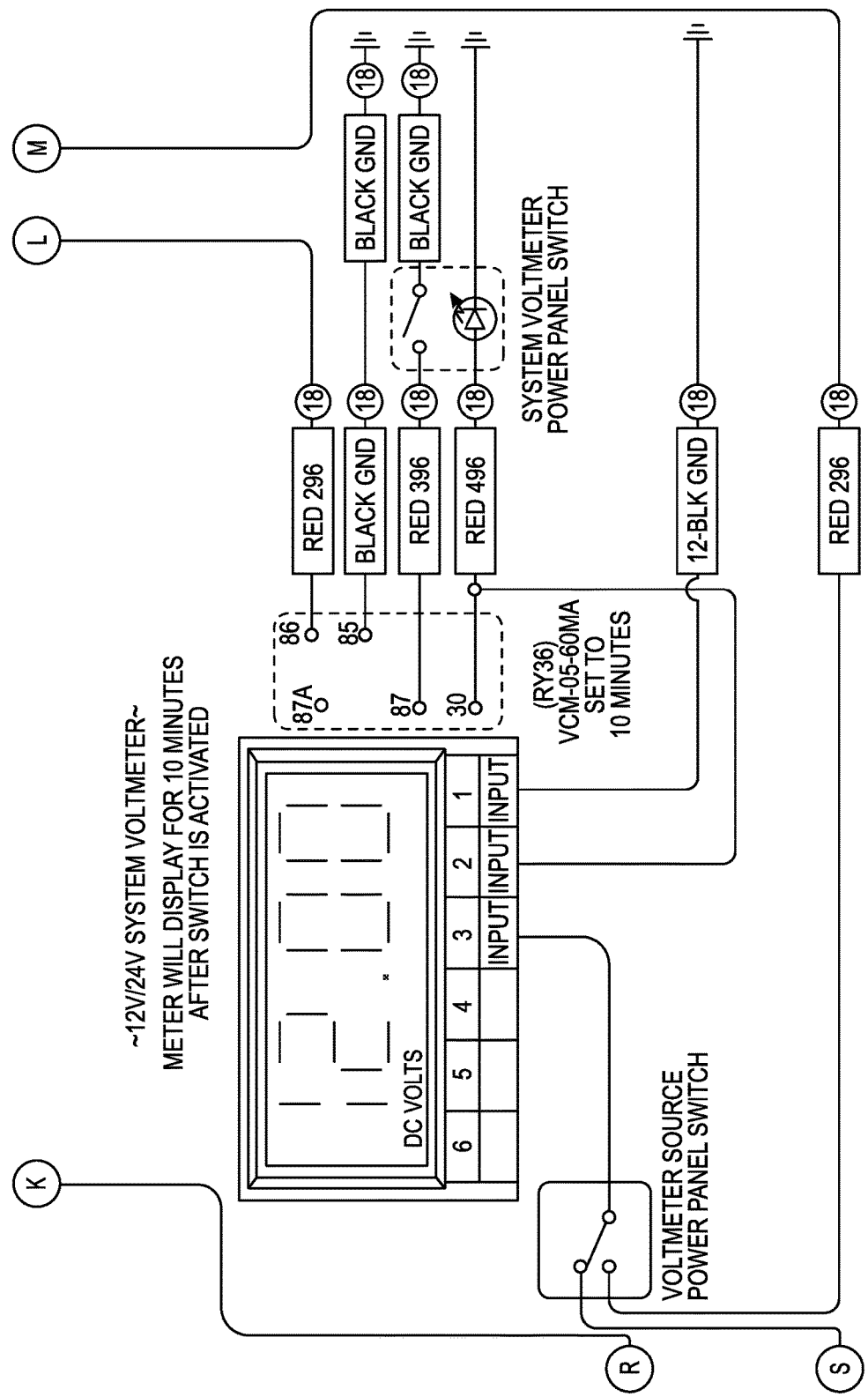
Figure 29A:
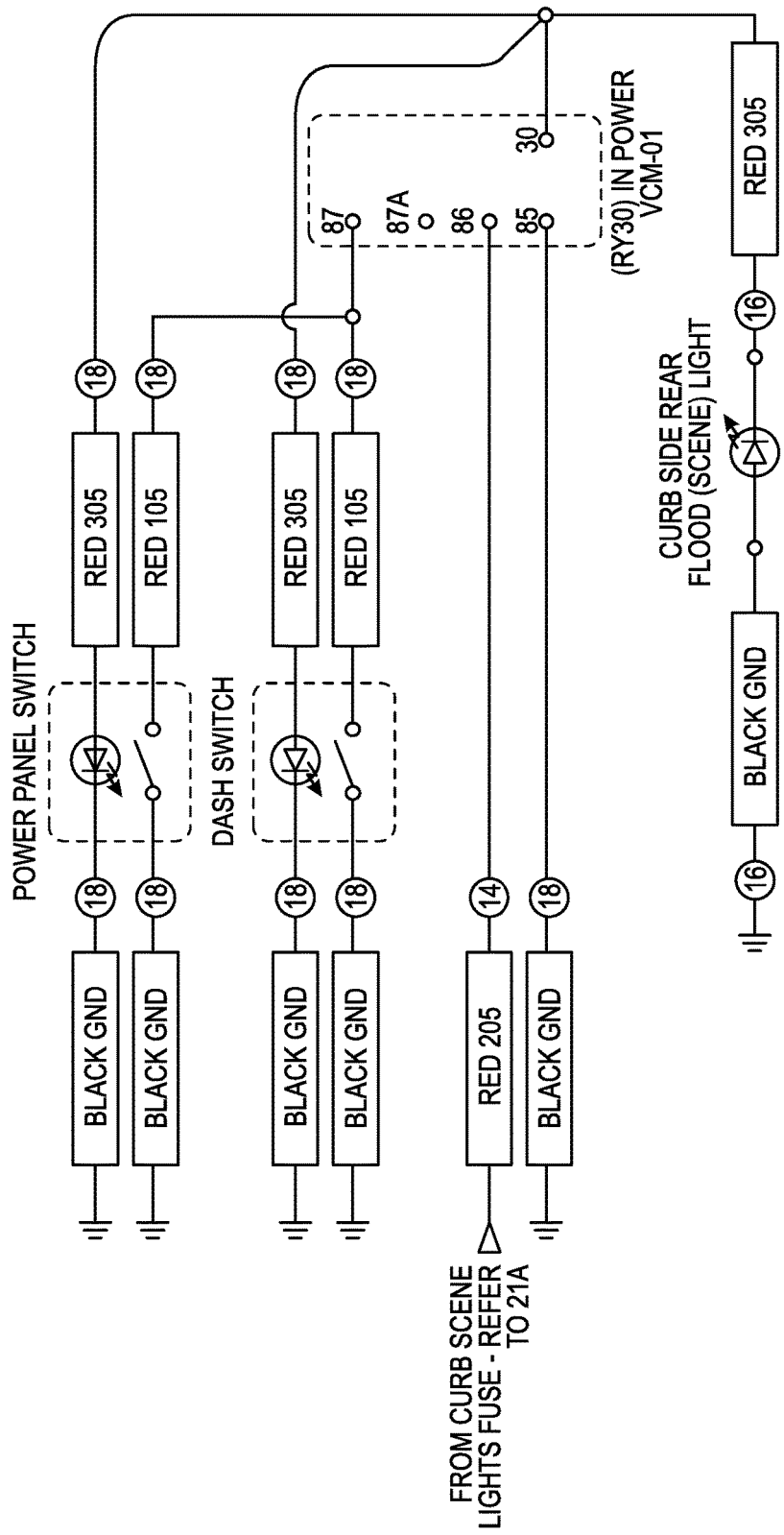
FIGS. 29A-29G are schematic diagrams of other portions of a DC portion of an auxiliary power system, according to yet another exemplary embodiment.
Figure 29B:
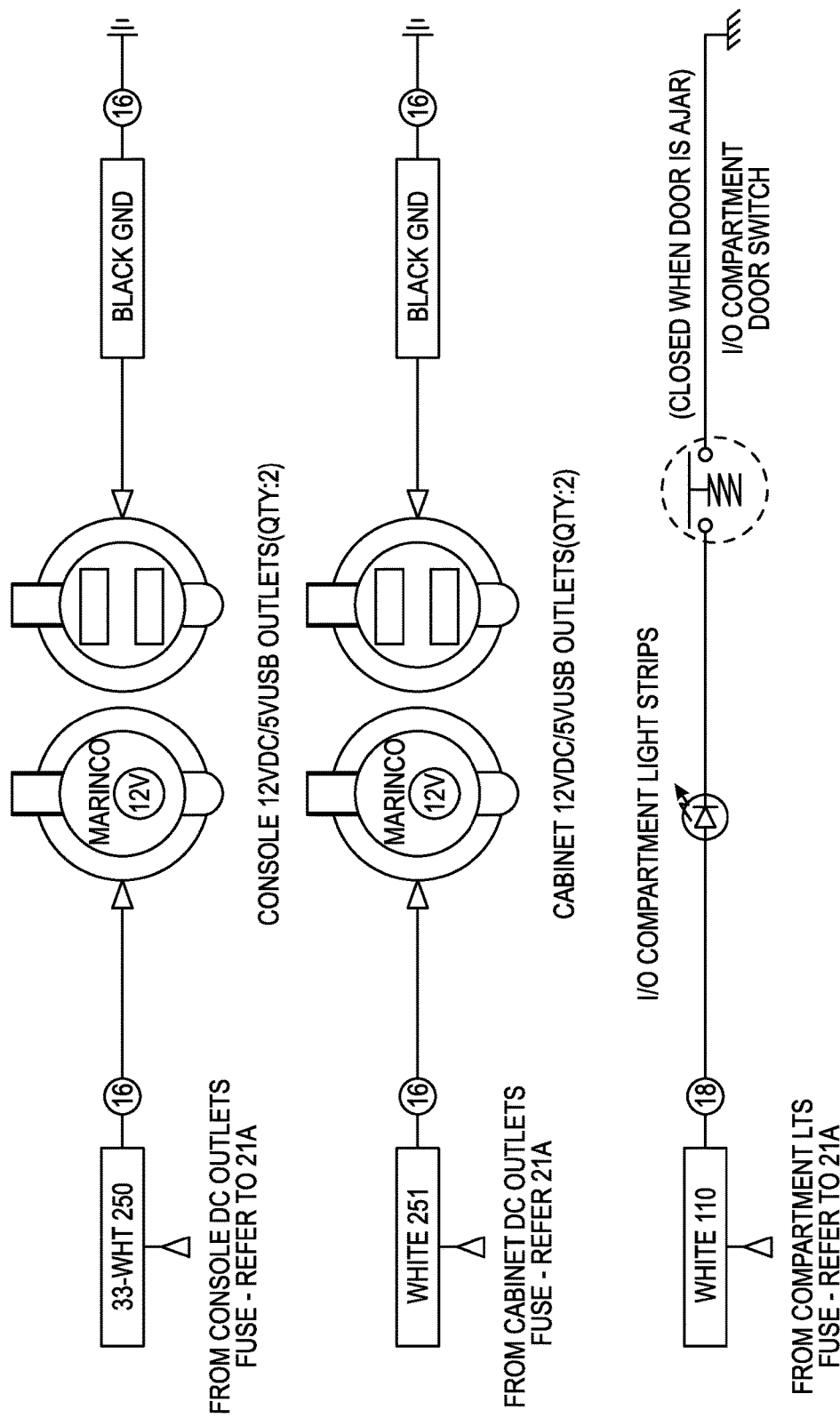
Figure 29C:
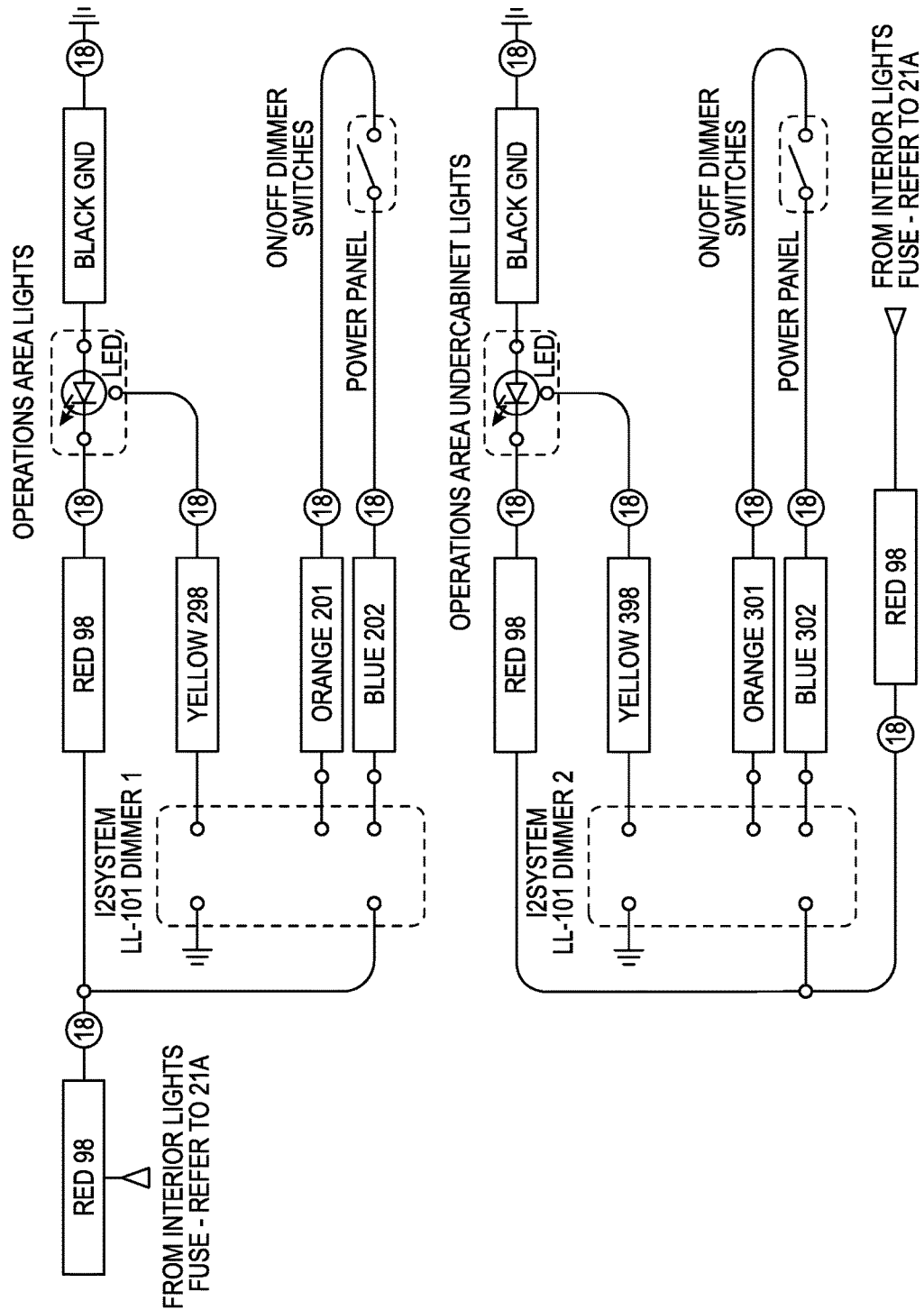
Figure 29D:
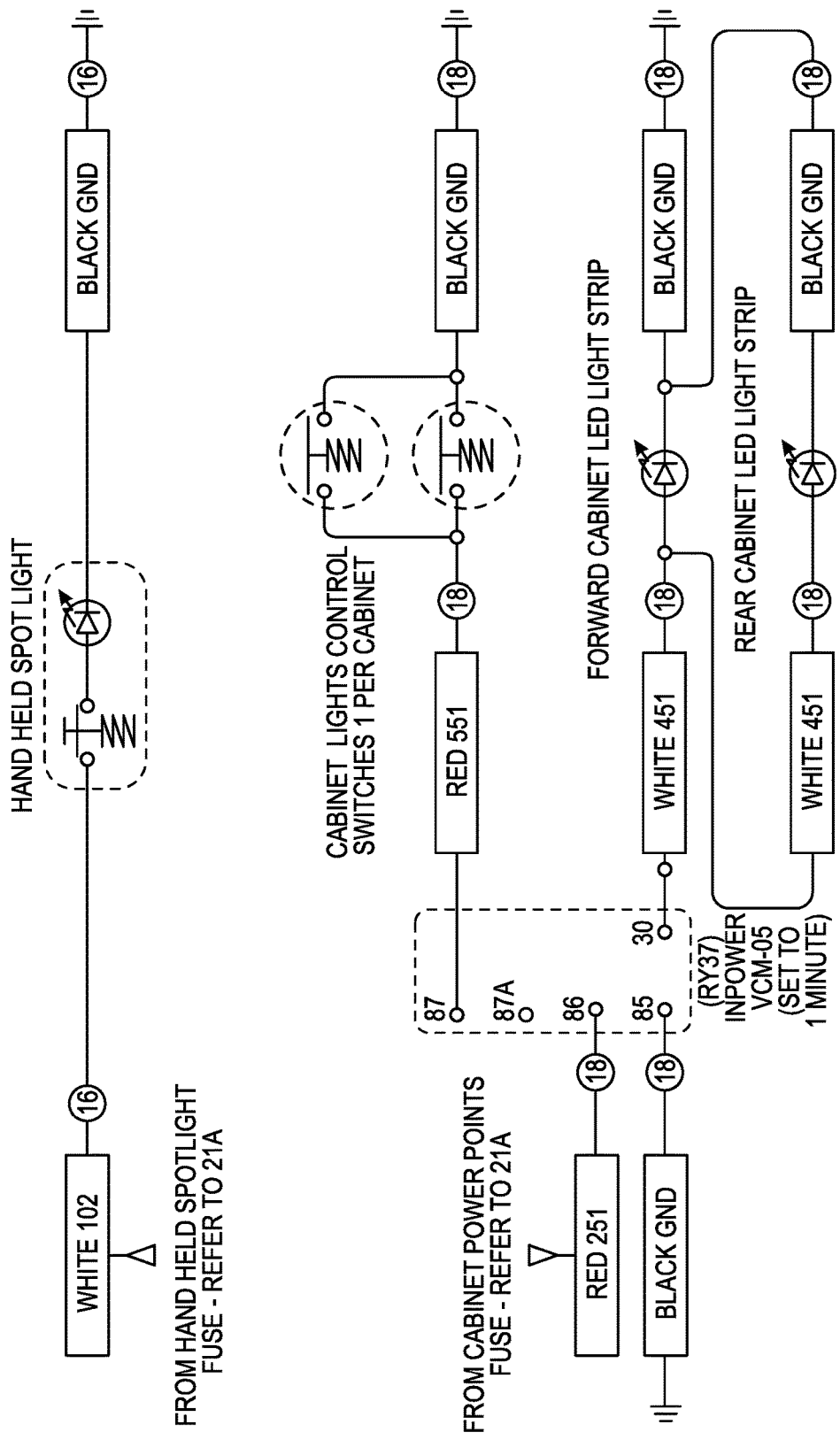
Figure 29E:
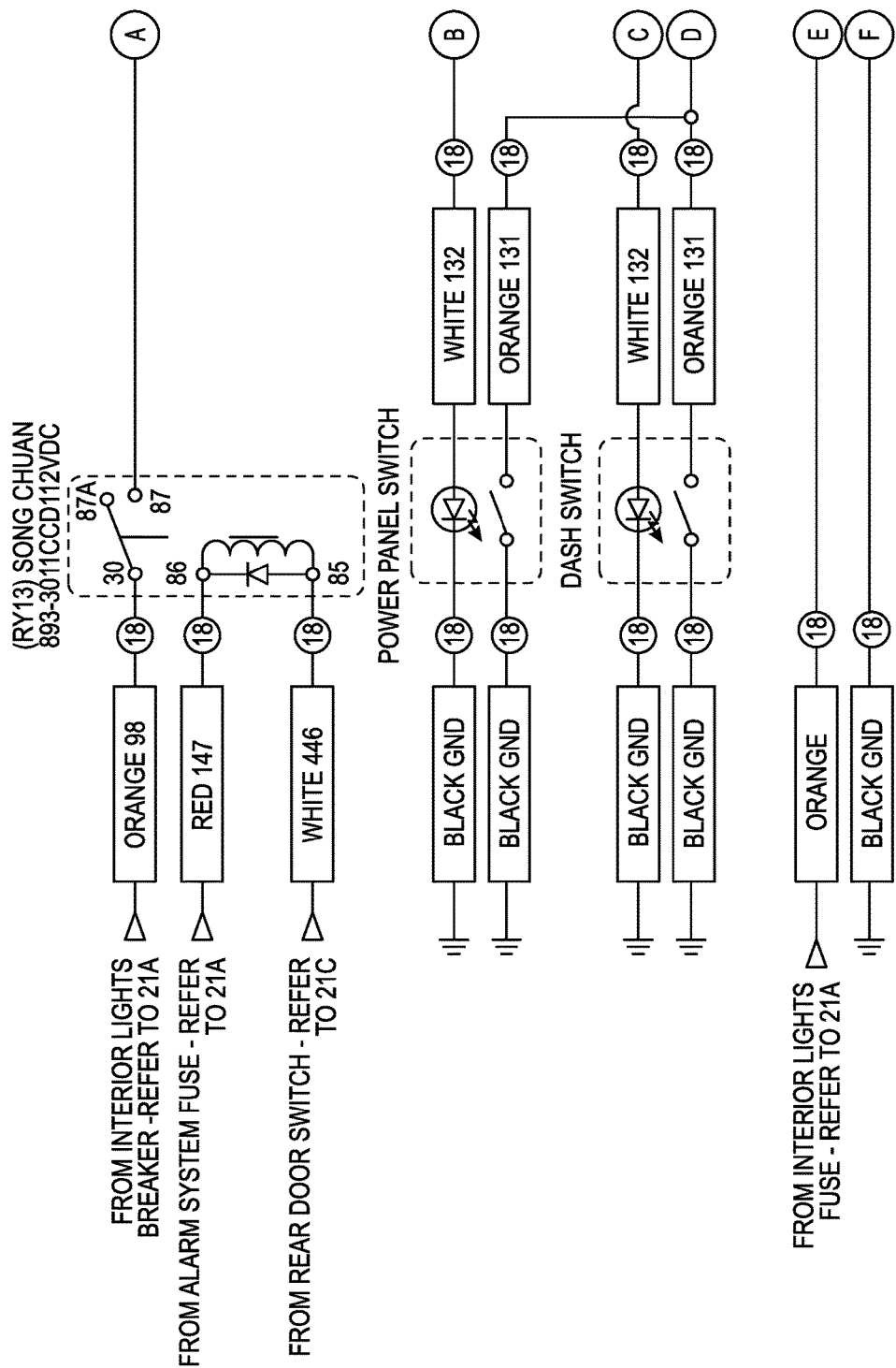
Figure 29F:
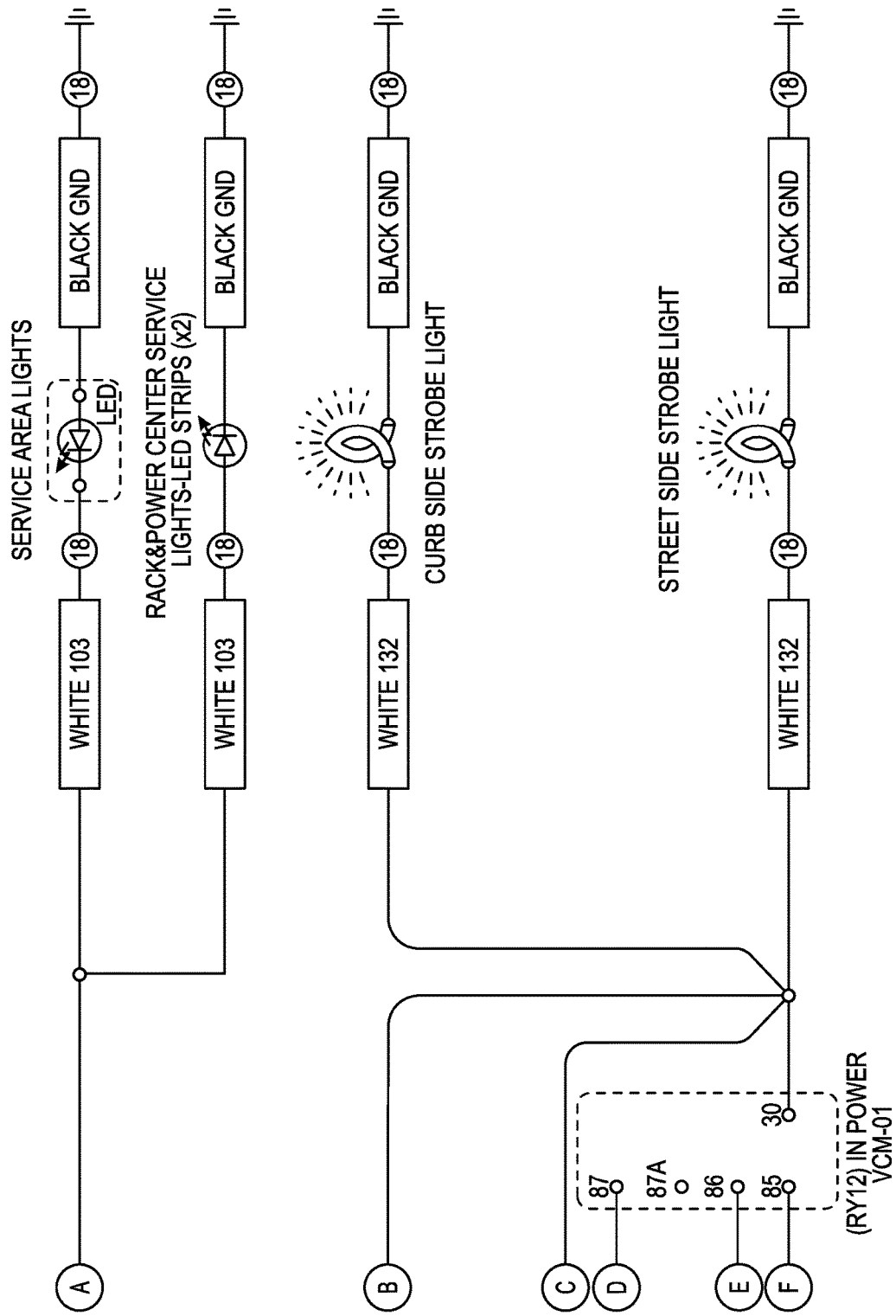
Figure 29G:
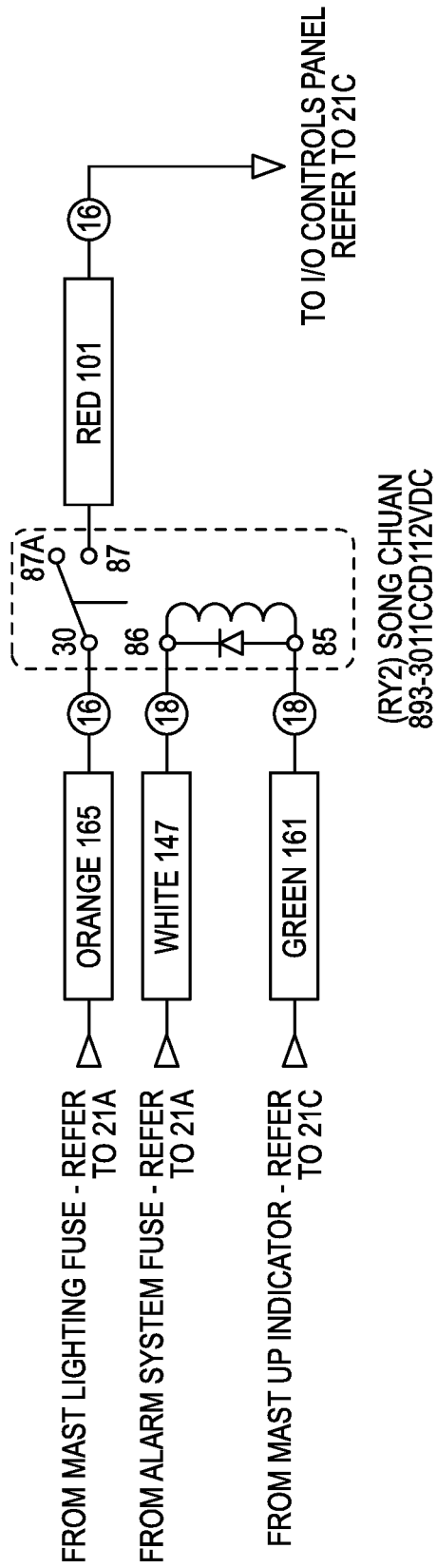
Figure 30B:
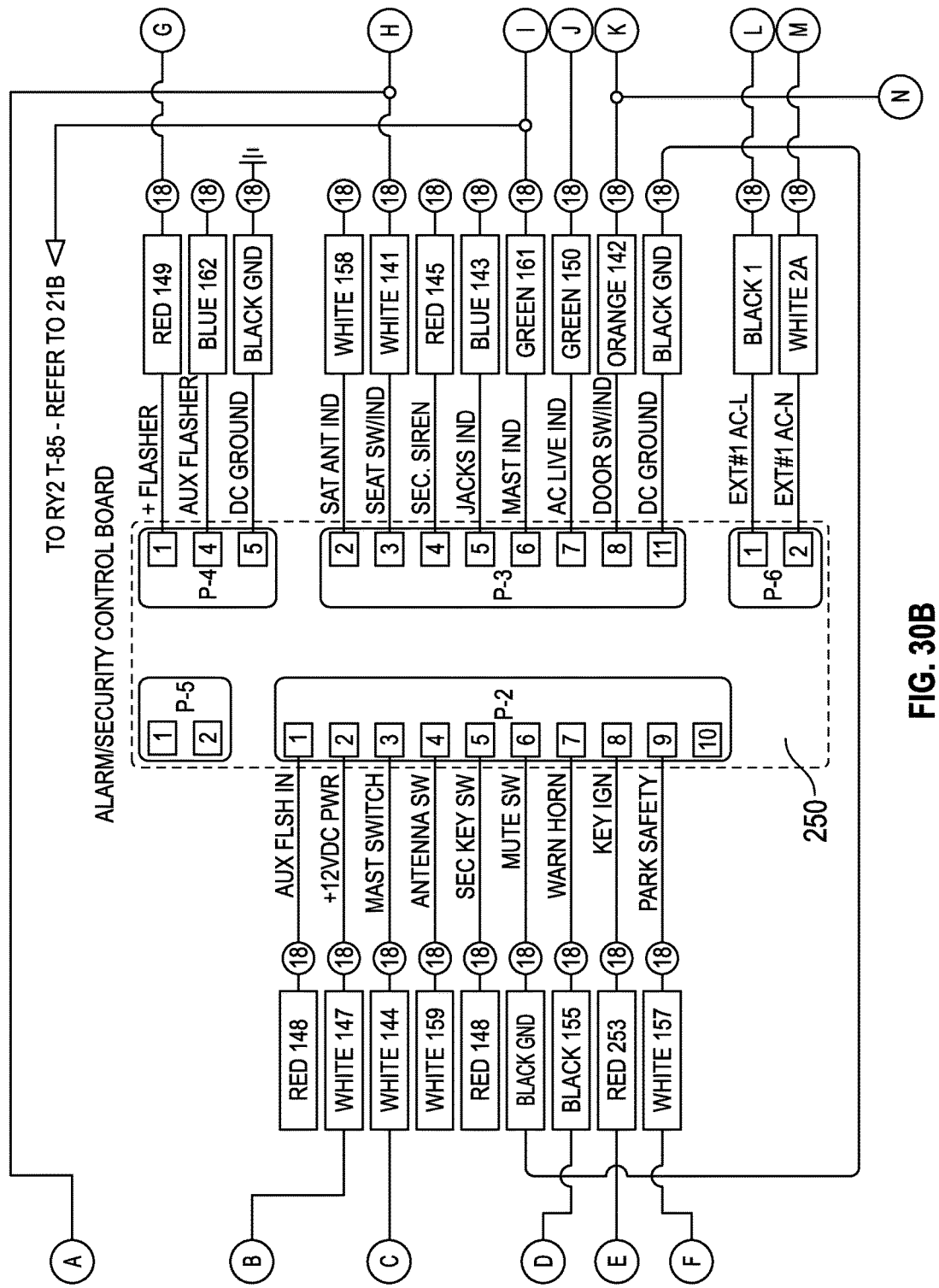
Figure 30C:
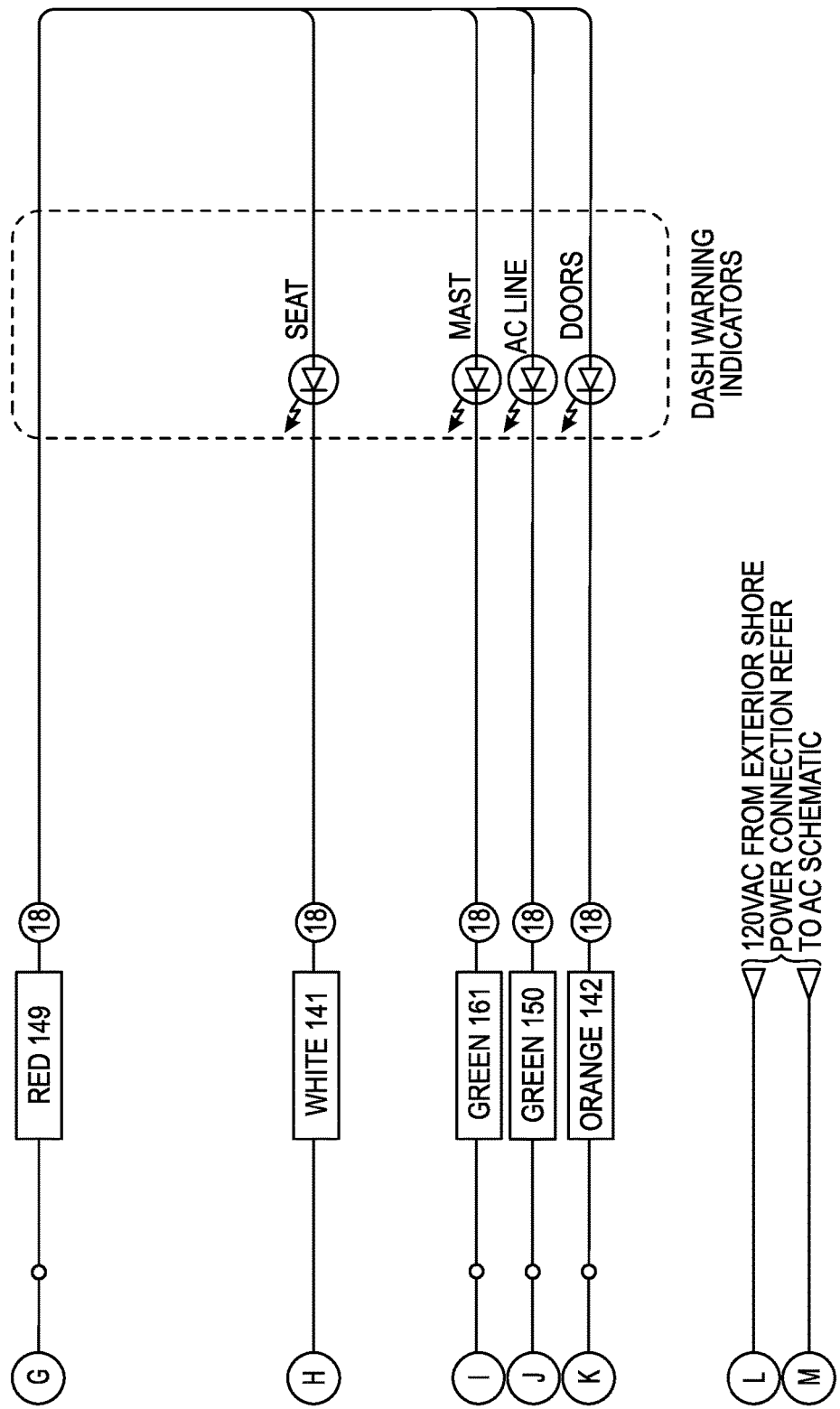
Figure 30D:
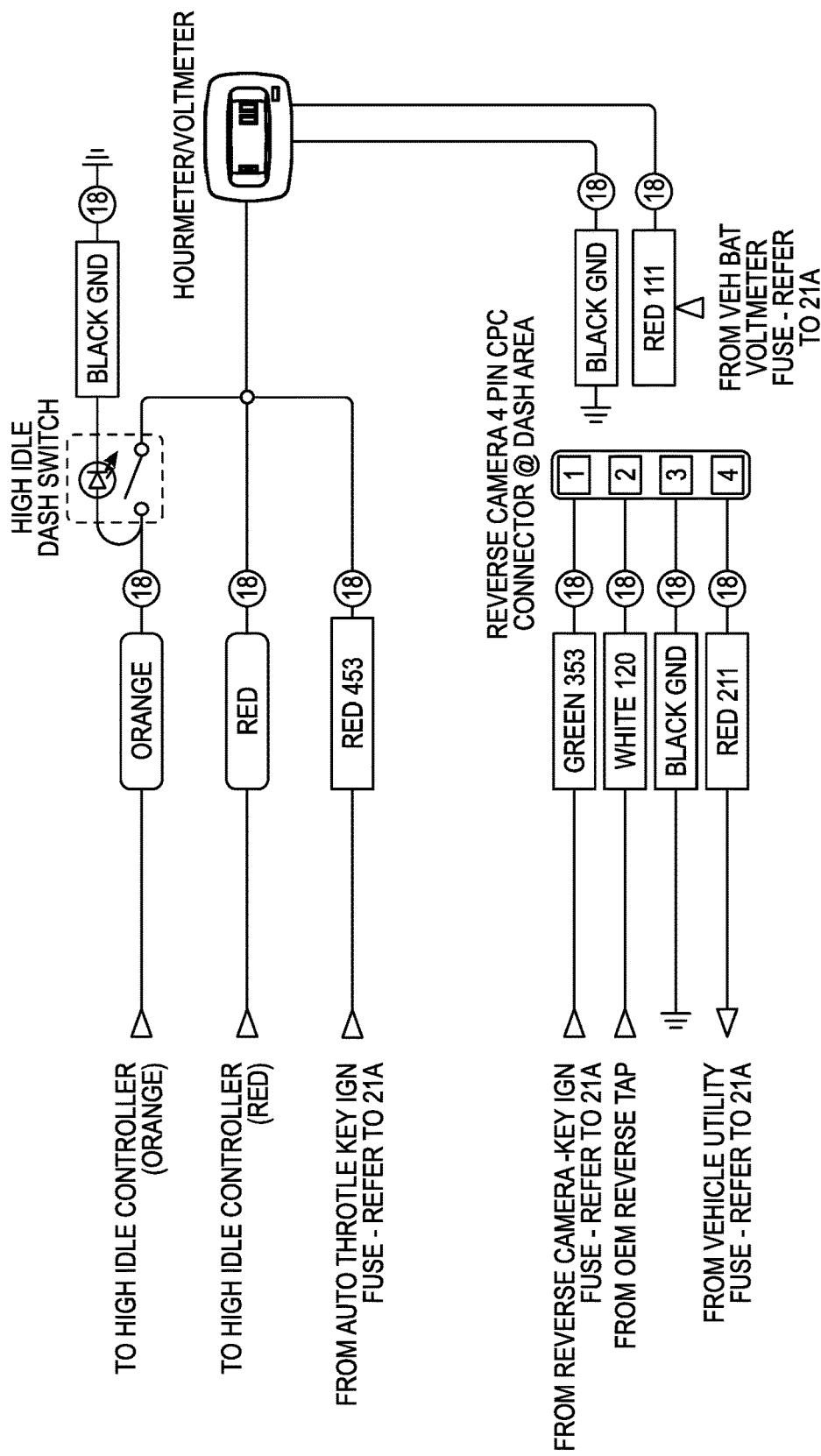
Figure 30E:
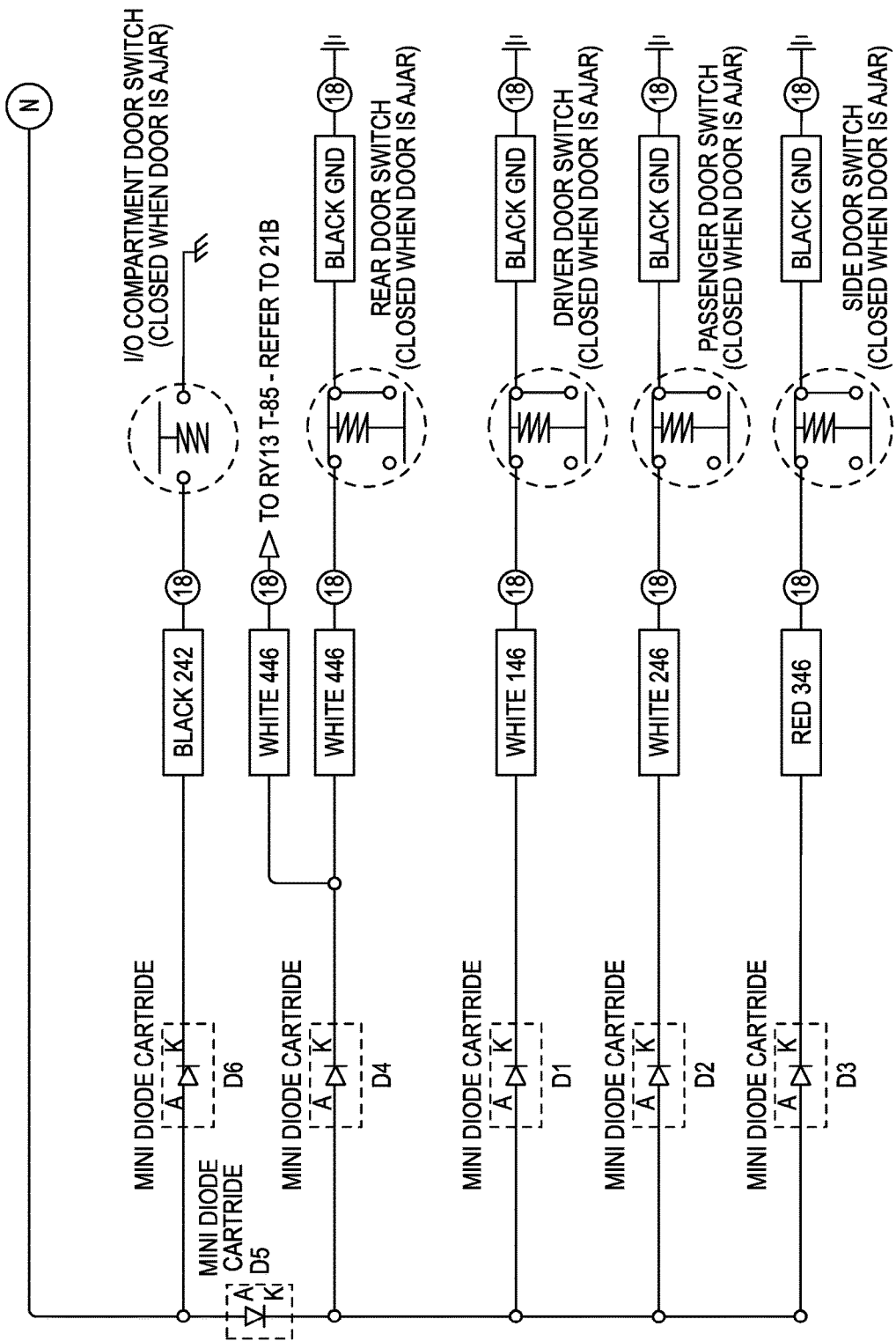
Figure 31A:
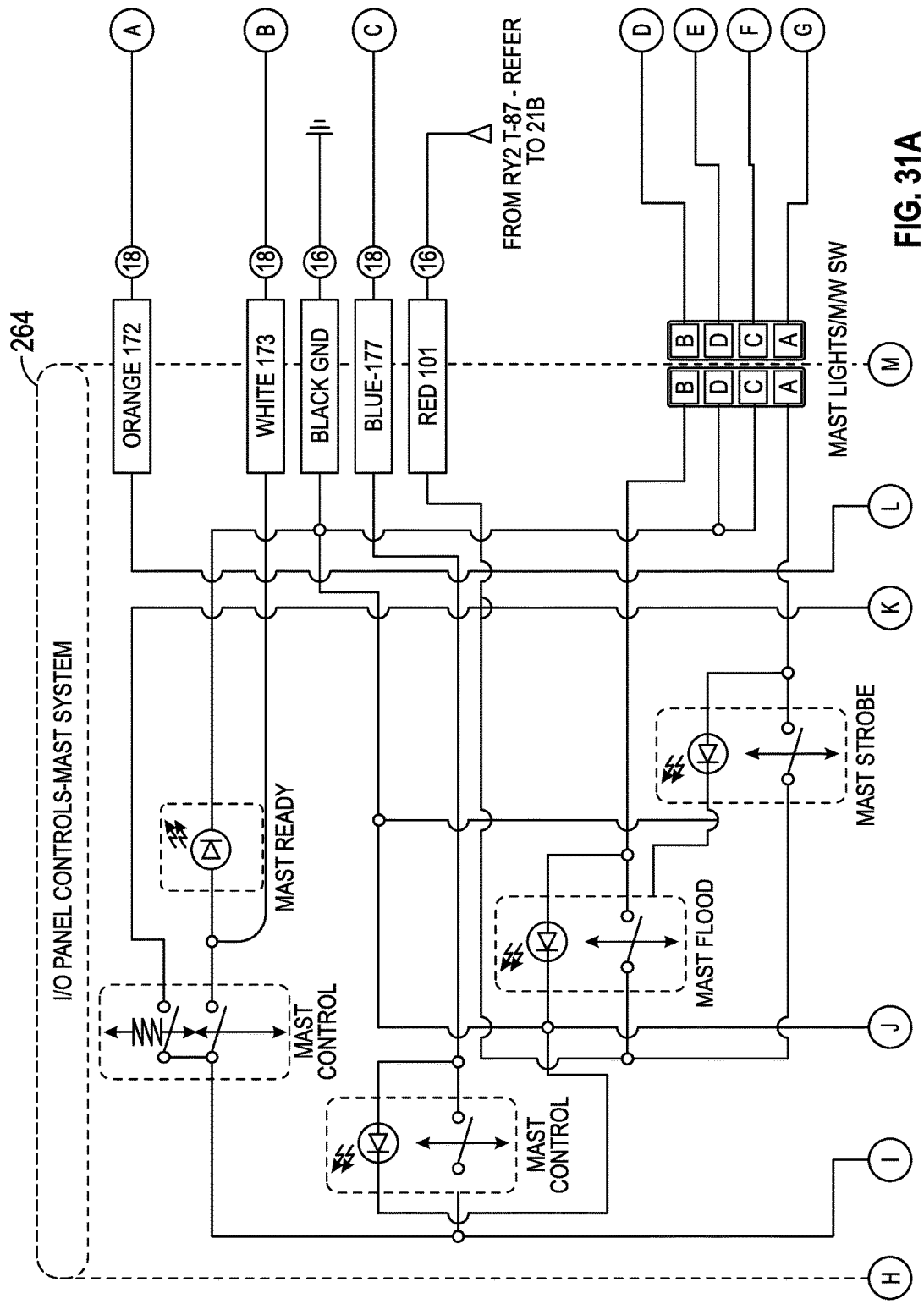
FIGS. 31A-31F are a schematic diagram of another portion of a DC portion of an auxiliary power system, according to yet another exemplary embodiment.
Figure 31B:
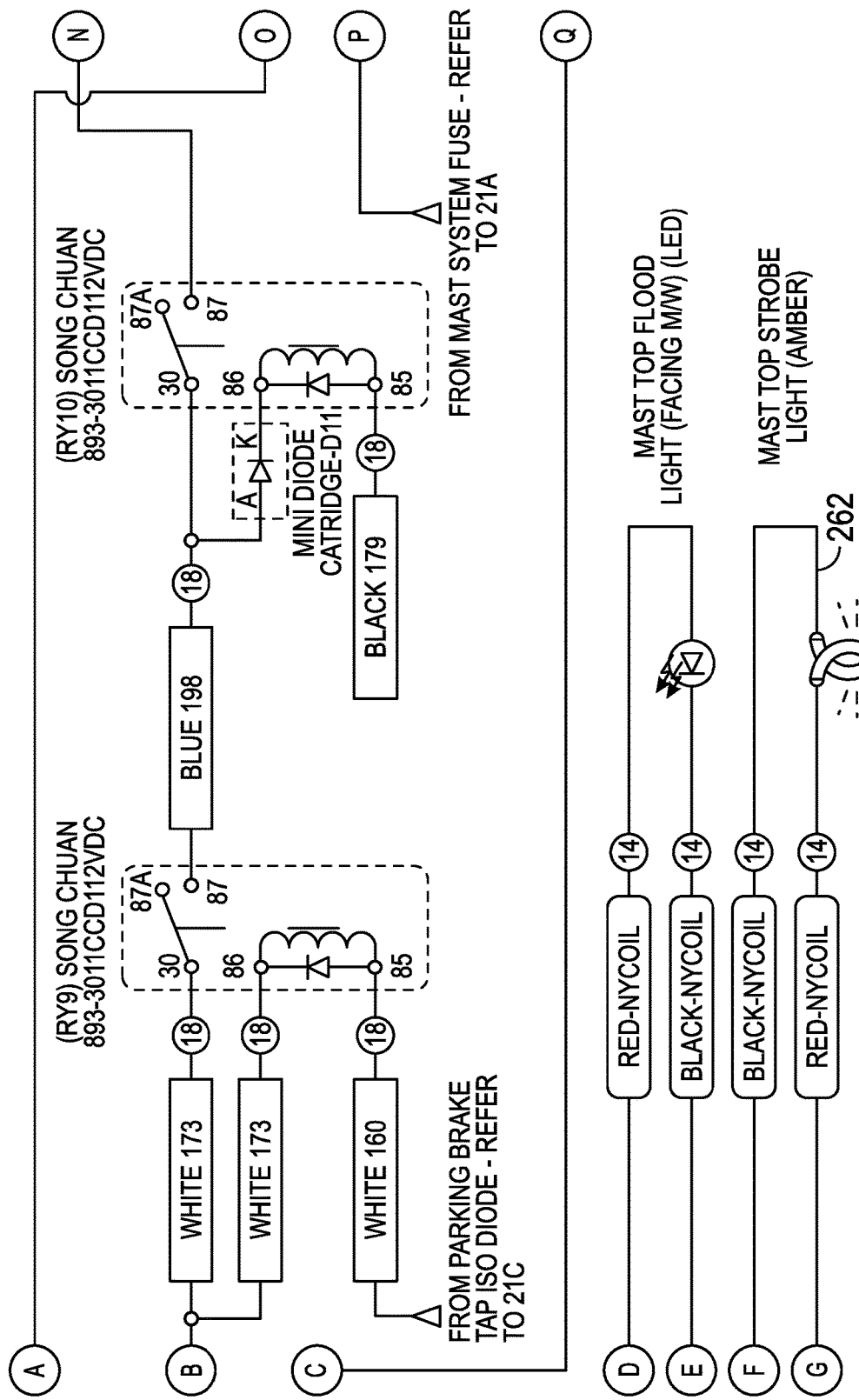
Figure 31C:
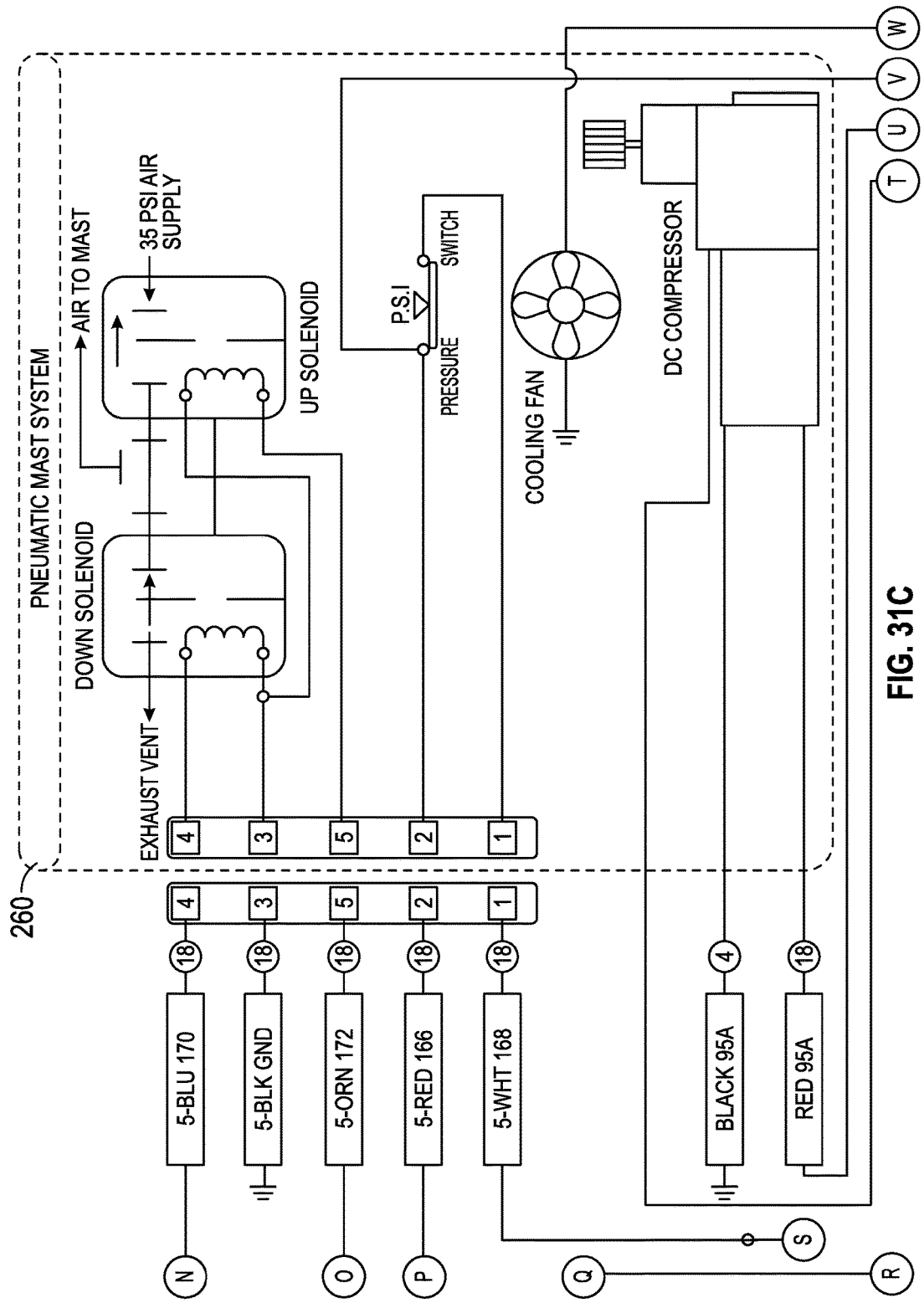
Figure 31D:
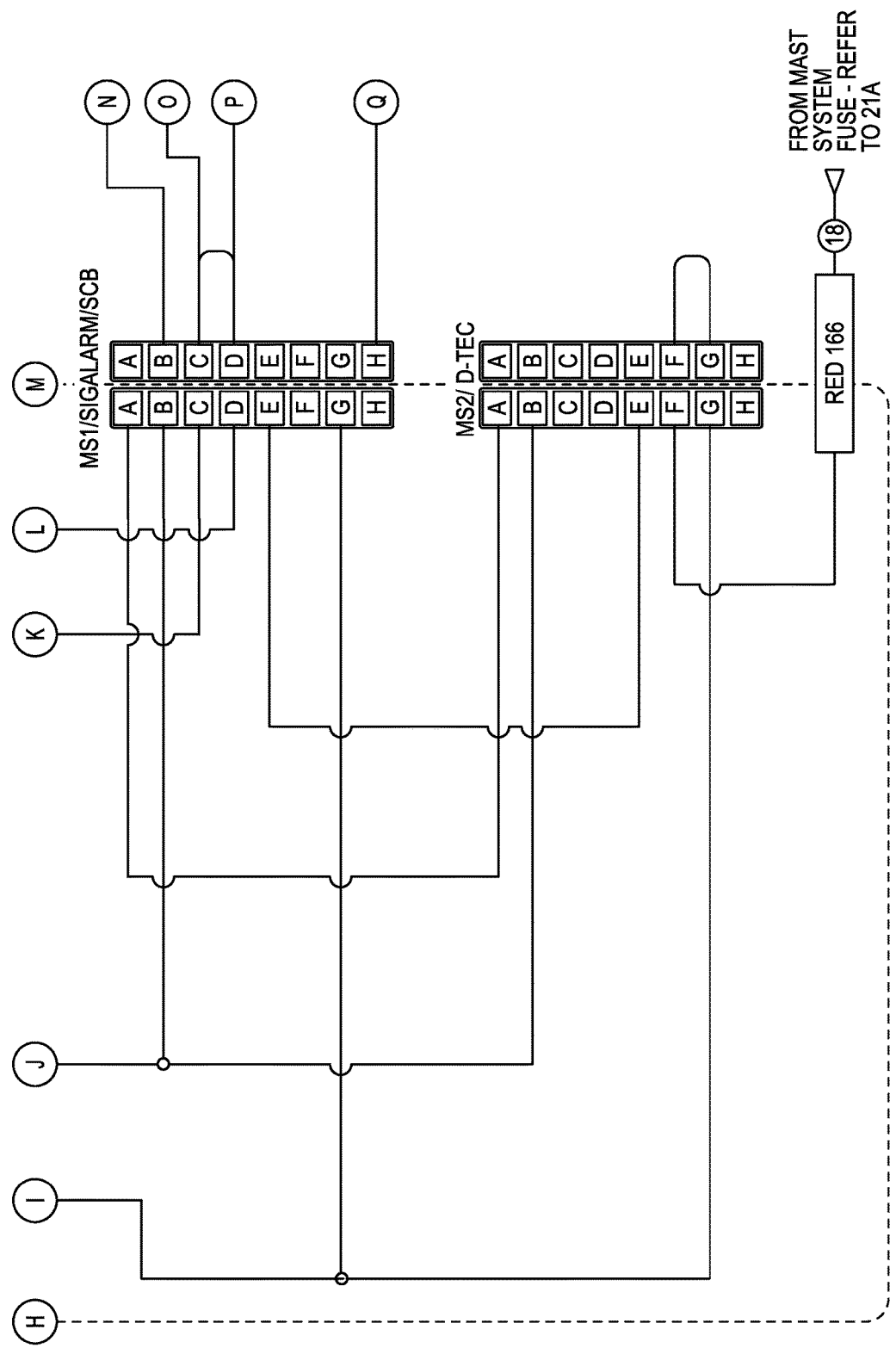
Figure 31E:
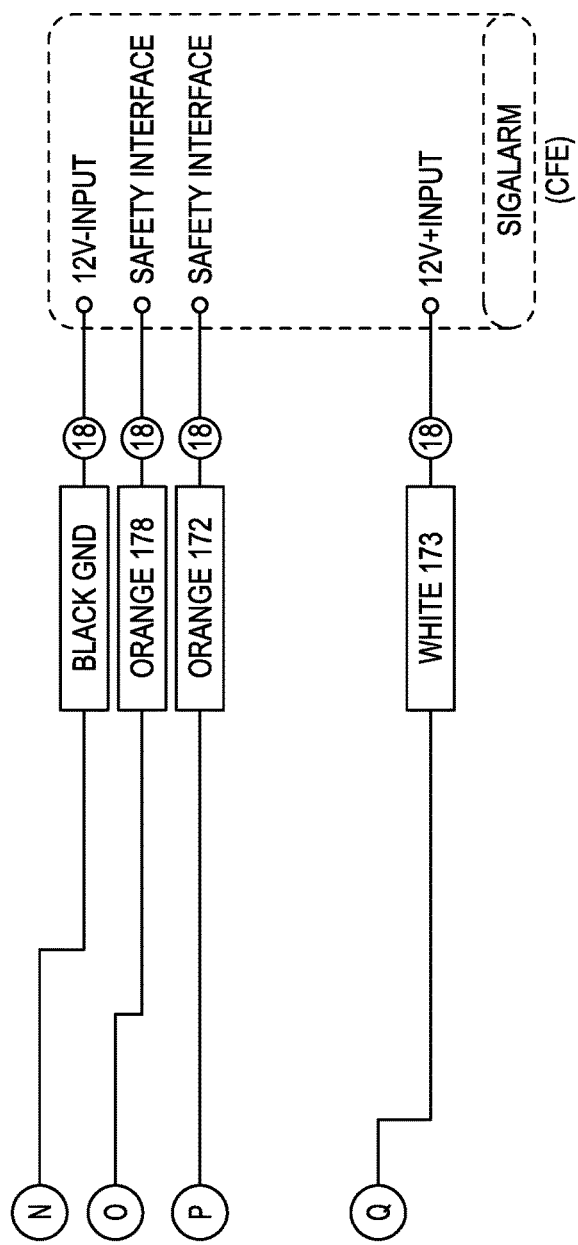
Figure 31F:
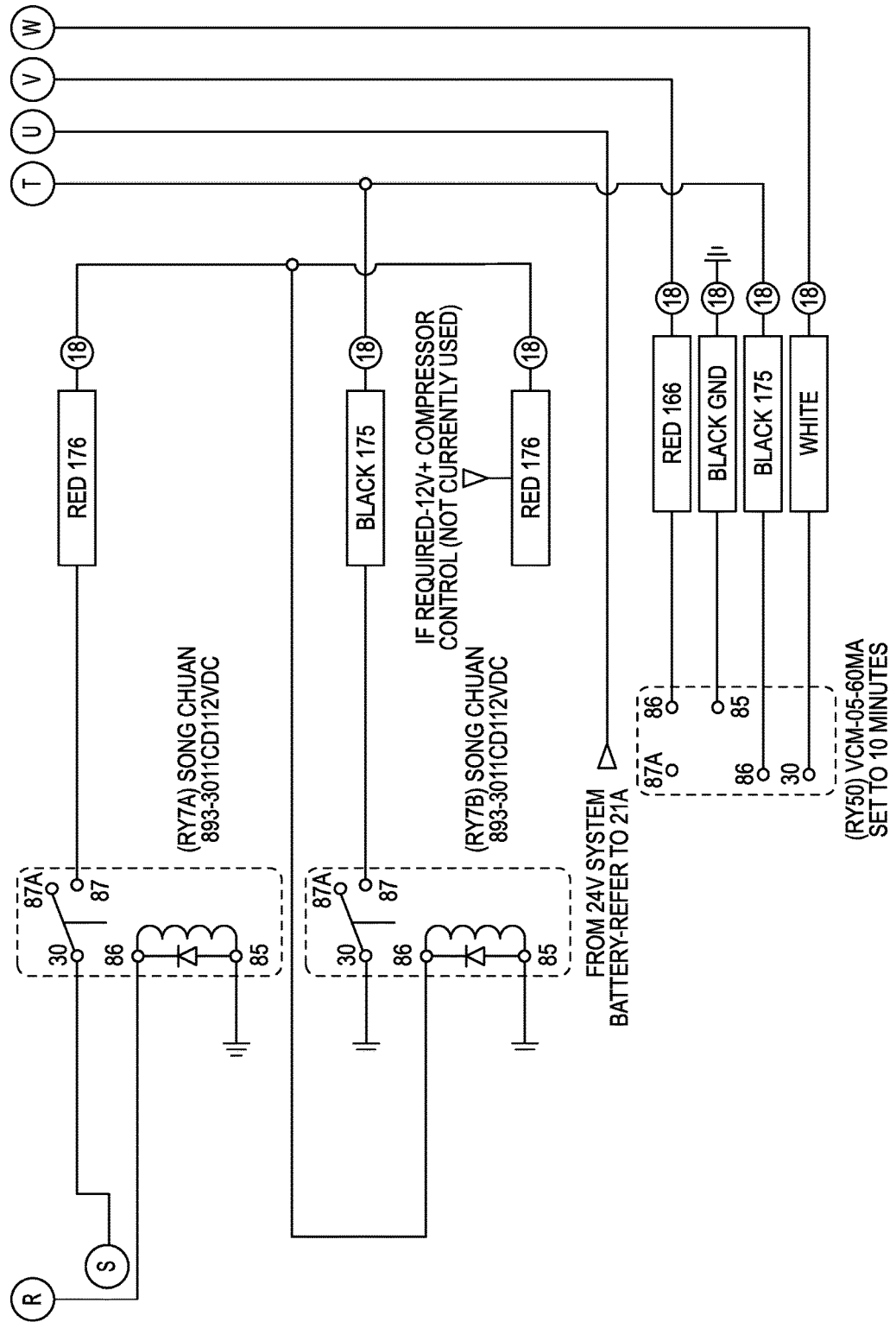

Referring generally to FIGS. 27A-31F, a third embodiment of an auxiliary power system for a vehicle is shown. FIGS. 27A-27C illustrate a schematic diagram of an AC portion of the auxiliary power system. The AC portion of the auxiliary power system may be similar to the AC portion of the first embodiment of the auxiliary power system as shown in FIGS. 16A-16C. However, it should be understood that the various embodiments may vary in terms of the power output to the various vehicle systems of the vehicle (e.g., compared to the embodiment shown in FIGS. 16A-16C, the embodiment of FIGS. 27A-27C is shown to provide a power output to different outlets of the vehicle, based on the vehicle configurations).

Referring now to FIGS. 28A-28G, in the third embodiment, the DC portion of the auxiliary power system is shown to include a battery equalizer 230 as described with reference to FIGS. 17A-17H. Battery equalizer 230 may be configured to ensure a battery voltage produced by battery system 240 is relatively stable, so that the power supply may be provided to various vehicle systems. However, the embodiment of FIGS. 28A-28G is shown not to include a solar power source. Unlike the first embodiment and like the second embodiment, there is no outside power source in addition to the power generated via local sources (e.g., battery system 240). In other embodiments, such features may be added to the system shown in FIGS. 28A-28G.

Referring to FIGS. 29A-31F, schematic diagrams of other portions of the DC portion of the auxiliary power system are shown in greater detail. The DC portion of the auxiliary power system as shown in detail in FIGS. 29A-31F may have the same general functionality as described with reference to the first and second embodiments. Referring in greater detail to FIGS. 31A-31F, I/O panel controls 264 for pneumatic mast system 260 are shown included, similar to the second embodiment shown in FIGS. 25A-25E.

The construction and arrangements of the power system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A vehicle, comprising:
a chassis;
an engine coupled to the chassis;
a primary electrical system configured to power one or more electrical loads associated with operation of the vehicle when the engine is running, the primary electrical system including a primary alternator configured to generate electrical power and a primary battery; and
an auxiliary electrical system including:
an auxiliary alternator configured to generate electrical power;
a battery system electrically coupled to the auxiliary alternator and configured to store at least a portion of the electrical power generated by the auxiliary alternator; and
an inverter coupled to the battery system, the inverter configured to at least one of (a) charge the battery system, (b) power a direct current load, and (c) power an alternating current load,
wherein at least one of:
the primary alternator is electrically decoupled from the battery system such that the primary alternator does not supply electrical power to the battery system; and
the auxiliary alternator is electrically decoupled from the primary battery such that the auxiliary alternator does not supply electrical power to the primary battery and the primary battery is electrically coupled to the one or more electrical loads associated with operation of the vehicle.

2. The vehicle of claim 1, wherein the inverter is electrically decoupled from the primary battery.

3. The vehicle of claim 1, wherein the auxiliary electrical system is configured to power various systems of the vehicle for an extended period of time without running the engine.

4. The vehicle of claim 1, wherein the battery system is configured to provide stored electrical power to at least one of the inverter and the direct current load.

5. The vehicle of claim 4, further comprising a controller configured to interrupt depletion of the stored electrical power associated with the battery system in response to receiving an inlet electrical energy from an electrical power connector.

6. The vehicle of claim 1, wherein the auxiliary electrical system has a power rating of at least 3 kW.

7. The vehicle of claim 1, wherein the auxiliary electrical system has a power rating of 3 kW.

8. A power system for a vehicle, comprising:
a primary electrical system configured to power one or more electrical loads associated with operation of the vehicle when the vehicle is running, the primary electrical system including a primary alternator configured to generate electrical power and a primary battery; and
an auxiliary electrical system configured to power various systems of the vehicle, the auxiliary electrical system including:
an auxiliary alternator configured to generate electrical power;
a battery system electrically coupled to the auxiliary alternator and configured to store at least a portion of the electrical power generated by the auxiliary alternator; and
an inverter coupled to the battery system, the inverter configured to at least one of (a) charge the battery system, (b) power a direct current load, and (c) power an alternating current load,
wherein at least one of:
the primary alternator is electrically decoupled from the battery system such that the primary alternator does not supply electrical power to the battery system; and
the auxiliary alternator is electrically decoupled from the primary battery such that the auxiliary alternator does not supply electrical power to the primary battery and the primary battery is electrically coupled to the one or more electrical loads associated with operation of the vehicle.

9. The power system of claim 8, wherein the inverter is electrically decoupled from the primary battery.

10. The power system of claim 8, further comprising a solar panel system electrically coupled to at least one of the battery system and the direct current load, the solar panel system configured to generate electrical power from incident solar energy, wherein the solar panel system provides the generated electrical power to at least one of the battery system and the direct current load.

11. The power system of claim 8, further comprising a controller configured to interrupt a power flow between the battery system and at least one of the direct current load and the alternating current load in response to the auxiliary electrical system receiving an inlet electrical energy from an electrical power connector.

12. The power system of claim 8, wherein the auxiliary electrical system has a power rating of at least 3 kW.

13. The power system of claim 8, wherein the auxiliary electrical system has a power rating of 3 kW.

14. The power system of claim 8, wherein the battery system is configured to provide direct current electrical energy to at least one of the inverter and the direct current load at a target voltage.

15. A method for powering a vehicle, comprising:
   converting mechanical energy from an engine of the vehicle into primary direct current electrical energy with a primary alternator of a primary electrical system;
   supplying at least a portion of the primary direct current electrical energy to a primary battery of the primary electrical system;
   generating auxiliary direct current electrical energy with an auxiliary alternator of an auxiliary electrical system;
   storing the generated auxiliary direct current electrical energy in a battery system of the auxiliary electrical system;
   converting the stored auxiliary direct current electrical energy to converted alternating current electrical energy with an inverter of the auxiliary electrical system; and
   powering one or more systems of the vehicle with the auxiliary electrical system while the engine of the vehicle is turned off,
   wherein at least one of:
      the primary alternator is electrically decoupled from the battery system such that the primary direct current electrical energy from the primary alternator is not supplied to the battery system; and
      the auxiliary alternator is electrically decoupled from the primary battery such that the auxiliary direct current electrical energy from the auxiliary alternator is not supplied to the primary battery and the primary battery is electrically coupled to one or more electrical loads.

16. The method of claim 15, wherein the inverter of the auxiliary electrical system is electrically decoupled from the primary battery.

17. The method of claim 15, wherein the auxiliary electrical system has a power rating of at least 3 kW.

* * * * *